United States Patent
Forgeron et al.

(10) Patent No.: US 9,108,883 B2
(45) Date of Patent: Aug. 18, 2015

(54) APPARATUS FOR CARBONATION OF A CEMENT MIX

(71) Applicant: CarbonCure Technologies, Inc., Halifax (CA)

(72) Inventors: Dean Paul Forgeron, White's Lake (CA); George Sean Monkman, Montreal (CA); Kevin Cail, Sarasota, FL (US); Joshua Jeremy Brown, Lower Sackville (CA)

(73) Assignee: CarbonCure Technologies, Inc., Dartmouth, Nova Scotia (CA)

( * ) Notice: Subject to any disclaimer, the term of this patent is extended or adjusted under 35 U.S.C. 154(b) by 0 days.

(21) Appl. No.: 14/249,308

(22) Filed: Apr. 9, 2014

(65) Prior Publication Data

US 2014/0373755 A1    Dec. 25, 2014

Related U.S. Application Data

(60) Provisional application No. 61/839,312, filed on Jun. 25, 2013, provisional application No. 61/847,254, filed on Jul. 17, 2013, provisional application No. 61/879,049, filed on Sep. 17, 2013, provisional application No. 61/925,100, filed on Jan. 8, 2014, provisional application No. 61/938,063, filed on Feb. 10, 2014.

(51) Int. Cl.
| | |
|---|---|
| *C04B 12/00* | (2006.01) |
| *B29B 7/60* | (2006.01) |
| *C04B 40/02* | (2006.01) |

(52) U.S. Cl.
CPC ............... *C04B 12/00* (2013.01); *B29B 7/603* (2013.01); *C04B 40/0231* (2013.01)

(58) Field of Classification Search
CPC ............ B29B 7/60; B29B 7/603; C04B 12/00
See application file for complete search history.

(56) References Cited

U.S. PATENT DOCUMENTS

| | | |
|---|---|---|
| 1,932,150 A | 10/1933 | Tada |
| 2,329,940 A | 9/1943 | Ponzer |
| 2,496,895 A | 2/1950 | Staley |
| 3,356,779 A | 12/1967 | Schulze |
| 3,358,342 A | 12/1967 | Spence |
| 3,468,993 A | 9/1969 | Bierlich |

(Continued)

FOREIGN PATENT DOCUMENTS

| | | |
|---|---|---|
| CA | 0970935 A | 7/1975 |
| CA | 1185078 A | 7/1985 |

(Continued)

OTHER PUBLICATIONS

International search report and written opinion dated Sep. 18, 2014 for PCT/CA2014/050611.

(Continued)

*Primary Examiner* — Charles Cooley
(74) *Attorney, Agent, or Firm* — Wilson Sonsini Goodrich and Rosati

(57) ABSTRACT

The invention provides compositions and methods directed to carbonation of a cement mix during mixing. The carbonation may be controlled by one or more feedback mechanisms to adjust carbon dioxide delivery based on one or more characteristics of the mix or other aspects of the mixing operation.

43 Claims, 53 Drawing Sheets

(56) References Cited

U.S. PATENT DOCUMENTS

| | | | |
|---|---|---|---|
| 3,492,385 | A | 1/1970 | Simunic |
| 4,069,063 | A | 1/1978 | Ball |
| 4,093,690 | A | 6/1978 | Murray |
| 4,117,060 | A | 9/1978 | Murray |
| 4,266,921 | A | 5/1981 | Murray |
| 4,350,567 | A | 9/1982 | Moorehead et al. |
| 4,362,679 | A | 12/1982 | Malinowski |
| 4,427,610 | A | 1/1984 | Murray |
| 4,436,498 | A | 3/1984 | Murray |
| 4,588,299 | A | 5/1986 | Brown et al. |
| 4,746,481 | A | 5/1988 | Schmidt |
| 4,772,439 | A | 9/1988 | Trevino-Gonzalez |
| 4,789,244 | A * | 12/1988 | Dunton et al. ............ 366/12 |
| 4,917,587 | A | 4/1990 | Alpar et al. |
| 4,944,595 | A | 7/1990 | Hodson |
| 5,051,217 | A | 9/1991 | Alpár et al. |
| 5,158,996 | A | 10/1992 | Valenti |
| 5,162,402 | A | 11/1992 | Ogawa et al. |
| 5,203,919 | A | 4/1993 | Bobrowski et al. |
| 5,220,732 | A | 6/1993 | Lee |
| 5,232,496 | A | 8/1993 | Jennings et al. |
| 5,257,464 | A | 11/1993 | Trevino-Gonzales |
| 5,358,566 | A | 10/1994 | Tanaka et al. |
| 5,393,343 | A | 2/1995 | Darwin et al. |
| 5,427,617 | A | 6/1995 | Bobrowski et al. |
| 5,494,516 | A | 2/1996 | Drs et al. |
| 5,505,987 | A | 4/1996 | Jennings et al. |
| 5,518,540 | A | 5/1996 | Jones, Jr. |
| 5,583,183 | A | 12/1996 | Darwin et al. |
| 5,609,681 | A | 3/1997 | Drs et al. |
| 5,612,396 | A | 3/1997 | Valenti et al. |
| 5,633,298 | A | 5/1997 | Arfaei et al. |
| 5,643,978 | A | 7/1997 | Darwin et al. |
| 5,650,562 | A | 7/1997 | Jones, Jr. |
| 5,660,626 | A | 8/1997 | Ohta et al. |
| 5,661,206 | A | 8/1997 | Tanaka et al. |
| 5,665,158 | A | 9/1997 | Darwin et al. |
| 5,668,195 | A | 9/1997 | Leikauf |
| 5,669,968 | A | 9/1997 | Kobori et al. |
| 5,674,929 | A | 10/1997 | Melbye |
| 5,676,905 | A | 10/1997 | Andersen et al. |
| 5,690,729 | A | 11/1997 | Jones, Jr. |
| 5,703,174 | A | 12/1997 | Arfaei et al. |
| 5,725,657 | A | 3/1998 | Darwin et al. |
| 5,728,207 | A | 3/1998 | Arfaei et al. |
| 5,744,078 | A | 4/1998 | Soroushian et al. |
| 5,753,744 | A | 5/1998 | Darwin et al. |
| 5,798,425 | A | 8/1998 | Albrecht et al. |
| 5,800,752 | A | 9/1998 | Charlebois |
| 5,840,114 | A | 11/1998 | Jeknavorian et al. |
| 5,882,190 | A | 3/1999 | Doumet |
| 5,912,284 | A | 6/1999 | Hirata et al. |
| 5,935,317 | A | 8/1999 | Soroushian et al. |
| 5,965,201 | A | 10/1999 | Jones, Jr. |
| 6,008,275 | A | 12/1999 | Moreau et al. |
| 6,042,258 | A * | 3/2000 | Hines et al. ............ 366/8 |
| 6,042,259 | A * | 3/2000 | Hines et al. ............ 366/17 |
| 6,063,184 | A | 5/2000 | Leikauf et al. |
| 6,136,950 | A | 10/2000 | Vickers, Jr. et al. |
| 6,187,841 | B1 | 2/2001 | Tanaka et al. |
| 6,264,736 | B1 | 7/2001 | Knopf et al. |
| 6,267,814 | B1 | 7/2001 | Bury et al. |
| 6,284,867 | B1 | 9/2001 | Vickers, Jr. et al. |
| 6,290,770 | B1 | 9/2001 | Moreau et al. |
| 6,310,143 | B1 | 10/2001 | Vickers, Jr. et al. |
| 6,334,895 | B1 | 1/2002 | Bland |
| 6,387,174 | B2 | 5/2002 | Knopf et al. |
| 6,451,105 | B1 | 9/2002 | Turpin, Jr. |
| 6,517,631 | B1 | 2/2003 | Bland |
| 6,648,551 | B1 | 11/2003 | Taylor |
| 7,003,965 | B2 | 2/2006 | Auer et al. |
| 7,390,444 | B2 | 6/2008 | Ramme et al. |
| 7,735,274 | B2 | 6/2010 | Constantz et al. |
| 7,736,430 | B2 | 6/2010 | Barron et al. |
| 7,771,684 | B2 | 8/2010 | Constantz et al. |
| 7,815,880 | B2 * | 10/2010 | Constantz et al. ............ 423/220 |
| 7,879,146 | B2 | 2/2011 | Raki et al. |
| 7,906,086 | B2 | 3/2011 | Comrie |
| 7,914,685 | B2 | 3/2011 | Constantz et al. |
| 7,922,809 | B1 | 4/2011 | Constantz et al. |
| 7,950,841 | B2 | 5/2011 | Klein et al. |
| 8,006,446 | B2 | 8/2011 | Constantz et al. |
| 8,105,558 | B2 | 1/2012 | Comrie |
| 8,114,214 | B2 | 2/2012 | Constantz et al. |
| 8,114,367 | B2 | 2/2012 | Riman et al. |
| 8,137,455 | B1 | 3/2012 | Constantz et al. |
| 8,177,909 | B2 | 5/2012 | Constantz et al. |
| 8,192,542 | B2 | 6/2012 | Virtanen |
| 8,235,576 | B2 | 8/2012 | Klein et al. |
| 8,272,205 | B2 * | 9/2012 | Estes et al. ............ 60/274 |
| 8,311,678 | B2 | 11/2012 | Koehler et al. |
| 8,313,802 | B2 | 11/2012 | Riman et al. |
| 8,333,944 | B2 | 12/2012 | Constantz et al. |
| 8,470,275 | B2 * | 6/2013 | Constantz et al. ............ 423/220 |
| 8,491,858 | B2 | 7/2013 | Seeker et al. |
| 8,518,176 | B2 | 8/2013 | Silva et al. |
| 8,708,547 | B2 | 4/2014 | Bilger |
| 8,709,960 | B2 | 4/2014 | Riman et al. |
| 8,721,784 | B2 | 5/2014 | Riman et al. |
| 8,845,940 | B2 | 9/2014 | Niven et al. |
| 2002/0019459 | A1 | 2/2002 | Albrecht et al. |
| 2007/0171764 | A1* | 7/2007 | Klein et al. ............ 366/4 |
| 2008/0202389 | A1 | 8/2008 | Hojaji et al. |
| 2008/0245274 | A1 | 10/2008 | Ramme |
| 2009/0103392 | A1* | 4/2009 | Bilger ............ 366/4 |
| 2009/0143211 | A1 | 6/2009 | Riman et al. |
| 2009/0292572 | A1 | 11/2009 | Alden et al. |
| 2010/0246312 | A1 | 9/2010 | Welker et al. |
| 2011/0165400 | A1 | 7/2011 | Quaghebeur et al. |
| 2011/0289901 | A1 | 12/2011 | Estes et al. |
| 2012/0238006 | A1 | 9/2012 | Gartner et al. |
| 2012/0312194 | A1 | 12/2012 | Riman et al. |
| 2013/0122267 | A1 | 5/2013 | Riman et al. |
| 2013/0284073 | A1 | 10/2013 | Gartner |
| 2014/0069302 | A1 | 3/2014 | Saastamoinen et al. |
| 2014/0096704 | A1 | 4/2014 | Rademan et al. |
| 2014/0116295 | A1 | 5/2014 | Niven et al. |
| 2014/0127450 | A1 | 5/2014 | Riman et al. |
| 2014/0197563 | A1 | 7/2014 | Niven et al. |
| 2014/0216303 | A1 | 8/2014 | Lee et al. |
| 2014/0327168 | A1 | 11/2014 | Niven et al. |
| 2014/0373755 | A1* | 12/2014 | Forgeron et al. ............ 106/638 |
| 2015/0023127 | A1* | 1/2015 | Chon et al. ............ 366/167.1 |

FOREIGN PATENT DOCUMENTS

| | | |
|---|---|---|
| CA | 2598583 A1 | 9/2006 |
| CA | 2646462 A1 | 9/2007 |
| CA | 2659447 A1 | 12/2008 |
| CA | 2703343 A1 | 4/2009 |
| CA | 2705857 A1 | 5/2009 |
| CA | 2670049 A1 | 11/2009 |
| CA | 2778508 A1 | 6/2011 |
| CA | 2785143 A1 | 7/2011 |
| CA | 2829320 A1 | 9/2012 |
| CA | 2837832 A1 | 12/2012 |
| DE | 3139107 A1 | 4/1983 |
| DE | 19506411 A1 | 8/1996 |
| EP | 0047675 A1 | 3/1982 |
| EP | 0218189 A2 | 4/1987 |
| EP | 0151164 A1 | 5/1988 |
| EP | 0218189 A3 | 5/1988 |
| EP | 0629597 A1 | 12/1994 |
| EP | 0701503 B1 | 8/2000 |
| FR | 1259819 A | 4/1961 |
| FR | 2121975 A | 8/1972 |
| FR | 2503135 A | 10/1982 |
| FR | 2513932 A | 4/1983 |
| FR | 2735804 A | 12/1996 |
| GB | 217791 A | 6/1924 |
| GB | 574724 A | 1/1946 |
| GB | 644615 A | 10/1950 |
| GB | 851222 A | 10/1960 |
| GB | 1199069 A | 7/1970 |

(56) References Cited

FOREIGN PATENT DOCUMENTS

| | | |
|---|---|---|
| GB | 1337014 A | 11/1973 |
| GB | 1460284 A | 12/1976 |
| GB | 2106886 A | 4/1983 |
| GB | 2192392 A | 1/1988 |
| GB | 2300631 A | 11/1996 |
| GB | 2302090 A | 1/1997 |
| JP | 02018368 A | 1/1990 |
| JP | 06144944 A | 5/1994 |
| JP | 6263562 A | 9/1994 |
| JP | 07048186 A | 2/1995 |
| JP | 10194798 A | 7/1998 |
| JP | 11303398 A | 11/1999 |
| JP | 2000203964 A | 7/2000 |
| JP | 2000247711 A | 9/2000 |
| JP | 2000-281467 A | 10/2000 |
| JP | 2002012480 A | 1/2002 |
| JP | 2002127122 A | 5/2002 |
| JP | 2007326881 A | 6/2009 |
| SE | 8002613 | 3/1982 |
| SE | 451067 B | 8/1987 |
| SU | 1031728 A2 | 7/1983 |
| WO | WO 79/00473 A1 | 7/1979 |
| WO | WO 85/00587 A1 | 2/1985 |
| WO | WO 91/05644 A1 | 5/1991 |
| WO | WO 94/27797 A1 | 12/1994 |
| WO | WO 01/90020 | 11/2001 |
| WO | WO 2004/074733 A1 | 9/2004 |
| WO | WO 2006/040503 A1 | 4/2006 |
| WO | WO 2006/100550 A1 | 9/2006 |
| WO | WO 2006/100693 A1 | 9/2006 |
| WO | WO 2009/078430 A1 | 6/2009 |
| WO | WO 2009/132692 A1 | 11/2009 |
| WO | WO 2012/079173 A1 | 6/2012 |
| WO | WO 2014/121198 A1 | 8/2014 |

OTHER PUBLICATIONS

Notice of allowance dated Apr. 22, 2014 for U.S. Appl. No. 13/660,447.
Office action dated Mar. 28, 2013 for U.S. Appl. No. 13/660,447.
Office action dated Jul. 15, 2013 for U.S. Appl. No. 13/660,447.
U.S. Appl. No. 14/282,965, filed May 20, 2014, Niven et al.
Estes-Haselbach. The greenest concrete mixer—carbon sequestration in freshly mixed concrete. Sep. 25, 2012.
Hurst. Canadian cement plant becomes first to capture CO2 in algae. Earth and Industry. Pond Biofuels press release. Mar. 19, 2010.
Sato, et al. Seeding effect of nano-CaCO3 on the hidration of tricalcium silicate, Transportation Research Record. 2010; 2141:61-67.
U.S. Appl. No. 61/839,312, filed Jun. 25, 2013, Niven et al.
U.S. Appl. No. 61/847,254, filed Jul. 17, 2013, Niven et al.
U.S. Appl. No. 61/879,049, filed Sep. 17, 2013, Niven et al.
U.S. Appl. No. 61/925,100, filed Jan. 8, 2014, Niven et al.
U.S. Appl. No. 61/938,063, filed Feb. 10, 2014, Niven et al.
U.S. Appl. No. 61/941,222, filed Feb. 18, 2014, Crossman et al.
U.S. Appl. No. 61/976,360, filed Apr. 7, 2014, Monkman et al.
U.S. Appl. No. 61/980,505, filed Apr. 16, 2014, Sandberg et al.
Abanades, et al. Conversion limits in the reaction of CO2 with lime. Energy and Fuels. 2003; 17(2):308-315.
Bhatia, et al. Effect of the Product Layer on the kinetics of the CO2-lime reaction. AIChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
Dewaele, et al. Permeability and porosity changes associated with cement grout carbonation. Cement and Concrete Research. 1991; 21(4):441-454.
Fernandez-Bertos, et al. A review of accelerated carbonation technology in the treatment of cement-based materials and sequestration of CO2. Journal of Hazardous Materials B112, 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.
Iizuka, et al. Development of a new CO2 sequestration process utilizing the carbonation of waste cement. Industrial & Engineering Chemistry Research. 2004; (43)24:7880-7887.
International search report and written opinion dated Mar. 6, 2012 for PCT Application No. CA2011/050774.
International search report and written opinion dated Jul. 18, 2013 for PCT Application No. CA2013/050190.
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. Theses from the Department of Civil Engineering and Applied Mechanics. McGill University, Montreal, Canada. Oct. 2006.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Preliminary Amendment dated Nov. 1, 2013 for U.S. Appl. No. 13/994,681.

(56) References Cited

OTHER PUBLICATIONS

Reardon, et al. High pressure carbonation of cementitious grout. Cement and Concrete Research. 1989; 19(3):385-399.

Shao, et al. A new CO2 sequestration process via concrete products production. Department of civil engineering. McGill University, Montreal, Canada. 2007.

Shao, et al. CO2 sequestration using calcium-silicate concrete. Canadian Journal of Civil Engineering. 2006;(33)6:776-784.

Shao, et al. Market analysis of CO2 sequestration in concrete building products. Second International Conference on Sustainable Construction Materials and Technologies. Jun. 28-30, 2010.

Shao, et al. Recycling carbon dioxide into concrete: a feasibility study. Concrete Sustainability Conference. 2010.

Shi, et al. Studies on some factors affecting CO2 curing of lightweight concrete products. Resources, Conservation and Recycling. 2008; (52)8-9:1087-1092.

Shideler, J. Investigation of the moisture-volume stability of concrete masonry units. Portland Cement Association. 1955. (D3).

Shih, et al. Kinetics of the reaction of Ca(OH)2 with CO2 at low temperature. Industrial and Engineering Chemistry Research. 1999; 38(4):1316-1322.

Sorochkent, et al. Study of the possibility of using carbon dioxide for accelerating the hardening of products made from Portland Cement. J. Appl. Chem. USSR. 1975; 48:1271-1274.

Steinour, H. Some effects of carbon dioxide on mortars and concrete-discussion. Journal of the American Concrete Institute. 1959; 30:905-907.

Technology Roadmap: Cement. International Energy Agency. Dec. 2009 [Retrieved on Jul. 13, 2013]. Retrieved from http://www.iea.org/publications/freepublications/publication/name,3861, en.html.

Teir, et al. Carbonation of Finnish magnesium silicates for CO2 sequestration. Fifth Annual Conference on Carbon Capture and Sequestration. May 8-11, 2006. National Energy Technology Laboratory, Department of Energy, USA.

Toennies, et al. Artificial carbonation of concrete masonry units. American Concrete Institute Journal. 1960; 31(8):737-755.

Tri-Cast literature, Besser Company. Sioux, Iowa, USA, date unknown.

Van Balen, K. Carbonation reaction of lime, kinetics at ambient temperature. Cement and Concrete Research. 2005; 35(4):647-657.

Venhuis, et al. Vacuum method for carbonation of cementitious wasteforms. Environ Sci Technol. Oct. 15, 2001;35(20):4120-5.

Weber, et al. Find carbon dioxide gas under pressure an efficient curing agent for cast stone. Concrete. Jul. 1941; 33-34.

Young, et al. Accelerated Curing of Compacted Calcium Silicate Mortars on Exposure to CO2. Journal of the American Ceramic Society.. 1974; 57(9):394-397.

European search report and search opinion dated Jan. 14, 2015 for EP 11849437.6.

U.S. Appl. No. 14/642,536, filed Mar. 9, 2015, Forgeron, et al.

U.S. Appl. No. 14/701,456, filed Apr. 30, 2015, Forgeron, et al.

* cited by examiner

High - Low - Avg Plot BOMIX readymix
7 day strength

High - Low - Avg Plot
14 day strength

Strength Development, BOMIX

Strength Development, BOMIX

BOMIX slump with varying mix water contents

Figure 32

| Code | Condition | Water w/c | Water Final | Water Bake-off | Ad-mix | CO₂ (% bwc) Dose | CO₂ (% bwc) Uptake | CO₂ Efficiency (%) | Strength, psi 7 day | Strength, psi 28 day | Strength, psi 56 day | Absorption | Density (lb/ft³) |
|---|---|---|---|---|---|---|---|---|---|---|---|---|---|
| 0500 | Uncarb | 0.406 | 8.88% | 6.83% | - | - | 0.00 | - | 2646 | 3002 | 3688 | 6.6% | 130.3 |
| 0700 | Uncarb | 0.425 | 7.35% | 6.71% | - | - | 0.00 | - | 3172 | 3529 | 3642 | 6.4% | 131.0 |
| Avg | Uncarb | - | - | - | - | - | 0.00 | - | 2843 | 3199 | 3671 | 6.5% | 130.7 |
| 0601 | CO2 | 0.422 | 8.32% | 6.55% | - | 0.50* | 0.20 | 39% | 3872 | 4175 | 4528 | 3.9% | 134.0 |
| 0602 | CO2 | 0.430 | 8.25% | 6.58% | - | 0.50 | 0.28 | 57% | 3703 | 4171 | 4648 | 4.0% | 133.8 |
| 0603 | CO2 | 0.440 | 8.08% | 6.26% | - | 1.00 | 0.54 | 54% | 3788 | 4121 | 4150 | 4.3% | 131.0 |
| 0604 | CO2 | 0.450 | 8.23% | 6.01% | - | 1.50* | 0.80 | 53% | 3836 | 4377 | 4554 | 5.3% | 130.9 |
| 0605 | CO2 | 0.455 | 8.39% | 6.56% | - | 1.50 | 1.40 | 93% | 3347 | 3804 | 4364 | 5.4% | 130.4 |
| 0701 | CO2 | 0.413 | 8.12% | 5.92% | 0.5% | 1.50 | 1.43 | 95% | 4248 | 4456 | 4569 | 4.4% | 132.7 |
| 0702 | CO2 | 0.413 | 7.85% | 6.24% | 0.4% | 1.50 | 1.43 | 95% | 3539 | 3538 | 3738 | 4.4% | 131.5 |
| 0703 | CO2 | 0.424 | 7.99% | 5.90% | 0.3% | 1.50 | 1.24 | 83% | 3249 | 3720 | 3861 | 4.7% | 129.9 |
| 0704 | CO2 | 0.426 | 7.87% | 6.11% | 0.2% | 1.50 | 1.19 | 79% | 3275 | 3559 | 3788 | 5.5% | 128.1 |
| 0705 | CO2 | 0.433 | 7.81% | 5.48% | 0.1% | 1.50 | 1.19 | 79% | 3216 | 3121 | 3590 | 5.6% | 128.6 |

*The reported $CO_2$ dose for batches 601 and 604 include 0.5% bwc $CO_2$ delivered into the feedbox

Figure 34

| Code | Cond-ition | Water | | | Ad-mix | $CO_2$ (% bwc) | | $CO_2$ Effi-ciency (%) | Strength | | | Absorption | Density (lb/ft$^3$) |
|---|---|---|---|---|---|---|---|---|---|---|---|---|---|
| | | w/c | Final | Bake-off | | Dose | Up-take | | 7 day | 28 day | 56 day | | |
| 0805 | Uncarb | 0.225 | 7.75% | 7.17% | - | - | 0.00 | - | 2518 | 2927 | 3035 | 7.5% | 128.9 |
| 0806 | CO2 | 0.514 | 8.53% | 7.27% | 0.4% | 1.50 | 2.10 | 140% | 2349 | 2518 | 2762 | 8.9% | 125.8 |

Figure 35

| Code | Condition | Water w/c | Water Final | Water Bakeoff | Admix | CO2 (% bwc) Dose | CO2 (% bwc) Uptake | CO2 Efficiency (%) | Strength 7 day | Strength 28 day | Strength 56 day | Absorption | Density (lb/ft³) |
|---|---|---|---|---|---|---|---|---|---|---|---|---|---|
| 0801 | Uncarb | 0.745 | 6.96% | 12.20% | - | - | 0.00 | - | 1549 | 1680 | 1803 | 13.0% | 101.7 |
| 0901 | CO2 | 0.691 | 12.25% | 12.53% | - | 1.50 | 2.09 | 139% | 1374 | 1758 | 1980 | 13.6% | 100.1 |
| 0902 | CO2 | 0.703 | 13.79% | 12.14% | 0.35% | 1.50 | 1.69 | 113% | 1893 | 2381 | 2536 | 11.6% | 103.6 |
| 0802 | CO2 | 0.758 | 8.80% | 12.85% | 0.40% | 1.50 | 0.92 | 61% | 2724 | 3260 | 3319 | 8.6% | 108.8 |
| 0903 | CO2 | 0.707 | 13.99% | 12.27% | 0.45% | 1.50 | 1.62 | 108% | 1871 | 2224 | 2398 | 11.8% | 102.8 |

Figure 37

| Code | Condition | Water | | | Admix | CO2 (% bwc) | | CO2 Efficiency (%) | Strength | | | Absorption | Density (lb/ft³) |
| --- | --- | --- | --- | --- | --- | --- | --- | --- | --- | --- | --- | --- | --- |
| | | w/c | Final | Bake-off | | Dose | Uptake | | 7 day | 28 day | 56 day | | |
| 0803 | Uncarb | 0.672 | 6.55% | 6.99% | - | - | 0.00 | - | 1876 | 1884 | 2200 | 8.9% | 125.5 |
| 0904 | CO2 | 0.697 | 6.93% | 6.58% | - | 1.50 | 1.26 | 84% | 1809 | 1922 | 2086 | 10.0% | 121.4 |
| 0905 | CO2 | 0.736 | 7.00% | 6.65% | 0.35% | 1.50 | 0.35 | 23% | 2004 | 2027 | 2399 | 9.1% | 125.6 |
| 0804 | CO2 | 0.710 | 7.29% | 6.80% | 0.40% | 1.50 | 1.04 | 69% | 2038 | 2292 | 2373 | 8.7% | 126.0 |
| 0906 | CO2 | 0.718 | 7.02% | 6.37% | 0.45% | 1.50 | 1.35 | 90% | 3050 | 3073 | 3483 | 7.2% | 129.3 |

Figure 41

| Condition | Batch | | |
|---|---|---|---|
| | 092509 | 092506 | 092507 |
| | Control | 1% CO2 | 1% CO2 + 0.25% sg |
| Strength (psi) | 3723 | 3510 | 4003 |
| Absorption | 6.5% | 7.0% | 6.2% |
| Shrinkage | 0.044% | 0.051% | 0.046% |
| Strength vs control | - | - 6% | + 8% |
| Absorption vs control | - | + 7% | - 4% |
| Shrinkage vs control | - | + 14% | + 4% |

APPARATUS FOR CARBONATION OF A CEMENT MIX

CROSS-REFERENCE

This application claims priority to: U.S. Provisional Patent Application Ser. No. 61/839,312, filed Jun. 25, 2013, U.S. Provisional Patent Application Ser. No. 61/847,254, filed Jul. 17, 2013, U.S. Provisional Patent Application Ser. No. 61/879,049, filed Sep. 17, 2013, U.S. Provisional Patent Application Ser. No. 61/925,100, filed Jan. 8, 2014, and U.S. Provisional Patent Application Ser. No. 61/938,063, filed Feb. 10, 2014, each of which is entirely incorporated herein by reference.

BACKGROUND OF THE INVENTION

Cement mixes, such as concrete mixes, are used in a multitude of compositions and procedures throughout the world. In addition, greenhouse gases such as carbon dioxide are a growing concern worldwide. There is a need for methods and compositions to contact cement mixes with carbon dioxide and for cement mixes containing incorporated carbon dioxide and carbonation products.

SUMMARY OF THE INVENTION

In one aspect, the invention provides methods. In certain embodiments, the invention provides a method for producing a carbonated cement mix in a mix operation in a cement mix apparatus comprising (i) contacting a cement mix comprising cement binder and aggregate in a mixer with carbon dioxide while the cement mix is mixing, (ii) monitoring a characteristic of the cement binder, the cement mix, a gas mixture in contact with the cement mix or the mixer, or a component of the cement mix apparatus; and (iii) modulating the exposure of the cement mix to the carbon dioxide or another characteristic of the cement mix operation, or a combination thereof according to the characteristic monitored in step (ii). In certain embodiments, the characteristic monitored in step (ii) comprises at least one of: (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix; for example carbon dioxide content of a gas mixture exiting from the mixer, such as wherein the exposure of the cement mix to carbon dioxide is modulated when the carbon dioxide content of the gas mixture reaches a threshold value, or when rate of change of the carbon dioxide content of the gas mixture reaches a threshold value. In certain embodiments, the exposure of the cement mix to carbon dioxide is modulated when the temperature of the cement mix or a component of the mix apparatus in contact with the cement mix reaches a threshold value. In certain embodiments, a plurality of characteristics is monitored in step (ii), comprising at least two of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix. In certain embodiments, the additional (another) characteristic of the mix operation comprises (a) whether or not an admixture is added to the cement mix, (b) type of admixture added to the cement mix, (c) timing of addition of admixture to the cement mix, (d) amount of admixture added to the cement mix, (e) amount of water added to the cement mix, (f) timing of addition of water to the cement mix, (g) cooling of the cement mix during or after carbon dioxide addition, or a combination thereof. In certain embodiments, the characteristic is monitored by one or more sensors which transmit information regarding the characteristic to a controller which processes the information and determines if a modulation of carbon dioxide exposure or another characteristic of the mix operation is required and, if so, transmits a signal to one or more actuators to carry out the modulation of carbon dioxide exposure or other characteristic of the mix operation. The controller can, e.g., store and process the information obtained regarding the characteristic monitored in step (ii) for a first batch of cement mix and adjust conditions for a subsequent second cement mix batch based on the processing. In certain embodiments, the controller, one or more sensors, one or more actuators, or combination thereof, transmits information regarding the characteristics monitored and conditions modulated to a central controller that receives information from a plurality of controllers, sensors, actuators, or combination thereof, from a plurality of separate mix operations. In certain embodiments, the exposure of the cement mix to the carbon dioxide is modulated in such a way as to achieve an efficiency of carbonation of at least 60%, wherein efficiency of carbonation is the amount of carbon dioxide retained in the cement mix per the total amount of carbon dioxide to which the cement mix is exposed during mixing.

In another aspect, the invention provides apparatus. In certain embodiments, the invention provides an apparatus for carbonating a cement mix comprising a cement binder and aggregate in a cement mix apparatus during a mix operation, comprising (i) a mixer for mixing the cement mix; (ii) a system for contacting the cement mix in the mixer with carbon dioxide operably connected to the mixer and comprising an actuator for modulating a flow of carbon dioxide to the mixer; (iii) a sensor positioned and configured to monitor a characteristic of the mix operation; and to transmit information regarding the characteristic to a controller; (iv) the controller, wherein the controller is configured to process the information and determine whether or not and/or to what degree to modulate the flow of carbon dioxide to the mixer and to transmit a signal to the actuator to modulate the flow of carbon dioxide to the mixer. In certain embodiments, the characteristic of the mix operation comprises a characteristic of the cement binder, the cement mix, a gas mixture in contact with the cement mix or the mixer, or a component of the cement mix apparatus. In certain embodiments, the characteristic monitored by the sensor comprises at least one of: (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix. In certain embodiments, the characteristic monitored by the sensor comprises carbon dioxide content of a gas mixture exiting from the mixer. In certain embodiments, the characteristic monitored by the sensor comprise the temperature of the cement mix or a component of the mix apparatus in contact with the cement mix. In certain embodiments, the apparatus comprises a plurality of sensors configured to monitor at least two characteristics comprising (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments the apparatus further comprises an actuator configured to modulate an additional characteristic of the mix operation, wherein the actuator is operably connected to the controller and wherein the controller is configured to send a signal to the actuator to modulate the additional characteristic based on the processing of information from one or more sensors, such as an actuator configured to modulate addition of admixture to the cement mix, type of admixture added to the cement mix, timing of addition of admixture to the cement mix, amount of admixture added to the cement mix, amount of water added to the cement mix, timing of addition of water to the cement mix, or cooling the cement mix during or after carbon dioxide addition. In certain embodiments, the controller is configured to store and process the information obtained regarding the characteristic monitored by the sensor for a first batch of cement mix and to adjust conditions for a subsequent second cement mix batch based on the processing to optimize one or more aspects of the mix operation. The controller may be further configured to receive and process information regarding one or more characteristics of the cement mix measured after the cement mix leaves the mixer, and to transmit signals to one or more actuators configured to adjust conditions for the second cement mix batch based on the processing to modulate contact with the carbon dioxide or another characteristic of the mix operation. In certain embodiments, the controller, sensor, actuator, or combination thereof, is configured to transmit information regarding the characteristics monitored and conditions modulated to a central controller that is configured to receive information from a plurality of controllers, sensors, actuators, or combination thereof, each of which transmits information from a separate mix operation to the central controller. The central controller can be configured to process the information received from the plurality of controllers, sensors, actuators, or combination thereof and processes the information to modulate one or more of the plurality of mix operations. In certain embodiments, the processor is configured to control the actuator such that exposure of the cement mix to the carbon dioxide is modulated in such a way as to achieve an efficiency of carbonation of at least 60%, wherein efficiency of carbonation is the amount of carbon dioxide retained in the cement mix per the total amount of carbon dioxide to which the cement mix is exposed during mixing.

In certain embodiments, the invention provides a controller for controlling a cement mix mixing operation comprising carbonation of the cement mix in a mixer by exposing the cement mix to carbon dioxide, wherein the controller comprises (i) an input port for receiving a signal from a sensor that monitors a characteristic of the cement mix mixing operation; (ii) a processor for processing the signal from the sensor and formulating an output signal to modulate the exposure of the cement mix to carbon dioxide or to modulate a characteristic of the cement mix; and (iii) an output port for transmitting the output signal to an actuator that modulates the exposure of the cement mix to carbon dioxide or that modulates a characteristic of the cement mix. In certain embodiments, the input port is configured to receive a plurality of signals from a plurality of sensors, and the processor is configured to process the plurality of signals and formulate an output signal to modulate the exposure of the cement mix to carbon dioxide or to modulate a characteristic of the cement mix. In certain embodiments, the processor is configured to formulate a plurality of output signals to modulate the exposure of the cement mix to carbon dioxide or to modulate a characteristic of the cement mix and the output port is configured to transmit the plurality of signals.

In certain embodiments, the invention provides a network comprising (i) a plurality of spatially separate cement mix operations, each of which comprises at least one sensor for monitoring at least one characteristic of its operation, operably connected to (ii) a central processing unit, to which each sensor sends its information and which stores and/or processes the information. In certain embodiments, the network comprises at least one mix operation in which the cement mix is carbonated.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 32 provides a table showing the results of tests for carbon dioxide uptake, compressive strength, water absorption, and density for blocks produced in a precast dry cast operation with carbonation at the mixer, feedbox, or both, in a standard block mix.

FIG. 34 provides a table showing the results of tests for carbon dioxide uptake, compressive strength, water absorption, and density for blocks produced in a precast dry cast operation with carbonation at the mixer in a limestone block mix.

FIG. 35 provides a table showing the results of tests for carbon dioxide uptake, compressive strength, water absorption, and density for blocks produced in a precast dry cast operation with carbonation at the mixer in a lightweight block mix.

FIG. 37 provides a table showing the results of tests for carbon dioxide uptake, compressive strength, water absorption, and density for blocks produced in a precast dry cast operation with carbonation at the mixer in a sandstone block mix.

FIG. 41 provides a table of results of third party testing of medium weight blocks produced in a precast operation as uncarbonated, carbonated, and carbonated+0.25% sodium gluconate, as strength, absorption, and shrinkage.

DETAILED DESCRIPTION OF THE INVENTION

I. Introduction

Figure 1:
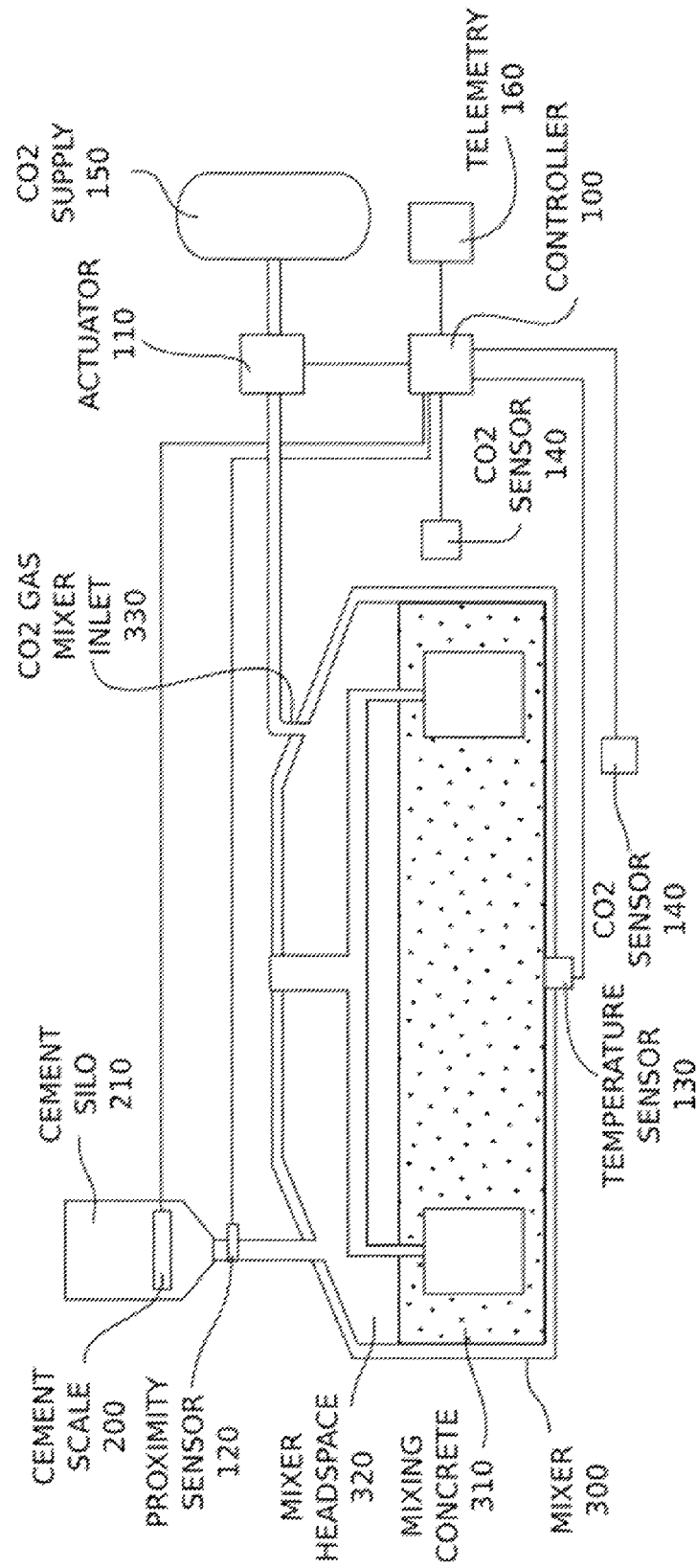
FIG. 1 provides a schematic view of a stationary mixer with apparatus for providing carbon dioxide to a hydraulic cement mix during mixer.

The invention provides methods, apparatus, and compositions for production of materials comprising a cement binder, e.g., a hydraulic cement or non-hydraulic cement. "Cement mix," as that term is used herein, includes a mix of a cement binder, e.g., a hydraulic cement, such as a Portland cement, and water; in some cases, "cement mix" includes a cement binder mixed with aggregate, such as a mortar (also termed a grout, depending on consistency), in which the aggregate is fine aggregate; or "concrete," which includes a coarse aggregate. The cement binder may be a hydraulic or non-hydraulic cement, so long as it provides minerals, e.g. calcium, magnesium, sodium, and/or potassium compounds such as CaO, MgO, $Na_2O$, and/or $K_2O$ that react with carbon dioxide to produce stable or metastable products containing the carbon dioxide, e.g., calcium carbonate. An exemplary hydraulic cement useful in the invention is Portland cement. In general herein the invention is described in terms of hydraulic cement binder and hydraulic cement mixes, but it will be appreciated that the invention encompasses any cement mix, whether containing a hydraulic or non-hydraulic cement binder, so long as the cement binder is capable of forming stable or metastable products when exposed to carbon dioxide, e.g., contains calcium, magnesium, sodium, and/or potassium compounds such as CaO, MgO, $Na_2O$, and/or $K_2O$. In certain embodiments, the invention provides methods, apparatus, and compositions for production of a cement mix (concrete) containing cement, such as Portland cement, treated with carbon dioxide. As used herein, the term "carbon dioxide" refers to carbon dioxide in a gas, solid, liquid, or supercritical state where the carbon dioxide is at a concentration greater than its concentration in the atmosphere; it will be appreciated that under ordinary conditions in the production of cement mixes (concrete mixes) the mix is exposed to atmospheric air, which contains minor amounts of carbon dioxide. The present invention is directed to production of cement mixes that are exposed to carbon dioxide at a concentration above atmospheric concentrations.

Cement mix operations are commonly performed to provide cement mixes (concrete) for use in a variety of applications, the most common of which is as a building material. Such operations include precast operations, in which a concrete structure is formed in a mold from the cement mix and undergoes some degree of hardening before transport and use at a location separate from the mix location, and ready mix operations, in which the concrete ingredients are supplied at one location and generally mixed in a transportable mixer, such as the drum of a ready mix truck, and transported to a second location, where the wet mix is used, typically by being poured or pumped into a temporary mold. Precast operations can be either a dry cast operation or a wet cast operation, whereas ready mix operations are wet cast. Any other operation in which a concrete mix is produced in a mixer and exposed to carbon dioxide during mixing is also subject to the methods and compositions of the invention.

Without being bound by theory, when the cement mix (concrete) is exposed to carbon dioxide, the carbon dioxide first dissolves in mix water and then forms intermediate species, before precipitating as a stable or metastable species, e.g., calcium carbonate. As the carbonate species are removed from solution, further carbon dioxide may dissolve in the water. In certain embodiments, the mix water contains carbon dioxide before exposure to the cement binder. All of these processes are encompassed by the term "carbonation" of the cement mix, as that term is used herein.

II. Components of the Invention

In certain embodiments the invention provides methods for preparing a mix containing cement, by contacting a mixture of a cement binder, e.g., hydraulic cement and water, and, optionally, other components such as aggregate (a "cement mix", or "concrete," e.g., a "hydraulic cement mix") with carbon dioxide during some part of the mixing of the cement mix, e.g., hydraulic cement mix.

In certain embodiments, a hydraulic cement is used. The term "hydraulic cement," as used herein, includes a composition which sets and hardens after combining with water or a solution where the solvent is water, e.g., an admixture solution. After hardening, the compositions retain strength and stability even under water. An important characteristic is that the hydrates formed from the cement constituents upon reaction with water are essentially insoluble in water. A hydraulic cement used in the invention may be any hydraulic cement capable of forming reaction products with carbon dioxide. The hydraulic cement most commonly used is based upon Portland cement. Portland cement is made primarily from limestone, certain clay minerals, and gypsum, in a high temperature process that drives off carbon dioxide and chemically combines the primary ingredients into new compounds. In certain embodiments, the hydraulic cement in the hydraulic cement mix is partially or completely composed of Portland cement.

A "hydraulic cement mix," as that term is used herein, includes a mix that contains at least a hydraulic cement and water. Additional components may be present, such as aggregates, admixtures, and the like. In certain embodiments the hydraulic cement mix is a concrete mix, i.e., a mixture of hydraulic cement, such as Portland cement, water, and aggregate, optionally also including an admixture.

The methods in certain embodiments are characterized by contacting carbon dioxide with wet cement binder, e.g., hydraulic cement, in a mixer at any stage of the mixing, such as during mixing of the cement with water, or during the mixing of wetted cement with other materials, or both. The cement may be any cement, e.g., hydraulic cement capable of producing reaction products with carbon dioxide. For example, in certain embodiments the cement includes or is substantially all Portland cement, as that term is understood in the art. The cement may be combined in the mixer with other materials, such as aggregates, to form a cement-aggregate mixture, such as mortar or concrete. The carbon dioxide may be added before, during, or after the addition of the other materials besides the cement and the water. In addition or alternatively, in certain embodiments the water itself may be carbonated, i.e., contain dissolved carbon dioxide.

In certain embodiments, the contacting of the carbon dioxide with the cement mix, e.g., hydraulic cement mix, may occur when part but not all of the water has been added, or when part but not all of the cement has been added, or both. For example, in one embodiment, a first aliquot of water is added to the cement or cement aggregate mixture, to produce a cement or cement-aggregate mixture that contains water in a certain water/cement (w/c) ratio or range of w/c ratios. In some cases one or more components of the cement mix, e.g., hydraulic cement mix, such as aggregate, may be wet enough that is supplies sufficient water so that the mix may be contacted with carbon dioxide. Concurrent with, or after, the addition of the water, carbon dioxide is introduced to the mixture, while the mixture is mixing in a mixer.

The carbon dioxide used in the invention may be of any purity and/or form suitable for contact with cement, e.g., hydraulic cement during mixing to form reaction products. As described, the carbon dioxide is at least above the concentration of atmospheric carbon dioxide. For example, the carbon dioxide may be liquid, gaseous, solid, or supercritical, or any combination thereof. In certain embodiments, the carbon dioxide is gaseous when contacted with the cement, e.g., hydraulic cement, though it may be stored prior to contact in any convenient form, e.g., in liquid form. In alternative embodiments, some or all of the carbon dioxide may be in liquid form and delivered to the cement or cement mix (concrete), e.g., in such a manner as to form a mixture of gaseous and solid carbon dioxide; the stream of liquid carbon dioxide can be adjusted by, e.g., flow rate and/or orifice selection so as to achieve a desired ratio of gaseous to solid carbon dioxide, such as ratio of approximately 1:1, or within a range of ratios. The carbon dioxide may also be of any suitable purity for contact with the cement or cement mix (concrete), e.g., hydraulic cement during mixing under the specified contact conditions to form reaction products. In certain embodiments the carbon dioxide is more than 5, 10, 20, 30, 40, 50, 60, 70, 80, 90, 95, or 99% pure. In certain embodiments, the carbon dioxide is more than 95% pure. In certain embodiments, the carbon dioxide is more than 99% pure. In certain embodiments, the carbon dioxide is 20-100% pure, or 30-100% pure, or 40-100% pure, or 50-100% pure, or 60-100% pure, or 70-100% pure, or 80-100% pure, or 90-100% pure, or 95-100% pure, or 98-100% pure, or 99-100% pure. In certain embodiments, the carbon dioxide is 70-100% pure. In certain embodiment, the carbon dioxide is 90-100% pure. In certain embodiment, the carbon dioxide is 95-100% pure. The impurities in the carbon dioxide may be any impurities that do not substantially interfere with the reaction of the carbon dioxide with the wet cement mix, e.g., hydraulic cement mix. Commercial sources of carbon dioxide of suitable purity are well-known. The gas may be commercially supplied high purity carbon dioxide. In this case, the commercial gas may be sourced from a supplier that processes spent flue gasses or other waste carbon dioxide so that sequestering the carbon dioxide in the cement mix, e.g., hydraulic cement mix sequesters carbon dioxide that would otherwise be a greenhouse gas emission.

The carbon dioxide is contacted with the cement mix, e.g., hydraulic cement mix during mixing by any suitable route, such as over part or all of the surface of the mixing cement mix, e.g., hydraulic cement mix, under the surface of the cement mix, e.g., hydraulic cement mix, or any combination thereof.

In certain embodiments, the carbon dioxide is contacted with the cement mix, e.g., hydraulic cement mix during mixing by contact with the surface of the mixing cement mix, e.g., hydraulic cement mix. Without being bound by theory, it is believed that the carbon dioxide contacted with the surface of the cement mix, e.g., hydraulic cement mix dissolves and/or reacts in the water, and is then subsumed beneath the surface by the mixing process, which then exposes different cement mix, e.g., cement mix, to be contacted, and that this process continues for as long as the wetted hydraulic cement is exposed to the carbon dioxide. It will be appreciated that the process of dissolution and/or reaction may continue after the flow of carbon dioxide is halted, since carbon dioxide will likely remain in the gas mixture in contact with the cement mix, e.g., hydraulic cement mix. In embodiments in which liquid carbon dioxide is used to produce gaseous and solid carbon dioxide, the solid carbon dioxide will sublimate and continue to deliver gaseous carbon dioxide to the cement mix, e.g., hydraulic cement mix after the flow of liquid carbon dioxide has ceased. This is particularly useful in ready mix truck operations, where there may be insufficient time at the batching facility to allow uptake of the desired amount of carbon dioxide; the use of liquid carbon dioxide which converts to gaseous and solid carbon dioxide allow more carbon dioxide to be delivered to the mix even after the truck leaves the batching facility. Other methods of increasing carbon dioxide delivery, such as using carbon dioxide-charged water in the mix, may also be used.

In embodiments in which carbon dioxide is contacted with the surface of the cement mix, e.g., hydraulic cement mix, the flow of carbon dioxide may be directed from an opening or plurality of openings (e.g., manifold or conduit opening) that is at least 5, 10, 30, 50, 80, 100, or more than 100 cm from the surface of the cement mix, e.g., hydraulic cement mix during carbon dioxide flow, on average, given that the surface of the mix will move with mixing.

In embodiments in which the carbon dioxide is contacted under the surface of the cement mix, e.g., hydraulic cement mix, any suitable means of providing the carbon dioxide may be used. In some embodiments, the flow of carbon dioxide may be both under the surface and over the surface, either by use of two different openings or plurality of openings or by movement of the openings relative to the mix, e.g., under the surface at one stage and over the surface at another, which may be useful to prevent clogging of the openings.

The carbon dioxide may be contacted with the cement mix, e.g., hydraulic cement mix such that it is present during mixing by any suitable system or apparatus. In certain embodiments, gaseous or liquid carbon dioxide is supplied via one or more conduits that contain one or more openings positioned to supply the carbon dioxide to the surface of the mixing cement mix, e.g., hydraulic cement mix. The conduit and opening may be as simple as a tube, e.g., a flexible tube with an open end. The conduit may be sufficiently flexible so as to allow for movement of various components of the cement mix, e.g., hydraulic cement mixing apparatus, the conduit opening, and the like, and/or sufficiently flexible to be added to an existing system as a retrofit. On the other hand, the conduit may be sufficiently rigid, or tied-off, or both, to insure that it does not interfere with any moving part of the cement mix, e.g., hydraulic cement mixing apparatus. In certain embodiments, part of the conduit can be used for supplying other ingredients to the cement mix, e.g., water, and configured such that either the other ingredient or carbon dioxide flows through the conduit, e.g., by means of a T-junction.

In certain embodiments, the carbon dioxide exits the conduit or conduits via one or more manifolds comprising a plurality of openings. The opening or openings may be positioned to reduce or eliminate clogging of the opening with the cement mix, e.g., hydraulic cement mix. The manifold is generally connected via the conduit to at least one fluid (gas or liquid) supply valve, which governs flow of pressurized fluid between a carbon dioxide source, e.g. a pressurized gas or liquid supply, and the manifold. In some embodiments, the fluid supply valve may include one or more gate valves that permit the incorporation of calibration equipment, e.g., one or more mass flow meters.

The mass of carbon dioxide provided to the cement mix, e.g., hydraulic cement mix via the conduit or conduits may be controlled by a mass flow controller, which can modulate the fluid supply valve, e.g., close the valve to cease supply of carbon dioxide fluid (liquid or gas).

Carbon dioxide may also be delivered to the cement mix, e.g., hydraulic cement mix as part of the mix water, i.e., dissolved in some or all of the mix water. Methods of charging water with carbon dioxide are well-known, such as the use of technology available in the soda industry. Some or all of the carbon dioxide to be used may be delivered this way. The mix water may be charged to any desired concentration of carbon dioxide achievable with the available technology, such as at least 2, 4, 6, 8, 10 g of carbon dioxide/L of water, or 2-12, 2-10, 4-12, 4-10, 6-12, 6-10, 8-12, or 8-10 g of carbon dioxide/L of water. Without being bound by theory, it is thought that the mix water so charged contacts the cement mix, e.g., hydraulic cement mix and the carbon dioxide contained therein reacts very quickly with components of the cement mix, e.g., hydraulic cement mix, leaving the water available to dissolve additional carbon dioxide that may be added to the system, e.g., in gaseous form.

The carbon dioxide is supplied from a source of carbon dioxide, such as, in the case of gaseous carbon dioxide, a pressurized tank filled with carbon dioxide-rich gas, and a pressure regulator. The tank may be re-filled when near empty, or kept filled by a compressor. The regulator may reduce the pressure in the tank to a maximum feed pressure. The maximum feed pressure may be above atmospheric, but below supercritical gas flow pressure. The feed pressure may be, for example, in a range from 120 to 875 kPa. A pressure relief valve may be added to protect the carbon dioxide source components. The carbon dioxide supplied by the carbon dioxide source may be about room temperature, or it may be chilled or heated as desired. In certain embodiments, some or all of the carbon dioxide is supplied as a liquid. In some cases the liquid is converted to gas before delivery to the mixer; in other cases, the remains a liquid in storage and movement to the mixer, and when released at the mixer forms a mixture comprising solid and gaseous carbon dioxide. In the latter case, one or more pressure sensors may be used; e.g., for the nozzle system to control dry ice formation between the nozzle and solenoid as well as to confirm pre-solenoid pressure is maintained to ensure the line remains liquid.

Carbon dioxide may be introduced to the mixer such that it contacts the hydraulic cement mix before, during, or after addition of water, or any combination thereof, so long as it is present during some portion of the mixing of some or all of the cement mix, e.g., hydraulic cement mix. In certain embodiments, the carbon dioxide is introduced during a certain stage or stages of mixing. In certain embodiments, the carbon dioxide is introduced to a cement mix, e.g., hydraulic cement mix during mixing at one stage only. In certain embodiments, the carbon dioxide is introduced during one stage of water addition, followed by a second stage of water addition. In certain embodiments, the carbon dioxide is introduced to one portion of cement mix, e.g., hydraulic cement mix, followed by addition of one or more additional portions of cement mix, e.g., hydraulic cement mix.

In certain embodiments, the carbon dioxide is introduced into a first stage of mixing of water in the cement mix, e.g., hydraulic cement mix, then, after this stage, additional water is added without carbon dioxide. For example, water may be added to a cement mix, e.g., hydraulic cement mix, e.g., a Portland cement mix, until a desired w/c ratio is achieved, then carbon dioxide may be contacted during mixing of the cement mix, e.g., hydraulic cement mix for a certain time at a certain flow rate or rates (or as directed by feedback, described further herein), then after carbon dioxide flow has stopped, additional water may be added in one or more additional stages to reach a desired w/c content, or a desired flowability, in the cement mix, e.g., hydraulic cement mix. The cement mixes contain aggregates, and it will be appreciated that the available aggregate may already have a certain water content and that little or no additional water need be added to achieve the desired w/c ratio for the first stage and that, in some environments, it may not be possible to achieve the desired w/c ratio because aggregate may be too wet, in which case the closest w/c ratio to the optimum is achieved. In certain embodiments, the w/c ratio for the first stage is less than 0.5, or less than 0.4, or less than 0.3, or less than 0.2, or less than 0.18, or less than 0.16, or less than 0.14, or less than 0.12, or less than 0.10, or less than 0.08, or less than 0.06. In certain embodiments, the w/c ratio for the first stage is less than 0.4. In certain embodiments, the w/c ratio for the first stage is less than 0.3. In certain embodiments, the w/c ratio for the first stage is less than 0.2. In certain embodiments, the w/c ratio for the first stage is less than 0.18. In certain embodiments, the w/c ratio for the first stage is less than 0.14. In certain embodiments, the w/c ratio for the first stage is 0.04-0.5, or 0.04-0.4, or 0.04-0.3, or 0.04-0.2, or 0.04-0.18, or 0.04-0.16, or 0.04-0.14, or 0.04-0.12, or 0.04-0.10, or 0.04-0.08. In certain embodiments, the w/c ratio for the first stage is 0.06-0.5, or 0.06-0.4, or 0.06-0.3, or 0.06-0.24, or 0.06-0.22, or 0.06-0.2, or 0.06-0.18, or 0.06-0.16, or 0.06-0.14, or 0.06-0.12, or 0.06-0.10, or 0.06-0.08. In certain embodiments, the w/c ratio for the first stage is 0.08-0.5, or 0.08-0.4, or 0.08-0.3, or 0.08-0.24, or 0.08-0.22, or 0.08-0.2, or 0.08-0.18, or 0.08-0.16, or 0.08-0.14, or 0.08-0.12, or 0.08-0.10. In certain embodiments, the w/c ratio for the first stage is 0.06-

0.3. In certain embodiments, the w/c ratio for the first stage is 0.06-0.2. In certain embodiments, the w/c ratio for the first stage is 0.08-0.2. Addition of additional water in subsequent stages to the first stage, when, in general, no further carbon dioxide is introduced, may be done to achieve a certain final w/c ratio, or to achieve a certain flowability. For example, for a ready-mix truck, a certain amount of water is added to the mixture at the ready-mix production site, then further water may be added at the work site to achieve proper flowability at the work site. Flowability may be measured by any suitable method, for example, the well-known slump test.

In some embodiments, carbon dioxide is added during mixing to a portion of a cement mix, e.g., hydraulic cement mix in one stage, then additional portions of materials, e.g., further cement mix, e.g., hydraulic cement mix, are added in one or more additional stages.

The carbon dioxide, e.g., gaseous carbon dioxide or liquid carbon dioxide, is introduced in the mixing cement mix, e.g., hydraulic cement mix, for example, in the first stage of mixing, at a certain flow rate and for a certain duration in order to achieve a total carbon dioxide exposure. The flow rate and duration will depend on, e.g., the purity of the carbon dioxide gas, the total batch size for the cement mix, e.g., hydraulic cement mix and the desired level of carbonation of the mix. A metering system and adjustable valve or valves in the one or more conduits may be used to monitor and adjust flow rates. In some cases, the duration of carbon dioxide flow to provide exposure is at or below a maximum time, such as at or below 100, 50, 20, 15, 10, 8, 5, 4, 3, 2, or one minute. In certain embodiments, the duration of carbon dioxide flow is less than or equal to 5 minutes. In certain embodiments, the duration of carbon dioxide flow is less than or equal to 4 minutes. In certain embodiments, the duration of carbon dioxide flow is less than or equal to 3 minutes. In certain embodiments, the duration of carbon dioxide flow is less than or equal to 2 minutes. In certain embodiments, the duration of carbon dioxide flow is less than or equal to 1 minutes. In some cases, the duration of carbon dioxide flow to provide exposure is within a range of times, such as 0.5-20 min, or 0.5-15 min, or 0.5-10 min, or 0.5-8 min, or 0.5-5 min, or 0.5-4 min, or 0.5-3 min, or 0.5-2 min, or 0.5-1 min, or 1-20 min, or 1-15 min, or 1-10 min, or 1-8 min, or 1-5 min, or 1-4 min, or 1-3 min, or 1-2 min. In certain embodiments, the duration of carbon dioxide flow is 0.5-5 min. In certain embodiments, the duration of carbon dioxide flow is 0.5-4 min. In certain embodiments, the duration of carbon dioxide flow is 0.5-3 min. In certain embodiments, the duration of carbon dioxide flow is 1-5 min. In certain embodiments, the duration of carbon dioxide flow is 1-4 min. In certain embodiments, the duration of carbon dioxide flow is 1-3 min. In certain embodiments, the duration of carbon dioxide flow is 1-2 min.

The flow rate and duration of flow may be set or adjusted to achieve a desired level of carbonation, as measured by weight of cement (bwc). In certain embodiments, the level of carbonation is more than 0.5, 1, 2, 3, 4, 5, 6, 7, 8, 9, or 10% bwc. In certain embodiments, the level of carbonation is more than 1% by weight. In certain embodiments, the level of carbonation is more than 2% bwc. In certain embodiments, the level of carbonation is more than 3% bwc. In certain embodiments, the level of carbonation is more than 4% bwc. In certain embodiments, the level of carbonation is more than 5% bwc. In certain embodiments, the level of carbonation is more than 6% bwc. In certain embodiments, the level of carbonation is 1-20%, or 1-15%, or 1-10%, or 1-8%, or 1-6%, or 1-5%, or 1-4%, or 1-3%, or 1-2%, or 2-20%, or 2-15%, or 2-10%, or 2-8%, or 2-6%, or 2-5%, or 2-4%, or 2-3%, or 0.5-20%, or 0.5-15%, or 0.5-10%, or 0.5-8%, or 0.5-6%, or 0.5-5%, or 0.5-4%, or 0.5-3%, or 0.5-2%. In certain embodiments, the level of carbonation is 0.5-3%. In certain embodiments, the level of carbonation is 0.5-2%. In certain embodiments, the level of carbonation is 1-6%. In certain embodiments, the level of carbonation is 1-4%. In certain embodiments, the level of carbonation is 2-8%. In certain embodiments, the level of carbonation is 2-6%. In certain embodiments, the level of carbonation is 2-4%. In certain embodiments, the level of carbonation is 3-10%. In certain embodiments, the level of carbonation is 3-8%. In certain embodiments, the level of carbonation is 3-6%. In certain embodiments, the level of carbonation is 4-10%. In certain embodiments, the level of carbonation is 4-8%. In certain embodiments, the level of carbonation is 4-6%. In certain embodiments, the level of carbonation is 5-10%. In certain embodiments, the level of carbonation is 5-8%. In certain embodiments, the level of carbonation is 5-6%. The level of carbonation may be ascertained by any suitable method, such as by the standard combustion analysis method, e.g. heating sample and quantifying the composition of the off gas. An instrument such as the Eltra CS-800 (KR Analytical, Cheshire, UK), or instrument from LECO (LECO Corporation, St. Joseph, Mich.) may be used.

The methods and compositions of the invention allow for very high levels of efficiency of uptake of carbon dioxide into the mixing concrete, where the efficiency of uptake is the ratio of carbon dioxide that remains in the mixing concrete as stable reaction products to the total amount of carbon dioxide to which the mixing concrete is exposed. In certain embodiments, the efficiency of carbon dioxide uptake is at least 40, 50, 60, 70, 80, 90, 95, 96, 97, 98, 99, or 99.%, or 40-100, 50-100, 60-100, 70-100, 80-100, 90-100, 40-99, 50-99, 60-99, 70-99, 80-99, or 90-99%.

In a wet cast operation, the addition of carbon dioxide, components of the cement mix, e.g., hydraulic cement mix, such as one or more admixtures, described more fully below, may be adjusted so that flowability of the final cement mix, e.g., hydraulic cement mix is within 10% of the flowability that would be achieved without the addition of carbon dioxide. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 50, 40, 30, 20 15, 10, 8, 5, 4, 3, 2, or 1% of the flowability that would be achieved without the addition of carbon dioxide, or of a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 20% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 10% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 5% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 2% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 1-50%, or 1-20%, or 1-10%, or 1-5%, or 2-50%, or 2-20%, or 2-10%, or 2-5% of the flowability that would be achieved without the addition of carbon dioxide, or a predetermined flowability.

A. Admixtures

Admixtures are often used in cement mix, e.g., hydraulic cement mixes, such as concrete mixes, to impart desired properties to the mix. Admixtures are compositions added to a cement mix, e.g., hydraulic cement mix such as concrete to provide it with desirable characteristics that are not obtainable with basic cement mix, e.g., hydraulic cement mixes, such as concrete mixtures or to modify properties of the cement mix, e.g., hydraulic cement mix, i.e., concrete to make it more readily useable or more suitable for a particular purpose or for cost reduction. As is known in the art, an admixture is any material or composition, other than the hydraulic cement, aggregate and water, that is used as a component of the cement mix, e.g., hydraulic cement mix, such as concrete or mortar to enhance some characteristic, or lower the cost, thereof. In some instances, the desired cement mix, e.g., hydraulic cement mix, e.g., concrete performance characteristics can only be achieved by the use of an admixture. In some cases, using an admixture allows for the use of less expensive construction methods or designs, the savings from which can more than offset the cost of the admixture.

In certain embodiments, the carbonated cement mix, e.g., hydraulic cement mixture, e.g., concrete, may exhibit enhanced characteristics when compared with the same mixture that was not exposed to carbon dioxide. For example, in certain embodiments, the carbonated concrete mixture has superior properties such as greater strength, such as greater 1-, 7-, or 28-day strength, e.g., at least 1, 2, 3, 4, 5, 7, 10, 15, 20, 30, or 40% greater strength than the non-carbonated concrete mixture at 1-, 7-, or 28-days. In general herein, "strength" refers to compressive strength, as that term is generally understood in the art. Carbonated cement mix, e.g., hydraulic cement mixes may also provide final concrete mixtures that have lower water absorption as compared to non-carbonated, such as at least 1, 2, 3, 4, 5, 7, 10, 15, 20, 30, or 40% lower water absorption. The carbonated cement mix, e.g., hydraulic cement mix, i.e., concrete, may also produce a final product that is lower in density but of comparable strength compared to non-carbonated, such as at least 1, 2, 3, 4, 5, 7, 10, 15, 20, 30, or 40% lower density with a compressive strength within 1, 2, 3, 4, 5, 7, 10, 15, or 20% of the non-carbonated, e.g., at least 5% lower density with a compressive strength within 2%.

However, depending on the mix design, the carbonated cement mix, e.g., hydraulic cement mixture, i.e., concrete, may alternatively or in addition, exhibit properties that it is desired to modulate, such as by the addition of an admixture. For example, carbonated cement mix, e.g., hydraulic cement mix for use in a wet cast operation may have workability/flow characteristics that are not optimum for a wet cast operation without addition of an admixture or other manipulation of the mix, e.g., addition of extra water. As another example, carbonated mixes may have strength characteristics, e.g., compressive strength at one or more time points, that are not optimum without addition of an admixture or other manipulation of the mix. In some cases, the mix design will already call for an admixture, whose effect on the properties of the mix may be affected by the carbonation, requiring coordination of the timing of the admixture in relation to the carbon dioxide addition, or other manipulation. In addition, an admixture may be used to modulate one or more aspects of the carbonation itself, for example, to increase the rate of uptake of the carbon dioxide.

Concrete may be used in wet cast operations, such as in certain precast operations or in ready mix trucks that transport the concrete to a job site where it is used, e.g., poured into molds or otherwise used at the site, or in dry cast operations, which are precast operations. In the case of a wet cast operation, the flowability of the concrete should be maintained at a level compatible with its use in the operation, e.g., in the case of a ready mix truck, at the job site; whereas for a dry cast operation concrete that does not flow (zero slump) is desirable. In both dry cast and wet cast operations, strength, e.g., compressive strength, is important, both in the short term so that the concrete can be allowed to stand alone, e.g., molds can be removed, cast objects can be manipulated, etc., in the shortest possible time, and also in the long term so that a required final strength is reached. Flowability of a mix may be evaluated by measuring slump; strength may be evaluated by one or more strength tests, such as compressive strength. Other properties that may be affected by carbonation; in some cases the effect is a positive one, but if the effect is a negative one, corrected through the use of one or more admixtures. Such properties include shrinkage and water absorption.

In certain cases carbonation of the cement mix, e.g., hydraulic cement mix may affect flowability of a cement mix, e.g., hydraulic cement mix, i.e., a concrete mix, to be used in a wet cast operation, such as in a ready mix truck transporting the mix to a job site. Thus in certain embodiments in which a carbonated mix is produced (such as for use with a ready mix truck), one or more admixtures may be added to modulate the flowability of the carbonated mixture, either before, during, or after carbonation, or any combination thereof, such that it is within a certain percentage of the flowability of the same mixture without carbonation, or of a certain predetermined flowability. The addition of carbon dioxide, components of the mix, e.g., concrete mix, and/or additional components such as one or more admixtures, may be adjusted so that flowability of the final mix is within 50, 40, 30, 20, 10, 8, 5, 4, 3, 2, 1, 0.5, or 0.1% of the flowability that would be achieved without the addition of carbon dioxide, or of a certain predetermined flowability. In certain embodiments, the addition of carbon dioxide, components of the mix, and/or additional components such as one or more admixtures, may be adjusted so that flowability of the final mix is within 20% of the flowability that would be achieved without the addition of carbon dioxide, or within 20% of a predetermined desired flowability. In certain embodiments, the addition of carbon dioxide, components of the mix, and/or additional components such as one or more admixtures, may be adjusted so that flowability of the final mix is within 10% of the flowability that would be achieved without the addition of carbon dioxide, or within 10% of a predetermined desired flowability. In certain embodiments, the addition of carbon dioxide, components of the mix, and/or additional components such as one or more admixtures, may be adjusted so that flowability of the final mix is within 5% of the flowability that would be achieved without the addition of carbon dioxide, or within 5% of a predetermined desired flowability. In certain embodiments, the addition of carbon dioxide, components of the mix, and/or additional components such as one or more admixtures, may be adjusted so that flowability of the final mix is within 2% of the flowability that would be achieved without the addition of carbon dioxide, or within 2% of a predetermined desired flowability. Any suitable measurement method for determining flowability may be used, such as the well-known slump test. Any suitable admixture may be used, as described herein, such as carbohydrates or carbohydrate derivatives, e.g., fructose, sucrose, glucose, sodium glucoheptonate, or sodium gluconate, such as sodium glucoheptonate or sodium gluconate.

In certain embodiments, one or more admixtures may be added to modulate the mix so that a desired strength, either early strength, late strength, or both, may be achieved. Strength of the carbonated cement mix can be dependent on mix design, thus, although with some mix designs carbonation may increase strength at one or more time points, in other mix designs carbonation may decrease strength at one or more time points. See Examples for various mix designs in which carbonation increased or decreased strength at one or more time points. In some cases, carbonation decreases strength at one or more time points and it is desired to return the strength at the time point to within a certain acceptable limit. In certain cases, one or more admixtures is added to increase strength beyond that seen in non-carbonated concrete of the same density. This may be done, e.g., to produce a lightweight concrete with strength comparable to the denser, non-carbonated concrete. In other cases, one or more admixtures added to a carbonated cement itself causes or exacerbates strength loss, and it is desired to recover the loss. Thus, in certain embodiments an admixture is added to the carbonated mix, either before, during, or after carbonation, or a combination thereof, under conditions such that the carbonated mix exhibits strength, e.g., 1-, 7-, 28 and/or 56-day compressive strength, within a desired percentage of the strength of the same mix without carbonation, or of a predetermined strength, e.g., within 50, 40, 30, 20, 15, 12, 10, 9, 8, 7, 6, 5, 4, 3, 2, 1, 0.5, or 0.1%. In certain embodiments, the addition of carbon dioxide, components of the mix, and/or additional components such as one or more admixtures, may be adjusted so that strength at a given time point of the final mix is within 20% of the strength that would be achieved without the addition of carbon dioxide, or within 20% of a predetermined desired strength. In certain embodiments, the addition of carbon dioxide, components of the mix, and/or additional components such as one or more admixtures, may be adjusted so that strength at a given time point of the final mix is within 10% of the strength that would be achieved without the addition of carbon dioxide, or within 10% of a predetermined desired strength. In certain embodiments, the addition of carbon dioxide, components of the mix, and/or additional components such as one or more admixtures, may be adjusted so that strength at a given time point of the final mix is within 5% of the strength that would be achieved without the addition of carbon dioxide, or within 5% of a predetermined desired strength. In certain embodiments, the addition of carbon dioxide, components of the mix, and/or additional components such as one or more admixtures, may be adjusted so that strength at a given time point of the final mix is within 2% of the strength that would be achieved without the addition of carbon dioxide, or within 2% of a predetermined desired strength. In certain embodiments the strength is a compressive strength. Any suitable method to test strength, such as flexural or compressive strength, may be used so long as the same test is used for samples with and without carbonation; such tests are well known in the art. Any suitable admixtures to achieve the desired strengths may be used, such as the admixtures described herein.

Other properties, such as water absorption, shrinkage, chloride permeability, and the like, may also be tested and adjusted in a similar manner, and to similar percentages, as for flowability and/or shrinkage.

It will be appreciated that more than one admixture may be used, for example, 2, 3, 4, 5, or more than 5 admixtures. For example, certain admixtures have desirable effects on flowability but undesirable effects on strength development; when such an admixture is used, a second admixture that accelerates strength development may also be used.

Any suitable admixture that has the desired effect on the property or properties of the carbonated cement that it is desired to modified may be used. TABLE 1 lists exemplary classes and examples of admixtures that can be used in the invention, e.g., to modulate the effects of carbonation.

TABLE 1

Admixtures for use with carbonated cement

| Chemical Class | Sub Class | Cement Application | Examples |
| --- | --- | --- | --- |
| Saccharides | Sugars | Retarder | Fructose, glucose, sucrose |
| | Sugar Acids/bases | Retarder | Sodium Gluconate, sodium glucoheptonate |
| Organic Polymers | Polycarboxylic Ethers | Plasticizer | Many commercial brands |
| | Sulfonated Napthalene Formaldehyde | Plasticizer | Many commercial brands |
| | Sulphonated Melamine formaldehyde | Plasticizer | Many commercial brands |
| | Ligno sulphonates | Plasticizer | Many commercial brands |
| Inorganic Salts | Alkaline Earth Metal Containing | Accelerant | $Ca(NO_3)_2$, $Mg(OH)_2$ |
| | Alkali Metal Containing | Accelerant | NaCl, KOH |
| | Carbonate containing | — | $NaHCO_3$, $Na_2CO_3$ |
| Alkanolamines | Tertiary alkanolamines | Accelerants/Grinding aids | Triethanolamine, Triisopropylamine |
| Phosphonates | — | Retarders | Nitrilotri(methylphosphonic acid), 2-phosphonobutane-1,2,4-tricarboxylic acid |

TABLE 1-continued

Admixtures for use with carbonated cement

| Chemical Class | Sub Class | Cement Application | Examples |
|---|---|---|---|
| Surfactants | Vinsol Resins, synthetic surfactants | Air Entraining Agents | Many commercial brands |
| Chelating Agents | Various Chemistries | Retarders | EDTA, Citric Acid, nitrilotriacetic acid |

In certain embodiments, one or admixtures is added to a cement mix, e.g., hydraulic cement mix, before, during, or after carbonation of the mix, or a combination thereof, where the admixture is a set retarder, plasticizer, accelerant, or air entraining agent. Where it is desired to modulate flowability, set retarders and plasticizers are useful. Where it is desired to modulate strength development, accelerants are useful. If it is desired to increase the rate of carbon dioxide uptake, certain air entraining agents may be useful.

Set retarders include carbohydrates, i.e., saccharides, such as sugars, e.g., fructose, glucose, and sucrose, and sugar acids/bases and their salts, such as sodium gluconate and sodium glucoheptonate; phosphonates, such as nitrilotri(methylphosphonic acid), 2-phosphonobutane-1,2,4-tricarboxylic acid; and chelating agents, such as EDTA, Citric Acid, and nitrilotriacetic acid. Other saccharides and saccharide-containing admixes of use in the invention include molasses and corn syrup. In certain embodiments, the admixture is sodium gluconate. Other exemplary admixtures that can be of use as set retarders include sodium sulfate, citric acid, BASF Pozzolith XR, firmed silica, colloidal silica, hydroxyethyl cellulose, hydroxypropyl cellulose, fly ash (as defined in ASTM C618), mineral oils (such as light naphthenic), hectorite clay, polyoxyalkylenes, natural gums, or mixtures thereof, polycarboxylate superplasticizers, naphthalene HRWR (high range water reducer). Additional set retarders that can be used include, but are not limited to an oxy-boron compound, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide. Illustrative examples of retarders are set forth in U.S. Pat. Nos. 5,427,617 and 5,203,919, incorporated herein by reference.

Accelerants include calcium-containing compounds, such as CaO, $Ca(NO_2)_2$, $Ca(OH)_2$, calcium stearate, or $CaCl_2$, and magnesium-containing compounds, such as magnesium hydroxide, magnesium oxide, magnesium chloride, or magnesium nitrate. Without being bound by theory, it is thought that, in the case of carbonated cement, the added calcium or magnesium compound may provide free calcium or magnesium to react with the carbon dioxide, providing a sink for the carbon dioxide that spares the calcium in the cement mix, or providing a different site of carbonation than that of the cement calcium, or both, thus preserving early strength development. In certain embodiments, CaO (lime) may be added to the mix, or a high-free lime cement may be the preferred cement for the mix. Other set accelerators include, but are not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (e.g., chloride).

The admixture or admixtures may be added to any suitable final percentage (bwc), such as in the range of 0.01-1.0%, or 0.01-0.05%, or 0.05% to 5%, or 0.05% to 1%, or 0.05% to 0.5%, or 0.1% to 1%, or 0.1% to 0.8%, or 0.1% to 0.7% per weight of cement. The admixture may be added to a final percentage of greater than 0.05%, 0.1, 0.15, 0.2, 0.3, 0.4, or 0.5%; in certain cases also less than 5, 4, 3, 2, 1, 0.9, 0.8, 0.7, or 0.6%.

It has been observed that the timing of addition of a given admixture relative to carbonation of a cement mix, e.g., hydraulic cement mix may alter the effects of the admixture on the properties of the cement mix, e.g., hydraulic cement mix, e.g., effects on flowability or strength. For example, in certain mix designs, the addition of sodium gluconate after carbonation restores flowability to desired levels, but may adversely affect early strength development; whereas the addition of sodium gluconate before carbonation maintains early strength development but does not optimally restore flowability. As another example, in mix designs in which an air entrainer is desired, it has been found that if the air entrainer is added before carbonation, the density of the mix is increased compared to if the air entrainer is added after carbonation. The admixture or admixtures thus may be added before, during, or after carbonation of the cement mix, e.g., hydraulic cement mix, or any combination thereof. For example, in certain embodiments, the admixture is added after carbonation; in other embodiments, the admixture is added before carbonation; in yet other embodiments, the admixture is added in two split doses, one before carbonation and one during and/or after carbonation. It will be apparent that if more than one admixture is used, one may be added at one time while another is added at another time, for example, in a mix where an air entrainer is used and sodium gluconate is also added to affect flowability, the sodium gluconate may be added in split doses, one before carbonation and one during/after carbonation, and the air entrainer may be added after carbonation. The latter is exemplary only, and any suitable combination of admixtures and timing to achieve the desired effect or effects may be used.

It has been observed that the effects of carbonation and of admixtures on carbonated cement mix, e.g., hydraulic cement mixes is highly mix-specific. In some cases carbonation actually improves the properties of a mix, especially in dry cast situations where flowability is not an issue, and no admixture is required. In other cases, especially in wet cast situations where flowability is an issue, one or more admixtures may be required to restore one or more properties of the mix. Whether or not admixture is added, and/or how much is added, to a given batch may be determined by pre-testing the mix to determine the properties of the carbonated mix and the effects of a given admixture. In some cases the admixture and/or amount may be predicted based on previous tests, or on properties of the cement used in the mix, or on theoretical considerations. It has been found that different cements have different properties upon carbonation, and also react differently to a given admixture, and the invention includes the use of a library of data on various cement types and admixtures so as to predict a desired admixture/amount for a mix design, which may be a mix that is the same as or similar to a mix in the library, or a new mix whose properties can be predicted from the library. In addition, for a given batch, rheology (flowability) may be monitored during the carbonation of the batch and the exact timing and/or amount of admixture added to that particular batch, or to subsequent batches, may be adjusted based on the feedback obtained. A combination of predicted value for admixture type, timing, and/or amount, and modification of the value based on real-time measurements in a given batch or batches may be used.

In certain embodiments, an admixture comprising a carbohydrate or carbohydrate derivative is added to a cement mix, e.g., hydraulic cement mix before, during, and/or after carbonation of the mix, or a combination thereof. In certain embodiments, the admixture is added after carbonation of the cement mix, e.g., hydraulic cement mix, or during and after carbonation. The carbonation may be accomplished as described herein, for example, by delivering carbon dioxide to the surface of the cement mix, e.g., hydraulic cement mix during mixing. The carbohydrate or derivative may be any carbohydrate as described herein, for example sucrose, fructose, sodium glucoheptonate, or sodium gluconate. In certain embodiments, the carbohydrate is sodium gluconate. The carbohydrate or derivative, e.g., sodium gluconate may be used at a suitable concentration; in some cases, the concentration is greater than 0.1%, 0.15%, 0.2%, 0.3%, 0.4%, or 0.5% bwc. The concentration may also be less than 2, 1.5, 1, 0.9, 0.8, 0.7, or 0.6%. The carbohydrate or derivative may be added in two or more doses, such as one dose before carbonation and one dose during and/or after carbonation. In certain embodiments, calcium stearate is used as an admixture.

In certain embodiments, a second admixture is also used, such as any of the admixtures described herein. In certain embodiments, the second admixture is a strength accelerator. In certain embodiments, a third admixture is also used, such as any of the admixtures described herein. In certain embodiments, a fourth admixture is also used, such as any of the admixtures described herein.

Other admixtures useful in methods and compositions of the invention are described in U.S. Pat. No. 7,735,274, hereby incorporated by reference herein in its entirety.

B. Control Mechanisms

The methods and apparatus of the invention may include one or more control mechanisms, e.g., automatic control mechanisms, to modulate one or more aspects of the mix and carbonation operation, such as to modulate the contact of the cement mix, e.g., hydraulic cement mix with carbon dioxide and/or other components, such as one or more admixtures or water, as well as other aspects of the operation of the mixer, such as worker safety requirements, cooling of the cement mix, e.g., hydraulic cement mix, and the like. It will be appreciated that modulation may be achieved by human operators who control the necessary valves and the like to achieve a desired carbon dioxide exposure and/or other characteristic of the carbonated cement mix, but in general automatic control mechanisms are employed. The control may be based on any suitable parameter, such as feedback regarding one or more characteristics of the mix operation, timing, which may be a predetermined timing, or a combination thereof.

Control systems and mechanisms can apply to a stationary mixer in a precast concrete plant or other central mixing facility. Alternatively, it can apply to a ready mix concrete truck that facilitates mixing through rotation of its drum. The mix operation can be a dry cast or wet cast operation; for example, the ready mix concrete truck will be a wet cast, while precast may be wet cast or dry cast.

A simple form of control is based on timing alone. Thus, in certain embodiments, the methods include modulating the flow of carbon dioxide to the cement mix, e.g., hydraulic cement mix according to a certain timing. The timing may be controlled by a controller that is connected to a cement mix, e.g., hydraulic cement mix apparatus and that senses when the apparatus has begun or stopped a stage of operation, and that modulates carbon dioxide flow accordingly, e.g., starts or stops flow. Thus in certain embodiments, carbon dioxide flow is begun when one or more components of a cement mix, e.g., hydraulic cement mix have been deposited in a mixer, continues for a certain predetermined time at a certain predetermined flow rate, then stops. The stage of operation of the cement mix, e.g., hydraulic cement mix apparatus may be determined by the programming of the controller or of another controller to which the controller is operably connected, or it may be determined by one or more sensors which monitor positions of components of the apparatus, flow, and the like, or a combination thereof.

Typically, however, control systems and mechanisms of the invention include feedback mechanisms where one or more characteristics of the cement mix, e.g., hydraulic cement mixture and/or apparatus or its environment is monitored by one or more sensors, which transmit the information to a controller which determines whether one or more parameters of the mix operation requires modulation and, if so, sends the appropriate output to one or more actuators to carry out the required modulation. The controller may learn from the conditions of one batch to adjust programming for subsequent batches of similar or the same mix characteristics to optimize efficiency and desired characteristics of the mix.

In order to achieve a desired efficiency of carbon dioxide uptake in the cement mix, e.g., hydraulic cement mix, to ensure desired characteristics such as flow characteristics, strength, and appearance, and/or to ensure worker safety, various aspects of the mix operation, the mixer, the cement mix, e.g., hydraulic cement mix, and the environment of the mixer may be monitored, the information from the monitoring processed, and adjustments made in one or more aspects of the mix operation in order to achieve the desired result. Thus, in certain embodiments of the invention, one or more sensors may be used to provide input to a controller as to various conditions related to the desired characteristics; the controller processes the inputs and compares them to predetermined parameters of operation and, if corrections in the process are necessary, the controller then sends output to one or more actuators in order to bring the system back toward the desired condition.

In particular embodiments, the invention provides control systems for controlling the carbonation of a cement mix, e.g., hydraulic cement mix in a mixer by use of one or more sensors monitoring one or more of weight of the cement used in the mix, carbon dioxide concentration of the atmosphere inside and/or outside the mixer, temperature of the cement mix, e.g., hydraulic cement mix or a component in contact with the cement mix, e.g., hydraulic cement mix, rheology of the mix, and/or moisture content of the mix, where the one or more sensors send input to a controller which processes the information received from the one or more sensors by comparing the input to one or more predetermined parameters and, if necessary, sends output to one or more actuators to adjust carbon dioxide flow rate, water addition, or admixture addition, or to perform other functions such as to sound an alarm if carbon dioxide levels exceed safe levels. In addition, certain operations, such as cooling of the cement mix, e.g., hydraulic cement mix, may be performed after the mixing is complete. The controller can learn from one batch to adjust conditions for a subsequent batch of the same or similar composition. Further levels of control may be used, such as a central controller that receives information from a plurality of mix operations in a plurality of locations regarding one or more aspects of each operation, and processes the information received from all mix operations to improve performance at the various operations; thus, large amounts of information can be used to improve performance at a variety of sites.

In the mixing operation, components of the cement mix, e.g., hydraulic cement mix, e.g., cement, aggregate, and water, are added to the mixer, and mixing commences. In some cases some components, such as aggregate, may have a sufficient water content, e.g., from exposure to wet weather conditions, that additional water is not added before mixing commences. In some cases, as described elsewhere herein, water or other components may be added in a staged manner. At some point before, during, or after the process of addition of components or mixing, carbon dioxide flow is initiated from a source of carbon dioxide to the mixer. In some cases, part or all of the carbon dioxide will be included in the mix water. In some cases, the carbon dioxide flow will be gaseous; in other cases, the carbon dioxide flow comprises a mixture of gaseous and solid carbon dioxide. Additional components, such as admixtures, may be added to the cement mix, e.g., hydraulic cement mix as well at any point in the operation. The carbon dioxide is subsumed into the mixing cement mix, e.g., hydraulic cement mix and begins reaction with the mix components; any carbon dioxide that is not taken up by the cement mix, e.g., hydraulic cement mix fills the head space of the mix container. Since typical mixers are not airtight, if the rate of carbon dioxide flow to the mixer exceeds the rate of uptake into the cement mix, e.g., hydraulic cement mix, at some point the head space in the mixer will be full of carbon dioxide and excess carbon dioxide will exit the mixer from one or more leak points. Thus, the carbon dioxide content of the atmosphere inside the mixer or, more preferably, outside the mixer, e.g., at one or more leak points, may be monitored to provide an indication that the rate of carbon dioxide addition is exceeding the rate of carbon dioxide uptake. In addition, carbon dioxide levels in areas where workers are likely to be may also be monitored as a safety precaution. The reaction of carbon dioxide with the hydraulic cement is exothermic, thus the temperature of the cement mix, e.g., hydraulic cement mix rises; the rate of temperature rise is proportional to the rate of carbon dioxide uptake and the overall temperature rise is proportional to total carbon dioxide uptake for a given mix design. Thus, the temperature of the cement mix, e.g., hydraulic cement mix, or the temperature of one or more portions of the mix container or other equipment that are in contact with the mix, may be monitored as an indication of rate and extent of carbon dioxide uptake into the cement mix, e.g., hydraulic cement mix. Carbonation of components of the cement mix, e.g., hydraulic cement mix may produce a change in the flow characteristics, i.e., rheology, of the cement mix, e.g., hydraulic cement mix, which can be undesirable in certain applications, e.g., in wet cast applications such as in a ready mix truck. Thus, the rheology of the cement mix, e.g., hydraulic cement mix may be monitored. In addition, carbonation may affect the moisture characteristics of the cement mix, e.g., hydraulic cement mix, which may lead to undesirable characteristics, and moisture content of the mix may be monitored as well.

The invention also provides a network of mix systems with one or more sensors and, optionally, controllers, that includes a plurality of mix systems, such as 2, 3, 4, 5, 6, 7, 8, 9, 10, or more than 10 mix systems with one or more sensors and, optionally, controllers, each of which transmits data from their respective locations and mix conditions to a central controller, which learns from the overall data from all the mix systems and provides updated and modified mix instructions to the various mix systems in the network based on this information. In this way the operation of each individual mix system within the network can be optimized based on information from all the other mix systems in the network. Thus, timing and extent of carbon dioxide delivery, admixture type and amount, water amount and timing and delivery, and other factors may be optimized for one site before it has even begun its first batch, based on historical information from other sites, and all sites may undergo continual improvement in optimization as the sensors, and, optionally, controllers in the network continually gain more information and feed it to the central controller.

Thus, in certain embodiments the methods and/or apparatus of the invention may include feedback mechanisms by which one or more characteristics of the type of mixer apparatus, cement mix, e.g., hydraulic cement mix, a gas mixture in contact with the cement mix, e.g., hydraulic cement mix and inside or outside of the mixer, a component of the cement mix, e.g., hydraulic cement mix production apparatus, a component exposed to the cement mix, e.g., hydraulic cement mix, or the environment of the mixer, is monitored and the information is used to modulate the exposure of the cement mix, e.g., hydraulic cement mix to carbon dioxide, one or more admixtures, water, or other components, in the current mix and/or in subsequent mixes. Characteristics such as carbon dioxide content monitored inside and/or outside the mixer, and/or temperature of the mix monitored inside the mixer or outside of the mixer, of a component in contact with the cement mix, e.g., hydraulic cement mix, e.g., a surface of the mixer such as the outer surface of the mixer, and/or position or state of operation of a component of the cement mix, e.g., hydraulic cement mix production apparatus, may be used to determine when to modulate carbon dioxide addition, e.g., to start or to stop or slow carbon dioxide addition. Certain safety monitoring may also be done, e.g., monitoring of areas outside the mixer for carbon dioxide levels to ensure worker safety.

In general, feedback systems include one or more sensors for monitoring one or more characteristics and sending input to a controller, which receives the input from the sensors, processes it, and, if necessary, sends output, based on the processing, to one or more actuators that is configured to alter some aspect of the exposure of the cement mix, e.g., hydraulic cement mix to carbon dioxide, water, admixture, or some other aspect of the operation of the cement mix, e.g., hydraulic cement mix apparatus. In the simplest case, a human operator may manually begin carbon dioxide exposure by adjusting a valve, then may monitor a characteristic by using one or more sensors, e.g., a handheld temperature sensor that is pointed at the drum of a ready mix truck, and/or a simple timer, and halt the supply of carbon dioxide gas when a certain temperature or a certain time is reached. However, in general automatic feedback mechanisms are used.

Sensors

Suitable sensors for use in control systems of the invention include temperature sensors, carbon dioxide sensors, rheology sensors, weight sensors (e.g., for monitoring the exact weight of cement used in a particular batch), moisture sensors, other gas sensors such as oxygen sensors, pH sensors, and other sensors for monitoring one or more characteristics of a gas mixture in contact with the cement mix, e.g., hydraulic cement mix, a component of the cement mix, e.g., hydraulic cement mix production apparatus, a component exposed to the cement mix, e.g., hydraulic cement mix, or some other aspect of the mix operation. Sensors also include sensors that monitor a component of the cement mix, e.g., hydraulic cement mix apparatus, such as sensors that detect when mixing has begun, when components of a cement mix, e.g., hydraulic cement mix have been added to a mixer, mass flow sensors, flow rate or pressure meter in the conduit, or other suitable sensors.

Cement Weight Scale Sensor

A cement weight scale sensor can be used to transmit information to the controller concerning the mass of cement that will be in a given mixture in the mixer. Since the $CO_2$ is dosed in proportion to the mass of cement, this weight is important for determining the correct dose to achieve the desired outcomes. The cement mass is also used to scale the size of a given batch, given that a mixture could vary in relation to a default size such as a full batch (100%) or a quarter batch (25%), or any other batch size. In some cases the batch could even exceed 100%. This batch size can also be used to determine the head (free) space in the mixer so that it can be rapidly filled with $CO_2$ without creating an overpressure by delivering more than the headspace will allow. Once the head space is full, the flow rate can be reduced to match the uptake rate of the cement.

Carbon Dioxide Sensors

One or more $CO_2$ sensors may be used to minimize waste, i.e., to increase the efficiency of carbon dioxide uptake, and/or to ensure worker safety. The $CO_2$ sensors work by measuring the $CO_2$ content of the air around the outside of the mixer and/or inside the mixer. Alternatively, or additionally, one or more sensors may be located inside the mixer and sense the carbon dioxide content of the gas in the mixer and send a signal to a controller. The sensors may be any sensor capable of monitoring the concentration of carbon dioxide in a gas and transmitting a signal to the controller based on the concentration, and may be located in any convenient location or locations inside or outside the mixer; if inside, preferably in a location such that the sensor is not subject to fouling by the cement mix, e.g., hydraulic cement mix as it is being mixed or poured. In addition to, or instead of, carbon dioxide sensors inside the mixer, one or more such sensors may be located outside the mixer to sense the carbon dioxide content of overflow gas escaping the mixer and send a signal to a controller. In either case, a certain range or ranges, or a cutoff value, for carbon dioxide content may be set, and after the carbon dioxide content of the mixer and/or overflow gas reaches the desired range, or goes above the desired threshold, carbon dioxide delivery, or some other aspect of the cement mix, e.g., hydraulic cement mix apparatus, may be modulated by a signal or signals from the controller to an actuator or actuators. For example, in certain embodiments a carbon dioxide sensor may be located outside the mixer and when carbon dioxide content of the overflow gas reaches a certain threshold, such as a carbon dioxide concentration that indicates that the gas mixture in contact with the cement mix, e.g., hydraulic cement mix is saturated with carbon dioxide, carbon dioxide delivery to the cement mix, e.g., hydraulic cement mix, e.g., inside the mixer is halted or slowed by closing a valve, partially or completely, in the conduit from the carbon dioxide source to the mixer.

In particular, for minimizing waste, one or more sensors can be placed in the areas where leaks are most likely to occur (e.g., around doors, etc.). The sensor or sensors may be positioned so that leaking carbon dioxide is most likely to pass in their vicinity, e.g., since carbon dioxide is more dense than air, positioning below a likely leak point is more desirable than positioning above a likely leak point. When the gas is delivered at a rate much greater than capacity of the cement to absorb the $CO_2$ it is more likely to spill out of the mixer at a leak point and be detected by a gas sensor. Leaks would be a normally occurring event when there is too much gas delivered to the mixer given that the mixer is not completely gas tight according to the nature of the machine. A $CO_2$ leak would occur when the $CO_2$ has been delivered too quickly. Given that $CO_2$ is heavier than air there would be, in general, a certain amount of $CO_2$ that can be delivered to the mixer wherein the incoming $CO_2$ gas would displace air that initial was sitting in the mixer. Once the air has been displaced an delivery of additional gas would displace previously delivered carbon dioxide or otherwise be immediately spilled from the mixer. Sensors that feed into a dosing logic system would preferably be placed in locations immediately beside the mixer leak points. If the one or more sensors read that the $CO_2$ content in the vicinity exceeds a preset threshold level (e.g. a defined baseline), the system will adjust the $CO_2$ flow rate and/or delivery time, e.g., to decrease or eliminate additional overspill in the present batch or to eliminate the overspill in a future mixing cycle. The logic can co-ordinate a filling rate of the mixer space that is proportional to the uptake rate of $CO_2$ by the cement.

For worker safety, if a carbon dioxide delivery causes the carbon dioxide concentration in areas around the mixer normally accessed by workers to exceed a maximum value (such as indicated by OSHA), the controller can signal for a system shut down wherein all the valves can be closed and, typically, an alarm can be sounded as a safety measure. Sensors that feed into a safety system can be placed at various distances from the mixer depending on the proximity requirements for workers to the mixer.

Temperature Sensors

One or more sensors may be used to monitor the temperature of the mix inside or outside of the mixer and/or of a component in contact with the cement mix, e.g., hydraulic cement mix and/or of the mixer, which is indicative of carbonation and/or other reactions due to the addition of the carbon dioxide, and carbon dioxide addition modulated based on this temperature or temperatures monitored by the sensor(s). One or more temperature sensors may be located to monitor the temperature of the cement mix, e.g., hydraulic cement mix, for example, within the mixer, or at a site distal to the mixer such as a holding site or transport site for the cement mix, e.g., hydraulic cement mix. Such a site may be, e.g., a feedbox for a pre-cast operation, or a belt or other transport mode, or a wheelbarrow or other site for transporting or storing concrete from a ready-mix truck. One or more temperature sensors may be located to monitor the temperature of a component that is in contact with the cement mix, e.g., hydraulic cement mix, e.g., the drum of the mixer. Any suitable temperature sensor may be used. For example, a infrared temperature sensor, such as a mounted or handheld sensor, may be used to monitor the temperature of the drum of a ready-mix truck to which carbon dioxide is added, and when a certain temperature is reached or range of temperatures achieved, the addition of the carbon dioxide inside the drum may be modulated.

The temperature or range of temperatures at which the carbon dioxide exposure is modulated may be a predetermined temperature or range, based on a temperature known to be associated with one or more undesirable characteristics, e.g., reduced strength, workability loss, poor compactability performance, hardening in the mixer, etc. In some cases it may be an absolute temperature or range. More preferably, it is a temperature or range that is determined in reference to an initial temperature, such as an initial temperature of the cement mix, e.g., hydraulic cement mix or a component in contact with the mix before addition of carbon dioxide. In certain embodiments, the temperature or range is at least 10, 15, 20, 21, 22, 23, 24, 25, 26, 27, 28, 29, 30 35, 40, 45, or 50° C. above the initial temperature, or 10-50, 10-40, 10-30° C. above the initial temperature, and with that range a threshold may be set, which may vary from batch to batch depending on the desired carbonation of the concrete mix or other characteristics. In certain cases, e.g., where warm starting materials are used, the temperature is kept unchanged from the starting temperature, or kept within 0-5° C. of the starting temperature. In some case, an absolute maximum temperature is set and the control system is configured to keep the mix below the maximum temperature. The sensor can also be used to monitor rate of temperature rise and the controller can adjust the flow rate and/or delivery time if the rate is too high or too low. Test data indicates that, for a constant flow, the carbon uptake is proportional to temperature increase detected immediately after carbonation for a given mix. An in-situ temperature measurement may be used to model the real-time total carbon dioxide uptake of the cement mix, e.g., hydraulic cement mix with respect to previously collected calibration data.

Rheology Sensors

In an operation in which flowability of the cement mix is important, e.g., a wet cast operation, one or more rheology sensors may be used. A rheometer can be mounted inside the mixer to measure the workability of the cement mix, e.g., hydraulic cement mix. $CO_2$ can reduce the workability of the fresh cement mix, e.g., hydraulic cement mix, and the rheometer can be used to monitor the workability loss. At a certain preset minimum threshold of workability, one or more actions may be triggered, such as modulation of the rate of $CO_2$ flow to the mixer, addition of admixture, and/or addition of additional water, to restore workability to a desired level. A rheometer can also monitor the workability of concrete in a ready mix concrete truck while it is in transit and adjust $CO_2$/admixture doses on subsequent mixtures produced at the batching plant, or even adjust an admixture dose delivered in the drum truck itself.

Moisture Sensors

One or more moisture sensors may be used. The moisture sensor is used to monitor the moisture in the cement mix, e.g., hydraulic cement mix during the mixing cycle. As $CO_2$ is taken up by the cement mix, e.g., hydraulic cement mix, the apparent moisture can be reduced and result in a drier looking product. Therefore the mix moisture may need to be increased to maintain the desired product appearance. If the moisture reaches a minimum threshold value, the $CO_2$ can be modulated, e.g., reduced or shut off so the mix is not released in an unacceptably dry condition. The sensor also monitors the moisture decrease with respect to $CO_2$ uptake and can adjust the flow rate and/or delivery time if the rate becomes too high or too low. The moisture sensor can also trigger the addition of supplemental mix water at any point in the mixing process. In addition, one or more moisture sensors may be used to determine the moisture content of one or more components of the cement mix, e.g., hydraulic cement mix before the components are mixed; for example, a moisture sensor may be used to determine the moisture content of aggregate, which may be exposed to weather conditions leading to water pickup. In the case of an operation where carbon dioxide is added via mix water as well as by gas or liquid, such information may be used to adjust the relative amount of carbon dioxide added via gas or liquid, to compensate for the fact that less mix water will be used due to the moisture content of the aggregate.

Other Sensors

One or more sensors may monitor conditions of the cement mix, e.g., hydraulic cement mix apparatus and send a signal to a controller. For example, one or more sensors may monitor when all desired components of the cement mix, e.g., hydraulic cement mix are in the mixer and mixing, and the controller may send a signal to an actuator, such as a controllable valve, to begin flow of carbon dioxide. The carbon dioxide flow may continue for a predetermined time, or may be modulated according to further feedback, such as described above.

Other conditions may be monitored, as well, such as pressure conditions in one or more lines; for example, in a system where liquid carbon dioxide is delivered to the mixer, sensors may be employed to control dry ice formation between the nozzle and solenoid as well as to confirm pre-solenoid pressure is maintained to ensure the line remains liquid.

Any combination of one or more sensors inside or outside the mixer, and/or inside or outside the mix, may be used to monitor cement binder weight, cement binder location, carbon dioxide content, temperature, rheology, moisture content, pH, other characteristics, or a combination thereof, and feedback loops to modulate the addition of carbon dioxide based on the information provided by these sensors may be used; such loops may include automatic or manual adjustments, or both. In certain embodiments, sensors monitor the cement binder addition time and/or dust collector system operation time, as in some mixers a fan is run after the powders go in to prevent excessive dust, and these should be turned off so that added carbon dioxide is not removed during this time.

Thus, in certain embodiments the invention provides a method or apparatus for producing carbonated cement mix, e.g., hydraulic cement mix that includes a control system that includes at least one sensor selected from the group consisting of a carbon dioxide sensor, a temperature sensor, a rheology sensor, and a moisture sensor. In certain embodiments the invention provides a method or apparatus for producing carbonated cement mix, e.g., hydraulic cement mix that includes a control system that includes at least two sensors selected from the group consisting of a carbon dioxide sensor, a temperature sensor, a rheology sensor, and a moisture sensor. In certain embodiments the invention provides a method or apparatus for producing carbonated cement mix, e.g., hydraulic cement mix that includes a control system that includes at least three sensors selected from the group consisting of a carbon dioxide sensor, a temperature sensor, a rheology sensor, and a moisture sensor. In certain embodiments the invention provides a method or apparatus for producing carbonated cement mix, e.g., hydraulic cement mix that includes a control system that includes a carbon dioxide sensor, a temperature sensor, a rheology sensor, and a moisture sensor. The methods and apparatus can further include one or more actuators for adjusting some aspect of the mix operation, for example carbon dioxide flow to the mixer, or admixture flow to the mixer, and a controller that receives signals from the sensor or sensors, processes them to determine if modulation of the mix operation is required, and, if so, transmits a signal to an actuator or actuators to carry out the modulation.

Actuators

The actuator or actuators may be, e.g., one or more valves, such as solenoid valve, in one or more conduits supplying a component, such as carbon dioxide, to the mixer, as described elsewhere herein. An actuator for CO2 delivery can be, e.g., a delivery manifold with, e.g. gas temperature sensor, gas pressure gauge, modulating control valve, open/close solenoid and orifice plate assembly. These components can all be combined in a singular unit, i.e. a flow controller. In certain embodiments, in addition to or alternatively to, a gas delivery system, one or more actuators for controlling delivery of carbonated mix water, as described herein, may be used. Such actuators may include, e.g., actuators to control charging mix water with carbon dioxide and/or actuators to control delivery of carbon dioxide-charged water to the mixer. Similarly, an actuator controlling water delivery to the mix may be under the control of the controller, as may be an actuator controlling delivery of one or more admixtures to the mix. In addition, an actuator may include a relay switch attached to dust collector power source to shut off mixer dust collector during $CO_2$ delivery (if necessary). In general, the modulation of the carbon dioxide exposure will be an increase or decrease in exposure, such as a decrease in flow rate of carbon dioxide gas to the mixer. In certain embodiments, the modulation is halting the flow of carbon dioxide gas to the mixer.

Thus, in certain embodiments the invention provides a method or apparatus for producing carbonated cement mix, e.g., hydraulic cement mix that includes a control system that includes at least one actuator for controlling at least one action selected from the group consisting of a carbon dioxide flow to the mixer, water flow to the mixer, and admixture flow to the mixer. In certain embodiments the invention provides a method or apparatus for producing carbonated cement mix, e.g., hydraulic cement mix that includes a control system that includes at least two actuators for controlling at least two actions selected from the group consisting of a carbon dioxide flow to the mixer, water flow to the mixer, and admixture flow to the mixer. In certain embodiments the invention provides a method or apparatus for producing carbonated cement mix, e.g., hydraulic cement mix that includes a control system that includes an actuator for controlling carbon dioxide flow to the mixer, an actuator for controlling water flow to the mixer, and an actuator for controlling admixture flow to the mixer.

Other actuators, such as actuators that control one or more aspects of hydraulic cement production, such as timing of mixing, delivery of cooling input such as ice or liquid nitrogen, activation of an alarm, and the like, may also be used as appropriate.

Controller

The control systems used in methods and apparatus of the invention include a controller that receives inputs from the one or more sensors, processes them by comparing them to preset values for achieving the desired result, and, as necessary, sends outputs to the one or more actuators to move the system toward the desired result.

The controller may be, e.g., an electronic circuit or a programmable logic controller, located either on-site with the mixer or off-site, e.g., as part of a computer network. For example, the controller may be a Programmable Logic Controller (PLC) with a Human Machine Interface (HMI), for example a touch screen and onboard telemetry computer. The controller can be integrated into the overall mixer controller or it can be a separate unit that receives inputs from the mixer controller as appropriate.

An exemplary set of operations for a controller in response to inputs from various sensors and giving outputs to various actuators is illustrated below.

The system can include the following components: 1) Programmable Logic Controller (PLC) with attached Human Machine Interface (HMI), for example a touch screen and onboard telemetry computer. 2) Gas delivery manifold with, e.g., gas temperature sensor, gas pressure gauge, modulating control valve, open/close solenoid and orifice plate assembly. These components can all be combined in a singular unit, i.e. a flow controller. 3) Cement weight scale feeding into a concrete mixer to measure quantity of cement used in a batch. This quantity is used logically to determine the $CO_2$ dose based on cement content (further information below). 4) Proximity switch to trigger the delivery of $CO_2$ into the mixer 5) Relay switch attached to dust collector power source to shut off mixer dust collector during $CO_2$ delivery (if necessary). 6) One or more $CO_2$ sensors positioned around the mixer used to monitor carbon dioxide gas concentration outside the mixer. The data can be used logically to minimize wastage by controlling flow or monitor safety (further information below). 7) Concrete temperature sensor in or on mixer used to monitor the concrete temperature during the carbonation treatment. The data can be used logically to control the $CO_2$ dose as well as the flow rate (further information below). 8) Moisture sensor used to monitor concrete moisture in the mixer. This information can be used to logically control the $CO_2$ dose (further information below). 9) Concrete rheology sensor to monitor the consistency of the concrete. Information about the workability of the concrete can logically be used to signal admixture delivery or process end points. Not all of these components need be present, depending on the needs of the mix operation. For example, in a dry cast operation, a rheology sensor may not be used.

The steps of operation of the system are as follows:

1. A PLC is programmed, for example, through the HMI, to apply carbon dioxide treatment to a first batch. Process threshold settings for aspects such as $CO_2$ concentration in the air at a leak point and/or at a worker area, concrete temperature and/or rate of temperature change, concrete moisture and/or rate of moisture change, concrete rheology can be input at this time.

2. Batching starts by a signal from the mixing controller to the mixer. This follows logically after the previous step. The mixer controller software can communicate batch information to the PLC.

3. Materials are added to mixer (e.g. aggregates). This follows logically after the previous step as part of normal practice.

4. The cement is weighed. This follows logically after the previous step as part of normal practice. A cement mass (weight) sensor determines mass (weight) of cement used in the batch and feeds information to the PLC 5. The PLC makes a calculation to determine the required gas flow. This follows logically from an earlier step. The PLC calculates the amount of gas required for delivery to the current mix based upon a percentage dosage rate of gas mass to cement mass. The PLC calculation may refer to a predetermined set point. It may alternatively, or in addition, call upon historical data of previous combinations of mix size, mix type and $CO_2$ dosage rate, either from the mix site at which the current batch is being mixed, or from other mix sites, or a combination thereof. It can use information (either input or detected) about the batch size, cement mass, mix type and mixer volume. For example, it can use information about cement type or origin to determine whether, which, and/or how much admixture should be employed. The PLC can accept information required for calculations from sources including user input into the HMI, communication with the mixer controller software, and the cement mass sensor. The PLC calculations will depend upon acquiring all of the required data which can come from, e.g., the HMI in step 1, mix controller software in step 2, and/or the cement mass sensor in step 4.

6. Cement is dropped into the mixer. This follows logically after the previous step. The time that cement enters the mixer is detected. A proximity sensor can detect the cement deposit in the mixer through a physical movement (e.g. the opening of a door or gate). Alternatively, the cement addition time can be supplied synchronously from the mixer controller software. The time that the cement is placed into mixer is transmitted to the PLC.

7. The PLC starts the gas delivery. This can be concurrent with the previous step, at some predetermined time after the previous step, or even before the previous step, if it is desired to replace some or all of the air in the mixer with $CO_2$ prior to deposition of the cement. The PLC can send a signal to the mixer dust collector to be turned off for all or part of the $CO_2$ delivery or otherwise coordinated with some aspect of the gas delivery. The PLC sends signal to the solenoid in the $CO_2$ delivery system to open either in coordination with the cement insertion or at some time before or after the insertion.

8. The PLC surveys the sensors for any process conditions that signal the $CO_2$ delivery is to change/end according to preset conditions or for other measurable aspects. This follows logically after the previous step. A) Temperature sensor—the concrete temperature exceeds a threshold value or rate that can be set for correlation to a maximum allowable temperature rise or a target temperature rise. B) $CO_2$ leak sensors—the $CO_2$ sensors at the significant leak points of the mixer have detected a $CO_2$ content that exceeds a preset threshold or a relative value above a baseline measurement. C) $CO_2$ safety sensors—the $CO_2$ sensors monitoring the $CO_2$ content of the air in the general vicinity of the mixer have reached a threshold value. There can also be an oxygen sensor measuring the oxygen content of the air. These sensors are located in areas accessed by workers around the machine as opposed to leaks immediately from the mixer. D) Moisture sensor—the moisture content of the concrete has reached an absolute threshold with respect to a set point or otherwise has passed a relative measure with respect to the batch at hand. For example, a condition might acknowledge that the moisture content of the concrete inherently varies from batch to batch but would search for a decline in moisture content of, e.g., 0.5% with respect to the measurement expected if no $CO_2$ had been applied or the initial measurement, etc. E) Rheology—(relevant to wet mix) the workability of the concrete is measured and found to reach a threshold level. F) Timer on PLC—PLC may have a predefined maximum delivery time that may signal a stop condition in the event no other sensors have triggered a stop.

9. A gas flow modification condition is detected. The PLC receives a signal from a sensor and modifies the gas delivery in response. Follows logically from previous step. A) Any sensor may suggest the gas input flow is modified (e.g., reduced) as a threshold value is neared rather than simply attained or crossed. B) Temperature Sensor—if the sensor detects an increase in the temperature of the concrete that is greater than expected then a signal can be sent by the PLC to reduce the rate of input of carbon dioxide. Conversely, if the rate of temperature increase is lower than expected then the PLC can increase the rate input of carbon dioxide. In addition or alternatively, if a certain threshold temperature is reached, carbon dioxide delivery may be halted. C) $CO_2$ leak sensors—if the sensors detect an increase in $CO_2$ concentration at the mixer leak points a signal can be sent to the PLC, which reduces the input of carbon dioxide. For example, the leaking can be an indication that the head space of the mixer has been filled with $CO_2$ and any further addition will result in leaks or overspill. The $CO_2$ input may be reduced to a rate that is in proportion to the projected absorption rate of the carbon dioxide into the cement. Thereby any gas that is absorbed into the concrete is in turn replaced with new gaseous $CO_2$ to maintain an overall amount of gas in the mixer. D) Rheology sensor—if the sensor detects a decrease, e.g., a rapid decrease in the workability of the concrete, a signal can be sent by the PLC to reduce carbon dioxide input. Conversely, if the workability loss is less than expected, the PLC can increase the carbon dioxide input. Other outputs from the PLC may cause addition of admixture, water, or both to the mix.

10. A gas delivery stop condition achieved, PLC receives signal to stop gas delivery. Follows logically from previous step. Solenoid is closed. Gas delivery ends.

11. After the $CO_2$ delivery is complete the sensors may send signals to the controller that call for supplemental inputs to the mixer. Follows logically from previous step. A) Temperature sensor can detect a temperature rise that calls for the concrete temperature to be reduced through the addition of a cooling input such as ice or liquid nitrogen. B) Temperature sensor detects that the target $CO_2$ uptake of the concrete has been achieved which may prompt the addition of an appropriate admixture. C) Moisture sensor reading causes PLC to signal for additional mix water or other remedial measure such as an admixture. D) Rheology sensor input to PLC causes output for additional mix water addition, or an admixture addition, or both, to facilitate a workability increase or other remedial measure.

12. Batching and mixing is complete. Concrete is released to the remainder of the production cycle. Follows logically from previous step.

13. The PLC can perform calculations to learn for subsequent batches—particularly for the next time that same or similar combination of mix design and $CO_2$ dosage is used. Otherwise settings can be predicted for other $CO_2$ dosages to apply to that same mix design, or for smaller batches of that mix design with the same $CO_2$ dosage, etc. This can be concurrent with previous step. A) The data from $CO_2$ leak sensors can dictate that, for a future mix, the flow rate should be reduced if there were excessive leaks (too much gas is supplied) or increased because there are no leaks at all (not enough gas has been supplied) in the present mix. The PLC will make note of the updated or recalculated gas flow setting for future use. B) Temperature data can inform future cooling treatment usage. The PLC will make note of the temperature response in the wake of the applied temperature adjustment for adjustment of the cooling treatment in future batches. For example the future cooling treatment can be greater or lower if the current cooling treatment was found to be inadequate. C) Temperature data can inform future kinetic assessments of temperature rise vs time for a given combination of mix design and gas delivery condition. D) The moisture sensor data can inform future mix water adjustment required either to be included as part of the initial mix water or as late addition mix water. In the first case the total water addition might be approached incrementally whereas later mixes can use the end point determined in the first mix as a target setting. E) Rheological information can inform future admix usage. The PLC can correlate a quantified dose of admix with the response in workability metric. The proportion of admix to aspects such as, but not limited to, cement content, absorbed carbon dioxide (either measured directly after the fact or approximated by temperature increase) workability improvement can be recorded and recursively recalculated as additional data is acquired thereby improving the admix dosing logic. Further information regarding characteristics of the batch, such as flowability or strength at one or more time points, water absorption, and the like, may also be input. 14. Telemetry data can be logged and distributed by the PLC to a remote data storage. This can be concurrent with the end of gas delivery (step 10) or follow from later steps if additional information acquired after the end of delivery is part of the transmitted information.

Figure 2:
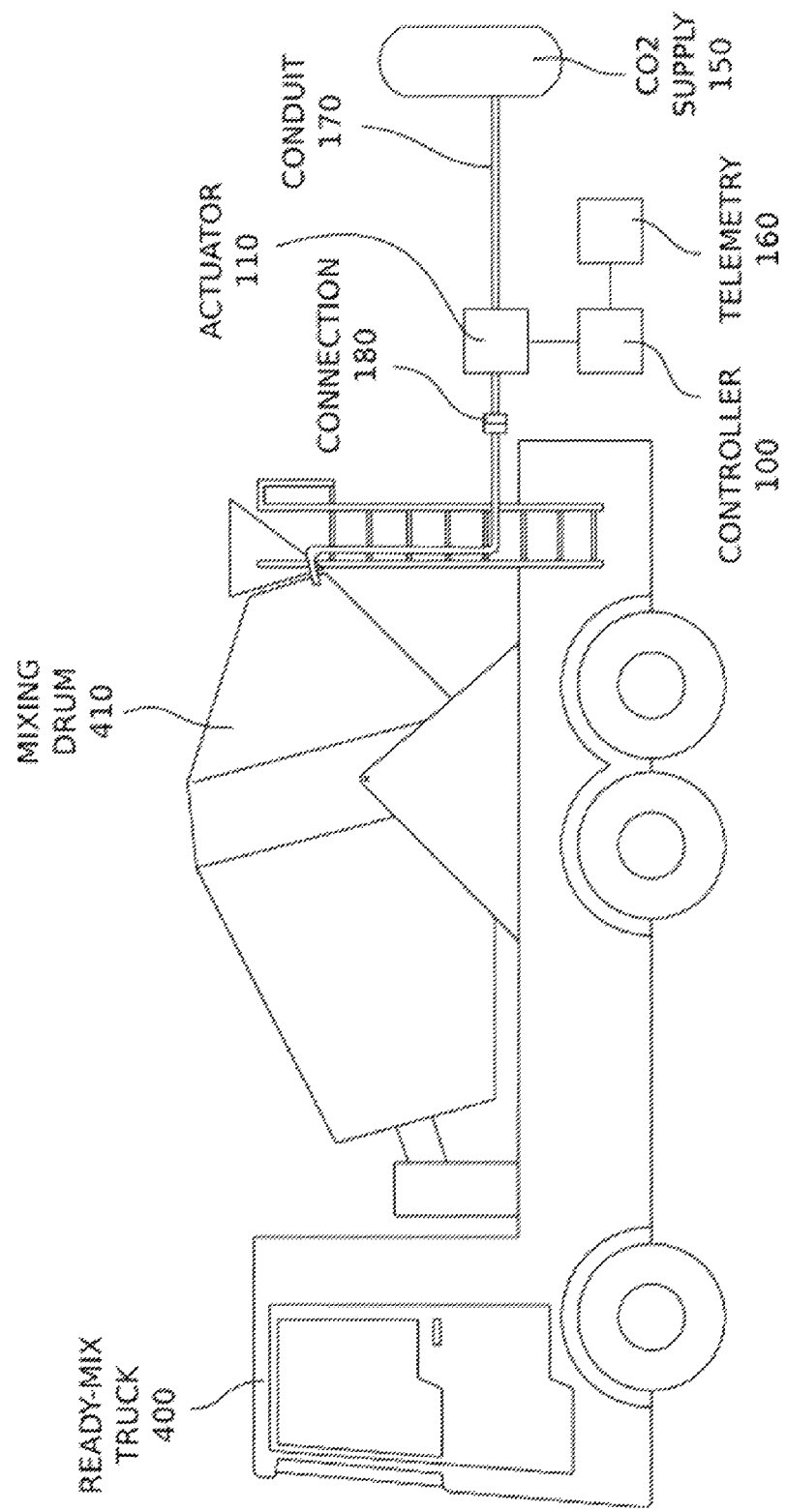
FIG. 2 provides a schematic view of a mobile mixer (ready mix truck) provided with a detachable carbon dioxide delivery system to deliver carbon dioxide to the mixing concrete.
Figure 3:
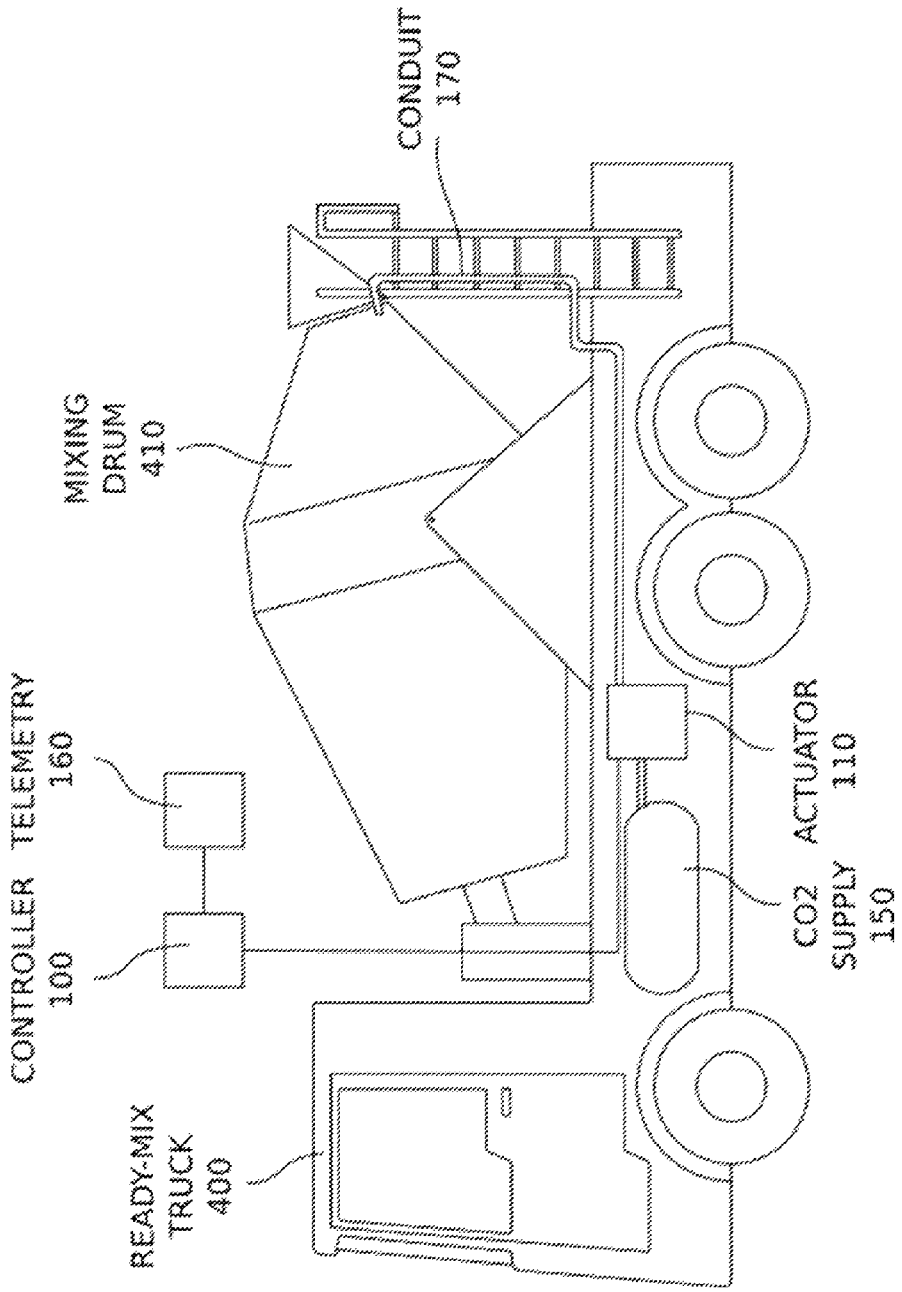
FIG. 3 provides a schematic view of a mobile mixer (ready mix truck) provided with an attached carbon dioxide delivery system to deliver carbon dioxide to the mixing concrete.

Exemplary mixers and control systems are illustrated in FIGS. 1, 2, and 3. FIG. 1 shows a stationary planetary mixer, e.g., for use in a precast operation. The cement scale 200 includes a mass sensor that sends data regarding the mass of cement dispensed from the cement silo 210 to the controller 100. Proximity sensor 120 senses when cement is released to the mixer and sends a signal to the controller; alternatively, the mix controller (not shown) can send a signal to the controller 100 when the cement is released. $CO_2$ delivery may commence upon release of the cement; alternatively, $CO_2$ delivery may commence before or after release. $CO_2$ sensors 140 are located at leak areas outside the mixer and send signals regarding atmospheric $CO_2$ content to the controller 100. In addition, temperature sensor 130 sends signals regarding the temperature of the concrete mix to the controller 100. Additional sensors, such as moisture and rheology sensors, or additional $CO_2$ sensors in worker areas in the vicinity of the mixer may be used (not shown) and send additional signals to the controller. Controller 100 processes the signals and sends output to an actuator 110 for controlling delivery of $CO_2$ from a $CO_2$ supply 150 via a conduit to the $CO_2$ gas mixer inlet 330, where it enters the mixer headspace 320 and contacts the mixing concrete 310. For example, in a basic case, the controller 100 may send a signal to the actuator 110 to open a valve for delivery of $CO_2$ upon receiving input from the proximity sensor 120 indicating that cement has been delivered to the mixer, and send a signal to the actuator 110 to close the valve upon receiving input from one or more of the $CO_2$ sensors 140 or the temperature sensor 130 indicating that the desired delivery of $CO_2$ to the mixer, or uptake of $CO_2$ into the concrete has been achieved. The controller may send output to additional actuators such as an actuator for controlling water addition or an actuator controlling admixture addition (not shown). An optional telemetry system 160 may be used to transmit information regarding the batch to a central location to be used, e.g., to store data for use in future batches and/or to use for modification of the same or similar mixes in other locations.

FIGS. 2 and 3 show a mobile cement mixer, in this case, a ready mix truck. FIG. 2 shows a ready mix truck 400 with a detachable carbon dioxide delivery system. Carbon dioxide is supplied from a carbon dioxide supply 150 via a conduit that is attachable to a conduit on the truck at a connection (junction) 180. Controller 100 controls the supply of carbon dioxide to the drum of the truck 410 via an actuator 110. Sensors, such as $CO_2$ sensors may be located at leak areas outside and/or inside the drum 410 and send signals regarding atmospheric $CO_2$ content to the controller 100. In addition, one or more temperature sensors may sends signals regarding the temperature of the concrete mix to the controller 100. Additional sensors, such as moisture and rheology sensors, or additional $CO_2$ sensors in worker areas in the vicinity of the mixer may be used (not shown) and send additional signals to the controller. The controllers sends a signal to the actuator (e.g., valve) 110 to control addition of carbon dioxide to the drum 410. Additional actuators may be controlled by the controller, such as to control addition of an admixture to the drum 410. An optional telemetry system 160 may be used to transmit information regarding the batch to a central location to be used, e.g., to store data for use in future batches and/or to use for modification of the same or similar mixes in other locations. FIG. 3 shows a ready mix truck with attached carbon dioxide delivery system that travels with the truck 400. This can be useful to, e.g., optimize exposure of the cement mix to carbon dioxide. Carbon dioxide is supplied from a carbon dioxide supply 150 via a conduit 170 that is attachable the truck and delivers carbon dioxide to the drum of the truck 410. Controller 100 controls the supply of carbon dioxide to the drum of the truck 410 via an actuator 110. Sensors, such as $CO_2$ sensors may be located at leak areas outside and/or inside the drum 410 and send signals regarding atmospheric $CO_2$ content to the controller 100. In addition, one or more temperature sensors may sends signals regarding the temperature of the concrete mix to the controller 100. Additional sensors, such as moisture and rheology sensors, or additional $CO_2$ sensors in worker areas in the vicinity of the mixer may be used (not shown) and send additional signals to the controller. The controllers sends a signal to the actuator (e.g., valve) 110 to control addition of carbon dioxide to the drum 410. Additional actuators may be controlled by the controller, such as to control addition of an admixture to the drum 410. An optional telemetry system 160 may be used to transmit information regarding the batch to a central location to be used, e.g., to store data for use in future batches and/or to use for modification of the same or similar mixes in other locations. In certain embodiment the controller 100 is located remote from the truck and receives the signals from the telemetry system, and transmits signals which are received and acted upon by the actuator 110.

C. Mixers

The mixer in which the carbon dioxide is contacted with the cement mix, e.g., hydraulic cement mix during mixing may be any suitable mixer. The mixer may be relatively fixed in location or it may provide both mixing and transport to a different location from the mixing location.

In certain embodiments, the mixer is fixed or relatively fixed in location. Thus, for example, in certain embodiments the mixer is part of a pre-casting apparatus. For example, the mixer may be configured for mixing concrete before introducing the concrete into a mold to produce a precast concrete product. In certain embodiments, the mixer is configured to mix concrete before introducing the concrete into a mold, and the addition of carbon dioxide to the concrete mix, the components of the concrete mix, and, optionally, other ingredients such as one or more admixtures, are adjusted so that a desired level of flow of the concrete mix, generally very low or no flow, is combined with a desired level of compactability so that the concrete may be compacted within a certain range of parameters during and after delivery to a mold, and so that the final product possesses a desired hardening time, strength, shrinkage, and other characteristics as desired. For example, a gas tube to deliver carbon dioxide into the mixer may be placed with the gas line positioned in such a way that it does not interfere with the normal mixer operation. Gas is delivered in proportion to the amount of cement, for example in the range 0.5% to 2.5%, or any other suitable range as described herein. The gas delivery can be confined to the normal mixing time. In certain embodiments gas delivery may be triggered by a gate for the cement addition pipe. When the gate closes (signaling completion of cement addition) a magnetic proximity sensor detects the closed state and triggers the start of the carbon dioxide flow.

In certain embodiments in which the mixer is a fixed mixer, for example in a dry cast or wet cast pre-casting operation, the mixer is configured to mix concrete and to deliver it to a holding component, e.g., a hopper, which further delivers the concrete to a mold, optionally via a feedbox. Additional carbon dioxide can be added to the cement mix, e.g., hydraulic cement mix at the hopper and/or feedbox, if desired. See U.S. patent application Ser. No. 13/660,447 incorporated herein by reference in its entirety. In certain embodiments, no further carbon dioxide is added to the mix (apart from carbon dioxide in the atmosphere) after the concrete exits the mixer.

The addition of carbon dioxide may affect the compactability and thus the strength of the final object, e.g., precast object. In the case of a wet cast operation, flowability is also a consideration. Thus, in certain embodiments, the addition of carbon dioxide to the concrete mix, the components of the concrete mix, and, optionally, other ingredients such as one or more admixtures, are adjusted so that a desired level of compactability (strength) and/or flowability of the cement mix, e.g., hydraulic cement mix, e.g., concrete, is achieved, generally a level of compactability (strength) and/or flowability similar to the level that would be present without the addition of the carbon dioxide, so that the final product after the concrete is poured into the mold and compacted at possesses a desired strength, such as a desired 1-, 7-, 28 and/or 56-day strength, and/or so that the flowability is at a desired value. In the case of the pre-cast mixer, the addition of carbon dioxide, components of the concrete mix, and/or additional components such as one or more admixtures, may be adjusted so that compactability and/or 1-, 7-, 28 and/or 56-day strength of the final concrete mix is within 50, 40, 30, 20, 10, 8, 5, 4, 3, 2, 1, 0.5, or 0.1% of the value or values that would be achieved without the addition of carbon dioxide, or is within 50, 40, 30, 20, 10, 8, 5, 4, 3, 2, 1, 0.5, or 0.1% of a predetermined desired value. In certain embodiments, the addition of carbon dioxide, components of the concrete mix, and/or additional components such as one or more admixtures, may be adjusted so that compactability and/or 1-, 7-, and/or 28-day strength of the final concrete mix of the final concrete mix is within 10% of the compactability and/or 1-, 7-, and/or 28-day strength of the final concrete mix that would be achieved without the addition of carbon dioxide. In certain embodiments, the addition of carbon dioxide, components of the concrete mix, and/or additional components such as one or more admixtures, may be adjusted so that compactability and/or 1-, 7-, and/or 28-day strength of the final concrete mix is within 5% of the compactability and/or 1-, 7-, and/or 28-day strength of the final concrete mix that would be achieved without the addition of carbon dioxide. In certain embodiments, the addition of carbon dioxide, components of the concrete mix, and/or additional components such as one or more admixtures, may be adjusted so that compactability and/or 1-, 7-, and/or 28-day strength of the final concrete mix is within 2% of the compactability and/or 1-, 7-, and/or 28-day strength of the final concrete mix that would be achieved without the addition of carbon dioxide. Other limits and ranges of compactability and/or 1-, 7-, and/or 28-day strength of the final concrete mix, as described herein, may also be used. Any suitable measurement method for determining compactability and/or 1-, 7-, and/or 28-day strength of the final concrete mix may be used, and standard techniques are well-known in the art. In certain embodiments, in addition to the desired compactability and/or 1-, 7-, and/or 28-day strength of the final concrete mix, one or more additional characteristics are achieved, such that shrinkage is within certain desired ranges, or above or below certain threshold numbers, as determined by standard methods in the art. In all cases, if the operation is a wet cast operation, additionally, or alternatively, flowability may be modulated, e.g., by use of one or more admixtures, for example so that flowability is within 50, 40, 30, 20, 10, 8, 5, 4, 3, 2, 1, 0.5, or 0.1% of the value or values that would be achieved without the addition of carbon dioxide, or within 50, 40, 30, 20, 10, 8, 5, 4, 3, 2, 1, 0.5, or 0.1% of a predetermined value. Any suitable admixture, as described herein, may be used. In certain embodiments the admixture comprises a set retarder. In certain embodiments, the admixture comprises a carbohydrate, such as a saccharide, e.g., a sugar or sugar derivative. In certain embodiments, the admixture is selected from the group consisting of fructose, sodium glucoheptonate, and sodium gluconate. In certain embodiments, the admixture is sodium gluconate, e.g., sodium gluconate delivered to achieve a percentage, per weight of cement, of 0.05-0.8%, 0.1-0.8%, or 0.1-0.6%, or 0.1-0.5%, or 0.2-0.5%, or 0.2-3%, or 0.2-2%, or 0.2-1%. In certain embodiments a second admixture is also used, such as any of the admixtures described herein.

In certain embodiments, the mixer is a transportable mixer. "Transportable mixer," as that term is used herein, includes mixers into which components of a cement mix, e.g., hydraulic cement mix are placed in one location and the cement mix, e.g., hydraulic cement mix is transported to another location which is remote from the first location, then used. A transportable mixer is transported by, for example, road or rail. As used herein, a transportable mixer is not a mixer such as those used in a pre-cast concrete operations. Thus, in certain embodiments, the mixer may be the drum of a ready-mix truck in which a concrete mix is prepared for delivery to a worksite. In this case, the mixer is configured to mix concrete and to deliver it to a worksite, and the addition of carbon dioxide to the concrete mix, the components of the concrete mix, and, optionally, other ingredients such as one or more admixtures, are adjusted so that a desired level of flow of the cement mix, e.g., hydraulic cement mix, i.e., concrete, generally a level of flow that is similar to the level that would be present without the addition of the carbon dioxide, or a predetermined flowability, is achieved, and so that the final product after pouring at the worksite possesses a desired hardening time, strength, shrinkage, and other characteristics as desired. In the case of the ready-mix mixer, the addition of carbon dioxide, components of the concrete mix, and/or additional components such as one or more admixtures, may be adjusted so that flowability of the final concrete mix is within 50, 40, 30, 20, 10, 8, 5, 4, 3, 2, 1, 0.5, or 0.1% of the flowability that would be achieved without the addition of carbon dioxide, or a predetermined flowability. In certain embodiments, the addition of carbon dioxide, components of the concrete mix, and/or additional components such as one or more admixtures, may be adjusted so that flowability of the final concrete mix is within 10% of the flowability that would be achieved without the addition of carbon dioxide, or a predetermined flowability. In certain embodiments, the addition of carbon dioxide, components of the concrete mix, and/or additional components such as one or more admixtures, may be adjusted so that flowability of the final concrete mix is within 5% of the flowability that would be achieved without the addition of carbon dioxide, or a predetermined flowability. In certain embodiments, the addition of carbon dioxide, components of the concrete mix, and/or additional components such as one or more admixtures, may be adjusted so that flowability of the final concrete mix is within 2% of the flowability that would be achieved without the addition of carbon dioxide, or a predetermined flowability. Other limits and ranges of flowability, as described herein, may also be used. Any suitable measurement method for determining flowability may be used, such as the well-known slump test. In certain embodiments, in addition to the desired flowability, one or more additional characteristics are achieved, such as that shrinkage and/or strength, such as compressive strength, at one or more times after pouring of the concrete are within certain desired ranges, or above or below certain threshold numbers, as determined by standard methods in the art. The addition of carbon dioxide, components of the concrete mix, and/or additional components such as one or more admixtures, may be adjusted so that 1-, 7-, 28, and/or 56-day strength of the final concrete mix is within 50, 40, 30, 20, 10, 8, 5, 4, 3, 2, 1, 0.5, or 0.1% of the value or values that would be achieved without the addition of carbon dioxide, or a predetermined strength value. In certain embodiments, the addition of carbon dioxide, components of the concrete mix, and/or additional components such as one or more admixtures, may be adjusted so that 1-, 7-, 28, and/or 56-day strength of the final concrete mix of the final concrete mix is within 10% of the 1-, 7-, 28 and/or 56-day strength of the final concrete mix that would be achieved without the addition of carbon dioxide, or a predetermined strength value. In certain embodiments, the addition of carbon dioxide, components of the concrete mix, and/or additional components such as one or more admixtures, may be adjusted so that 1-, 7-, 28 and/or 56-day strength of the final concrete mix is within 5% of the 1-, 7-, 28 and/or 56-day strength of the final concrete mix that would be achieved without the addition of carbon dioxide, or a predetermined strength value. In certain embodiments, the addition of carbon dioxide, components of the concrete mix, and/or additional components such as one or more admixtures, may be adjusted so that 1-, 7-, 28 and/or 56-day strength of the final concrete mix is within 2% of the 1-, 7-, 28 and/or 56-day strength of the final concrete mix that would be achieved without the addition of carbon dioxide, or a predetermined strength value. Other limits and ranges of 1-, 7-, 28 and/or 56-day strength of the final concrete mix, as described herein, may also be used. Any suitable measurement method for determining 1-, 7-, 28 and/or 56-day strength of the final concrete mix may be used, and standard techniques are well-known in the art. In certain embodiments, in addition to the desired 1-, 7-, 28 and/or 56-day strength of the final concrete mix, one or more additional characteristics are achieved, such as that shrinkage is within certain desired ranges, or above or below certain threshold numbers, as determined by standard methods in the art. Any suitable admixture, as described herein, may be used. In certain embodiments the admixture comprises a set retarder. In certain embodiments, the admixture comprises a carbohydrate, such as a saccharide, e.g., a sugar. In certain embodiments, the admixture is selected from the group consisting of fructose, sodium glucoheptonate, and sodium gluconate. In certain embodiments, the admixture is sodium gluconate, e.g., sodium gluconate at a percentage of 0.01-2%, or 0.01-1%, or 0.01-0.8%, or 0.01-0.5%, or 0.01-0.1%, or 0.1-0.8%, or 0.1-0.6%, or 0.1-0.5%, or 0.2-0.5%, or 0.2-3%, or 0.2-2%, or 0.2-1%. In certain embodiments, the admixture is fructose, e.g., fructose at a percentage of 0.01-2%, or 0.01-1%, or 0.01-0.8%, or 0.01-0.5%, or 0.01-0.1%, or 0.1-0.8%, or 0.1-0.6%, or 0.1-0.5%, or 0.2-0.5%, or 0.2-3%, or 0.2-2%, or 0.2-1%. In certain embodiments a second admixture is also used, such as any of the admixtures described herein.

It will be appreciated that, both in the case of a wet cast (such as ready mix) or a dry cast, different mixes may require different treatment in order to achieve a desired flowability and/or compactability, and that mix types may be tested in advance and proper treatment, e.g., proper type and/or percentage of admixture determined. In certain cases admixture may not be required; indeed, with certain mix types and carbon dioxide concentrations, compactability (strength) or flowability may be within acceptable limits; e.g., strength may even be improved in certain mix types at certain levels of carbon dioxide addition. Also, the point in the procedure in which ingredients are introduced can affect one or more characteristics of the product, as can be determined in routine testing and mix adjustment.

The mixer may be closed (i.e., completely or substantially completely airtight) or open (e.g., the drum of a ready mix truck, or a precast mixer with various leak points). The mixer may be one of a plurality of mixers, in which different portions of a cement mix, e.g., hydraulic cement mix are mixed, or it may be a single mixer in which the entire cement mix, e.g., hydraulic cement mix, such as a concrete mix, except in some cases additional water, is mixed.

Methods of Carbon Dioxide Delivery

Any suitable mixer for mixing concrete in an operation to produce concrete for use in objects, such as for use in producing building materials, may be used. In some cases a mixer may be used where the desired dose or uptake of carbon dioxide may be achieved using gas delivery alone. For example, in most pre-cast mixers, the mixer is enclosed but not gas-tight (i.e., not open to the atmosphere, although not gas tight, such that leak points are available for, e.g., carbon dioxide sensors) and the head space and mixing times are such that a desired dose or uptake can be achieved with nothing more than gaseous carbon dioxide delivery.

In some cases, however, such as in a ready mix truck where head space is relative less than in a typical precast mixer, additional efficiency may be desired, or necessary, in order to achieve a desired carbon dioxide dose or uptake. In these cases, the use of carbon dioxide-charged mix water, or liquid carbon dioxide delivered so as to form a gas and a solid, or both, may be used. The carbon dioxide may be delivered to the mixer as a liquid which, through proper manipulation of delivery, such as flow rate and/or orifice selection, becomes a mixture of gaseous carbon dioxide and solid carbon dioxide upon delivery, for example, in an approximate 1:1 ratio. The gaseous carbon dioxide is immediately available for uptake into the cement mix, e.g., hydraulic cement mix, while the solid carbon dioxide effectively serves as a time-delayed delivery of gaseous carbon dioxide as the solid gradually sublimates to gas. Additionally, or alternatively, carbon dioxide-charged mix water may be used. Carbon dioxide-charged water is routinely used in, e.g., the soda industry, and any suitable method of charging the mix water may be used. The water may be charged to achieve a carbon dioxide concentration of at least 1, 2, 3, 4, 5, 6, 7, 8, 9, or 10 g $CO_2$/L water. Carbon dioxide-charged mix water can deliver a significant portion of the desired carbon dioxide dose for a cement mix, e.g., hydraulic cement mix, for example, at least 5, 10, 15, 20, 25, 30, 35, 40, 45, 50, 55, 60, 65, 70, 75, 80, 85, 90, or 95% of the total carbon dioxide delivered to a batch of cement mix, e.g., hydraulic cement mix may be delivered in the mix water. In some cases, 100% of the carbon dioxide may be delivered in the mix water. In some cases, at least 20% of the carbon dioxide is delivered in the mix water. In some cases, at least 30% of the carbon dioxide is delivered in the mix water. Without being bound by theory, it is thought that the carbon dioxide thus delivered reacts rapidly with components of the cement mix, e.g., hydraulic cement mix, allowing further uptake of gaseous carbon dioxide by the water.

A ready mix operation is an example of a system where it may be desirable to use one or both of carbon dioxide-charged water and liquid carbon dioxide delivery. A ready mix truck drum is open to the atmosphere and has a relatively small head space in comparison to the mass of concrete, which is typically 6 to 10 cubic meters when the truck is batched to capacity, which it is as often as possible. Mixing time at the batching site may be relatively short. Therefore the use of carbonated mix water and liquid $CO_2$ may be used to ensure that a desired dose of $CO_2$ is delivered. For example, in a ready mix operation in which a carbon dioxide delivery of 1.5% is desired: The volume of gas to be added is ~2.66 m$^3$ of gas/m$^3$ of concrete (assuming 350 kg/m$^3$ of cement being carbonated at 1.5%). Mix water is typically represented by added water and excess moisture contained in the aggregate. If the free mix water (~160 L/m$^3$) is carbonated with $CO_2$ using existing carbonation technology, such as that used in the soda industry, to 10 g of $CO_2$/L of water this represents approximately ⅓ of the target carbon dioxide delivery of 1.5% bwc. Contact with cement results in rapid carbonation of the dissolved $CO_2$, and the water is quickly ready for additional carbon dioxide dissolution once it is in the truck and in contact with the cement. The use of carbon dioxide in the mix water reduces the total carbon dioxide to be added to the truck to 3.66 kg of $CO_2$ (or about 1.85 m$^3$ gas/m$^3$ concrete). This amount may still be too high to be universally delivered at atmospheric pressure gas form. Therefore liquid $CO_2$ injection into the truck can be used for the balance of the carbon dioxide supply. Liquid $CO_2$ injection of the remaining 3.66 kg $CO_2$/m$^3$ in the truck can be done using a controlled flow rate that is based upon sensors and a calibrated $CO_2$ uptake rate. See Control Mechanisms as described herein. Upon delivery through a nozzle the liquid transforms into a mixture of solid and gaseous carbon dioxide. The liquid delivery can result, e.g., in 1.75 kg of solid $CO_2$ snow (with a density of 1560 kg/m$^3$) and 1.9 kg of $CO_2$ gas (0.96 m$^3$ gas). The gas is immediately be available for uptake by the mix water while the solid $CO_2$ serves as a time delayed $CO_2$ delivery, as the solid gradually sublimates to gas. This process reduces the gaseous volume injected into the truck to approximately 29% of the volume needed if the entire $CO_2$ delivery had been via gaseous $CO_2$. In some cases part of the concrete mix, e.g., the aggregate, may also be wet. In that case, less mix water is used and correspondingly more liquid carbon dioxide. Moisture sensors, e.g., to sense the moisture content of the aggregate, may be used to provide information to allow for the adjustment, even on a batch-by-batch basis. This approach can allow for higher uptake rates and greater efficiency.

Exemplary embodiments include a method for producing a cement mix, e.g., hydraulic cement mix comprising (i) placing components of the cement mix, e.g., hydraulic cement mix in a mixer and mixing the components; and (ii) delivering liquid $CO_2$ via an opening in a conduit into the mixer in such a manner as to cause the liquid $CO_2$ to form a mixture of gaseous and solid $CO_2$ which then contact the cement mix, e.g., hydraulic cement mix. The delivery of the liquid may be controlled in such a manner, e.g., by adjusting flow rate and/or orifice, or other suitable means, as to form a mixture of gaseous to solid carbon dioxide in a ratio in the range of 1:10 to 10:1, or 1:5 to 5:1, or 1:3 to 3:1, or 1:2 to 2:1, or 1:1.5 to 1.5:1, or 1:1.2 to 1.2 to 1. The cement mix, e.g., hydraulic cement mix comprises water and the water may be charged with $CO_2$ before delivery to the mixer as described herein, for example to a level of at least 2 g $CO_2$/L water, or at least 4 g $CO_2$/L water, or at least 6 g $CO_2$/L water, or at least 8 g $CO_2$/L water, or at least 9 g $CO_2$/L water, or at least 10 g $CO_2$/L water. The mixer may be any suitable mixer, such as a stationery mixer or a transportable mixer, e.g., the drum of a ready mix concrete truck. When the mixer is the drum of a ready mix concrete truck, the liquid $CO_2$ may be supplied to the mixer at a batching plant, or it may be supplied to the mixer during transport of the batch to a job site, or even at the job site itself, or a combination thereof. The method may further include monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of liquid $CO_2$ according to the characteristic monitored. For example, $CO_2$ concentration, temperature, moisture content, rheology, pH, or a combination thereof may be monitored, as detailed elsewhere herein. When $CO_2$ is monitored, it may be monitored in a portion of gas outside the mixer, e.g. at a leak point or spill point.

Exemplary embodiments also include a method for producing a cement mix, e.g., hydraulic cement mix comprising (i) contacting components of the cement mix, e.g., hydraulic cement mix with $CO_2$-charged water, wherein the water is charged with $CO_2$ to a level of at least 2 g/L, 3 g/L, 4 g/L, 6 g/L, 8 g/L, 9 g/L, or 10 g/L, and mixing the components and the water. Embodiments further include a method of producing a carbonated cement mix, e.g., hydraulic cement mix comprising (i) determining a dose of $CO_2$ to be delivered to the cement mix, e.g., hydraulic cement mix; and (ii) delivering at least 10, 20, 30, 40, 50, 60, 70, 80, 90, or 100% of the dose of $CO_2$ as $CO_2$ dissolved in mix water for the cement mix, e.g., hydraulic cement mix. In certain embodiments the dose is 0.1-10%, or 0.5-5%, or 0.5-4%, or 0.5-3%, or 0.5-2%, or 1-5%, or 1-4%, or 1-3%, or 1-2% $CO_2$ bwc. In certain embodiments the dose is 1.5% $CO_2$ bwc. Delivery of carbon dioxide-charged mix water as described may be combined in some embodiments with delivery of gaseous and/or liquid carbon dioxide.

Exemplary embodiments further include an apparatus for carbonating a cement mix, e.g., hydraulic cement mix comprising (i) a mixer for mixing the cement mix, e.g., hydraulic cement mix; (ii) a source of liquid $CO_2$; and (iii) a conduit operably connecting the source of liquid $CO_2$ to the mixer, wherein the conduit comprises an orifice through which the liquid $CO_2$ exits the conduit into the mixer. The conduit can include a system for regulating the flow of the liquid $CO_2$ where the system, the orifice, or both, are configured to deliver the liquid $CO_2$ as a combination of solid and gaseous $CO_2$, such as by regulating flow rate of the liquid $CO_2$ and/or orifice configuration, such as to produce a ratio of solid to gaseous $CO_2$ in the range of 1:10 to 10:1, or 1:5 to 5:1, or 1:3 to 3:1, or 1:2 to 2:1, or 1:1.5 to 1.5:1, or 1:1.2 to 1.2 to 1, for example, between 1:3 and 3:1, or between 1:2 and 2:1. The mixer can be a transportable mixer, such as a drum of a ready-mix truck. The source of liquid $CO_2$ and the conduit may remain at a batching facility after the transportable is charged, or may accompany the transportable mixer when the transportable mixer transports the cement mix, e.g., hydraulic cement mix. The apparatus may further include a system for delivering $CO_2$-charged water to the mixer comprising a source of $CO_2$-charged water and a conduit operably connected to the source and configured to deliver the water to the mixer, which may in some cases further include a charger for charging the water with $CO_2$. In certain cases the mixer is transportable and the system for delivering $CO_2$-charged water to the mixer is detachable from the mixer during transport, e.g., if the mixer is the drum of a ready mix truck the system for delivering and, optionally, charging $CO_2$-charged water remains at the batching facility.

Exemplary embodiments also include an apparatus for producing a carbonated cement mix, e.g., hydraulic cement mix comprising (i) a mixer for mixing the cement mix, e.g., hydraulic cement mix; and (ii) at least two of (a) a source of gaseous $CO_2$ operably connected to the mixer and configured to deliver gaseous $CO_2$ to the mixer; (b) a source of liquid $CO_2$ operably connected to the mixer and configured to deliver liquid $CO_2$ to the mixer and release the liquid $CO_2$ into the mixer as a mixture of gaseous and solid $CO_2$; and (c) a source of carbonated water operably connected to the mixer and configured to deliver carbonated water to the mixer.

D. Retrofitting Existing Apparatus

In certain embodiments, the methods of the invention include methods and apparatus for retrofitting an existing cement mix, e.g., hydraulic cement mix apparatus to allow for the contact of the mixing cement mix, e.g., hydraulic cement mix with carbon dioxide. As used herein, the term "retrofit" is used in its generally accepted sense to mean installing new or modified parts or equipment into something previously manufactured or constructed. The retrofit may modify the existing apparatus to perform a function for which it was not originally intended or manufactured. In the case of the present invention, a cement mix, e.g., hydraulic cement mix apparatus to be retrofitted is not originally constructed to allow addition of carbon dioxide to a cement mix, e.g., hydraulic cement mix during mixing of the cement mix, e.g., hydraulic cement mix. Preferably, the retrofitting requires little or no modification of the existing apparatus. The retrofitting may include delivering to a site where a pre-existing cement mix, e.g., hydraulic cement mix apparatus is located the components necessary to modify the existing cement mix, e.g., hydraulic cement mix apparatus to allow exposure of a cement mix, e.g., hydraulic cement mix to carbon dioxide during mixture. Instructions for one or more procedures in the retrofitting may also be transported or transmitted to the site of the existing cement mix, e.g., hydraulic cement mix apparatus.

The retrofitting may include installing components necessary to modify the existing cement mix, e.g., hydraulic cement mix apparatus to allow exposure of a cement mix, e.g., hydraulic cement mix to carbon dioxide during mixing. The components may include a conduit for delivery of carbon dioxide to a cement mix, e.g., hydraulic cement mix mixer. The components may further include a source of carbon dioxide. In systems in which a control system is included, the retrofit may include modifying the existing control system of the cement mix, e.g., hydraulic cement mix apparatus to perform functions appropriate to the controlled addition of carbon dioxide to the cement mix, e.g., hydraulic cement mix. Instructions for such modifications may also be transmitted or sent to the site of the existing cement mix, e.g., hydraulic cement mix apparatus controller. Such modifications can include, for example, modifying the existing controller settings to include timing the opening and closing of a gas supply valve to deliver a flow of carbon dioxide at a predetermined flow rate for a predetermined time from the carbon dioxide source via the conduit to the mixer at a certain stage in the hydraulic mix apparatus operations. They may also include modifying the controller to modify the timing and/or amount of water addition to the cement mix, e.g., hydraulic cement mix, addition of admixture, and any other suitable parameter. Alternatively, or in addition to, modifying the existing controller, the retrofitting may include providing one or more new controllers to the pre-existing cement mix, e.g., hydraulic cement mix apparatus. The retrofitting can include transporting the new controller or controllers to the site of the existing cement mix, e.g., hydraulic cement mix apparatus. In addition, one or more sensors, such as sensors for sensing the positions and/or states of one or more components of the existing cement mix, e.g., hydraulic cement mix apparatus, which were not part of the original manufactured equipment, may be installed. The retrofit may include transporting one or more sensors to the site of the existing cement mix, e.g., hydraulic cement mix apparatus. Actuators, which may be actuators in the retrofitted apparatus, e.g., a gas supply valve, or in the original equipment, e.g., to move or start or stop various operations such as addition of water, may be operably connected to the retrofitted controller in order to modify the operations of the cement mix, e.g., hydraulic cement mix apparatus according to the requirements of contacting the cement mix, e.g., hydraulic cement mix with carbon dioxide. The retrofit may include transporting one or more sensors to the site of the existing cement mix, e.g., hydraulic cement mix apparatus.

III. Methods

In certain embodiments, the invention provides methods for producing a carbonated cement mix in a mix operation in a cement mix apparatus comprising (i) contacting a cement mix comprising cement binder and aggregate in a mixer with carbon dioxide while the cement mix is mixing; (ii) monitoring a characteristic of the cement binder, the cement mix, a gas mixture in contact with the cement mix or the mixer, or a component of the cement mix apparatus; and (iii) modulating the exposure of the cement mix to the carbon dioxide or another characteristic of the cement mix operation, or a combination thereof according to the characteristic monitored in step (ii). In some cases, only exposure of the cement mix to the carbon dioxide is modulated; in other cases, only another characteristic of the cement mix operation is modulated; and in other cases, both are modulated.

The cement binder may be any suitable cement binder as described herein, i.e., a cement binder containing calcium species capable of reacting with carbon dioxide to form stable or metastable reaction products, such as carbonates. The cement binder may be a hydraulic cement, for example, a Portland cement. "Cement mix," as that term is used herein, includes a mix of a cement binder, e.g., a hydraulic cement, such as a Portland cement, with aggregate; "concrete" is generally synonymous with "cement mix" as those terms are used herein.

The mix operation may be any operation in which a cement mix/concrete is produced for any of the various uses known in the art for such a mix. Thus, the cement mix operation may be an operation in a mixer at a precast facility for producing a cement mix for use in a dry cast or wet cast operation. In other embodiments, the cement mix operation may be an operation in a mixer for a ready mix operation, e.g., the drum of a ready mix truck. Any other suitable cement mix operation may also be used, so long as it is amenable to addition of carbon dioxide to the cement mix during mixing, for example, a mixer on site at a construction site. Thus, additional examples include pug mill or twin shaft continuous mixers that can be used for roller compacted concrete (dry mix) or CTB (cement treated base) for road stabilization, which are continuous mix applications rather than batch. While some of the aspects of water proportioning might not be achievable there still exists the possibility to add CO2 during the mixing step.

The characteristic monitored may be any suitable characteristic that provides useful feedback to inform modulation of exposure of the cement mix to carbon dioxide or another characteristic of the cement mix operation. In certain embodiments, the characteristic monitored is (a) mass of cement binder added to the cement mix, (b) location of the cement binder in the mix apparatus (e.g., coordinating carbon dioxide delivery with delivery of cement binder; may be achieved by sensing the location of the cement mix or by timing of the mix sequence, which can be input to the controller), (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix. The location of water in the mix apparatus also be monitored, e.g., to determine when water addition is complete. These characteristics and methods and apparatus for monitoring them are as described elsewhere herein. When the mass of the cement binder is monitored, the total amount of carbon dioxide to be added to the cement mix may be modulated to accord with a predetermined desired exposure, e.g., if a 1.5% carbon dioxide/cement exposure is desired, the exact mass used in a particular batch may be used to determine the exact total carbon dioxide to be added to the batch (which may be used as is, or modified in response to other characteristics that are monitored). When location of the cement binder or water in the mix apparatus is monitored, the modulation of carbon dioxide flow may be a simple on/off, e.g., when the cement mix and/or water is determined to have entered the mixer, carbon dioxide flow may be turned on at that time or at a predetermined time after that time. In certain embodiments, the characteristic monitored in step (ii) comprises carbon dioxide content of a gas mixture exiting from the mixer, e.g., at a leak point of the mixer. In this embodiment, and/or in other embodiments in which a carbon dioxide content of a gas mixture is monitored, the exposure of the cement mix to carbon dioxide can be modulated when the carbon dioxide content of the gas mixture reaches a threshold value, and/or when the rate of change of the carbon dioxide content of the gas mixture reaches a threshold value. The modulation can be an increase in the rate of carbon dioxide addition to the cement mix, a decrease, or even a full stop. In certain embodiments, the characteristic monitored is the temperature of the cement mix or a component of the mix apparatus in contact with the cement mix. For example, a wall of the mixer may be monitored for temperature. The exposure of the cement mix to carbon dioxide can be modulated when the temperature of the cement mix or a component of the mix apparatus in contact with the cement mix, or a combination of a plurality of such temperatures, reaches a threshold value and/or when the rate of change of the temperature of the cement mix or a component of the mix apparatus in contact with the cement mix reaches a threshold value. If temperature is used as a measure for the threshold value, it may be an absolute temperature, or it may be a temperature relative to the temperature of the mix before the addition of carbon dioxide, e.g., a temperature that is a certain number of degrees above the starting temperature, for example 10-50° C. above the starting value, or 10-40° C. above the starting value, or 10-30° C. above the starting value. The exact difference between starting and threshold temperature may be predetermined for a particular mix recipe by determining the relationship between carbonation and temperature for that recipe, or for that particular cement binder in relation to other components of that recipe.

In certain embodiments, a plurality of characteristics of the cement binder, the cement mix, a gas mixture in contact with the cement mix or the mixer, or a component of the cement mix apparatus are monitored, e.g., at least 2, 3, 4, 5, 6, 7, 8, 9, or 10 characteristics, for example, at least 2 characteristics. In certain embodiments, at least 2 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix are monitored. In certain embodiments, at least 3 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix are monitored. In certain embodiments, at least 4 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix are monitored. In certain embodiments, at least 5 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix are monitored. In certain embodiments, at least 6 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix are monitored.

In certain embodiments, the method alternatively, or additionally, include monitoring the time of exposure of the cement mix to the carbon dioxide, the flow rate of the carbon dioxide, or both.

When an additional characteristic of the mix operation is modulated in response to the monitoring, it may be any suitable characteristic. In certain embodiments, the additional characteristic includes (a) whether or not an admixture is added to the cement mix, (b) type of admixture added to the cement mix, (c) timing of addition of admixture to the cement mix, (d) amount of admixture added to the cement mix, (e) amount of water added to the cement mix, (f) timing of addition of water to the cement mix, (g) cooling of the cement mix during or after carbon dioxide addition, or a combination thereof. If an admixture is used, it may be any suitable admixture for adjusting a characteristic of the cement mix, e.g., an admixture to adjust the rheology (flowability) of the mix, for example, in a wet cast operation. Examples of suitable admixtures are described herein, e.g., carbohydrates or carbohydrate derivatives, such as sodium gluconate.

The characteristic may be monitored by any suitable means, such as by one or more sensors. Such sensors may transmit information regarding the characteristic to a controller which processes the information and determines if a modulation of carbon dioxide exposure or another characteristic of the mix operation is required and, if so, transmits a signal to one or more actuators to carry out the modulation of carbon dioxide exposure or other characteristic of the mix operation. The controller may be at the site of the mix operation or it may be remote. Such sensors, controllers, and actuators are described further elsewhere herein. If a controller is used, it may store and process the information obtained regarding the characteristic monitored in step (ii) for a first batch of cement mix and adjust conditions for a subsequent second cement mix batch based on the processing. For example, the controller may adjust the second mix recipe, e.g., amount of water used or timing of water addition, or carbon dioxide exposure in the second batch to improve carbon dioxide uptake, or to improve rheology or other characteristics of the mix, e.g., by addition and/or amount of an admixture, and/or timing of addition of the admixture. In such embodiments in which one or more conditions of a second mix operation are adjusted, in certain embodiments the one or more conditions of the second mix operation includes (a) total amount of carbon dioxide added to the cement mix, (b) rate of addition of carbon dioxide, (c) time of addition of carbon dioxide to the cement mix, (d) whether or not an admixture is added to the cement mix, (e) type of admixture added to the cement mix, (f) timing of addition of admixture to the cement mix, (g) amount of admixture added to the cement mix, (h) amount of water added to the cement mix, (i) timing of addition of water to the cement mix, (j) cooling the cement mix during or after carbon dioxide addition, or a combination thereof. The controller can also receive additional information regarding one or more characteristics of the cement mix measured after the cement mix leaves the mixer, and adjusts conditions for the second cement mix batch based on processing that further comprises the additional information. In certain embodiments, the one or more characteristics of the cement mix measured after the cement mix leaves the mixer comprises (a) rheology of the cement mix at one or more time points, (b) strength of the cement mix at one or more time points, (c) shrinkage of the cement mix, (d) water absorption of the cement mix, or a combination thereof. Other characteristics include elastic modulus, density, and permeability. Any other suitable characteristic, as known in the art, may be measured. The characteristic monitored can depend on the requirements for a particular mix batch, although other characteristics may also be monitored to provide data to the controller for future batches in which those characteristics would be required.

In embodiments in which a controller adjusts conditions for a second mix operation based on input from a first mix operation, the second mix operation may be in the same mix facility or it may be in a different mix facility. In certain embodiments, the controller, one or more sensors, one or more actuators, or combination thereof, transmits information regarding the characteristics monitored and conditions modulated to a central controller that receives information from a plurality of controllers, sensors, actuators, or combination thereof, each of which transmits information from a separate mixer to the central controller. Thus, for example, a first mix facility may have a first sensor to monitor a first characteristic of the first mix operation, and a second mix facility may have a second sensor to monitor a second characteristic of a second mix operation, and both may send information regarding the first and second characteristics to a central controller, which processes the information and transmit a signal to the first, second, or even a third mix operation to adjust conditions based on the first and second signals from the first and second sensors. Additional information that will be typically transmitted to the central controller includes mix components for the mixes at the first and second mix operations (e.g., type and amount of cement binder, amount of water and w/c ratio, types and amounts of aggregate, whether aggregate was wet or dry, admixtures, and the like) amount, rate, and timing of carbon dioxide addition, and any other characteristic of the first and second mix operations that would be useful for determining conditions to modulate future mix operations based on the characteristics achieved in past mix operations. Any number of mix operations may input information to the central controller, e.g., at least 2, 3, 4, 5, 6, 7, 8, 9, or 10 mix operations, or at least 15, 20, 25, 30, 40, 50, 60, 70, 80, 90, or 100 mix operations. The central controller may also receive any other information that may be suitable to informing decisions regarding mix operations to optimize one or more conditions of the mix operation and/or of the cement mix produced in the operation. For example, the central controller may receive information from experiments conducted with various types of cements (e.g., various types of Portland cements) carbonated under various conditions, and/or exposed to various admixtures, such as at different times, or in different concentrations, and the like, and the resulting characteristics of the cement mix, such as rheology at one or more timepoints, strength at one or more timepoints, and the like. Any other suitable information, such as information published in literature, or obtained in any manner, may be input into the central controller. The information the central controller receives can be processed and used to adjust cement mix operations at any mix operation to which the central controller can transmit outputs. Thus, the central controller can learn from numerous mix operations to optimize future operations and, over time, can accumulate a database to inform decisions in mix operations at a mix site even if a particular mix recipe and/or conditions have never been used at that site. The central controller can match to past mix recipes, or predict optimum conditions for a new mix recipe based on suitable algorithms using information in its database, or both.

In certain embodiments, the invention provides a method of carbonating a cement mix in a mixer that is not completely airtight in such a way as to achieve an efficiency of carbonation of at least 60, 70, 80, 90, 95, 96, 97, 98, or 99%, wherein efficiency of carbonation is the amount of carbon dioxide retained in the cement mix per the total amount of carbon dioxide to which the cement mix is exposed during mixing. The mixer may have leak points and other aspects that make it less than airtight, such as seen in a typical mixer for a precast operation. The mixer may be, e.g., the drum of a ready mix truck which has a large opening to the outside atmosphere. Such efficiency may be achieved, e.g., by using any of the methods to modulate the exposure of the cement mix to carbon dioxide as detailed above.

In certain embodiments, the invention provides a method for producing a cement mix, e.g., hydraulic cement mix comprising (i) contacting a cement mix, e.g., hydraulic cement mix comprising a first portion of water and hydraulic cement in a mixer with carbon dioxide while the cement mix, e.g., hydraulic cement mix is mixing; and (ii) adding a second portion of water to the cement mix, e.g., hydraulic cement mix. In some aspects of this embodiment, the contacting comprises directing a flow of carbon dioxide to the cement mix, e.g., hydraulic cement mix. The second portion of water may be added to the cement mix, e.g., hydraulic cement mix during said flow or after said flow has ceased, for example, after said flow has ceased. The method may include adding aggregate to the cement mix, e.g., hydraulic cement mix to produce a concrete mix; in certain embodiments, the aggregate comprises some or all of the first portion of water. The aggregate may be added before the contacting with the carbon dioxide. In certain embodiments, the method includes (iii) adding an admixture to the cement mix, e.g., hydraulic cement mix, such as an admixture that modulates the flowability of the cement mix, e.g., hydraulic cement mix. In embodiments in which an admixture to modulate flowability is added, the admixture may added in an amount to achieve a flowability in a predetermined range of flowabilities, such as a predetermined range of flowabilities that is determined by allowing for a margin from the flowability of the cement mix, e.g., hydraulic cement mixture without the addition of carbon dioxide. The admixture may be selected from the group consisting of a polycarboxylate superplasticizer, a naphthalene HRWR, or any combination thereof. In certain embodiments, the admixture contains sodium gluconate, sucrose, glucose, molasses, corn syrup, EDTA, or a combination thereof. In certain embodiments, the admixture contains sodium gluconate. In certain embodiments, the admixture contains sucrose. In certain embodiments, the admixture contains glucose. In certain embodiments, the admixture contains molasses. In certain embodiments, the admixture contains corn syrup. In certain embodiments, the admixture contains EDTA. In certain embodiments, the cement mix, e.g., hydraulic cement mix comprises Portland cement. Whether or not the cement mix, e.g., hydraulic cement mix comprises Portland cement, in certain embodiments cement mix, e.g., hydraulic cement mix comprising the first portion of water comprises an amount of water so that the ratio of water to cement (w/c ratio) is equal to or less than 0.5. In certain of these embodiments, the first portion of water comprises an amount of water so that the w/c ratio is in the range 0.1 to 0.5. the carbon dioxide to which the cement mix, e.g., hydraulic cement mix is exposed may be at least 50% pure. The cement mix, e.g., hydraulic cement mix may be contacted with carbon dioxide by flowing carbon dioxide over the surface of the mixing cement mix, e.g., hydraulic cement mix. The flow of carbon dioxide directed to the cement mix, e.g., hydraulic cement mix, e.g., the surface of the mix, may last for 5 minutes or less, for example, the flow of carbon dioxide directed to the cement mix, e.g., hydraulic cement mix may last for 0.5-5 minutes. In certain embodiments, in which solid carbon dioxide is introduced into the cement mix, the solid carbon dioxide sublimates to gaseous carbon dioxide and the delivery may be extended to more than 20, 30, 40, 50, or 60 minutes. The method may further comprise monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of carbon dioxide according to the characteristic monitored. For example, the method may further comprise monitoring a carbon dioxide concentration in a portion of gas adjacent to the cement mix, e.g., hydraulic cement mix, such as in a portion of gas in the mixer, or in a portion of gas outside the mixer, or both. The carbon dioxide concentration may be monitored by a sensor. The sensor may transmit a signal to a controller. The controller may process the signal and transmits a signal to an actuator according to the results of the processing, such as a controllable valve for controlling the flow of carbon dioxide to contact the cement mix, e.g., hydraulic cement mix. In addition to, or instead of carbon dioxide, a temperature of the cement mix, e.g., hydraulic cement mix, the mixer, or of another component exposed to the cement mix, e.g., hydraulic cement mix may be monitored, for example, the temperature of the mixer may be monitored, or the temperature of the cement mix, e.g., hydraulic cement mix inside the mixer may be monitored, or the temperature of a portion of the cement mix, e.g., hydraulic cement mix that is transported outside the mixer may be monitored. The contacting of the cement mix, e.g., hydraulic cement mix with carbon dioxide may be modulated according to the temperature monitored, for example, when the temperature being monitored, or a combination of temperatures being monitored, exceeds a threshold value. The threshold value may be a value determined relative to the initial temperature of the cement mix, e.g., hydraulic cement mix before addition of carbon dioxide, such as a threshold temperature or range of temperatures relative to the initial temperature as described herein. Alternatively, the threshold value may be an absolute value. The temperature may be monitored by a sensor. The sensor may transmit a signal to a controller. The controller may process the signal and transmit a signal to an actuator according to the results of the processing. The actuator may comprise a controllable valve for controlling the flow of carbon dioxide to contact the cement mix, e.g., hydraulic cement mix. The method of contacting the hydraulic cement with carbon dioxide may include, in any of these embodiments, controlling the contacting of the cement mix, e.g., hydraulic cement mix with the carbon dioxide is controlled to achieve a desired level of carbonation, such as a level as described herein, for example, at least 0.5, 1, 2, 3, or 4%. In certain embodiments, the exposure of the cement mix to carbon dioxide is modulated so as to provide an efficiency of carbon dioxide uptake of at least 60, 70, 80, 90, 95, 96, 97, 98, or 99%, for example, at least 70%.

In certain embodiments, the invention provides a method for producing a cement mix, e.g., hydraulic cement mix comprising (i) contacting a cement mix, e.g., hydraulic cement mix comprising water and hydraulic cement in a mixer with carbon dioxide while the cement mix, e.g., hydraulic cement mix is mixing, wherein the carbon dioxide is contacted with the surface of the cement mix, e.g., hydraulic cement mix by directing a flow of carbon dioxide to the surface of the mix from outside the mix, and wherein the flow lasts less than 5 min. In certain embodiments, the cement mix, e.g., hydraulic cement mix comprises aggregate. The cement mix, e.g., hydraulic cement mix may further comprise an admixture. In certain embodiments, the mixer is a transportable mixer, such as a drum of a ready-mix truck. In certain embodiments, the mixer is a mixer for pre-cast concrete. The method may further comprise controlling the flow of the carbon dioxide according to feedback from one or more sensors that monitor a characteristic selected from the group consisting of a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix.

In certain embodiments, the invention provides a method for producing a hydraulic cement mix comprising (i) contacting a cement mix, e.g., hydraulic cement mix comprising water and hydraulic cement in a mixer with carbon dioxide while the cement mix, e.g., hydraulic cement mix is mixing, wherein the carbon dioxide is contacted with the surface of the cement mix, e.g., hydraulic cement mix by directing a flow of carbon dioxide to the surface of the mix from outside the mix, and wherein the carbon dioxide is a component of a gaseous mixture that comprises at least 10, 20, 30, 40, 50, 60, 70, 80, 90, 95, or 99% carbon dioxide, such as at least 50% carbon dioxide. In certain embodiments, the hydraulic cement comprises aggregate. In certain embodiments, the hydraulic cement comprises an admixture. In certain embodiments, the mixer is a transportable mixer, such as a drum of a ready-mix truck. In certain embodiments, the mixer is a mixer for pre-cast concrete.

In certain embodiments, the invention provides a method for producing a cement mix, e.g., hydraulic cement mix comprising (i) contacting a cement mix, e.g., hydraulic cement mix in a mixer with carbon dioxide while the cement mix, e.g., hydraulic cement mix is mixing; and (ii) adding an admixture to the cement mix, e.g., hydraulic cement mix. The contacting may be achieved by directing a flow of carbon dioxide to the cement mix, e.g., hydraulic cement mix. In certain embodiments, the admixture is an admixture that modulates the flowability of the cement mix, e.g., hydraulic cement mix. In certain of these embodiments, the admixture may be added in an amount to achieve a flowability in a predetermined range of flowabilities, such as a predetermined range of flowabilities determined by allowing for a margin from the flowability of the cement mix, e.g., hydraulic cement mixture without the addition of carbon dioxide, for example, as described elsewhere herein. In certain aspects of the fourth embodiment, the admixture is selected from the group consisting of a polycarboxylate superplasticizer, a naphthalene HRWR, or any combination thereof.

In certain embodiments, the invention provides a method for producing a cement mix, e.g., hydraulic cement mix comprising (i) contacting a cement mix, e.g., hydraulic cement mix in a mixer with carbon dioxide while the cement mix, e.g., hydraulic cement mix is mixing, wherein the carbon dioxide is exposed to the cement mix, e.g., hydraulic cement mix when the w/c ratio of the cement mix, e.g., hydraulic cement mix is less than or equal to 0.4. In certain embodiments, the contacting is achieved by directing a flow of carbon dioxide to the cement mix, e.g., hydraulic cement mix. In certain aspects of this embodiment, the w/c ratio of the cement mix, e.g., hydraulic cement mix is 0.05-0.4. The method may further comprise monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of carbon dioxide according to the characteristic monitored. The method may comprise (ii) adding an admixture to the cement mix, e.g., hydraulic cement mix, such as an admixture that modulates the flowability of the cement mix, e.g., hydraulic cement mix, for example an admixture to modulate flowability of type and/or amount as described elsewhere herein.

In certain embodiments, the invention provides a method for producing a cement mix, e.g., hydraulic cement mix comprising (i) contacting a cement mix, e.g., hydraulic cement mix in a mixer with carbon dioxide while the cement mix, e.g., hydraulic cement mix is mixing at a first location, and (ii) transporting the cement mix, e.g., hydraulic cement mix to a second location where the cement mix, e.g., hydraulic cement mix is used. In certain aspects of this embodiment, said contacting is achieved by directing a flow of carbon dioxide to the cement mix, e.g., hydraulic cement mix. The second location may be at least 0.1 mile from the first location. The second location may be at least 0.5 mile from the first location. The method may comprise monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of carbon dioxide according to the characteristic monitored. The method may comprise (ii) adding an admixture to the cement mix, e.g., hydraulic cement mix, such as an admixture that modulates the flowability of the cement mix, e.g., hydraulic cement mix.

In certain embodiments, the invention provides a method for producing a cement mix, e.g., hydraulic cement mix comprising (i) contacting a cement mix, e.g., hydraulic cement mix in a mixer with carbon dioxide while the cement mix, e.g., hydraulic cement mix is mixing with a flow of carbon dioxide directed to the cement mix, e.g., hydraulic cement mix, (ii) monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix; and (iii) modulating the exposure of the cement mix, e.g., hydraulic cement mix to the carbon dioxide according to the characteristic monitored in step (ii). The method may comprise monitoring a carbon dioxide concentration in a portion of gas adjacent to the cement mix, e.g., hydraulic cement mix, e.g., a portion of gas in the mixer, or a portion of gas outside the mixer. The carbon dioxide concentration may be monitored by a sensor. The sensor may transmit a signal to a controller. The controller may process the signal and transmit a signal to an actuator according to the results of the processing, for example, an actuator comprising a valve for controlling the flow of carbon dioxide to contact the cement mix, e.g., hydraulic cement mix. The method may comprise monitoring a temperature of the cement mix, e.g., hydraulic cement mix, the mixer, or of another component exposed to the cement mix, e.g., hydraulic cement mix is monitored. A temperature of the mixer may be monitored, or a temperature of the cement mix, e.g., hydraulic cement mix inside the mixer may be monitored, or a temperature of a portion of the cement mix, e.g., hydraulic cement mix that is transported outside the mixer may be monitored, or any combination thereof. The contacting of the cement mix, e.g., hydraulic cement mix with carbon dioxide may be modulated according to the temperature monitored. The contacting of the cement mix, e.g., hydraulic cement mix with the carbon dioxide may be modulated when the temperature being monitored, or a combination of temperatures being monitored, exceeds a threshold value, such as a value determined relative to the initial temperature of the cement mix, e.g., hydraulic cement mix before addition of carbon dioxide, such as a threshold value as described elsewhere herein. Alternatively, the threshold value may be an absolute value. The temperature may be monitored by a sensor. The sensor may transmit a signal to a controller. The controller may process the signal and transmit a signal to an actuator according to the results of the processing. The actuator may comprise a controllable valve for controlling the flow of carbon dioxide to contact the cement mix, e.g., hydraulic cement mix.

In certain embodiments, the invention provides a method for producing a cement mix, e.g., hydraulic cement mix comprising (i) contacting a first portion of cement mix, e.g., hydraulic cement mix comprising a first portion of water and hydraulic cement in a mixer while the cement mix, e.g., hydraulic cement mix is mixing; and (ii) adding a second portion of cement mix, e.g., hydraulic cement mix to the first portion. In certain aspects of this embodiment, said contacting is achieved by directing a flow of carbon dioxide to the first portion of cement mix, e.g., hydraulic cement mix.

In certain embodiments, the invention provides a method of retrofitting an existing cement mix, e.g., hydraulic cement mixing apparatus comprising a mixer, comprising operably connecting to the existing cement mix, e.g., hydraulic cement mixing apparatus a system for contacting a cement mix, e.g., hydraulic cement mix within the mixer with carbon dioxide during mixing of the cement mix, e.g., hydraulic cement mix. In certain aspects of this embodiment, the system to contact the cement mix, e.g., hydraulic cement mix in the mixer with carbon dioxide comprises a system to direct a flow of carbon dioxide to the cement mix, e.g., hydraulic cement mix during mixing of the cement mix, e.g., hydraulic cement mix. The method may also comprise operably connecting a source of carbon dioxide to a conduit for delivering the carbon dioxide to the mixer. The method may also comprise operably connecting the conduit to the mixer. The system may comprise an actuator for modulating delivery of carbon dioxide from the source of carbon dioxide through the conduit. The system may comprise a control system for controlling the actuator, operably connected to the actuator. The control system may comprises a timer and a transmitter for sending a signal to the actuator based on the timing of the timer. The method may comprise connecting the actuator to an existing control system for the cement mix, e.g., hydraulic cement mixing apparatus. The method may comprise modifying the existing control system to control the actuator. The actuator may be operably connected to or configured to be operably connected to the conduit, the mixer, a control system for the mixer, or to a source of carbon dioxide, or a combination thereof. The actuator may control a valve so as to control delivery of carbon dioxide to the mixer. The method may comprise adding to the existing cement mix, e.g., hydraulic cement mixing apparatus one or more sensors operably connected to, or configured to be operably connected to, a control system, for monitoring one or more characteristics of the cement mix, e.g., hydraulic cement mix, a gas mixture in contact with the cement mix, e.g., hydraulic cement mix, a component of the cement mix, e.g., hydraulic cement mixing apparatus, or a component exposed to the cement mix, e.g., hydraulic cement mix, for example, one or more sensors is a sensor for monitoring carbon dioxide concentration of a gas or a temperature.

IV. Apparatus and Systems

In one aspect, the invention provides apparatus and systems. The apparatus may include one or more of a conduit for supplying carbon dioxide from a carbon dioxide source to a mixer, a source of carbon dioxide, a mixer, one or more sensors, one or more controllers, one or more actuators, all as described herein.

For example, in certain embodiments the invention provides an apparatus for addition of carbon dioxide to a mixture comprising hydraulic cement, where the apparatus comprises a mixer for mixing the cement mix, e.g., hydraulic cement mix, and a system for delivering carbon dioxide to the cement mix, e.g., hydraulic cement mix in the mixer during mixing. In certain embodiments, the system for delivering carbon dioxide is configured to deliver carbon dioxide to the surface of the cement mix, e.g., hydraulic cement mix during mixing. The system may include a carbon dioxide source, a conduit operably connecting the source and the mixer for delivery of carbon dioxide to the mixer, a metering system for metering flow of carbon dioxide in the conduit, and an adjustable valve to adjust the flow rate. In addition, the apparatus may include one or more sensors to sense carbon dioxide content of gas in the mixer, or outside the mixer. The apparatus may also include one or more sensors for sensing the temperature of the cement mix, e.g., hydraulic cement mix, or the mixer or other component. The apparatus may further include a controller that is operably connected to the one or more sensors, e.g., to one or more temperature sensors, one or more carbon dioxide sensors, or a combination thereof, and which is configured to receive data from the one or more sensors. The controller may be configured to display the data, e.g., so that a human operator may adjust flow or other parameters based on the data. The controller may be configured to perform one or more operations on the data, and to send output to one or more actuators based on the results of the one or more operations. For example, the controller may be configured to send output to a an adjustable valve causing it to modulate the flow of carbon dioxide in the conduit, e.g., to stop the flow after a particular temperature, or carbon dioxide concentration, or both, has been achieved.

In certain embodiments the invention provides a system for retrofitting an existing cement mix, e.g., hydraulic cement mix apparatus to allow carbon dioxide to be contacted with a cement mix, e.g., hydraulic cement mix during mixing. The system may be configured to be transported from a site remote from the site of the existing cement mix, e.g., hydraulic cement mix apparatus to the site of the existing cement mix, e.g., hydraulic cement mix apparatus.

In certain embodiments the invention provides an apparatus for carbonating a cement mix comprising a cement binder and aggregate in a cement mix apparatus during a mix operation, comprising (i) a mixer for mixing the cement mix; (ii) a system for contacting the cement mix in the mixer with carbon dioxide operably connected to the mixer and comprising an actuator for modulating a flow of carbon dioxide to the mixer; (iii) a sensor positioned and configured to monitor a characteristic of the mix operation; and to transmit information regarding the characteristic to a controller; (iv) the controller, wherein the controller is configured (e.g., programmed) to process the information and determine whether or not and/or to what degree to modulate the flow of carbon dioxide to the mixer and to transmit a signal to the actuator to modulate the flow of carbon dioxide to the mixer. In addition to, or instead of, the actuator for modulating a flow of carbon dioxide, the system may include one or more actuators for modulating another characteristic of the system, and the controller may be configured to determine whether or not and to what degree to modulate the other characteristic, and transmit a signal to the actuator for modulating the other characteristic.

The mixer may be any suitable mixer so long as it can be configured with the remaining elements of the apparatus, such as mixers described herein. In certain embodiments, the mixer is a stationery mixer, such as a mixer used in a precast operation. In certain embodiments, the mixer is a transportable mixer, such as the drum of a ready mix truck. In embodiments in which the mixer is transportable, one or more of the elements of the control system for contacting the cement mix with carbon dioxide, sensing a characteristic, controlling one or more characteristics such as carbon dioxide flow, and actuators, may be configured to be transported along with the mixer, or may be configured to be detachable from the mixer, for example, to remain at a batching station for a ready mix truck. See, e.g. FIGS. 3 and 4, which show elements of the carbon dioxide delivery system in either non-transportable or transportable form. Elements of the control system may be similarly transportable or non-transportable. It will be appreciated that some parts of the system may be transported while others remain at, e.g. the batching station. For example, all carbon dioxide may be delivered at the batching station but certain characteristics of the cement mix, e.g., rheology, may be monitored while the truck in en route to the job site, and, if necessary, the cement mix may be modulated based on the monitoring, e.g., by addition of an admixture, or water, etc.

The system for contacting the cement mix in the mixer with carbon dioxide may be any suitable system, such as the systems described herein. In certain embodiments, the system is configured to deliver gaseous carbon dioxide to the cement mix. In certain embodiments, the system is configured to deliver liquid carbon dioxide to the cement mix in such a manner that the liquid carbon dioxide is converted to gaseous and solid carbon dioxide as it is delivered to the cement mix, as described herein. The system may be configured to deliver carbon dioxide to the surface of the mixing cement mix, or underneath the surface, or a combination thereof. In the case of a ready mix truck, the system for contacting the cement in the mixer with carbon dioxide may share a conduit with the water delivery system, by means of a T junction in the conduit, such that either water or carbon dioxide can be delivered to a final common conduit. See Examples 2 and 6.

The sensor may be any suitable sensor so long as it is configured and positioned to transmit relevant information to the controller. In certain embodiments, the characteristic of the mix operation that is monitored by the sensor comprises a characteristic of the cement binder, the cement mix, a gas mixture in contact with the cement mix or the mixer, or a component of the cement mix apparatus. In certain embodiments, the sensor is configured and positioned to monitor (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix. In certain embodiments, the characteristic monitored by the sensor comprises carbon dioxide content of a gas mixture exiting from the mixer; this can be monitored by a single sensor or by a plurality of sensors placed at various leak locations, in which case the controller uses information from the plurality of sensors. The controller can be configured to send a signal to the actuator to modulate the flow of carbon dioxide when the carbon dioxide content of the gas mixture reaches a threshold value. Alternatively, or in addition, the controller can be configured to send a signal to the actuator to modulate the flow of carbon dioxide when a rate of change of the carbon dioxide content of the gas mixture reaches a threshold value. In certain embodiments, the characteristic monitored by the sensor comprise the temperature of the cement mix or a component of the mix apparatus in contact with the cement mix. The controller can be configured to send a signal to the actuator to modulate the flow of carbon dioxide when the temperature of the cement mix or a component of the mix apparatus in contact with the cement mix reaches a threshold value. Alternatively, or in addition, the controller can be configured to send a signal to the actuator to modulate the flow of carbon dioxide when a rate of change of the temperature of the cement mix or a component of the mix apparatus in contact with the cement mix reaches a threshold value.

In certain embodiments, the apparatus comprises a plurality of sensors configured to monitor a plurality of characteristics a plurality of characteristics of the cement binder, the cement mix, a gas mixture in contact with the cement mix or the mixer, or a component of the cement mix apparatus e.g., at least 2, 3, 4, 5, 6, 7, 8, 9, or 10 characteristics, for example, at least 2 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 3 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 4 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 5 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 6 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix.

In addition to these sensors, or alternatively, the apparatus may include one or more sensors to monitor the time of exposure of the cement mix to the carbon dioxide, the flow rate of the carbon dioxide, or both. For example, a sensor may signal when a valve to supply carbon dioxide has opened, and, e.g., the flow rate of the carbon dioxide, and a timer circuit in the controller can determine total carbon dioxide dose.

Sensors may be wired to the controller or may transmit information wirelessly, or any combination thereof.

The apparatus may additionally, or alternatively, include an actuator configured to modulate an additional characteristic of the mix operation, where the actuator is operably connected to the controller and wherein the controller is configured to send a signal to the actuator to modulate the additional characteristic based on the processing of information from one or more sensors. This actuator can be configured to modulate addition of admixture to the cement mix, type of admixture added to the cement mix, timing of addition of admixture to the cement mix, amount of admixture added to the cement mix, amount of water added to the cement mix, timing of addition of water to the cement mix, or cooling the cement mix during or after carbon dioxide addition. In certain embodiments, the apparatus comprises a plurality of such actuators, such as at least 2, 3, 4, 5, 6, 7, or 8 such actuators.

The actuators may be wired to the controller, or may receive signals from the controller wirelessly.

The controller may be any suitable controller so long as it is capable of being configured to receive information from one or more sensors, process the information to determine if an output is required, and transmit signals to one or more actuators, as necessary, based on the processing; e.g., a computer. For example, the controller can be a Programmable Logic Controller (PLC), optionally with a Human Machine Interface (HMI), as described elsewhere herein. The controller may be located onsite with the mixer, or it may be remote, e.g., a physical remote controller or a Cloud-based controller. In certain embodiments, the controller is configured to store and process the information obtained regarding the characteristic monitored by the sensor for a first batch of cement mix and to adjust conditions for a subsequent second cement mix batch based on the processing to optimize one or more aspects of the mix operation. For example, the controller may adjust the second mix recipe, e.g., amount of water used or timing of water addition, or carbon dioxide exposure in the second batch to improve carbon dioxide uptake, or to improve rheology or other characteristics of the mix. In such embodiments in which one or more conditions of a second mix operation are adjusted, in certain embodiments the one or more conditions of the second mix operation includes (a) total amount of carbon dioxide added to the cement mix, (b) rate of addition of carbon dioxide, (c) time of addition of carbon dioxide to the cement mix, (d) whether or not an admixture is added to the cement mix, (e) type of admixture added to the cement mix, (f) timing of addition of admixture to the cement mix, (g) amount of admixture added to the cement mix, (h) amount of water added to the cement mix, (i) timing of addition of water to the cement mix, (j) cooling the cement mix during or after carbon dioxide addition, or a combination thereof. The controller can also receive additional information regarding one or more characteristics of the cement mix measured after the cement mix leaves the mixer, and adjusts conditions for the second cement mix batch based on processing that further comprises the additional information. In certain embodiments, the one or more characteristics of the cement mix measured after the cement mix leaves the mixer comprises (a) rheology of the cement mix at one or more time points, (b) strength of the cement mix at one or more time points, (c) shrinkage of the cement mix, (d) water absorption of the cement mix, or a combination thereof. Other characteristics include water content, carbon dioxide analysis to confirm carbon dioxide uptake, calcite content (e.g., as determined by infrared spectroscopy), elastic modulus, density, and permeability. Any other suitable characteristic, as known in the art, may be measured.

In embodiments in which a controller adjusts conditions for a second mix operation based on input from a first mix operation, the second mix operation may be in the same mix facility or it may be in a different mix facility. In certain embodiments, the controller, one or more sensors, one or more actuators, or combination thereof, transmits information regarding the characteristics monitored and conditions modulated to a central controller that receives information from a plurality of controllers, sensors, actuators, or combination thereof, each of which transmits information from a separate mixer and mix operation to the central controller. In these embodiments, the apparatus may include a second controller that is the central controller, or the central controller may be the only controller for the apparatus. Thus, for example, a first mix facility may have a first sensor to monitor a first characteristic of the first mix operation, and a second mix facility may have a second sensor to monitor a second characteristic of a second mix operation, and both may send information regarding the first and second characteristics to a central controller, which processes the information and transmit a signal to the first, second, or even a third, fourth, fifth, etc., mix operation to adjust conditions based on the first and second signals from the first and second sensors. Additional information that will be typically transmitted to the central controller includes mix components for the mixes at the first and second mix operations (e.g., type and amount of cement binder, amount of water and w/c ratio, types and amounts of aggregate, whether aggregate was wet or dry, admixtures, and the like) amount, rate, and timing of carbon dioxide addition, and any other characteristic of the first and second mix operations that would be useful for determining conditions to modulate future mix operations based on the characteristics achieved in past mix operations. Any number of mix operations may input information to the central controller, e.g., at least 2, 3, 4, 5, 6, 7, 8, 9, or 10 mix operations, or at least 15, 20, 25, 30, 40, 50, 60, 70, 80, 90, or 100 mix operations. The central controller may also receive any other information that may be suitable to informing decisions regarding mix operations to optimize one or more conditions of the mix operation and/or of the cement mix produced in the operation. For example, the central controller may receive information from experiments conducted with various types of cements (e.g., various types of Portland cements) carbonated under various conditions, and/or exposed to various admixtures, such as at different times, or in different concentrations, and the like, and the resulting characteristics of the cement mix, such as rheology at one or more timepoints, strength at one or more timepoints, and the like. Any other suitable information, such as information published in literature, or obtained in any manner, may be input into the central controller, e.g., automatically and/or through a Human Machine Interface. The information the central controller receives can be processed and used to adjust cement mix operations at any mix operation to which the central controller can transmit outputs. Thus, the central controller can learn from numerous mix operations to optimize future operations and, over time, can accumulate a database to inform decisions in mix operations at a mix site even if a particular mix recipe and/or conditions have never been used at that site, or even predict optimum conditions for a mix recipe that has not been used at any of the sites to which the controller is connected. The central controller can match to past mix recipes, or predict optimum conditions for a new mix recipe based on suitable algorithms using information in its database, or both.

In certain embodiments in which the controller adjusts a second mix operation based on characteristics monitored in a first mix operation, the one or more characteristics of the mix operation may comprise total amount of carbon dioxide added to the cement mix, rate of addition of carbon dioxide, time of addition of carbon dioxide to the cement mix, whether or not an admixture is added to the cement mix, type of admixture added to the cement mix, timing of addition of admixture to the cement mix, amount of admixture added to the cement mix, amount of water added to the cement mix, timing of addition of water to the cement mix, cooling the cement mix during or after carbon dioxide addition, or a combination thereof.

The controller can be further configured, e.g., programmed, to receive and process information regarding one or more characteristics of the cement mix measured after the cement mix leaves the mixer, and to transmit signals to one or more actuators configured to adjust conditions for the second cement mix batch based on the processing to improve contact with the carbon dioxide or another characteristic of the mix operation in the second mix operation. The one or more characteristics of the cement mix measured after the cement mix leaves the mixer can be rheology of the cement mix at one or more time points, strength of the cement mix at one or more time points, water absorption, shrinkage, and the like. The characteristic monitored can depend on the requirements for a particular mix batch, although other characteristics may also be monitored to provide data to the controller for future batches in which those characteristics would be required.

The use of an apparatus that includes a control system, whether for a single mix operation or for a plurality of mix operations, can produce very high efficiencies of carbon dioxide uptake (ratio of carbon dioxide or carbon dioxide derivatives in the cement mix to total carbon dioxide delivered). In certain embodiments, the apparatus is configured to control one or more actuators such that an efficiency of carbonation of at least 60, 70, 80, 90, 95, 96, 97, 98, 99, or 99.5% is achieved. Such high efficiencies allow for greater sequestration of greenhouse gas without leakage into the atmosphere, as well as a more economical operation.

In certain embodiments, the invention provides a controller for controlling a cement mix mixing operation comprising carbonation of the cement mix in a mixer by exposing the cement mix to carbon dioxide, where the controller comprises (i) an input port for receiving a signal from a sensor that monitors a characteristic of the cement mix mixing operation; (ii) a processor for processing the signal from the sensor and formulating an output signal to modulate the exposure of the cement mix to carbon dioxide or to modulate a characteristic of the cement mix; and (iii) an output port for transmitting the output signal to an actuator that modulates the exposure of the cement mix to carbon dioxide or that modulates a characteristic of the cement mix. The input and output ports may be configured to be wired to the sensor or actuator, or to receive a wireless signal, or a combination of such ports may be used. In certain embodiments, the input port is configured to receive a plurality of signals from a plurality of sensors, and the processor is configured to process the plurality of signals and formulate an output signal to modulate the exposure of the cement mix to carbon dioxide or to modulate a characteristic of the cement mix. Thus, the input port may include a plurality separate ports that are wired to various sensors, or a wireless port that is configured to receive signals from a plurality of sensors, or a combination of one or more wired and wireless ports for one or more sensors. The controller can be is configured to formulate a plurality of output signals to modulate the exposure of the cement mix to carbon dioxide or to modulate a characteristic of the cement mix and the output port is configured to transmit the plurality of signals. Similar to an input port for a plurality of signals, this can be a wired output port with a plurality of ports, a wireless port configured to send a plurality of signals, or a combination of wired and wireless ports to send one or more signals each.

The controller may be configured to process any signal from any suitable sensor, such as described herein, and to send output to any suitable actuator, such as described herein. The controller may also be configured to send information to a central controller, or may itself be a central controller that is configured to receive input from, and send output to, a plurality of mix operations, also as described herein.

In certain embodiments, the invention provides a network comprising a plurality of spatially separate cement mix operations, such as at least 2, 3, 4, 5, 6, 7, 8, 9, or 10, or at least 20, 30, 40, 50, 70, or 100 separate mix operations, each of which comprises at least one sensor for monitoring at least one characteristic of its operation, and comprising a central processing unit, to which each sensor sends its information and which stores and/or processes the information. Alternatively, or in addition, information regarding at least one characteristic of the mix operation may be input manually into the central processing unit, e.g., through a HMI. One or more of the mix operations may be a mix operation in which the cement mix is carbonated, e.g., as described herein, such as a mix operation in which the cement is carbonated, i.e., exposed to carbon dioxide in such a way that the carbon dioxide is taken up by the cement mix, during mixing. The mix operations may also include sensors or other means by which one or more characteristics of the cement mix is monitored, before, during, or after mixing, e.g., also as described herein, which transmit information to the central processor. The central processor may also be configured to output signals to one or more of the mix operations, or to other mix operations, based on the processing of the signals.

In certain embodiments, the invention provides an apparatus for producing a cement mix, e.g., hydraulic cement mix comprising (i) a mixer for mixing a cement mix, e.g., hydraulic cement mix; and (ii) a system for exposing the cement mix, e.g., hydraulic cement mix to carbon dioxide during mixing, wherein the system is configured to deliver carbon dioxide to the surface of the cement mix, e.g., hydraulic cement mix.

In certain embodiments, the invention provides an apparatus for mixing a cement mix, e.g., hydraulic cement mix comprising (i) a mixer for mixing the cement mix, e.g., hydraulic cement mix; (ii) a system for contacting the cement mix, e.g., hydraulic cement mix with carbon dioxide directed to the cement mix, e.g., hydraulic cement mix operably connected to the mixer; (iii) a sensor positioned and configured to monitor one or more characteristics of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix; and (iv) an actuator operably connected to the sensor for modulating the flow of the carbon dioxide based on the characteristic monitored. In certain aspects of this embodiment, the system for contacting the cement mix, e.g., hydraulic cement mix with carbon dioxide comprises a system a system for contacting the cement mix, e.g., hydraulic cement mix with a flow of carbon dioxide directed to the cement mix, e.g., hydraulic cement mix.

In certain embodiments, the invention provides an apparatus for retrofitting an existing cement mix, e.g., hydraulic cement mixer comprising a conduit configured to be operably connected to a source of carbon dioxide and to the mixer, for delivering carbon dioxide from the source to the mixer. The apparatus may comprise the source of carbon dioxide. The apparatus may comprise an actuator for controlling delivery of carbon dioxide from a source of carbon dioxide through the conduit, wherein the actuator is operably connected or is configured to be operably connected to a control system. The apparatus may further comprise the control system. The control system may comprise a timer and a transmitter for sending a signal to the actuator based on the timing of the timer. The control system may be an existing control system for the mixer. The apparatus may comprise instructions for modifying the existing control system to control the actuator. The actuator may be operably connected to or configured to be operably connected to the conduit, the mixer, a control system for the mixer, or to a source of carbon dioxide, or a combination thereof. The actuator may control a valve so as to control delivery of carbon dioxide to the mixer. The apparatus may comprise one or more sensors operably connected to, or configured to be operably connected to, the control system for monitoring one or more characteristics of the cement mix, e.g., hydraulic cement mix, a gas mixture adjacent to the cement mix, e.g., hydraulic cement mix, or a component in contact with the cement mix, e.g., hydraulic cement mix. The one or more sensors may be a sensor for monitoring carbon dioxide concentration of a gas or a temperature.

In certain embodiments, the invention provides a system for exposing a cement mix, e.g., hydraulic cement mix within a transportable mixer to carbon dioxide comprising (i) a source of carbon dioxide that is more than 50% pure carbon dioxide; (ii) a transportable mixer for mixing a cement mix, e.g., hydraulic cement mix; and (iii) a conduit operably connected to the source of carbon dioxide and to the mixer for delivering carbon dioxide from the source of carbon dioxide to the cement mix, e.g., hydraulic cement mix. The system may further comprise an actuator operably connected to the conduit for controlling the flow of the carbon dioxide. The actuator may comprise a valve. The system may comprise a controller operably connected to the actuator, where the controller is configured to operate the actuator based on predetermined parameters, on feedback from one or more sensors, or a combination thereof. In certain embodiments the source of carbon dioxide and the conduit are housed in a portable unit that can be moved from one ready mix site to another, to provide carbon dioxide to more than one ready mix truck.

In certain embodiments, the invention provides a system for exposing a cement mix, e.g., hydraulic cement mix within a mixer to carbon dioxide comprising (i) a source of carbon dioxide; (ii) the mixer for mixing the cement mix, e.g., hydraulic cement mix; (iii) a conduit operably connected to the source of carbon dioxide and to the mixer for delivering carbon dioxide from the source of carbon dioxide to the cement mix, e.g., hydraulic cement mix; (iv) a sensor positioned and configured to monitor one or more one or more characteristics of the cement mix, e.g., hydraulic cement mix, a gas mixture adjacent to the cement mix, e.g., hydraulic cement mix, or a component in contact with the cement mix, e.g., hydraulic cement mix; and (v) an actuator operably connected to the sensor and to the system for exposing the cement mix, e.g., hydraulic cement mix to carbon dioxide, wherein the actuator is configured to alter the exposure of the cement mix, e.g., hydraulic cement mix to the carbon dioxide based on the characteristic monitored by the sensor. The mixer may be a stationary mixer. The mixer may be a transportable mixer.

V. Compositions

The invention also provides compositions, e.g., compositions that may be produced by the methods described herein. In certain embodiment the concrete mix is fluid, that is, capable of being mixed in the mixer and poured for its intended purpose. In certain embodiments the invention provides a composition that is a dry carbonated concrete mix that is fluid and compactable, e.g., sufficiently fluid and compactable to be placed in a mold for a pre-cast concrete product, that comprises hydraulic cement, e.g., OPC, and carbon dioxide and/or reaction products of carbon dioxide with the OPC and/or other components of the mix, and, optionally, one or more of aggregates and an admixture, such as an admixture to modulate the compactability of the carbonated concrete mix, and/or a strength accelerator. In certain embodiments the admixture comprises a set retarder, such as a sugar or sugar derivative, e.g., sodium gluconate. In certain embodiments the invention provides a composition that is a wet carbonated concrete mix that is fluid and pourable, e.g., sufficiently fluid and pourable to be poured in a mold at a construction site, that comprises hydraulic cement, e.g., OPC, and carbon dioxide and/or reaction products of carbon dioxide with the OPC and/or other components of the mix, and, optionally, one or more of aggregates and an admixture, such as an admixture to modulate the flowability of the carbonated concrete mix, and/or a strength accelerator. In certain embodiments the admixture comprises a set retarder, such as a sugar or sugar derivative, e.g., sodium gluconate.

Thus, in certain embodiments, the invention provides a fluid cement mix, e.g., hydraulic cement mix composition comprising (i) a wet cement mix, e.g., hydraulic cement mix comprising hydraulic cement and water in a w/c ratio of no more than 0.4, or 0.3, or 0.2 and (ii) carbon dioxide or carbonation product in an amount of at least 0.05% by weight of cement (bwc). The composition is in a mixable and/or flowable state, e.g., set and hardening have not progressed to the point where the mixture can no longer be mixed by the apparatus in which it is formed. The composition may further comprise (ii) an admixture for modulating the flowability of the cement mix, e.g., hydraulic cement mixture. The admixture may a polycarboxylate superplasticizer, a naphthalene HRWR, or a combination thereof.

In certain embodiments, the invention provides a fluid cement mix, e.g., hydraulic cement mix composition comprising (i) a wet cement mix, e.g., hydraulic cement mix comprising hydraulic cement and water; (ii) carbon dioxide or carbonation product in an amount of at least 0.05% bwc; (iii) an admixture for modulating the flowability of the wet hydraulic cement mix. In certain embodiments the admixture comprises a polycarboxylate superplasticizer, a naphthalene HRWR, or any combination thereof.

In certain embodiment the invention provides a cement mix comprising gaseous carbon dioxide or carbon dioxide reaction products, such as carbonates, and solid carbon dioxide. The gaseous carbon dioxide or carbon dioxide reaction products may be present in an amount of greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5% bwc. The solid carbon dioxide may be present in an amount of greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5% bwc. The cement mix may further contain an admixture, such as any admixture as described herein, e.g., a carbohydrate or carbohydrate derivative, such as sodium gluconate. The admixture may be present in an amount of greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5%; or greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5% and less than greater than 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, 2.5 or 3.0%

EXAMPLES

Example 1

This example describes contacting a wet hydraulic cement mix (concrete) with carbon dioxide during mixing of the concrete.

A series of tests were conducted to contact wet concrete mix with carbon dioxide during mixing of the concrete.

Figure 4:
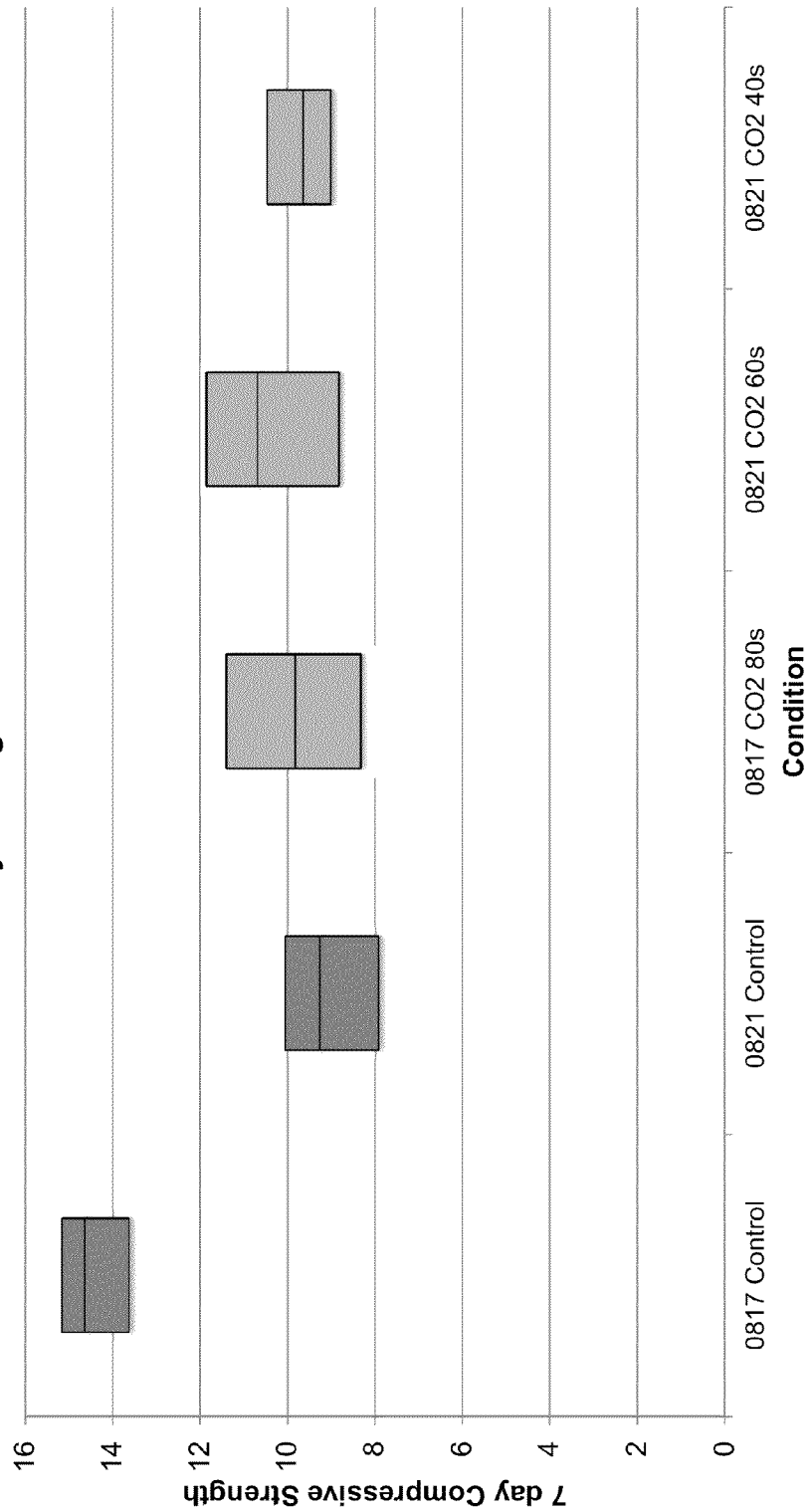
FIG. 4 shows 7-day compressive strengths of concrete prepared from wet mixes exposed to carbon dioxide at various doses.
Figure 5:
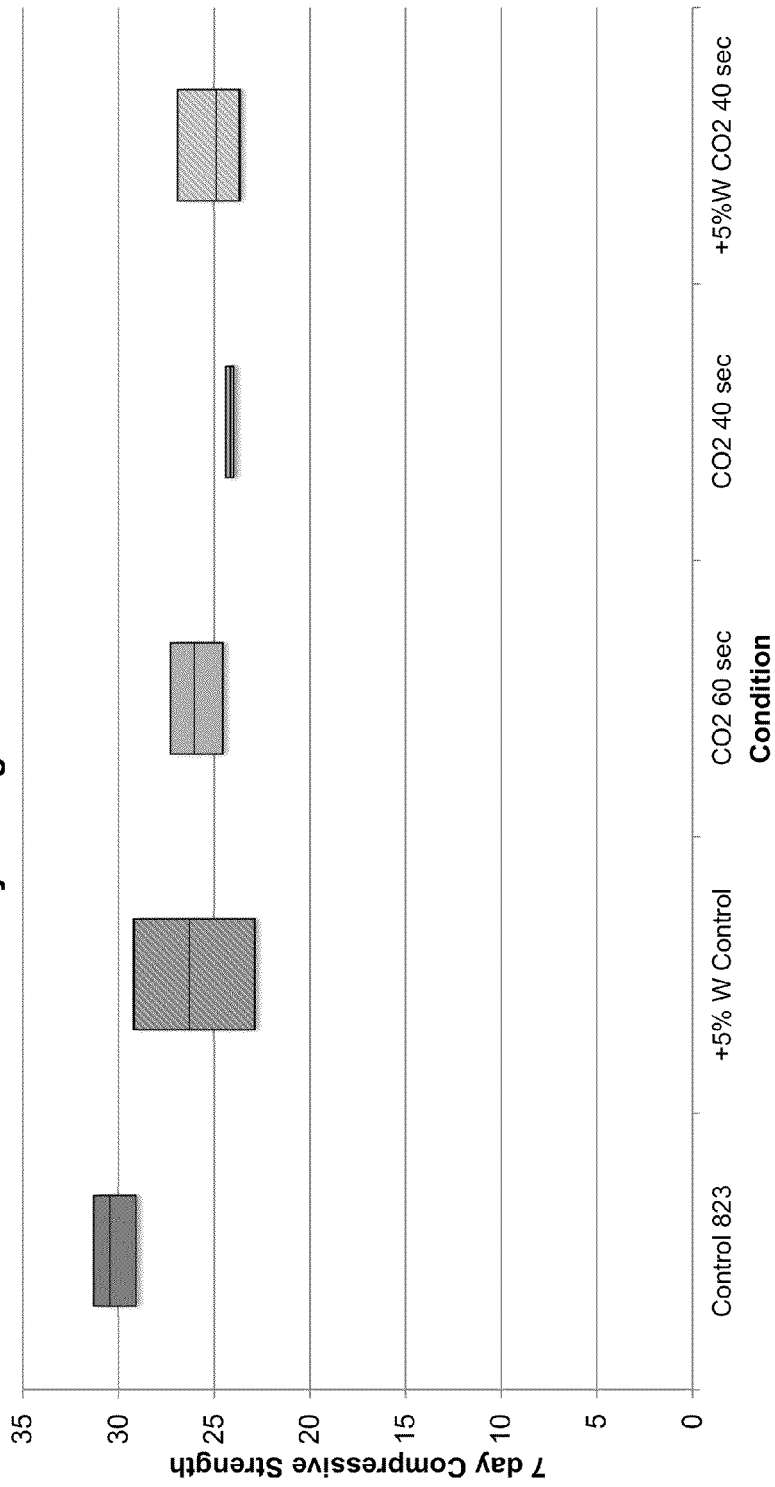
FIG. 5 shows 7-day compressive strengths of concrete prepared from wet mixes exposed to carbon dioxide at various doses and with various water contents.

In a first experiment, bagged ready mix concrete (Quikrete or Shaw), 20 kg was mixed with water in a Hobart mixer. The cement content of the concrete was not known but was assumed to be 12-14%. A value of 14% was used in subsequent calculations. 0.957 kg of water, which was 57% of the final water, was added for a w/c ratio of 0.34 and the mixer was topped with a loose lid. The concrete mix was mixed for 1 minute. Then a gas mixture containing carbon dioxide at a concentration of 99.5% (Commercial grade carbon dioxide from Air Liquide, 99.5% CO2, UN1013, CAS:124-38-9) was delivered to contact the surface of the mixing concrete via a tube of approximately ¼" ID whose opening was located approximately 10 cm from the surface of the mixing concrete, at a flow rate of 20 liters per minute (LPM) for 40-80 sec, for a total amount of carbon dioxide of 13.3 L (40 sec) to 26.7 L (80 sec). The remaining water, 0.713 kg, was added to bring the mix to a w/c ratio of 0.6 while the concrete mix continued to be mixed after the carbon dioxide addition for approximately 2 minutes, for a total mix time of approximately 4 minutes, with carbon dioxide addition for 40, 60, or 80 sec during the mixing. In general, the mixing procedure was as follows: mix dry mix and add first water addition over 15 seconds; mix for remainder of one minute; deliver $CO_2$ while mixing for 40, 60 or 80 seconds; when the delivery was 40 seconds there was an additional 20 sec of post-$CO_2$ mixing to bring the step up to one minute, when the delivery was 60 or 80 seconds the next step began immediately after the $CO_2$ was stopped; add the second water addition and mix two minutes. In one test an additional 5% water was added. These tests were done with Shaw pre bagged mix, which required more water and was assumed to contain more cement (17%). The two water additions were 1.15 kg (58% giving 0.34 estimated w/c) and 0.850 kg (to give a total of 2.0 kg of water and estimated 0.59 w/c). In the case of 5% added water it was only applied on the second addition (1.150 kg or 55%, then 0.950 kg for a total of 2.1 kg and estimated 0.62 w/c). Control concrete mixes were prepared with the same final w/c ratio and mixing time, but no addition of carbon dioxide. The mixed concrete was poured into cylinders and strength tests were performed at 7 days. The results are shown in FIGS. 4 and 5, where the bars represent the data range (high to low) and the line in the middle corresponds to the average. The concrete mixes that had been exposed to carbon dioxide showed 7-day strengths comparable to the controls.

Figure 6:
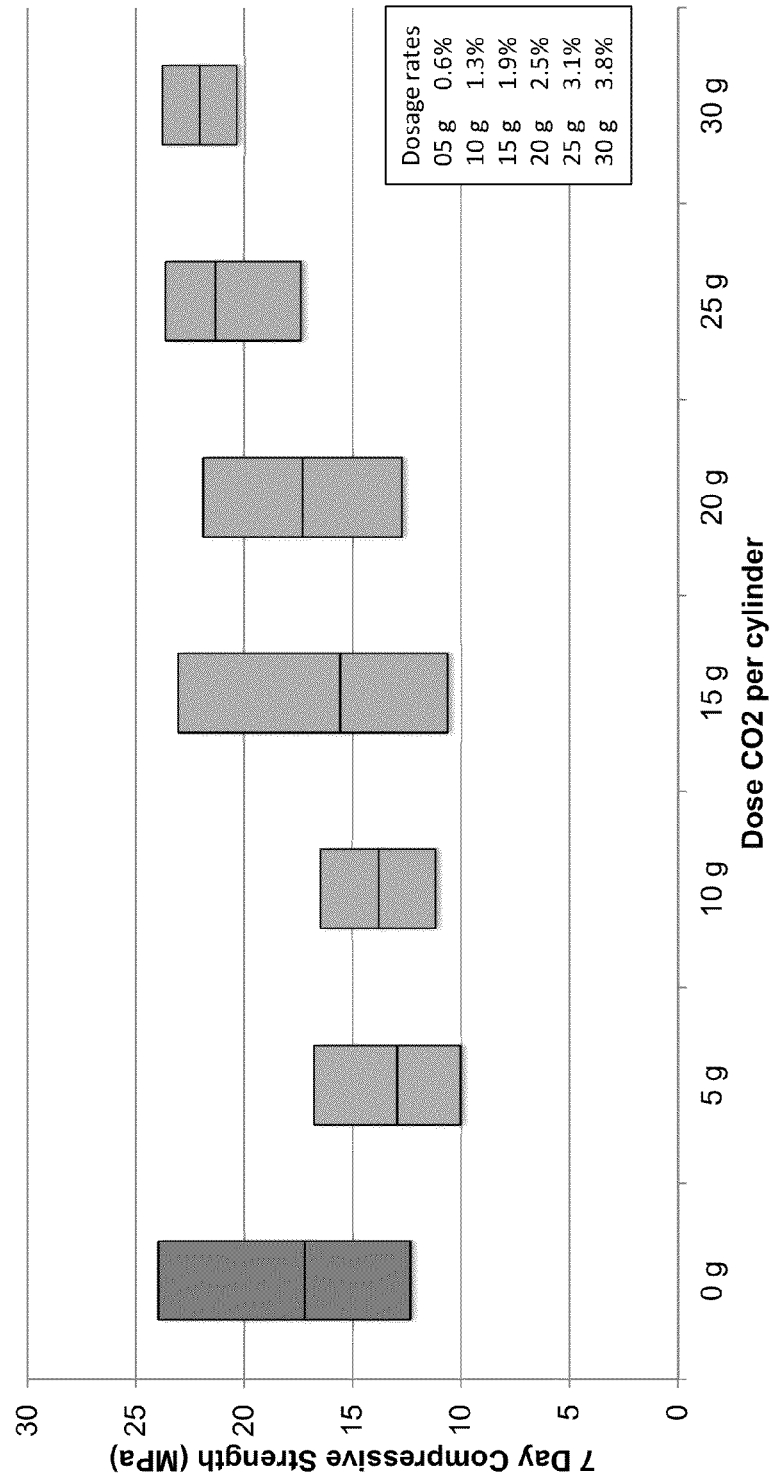
FIG. 6 shows 7-day compressive strengths of concrete prepared from wet mixes exposed to carbon dioxide at various doses.
Figure 7:
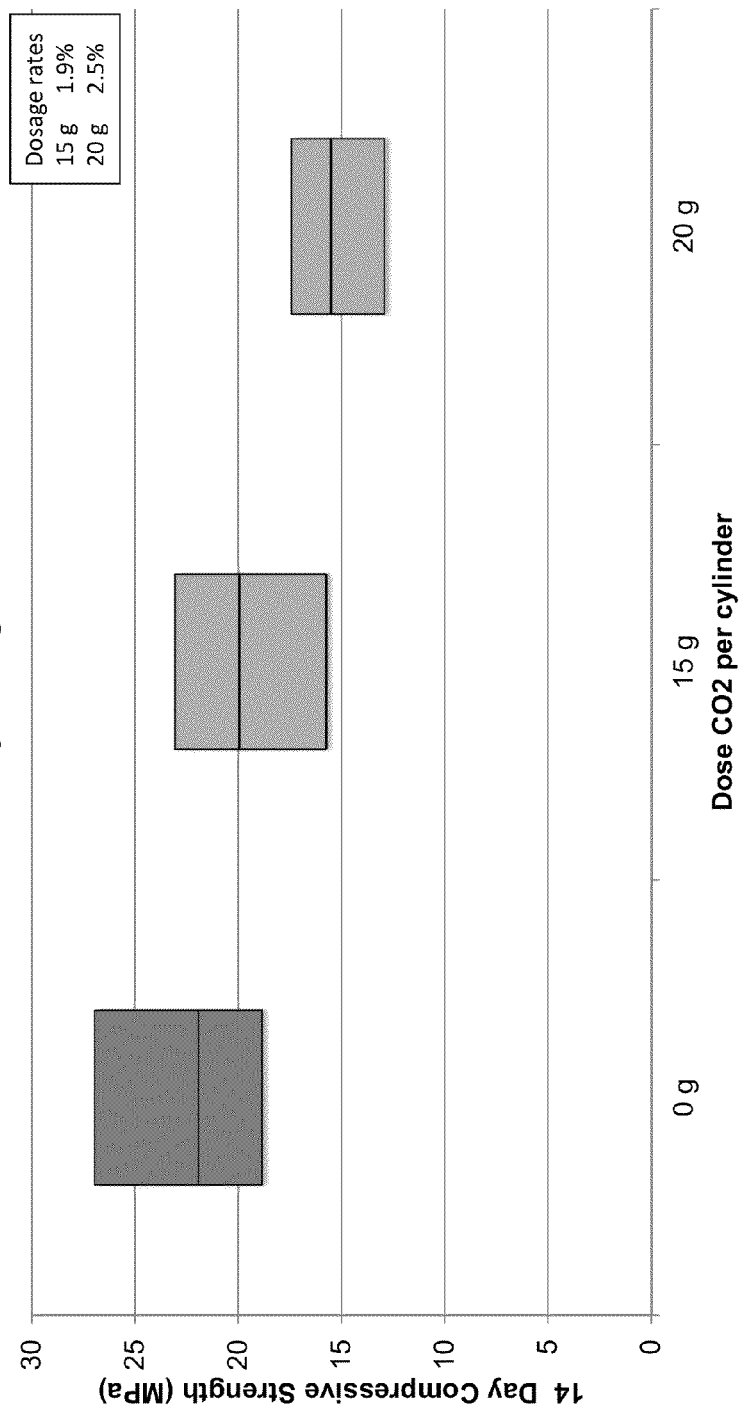
FIG. 7 shows 14-day compressive strengths of concrete prepared from wet mixes exposed to carbon dioxide at various doses.
Figure 8:
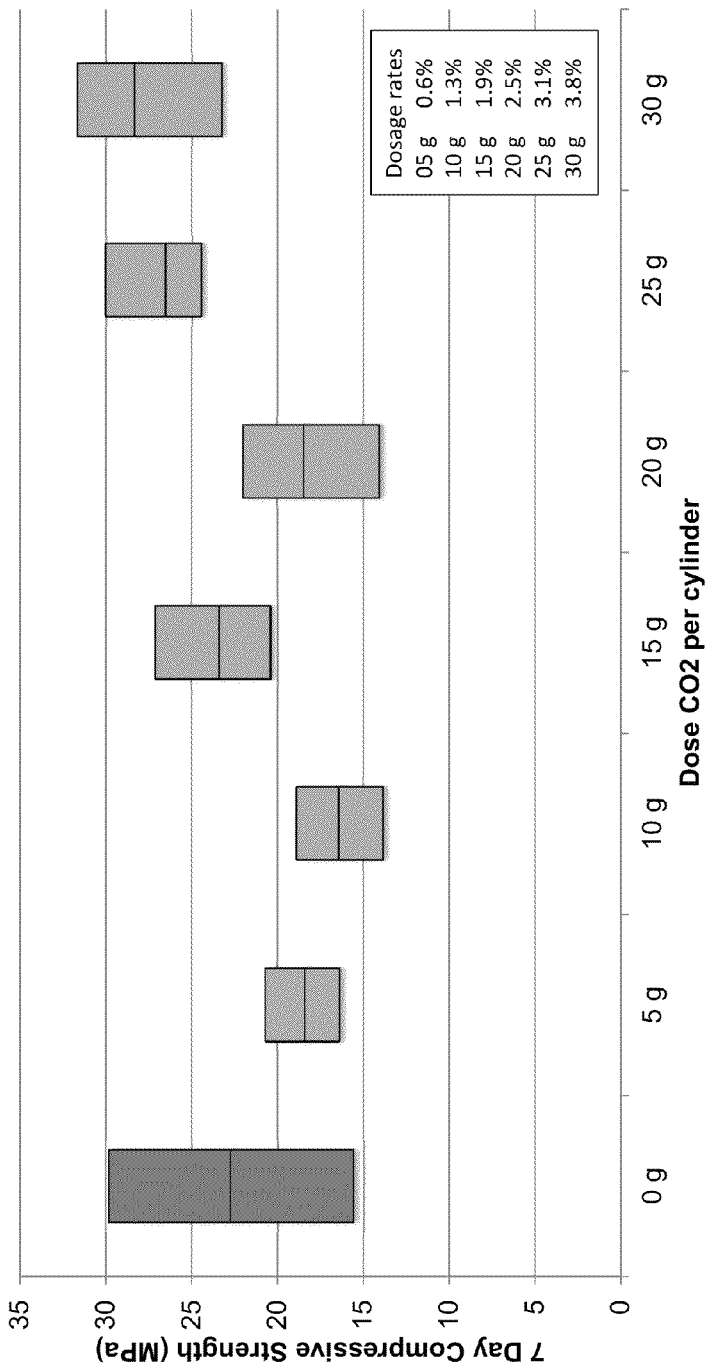
FIG. 8 shows 28-day compressive strengths of concrete prepared from wet mixes exposed to carbon dioxide at various doses.

In a second experiment, several batches were prepared. In each batch, approximately 20 kg of bagged ready mix concrete (BOMIX bagged ready mix) was mixed with water in a Hobart mixer. The cement content of the concrete was not known but was assumed to be 20%. A first water addition of 0.6 kg (30% of total water) was added for a w/c ratio of 0.15 and the mixer was topped with a loose lid. The concrete mix was mixed for a total of 1 minute. Then a gas mixture containing carbon dioxide at a concentration of 99.5% (Commercial grade carbon dioxide from Air Liquide, 99.5% CO2, UN1013, CAS:124-38-9) was delivered to contact the surface of the mixing concrete via a tube of approximately ¼" ID whose opening was located approximately 10 cm from the surface of the mixing concrete, at various flow rates for different batches, for 60 sec, to give different total carbon dioxide doses for different batches. The remaining water of 1.4 kg was added to bring the mix to a w/c ratio of 0.5 while the concrete mix continued to be mixed after the carbon dioxide addition for approximately 2 minutes, for a total mix time of approximately 4 minutes, with carbon dioxide addition for 60 sec during the mixing (one minute premix, 60 sec $CO_2$ dose, then add remainder of water and finish with two minutes mixing for 4 minutes total). Control concrete mixes were prepared with the same final w/c ratio and mixing time, but no addition of carbon dioxide. The mixed concrete was poured into 5 4 kg cylinders (100 mm diameter by 200 mm, or 4 inches by 8 inches) and strength tests were performed at 7, 14, and 28 days. The carbon dioxide dosage is expressed on a per-cylinder basis, and was 5, 10, 15, 20, 25, or 30 g per cylinder, depending on the batch, which was 0.6, 1.3, 1.9, 2.5, 3.1, or 3.8% carbon dioxide bwc, respectively. The results are shown in FIGS. 6, 7, and 8. The concrete mixes that had been exposed to carbon dioxide showed 7-day compressive strengths comparable to the controls, with a trend toward increasing 7-day strength with increasing carbon dioxide dose (FIG. 6). 14-day compressive strengths were comparable to or lower than controls at two doses, 15 and 20 g (FIG. 7). 28-day compressive strengths were comparable to the control, with a trend toward increasing 28-day strength with increasing carbon dioxide dose (FIG. 8).

Figure 9:
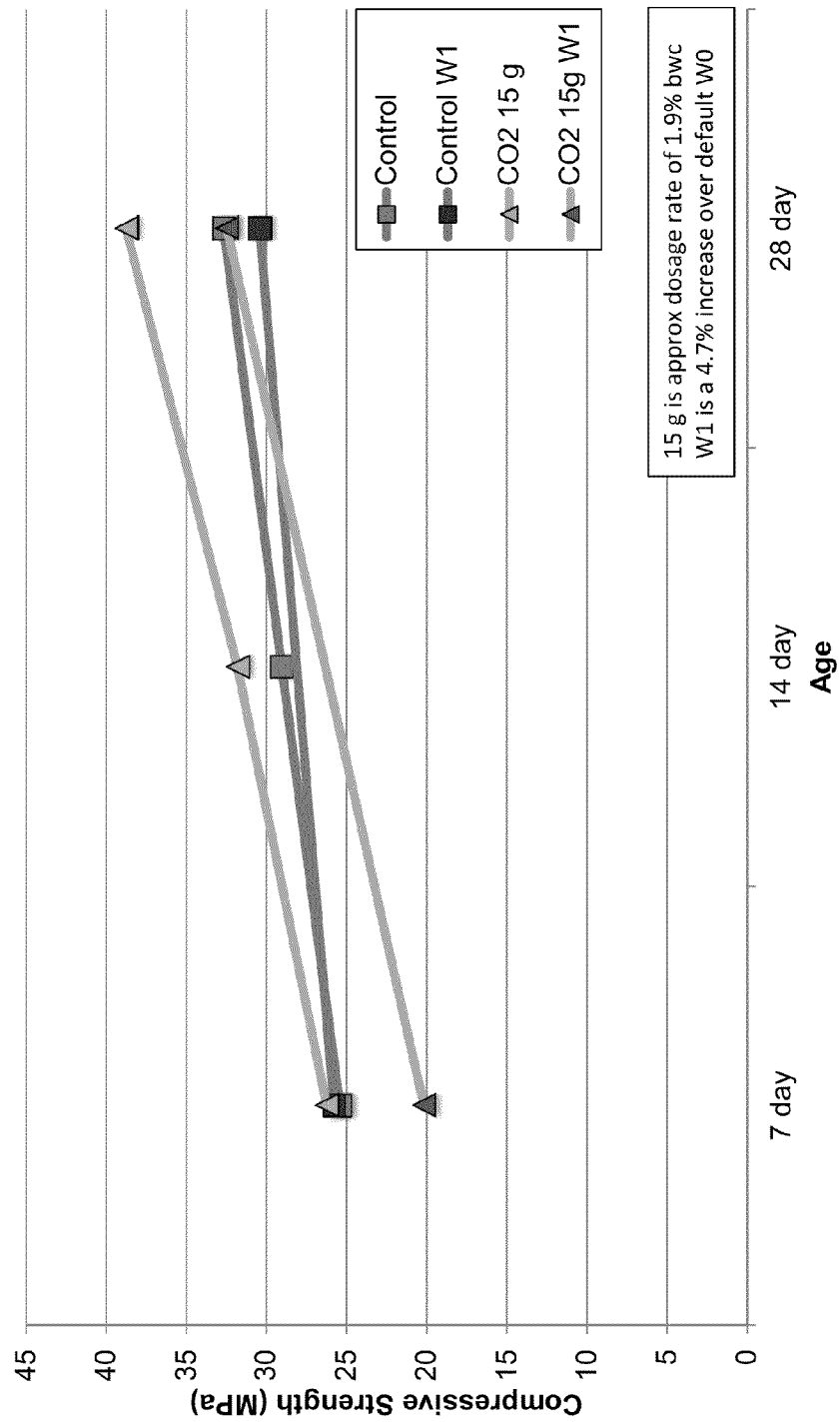
FIG. 9 shows 7-, 14-, and 28-day compressive strengths of concrete prepared from wet mixes exposed to carbon dioxide with two different water contents.
Figure 10:
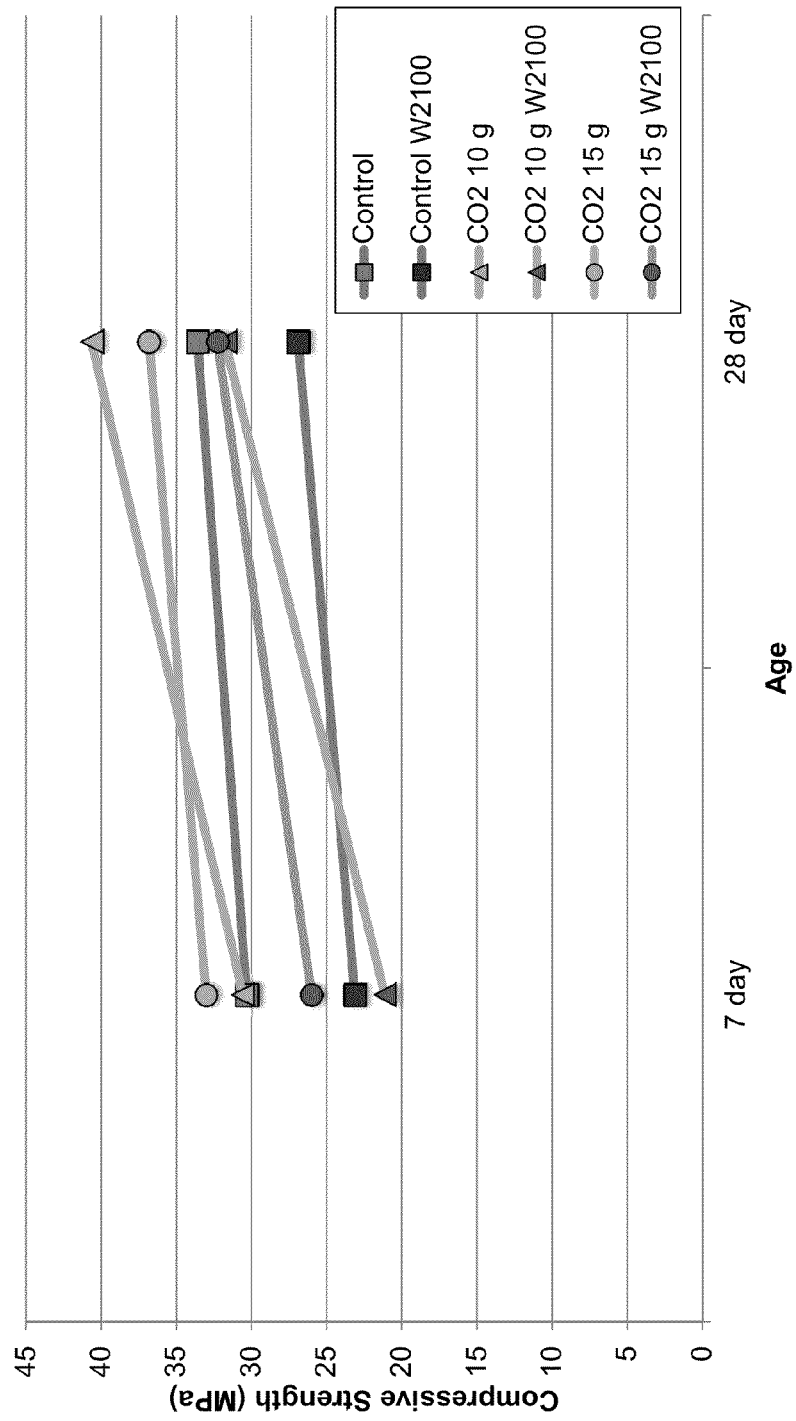
FIG. 10 shows 7- and 28-day compressive strengths of concrete prepared from wet mixes exposed to carbon dioxide at two different doses and two different water contents.
Figure 11:
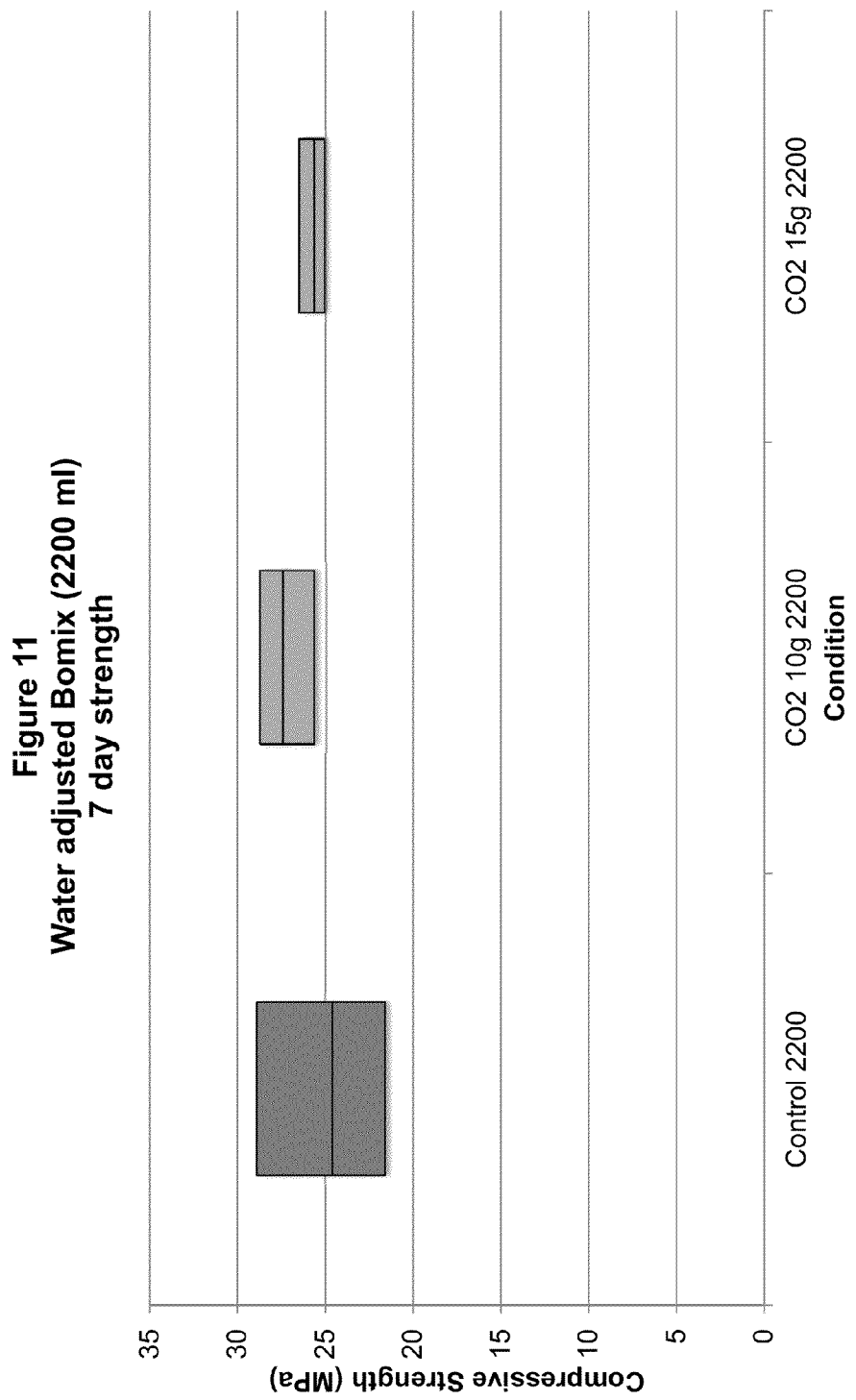
FIG. 11 shows 7-day compressive strengths of concrete prepared from wet mixes exposed to carbon dioxide at two different doses and higher water content.
Figure 12:
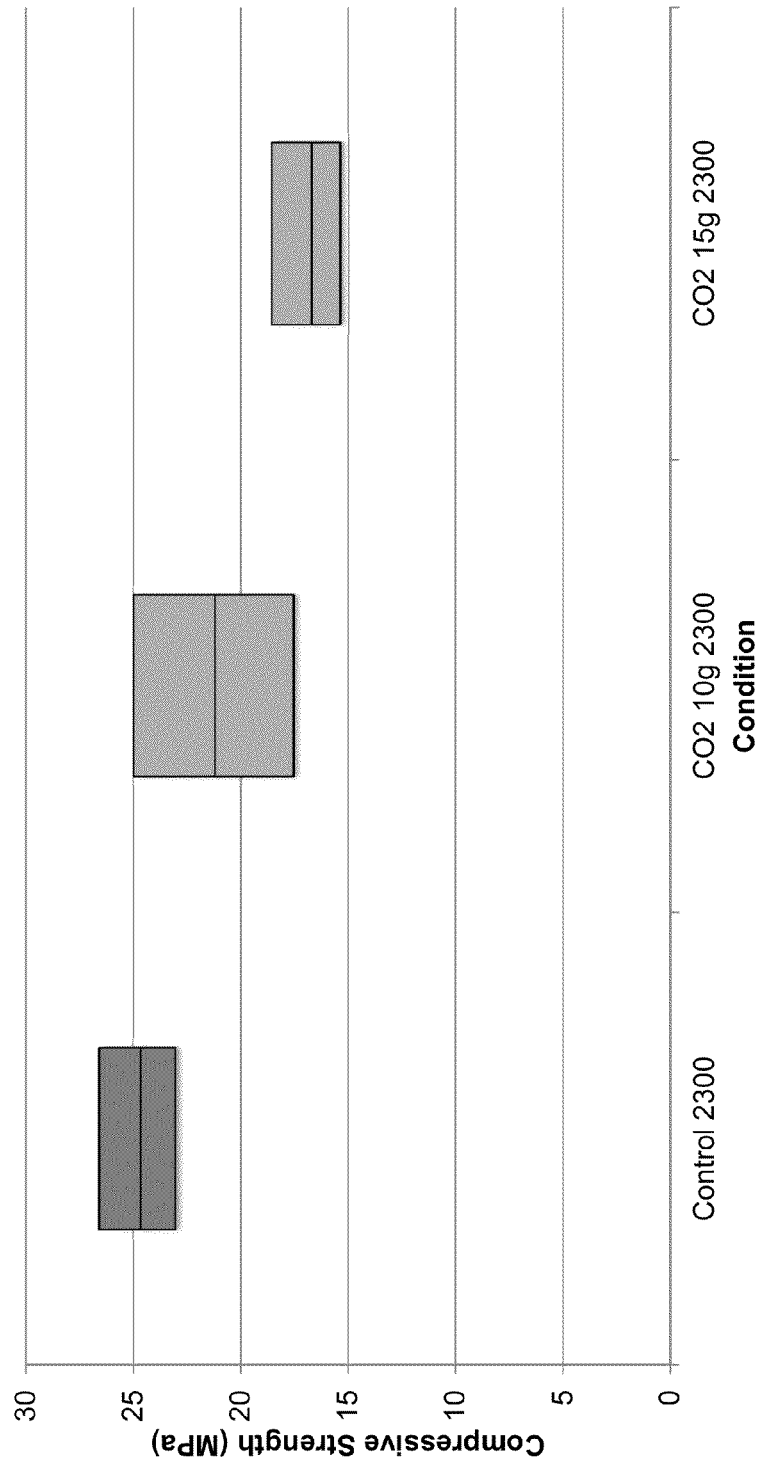
FIG. 12 shows 7-day compressive strengths of concrete prepared from wet mixes exposed to carbon dioxide at two different doses and higher water content.
Figure 13:
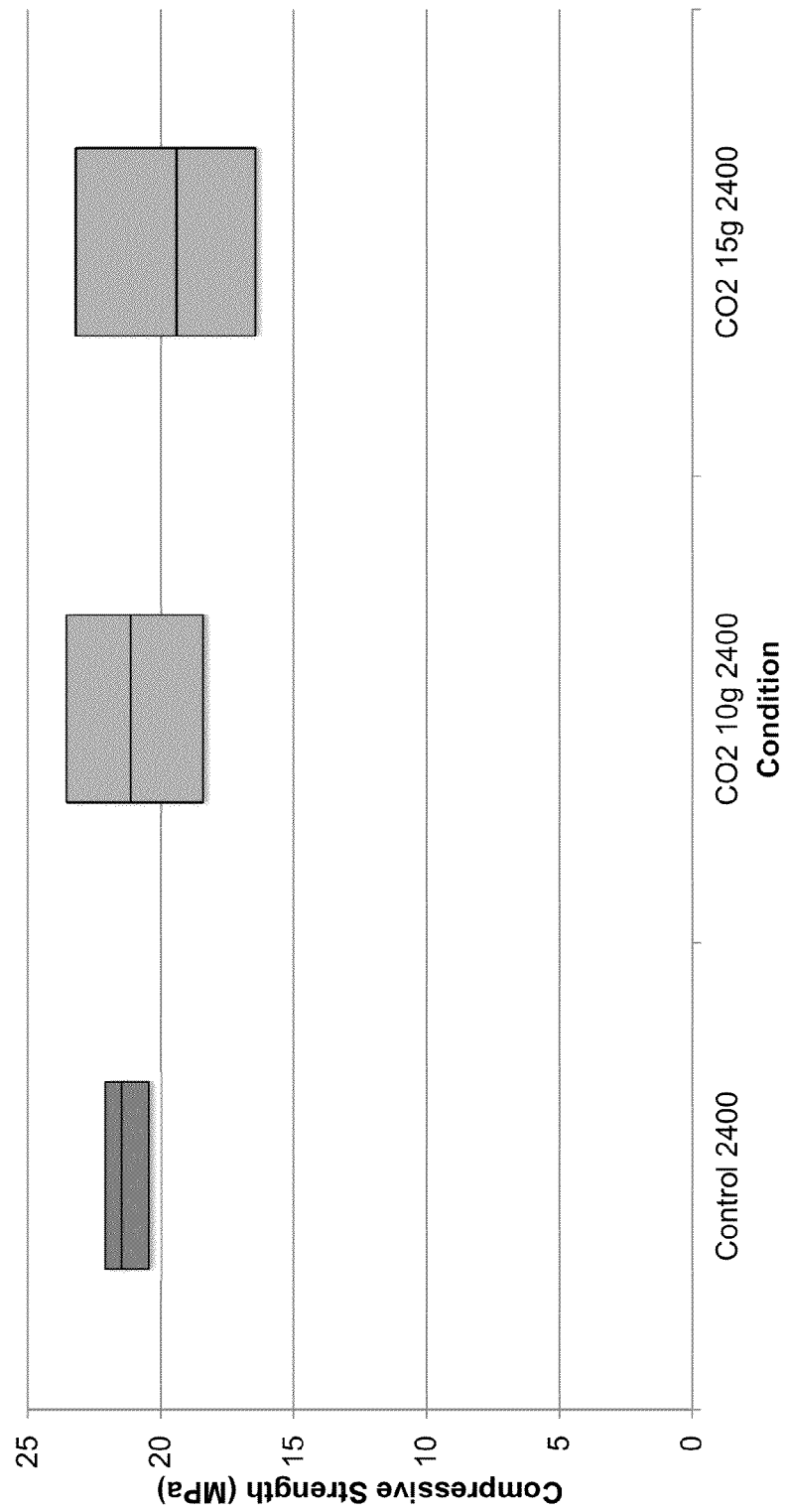
FIG. 13 shows 7-day compressive strengths of concrete prepared from wet mixes exposed to carbon dioxide at two different doses and higher water content.

In a third experiment, additional water was added to compensate for reduced flowability (slump) observed in the concrete mixes contacted with carbon dioxide in the previous experiments. Concrete mixes were prepared as in the second experiment, except the dosages of carbon dioxide used was 15 g per cylinder (1.9% carbon dioxide bwc). In addition, in one set of both control and carbon dioxide batches, the second water addition was increased to give a total water that was 4.7% increased over the default water addition 7-, 14-, and 28-day compressive strength tests were conducted. The results are shown in FIG. 9. Even with the additional water the concrete mix contacted with carbon dioxide showed a 28-day strength comparable to control.

Figure 14:
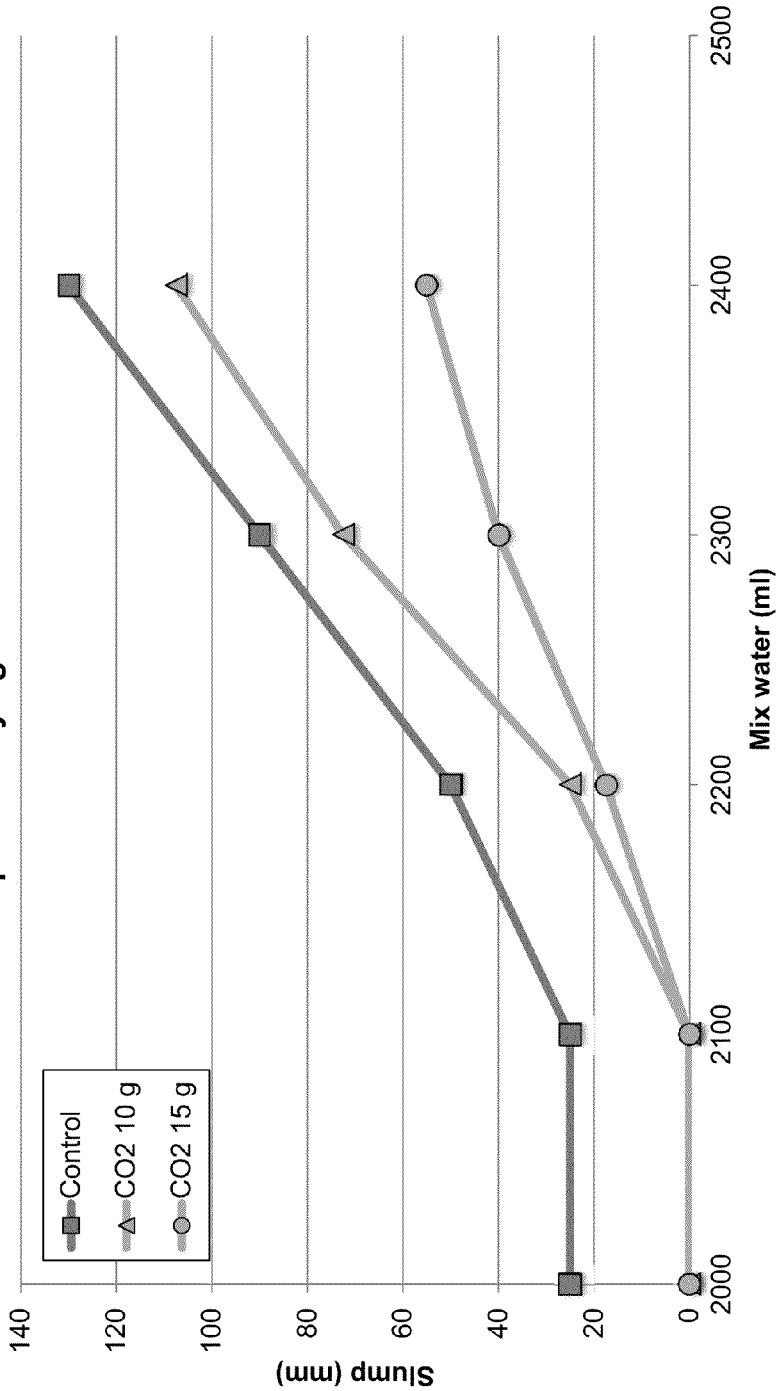
FIG. 14 shows slump of concrete wet mixes exposed to carbon dioxide at two different doses and five different water contents.

In a fourth experiment, various additional water amounts were investigated. Concrete mixes were prepared as in the second experiment, except the dosages of carbon dioxide used was 10 or 15 g per cylinder (1.3 or 1.9% carbon dioxide bwc, respectively). In addition, in sets of both control and carbon dioxide batches, the second water addition was increased to give a total water that was 2100, 2200, 2300, 2400, or 2500 ml/20 kg dry mix, compared to 2000 ml/kg for control batches. The amount of water on the first addition was 60% of the total water so the w/c at time of carbon dioxide was increased as mix water was increased. 7- and 28-day compressive strength tests were conducted. The results are shown in FIGS. 10-13. Slump tests were also conducted and the results are shown in FIG. 14. Additional water partially compensated for the decrease in slump with carbon dioxide addition, especially at the lower carbon dioxide dose. 7 day strength was comparable to control for most doses of water.

Example 2

This example describes retrofitting an existing ready mix truck with a system for contacting a wet concrete mix in the drum of the truck with carbon dioxide while the concrete mix is mixing.

A ready mix concrete truck was retrofitted for delivery of carbon dioxide to the mixing concrete mix. A flexible rubber tube of approximately ¾" diameter was brought to the ready mix site and the ready mix truck was retrofitted by running a flexible rubber tubing for delivery of carbon dioxide in parallel with existing tubing for delivery of water to allow delivery of carbon dioxide to the drum of the truck at the high end of the drum while a hydraulic cement mix, e.g., concrete, was mixing in the drum. The opening of the tube was positioned 0.5 to 2 m from the concrete in the truck. The truck was a six cubic meter transit mixer. A source of carbon dioxide was attached to the flexible rubber tubing. In this example, the source of carbon dioxide was a liquid carbon dioxide supply, heater (ethylene glycol), gas buffer tank, gas metering equipment, and gas output, to supply carbon dioxide of at least 99% concentration. The gas delivery trailer took liquid carbon dioxide, metered by a pressure regulator and ran it through a heat exchanger where hot liquid glycol (antifreeze) heated it to change the liquid carbon dioxide into a gas. The gas was stored in the receiver tanks on a mobile cart which can be wheeled out of the trailer to a location inside the plant. A touchscreen was used to program the correct dose of carbon dioxide to be delivered during the concrete making process. Valves and sensors were used to meter the gas correctly. Hoses were used to connect between the trailer, cart and manifolds and the manifolds attach to the concrete making machine to deliver the gas dose in the correct location. In industrial trials the gas line was ¾" diameter.

In another ready mix truck retrofit, the truck was retrofitted by connecting the carbon dioxide source to the drum through the water line release. The water line went from the water tank on the truck to a T junction. Going up from the T sent the water into the drum. Going down from the T was a drain to empty the line onto the ground. The water supply was turned off when not in use, essentially connecting the outlet to the drum. By booking the gas supply into the outlet, in this example, the parallel line approach was avoided and it was only necessary to use a carbon dioxide supply and a conduit to connect to the T junction.

Example 3

This example describes the use of carbon dioxide to contact a mixing concrete mix in a ready mix truck.

The retrofitted ready mix truck described in Example 2 was used. The components of a batch of concrete were added to the drum of the truck, including cement mix and aggregate. While the hydraulic cement mix was mixing, carbon dioxide in a gaseous mixture that was at least 99% carbon dioxide was introduced into the drum at a flow rate of 750, 1500, or 2250 liters per minute for 180 seconds, for a total carbon dioxide dose of 0.5%, 1.0%, or 1.5% bwc, respectively. The drum remained open to the atmosphere during the carbon dioxide addition. After the flow of carbon dioxide had stopped, additional water was added to the mixing concrete to bring the w/c ratio of the concrete to 0.45. The truck received the concrete and the carbon dioxide at the batching bay, and delivered the concrete to an adjacent building where testing was done and samples were made. Tests were conducted for temperature, slump, and air content, and cylinders were made for strength and flexural strength.

In a second mixing example, carbon dioxide was added before any additional water was added to the mix, and the water in the mix during carbon dioxide addition was due to water in the aggregate mix, which had been exposed to water before addition. The aggregate was wet and with the addition of the wet aggregate the water content of the resulting hydraulic cement mix (concrete) was a w/c ratio of 0.17. Final mix water was achieved by adding water to the truck manually attain desired consistency.

Example 4

This example describes retrofitting a stationary pan mixer used to mix concrete for use in a precast concrete operation with a system for contacting the mixing concrete in the mixer with carbon dioxide. A gas line was attached to a carbon dioxide supply and run to a pan mixer for mixing concrete for delivery to a mold. The line was configured to allow a controllable flow of carbon dioxide from the carbon dioxide to the mixer for a predetermined time during mixing of the wet mix.

Example 5

This example describes the use of carbon dioxide to contact a mixing concrete mix in a stationary pan mixer and pouring the concrete into molds for precast concrete products. A retrofitted pan mixer as described in Example 4 was used to deliver carbon dioxide to a wet concrete mix in a mixer while the concrete was mixing, for 3 minutes, to obtain a dose of carbon dioxide of 0.5% to 2.5% bwc. The gas line was about 1 m from the concrete.

Example 6

This example describes the use of carbon dioxide to contact mixing concrete mix in two different ready mix operations.

In a first operation, the following mix was used:
30 MPa with a maximum 4" slump
20 mm aggregate—2780 kg
Sand—2412 kg
Washed sand—615 kg
Type 10 GU cement—906 kg
Fly ash—192 kg
Visco 2100—850 ml
ViscoFlow—1650 ml
Water—334 liters The carbon dioxide was added via a ¾" diameter rubber hose clipped to the side of the truck and disposed in the mixing drum to deliver $CO_2$ to the surface of the mixing concrete for 180 sec (controlled manually), at low, medium or high dose, to achieve 0.43, 0.55, and 0.64% $CO_2$ bwc, respectively. Because the aggregate was wet, $CO_2$ was added to the mix before the final addition of water; the w/c of the mix when $CO_2$ was added was calculated to be 0.16. Final water was added immediately after the $CO_2$ addition.

Figure 15:
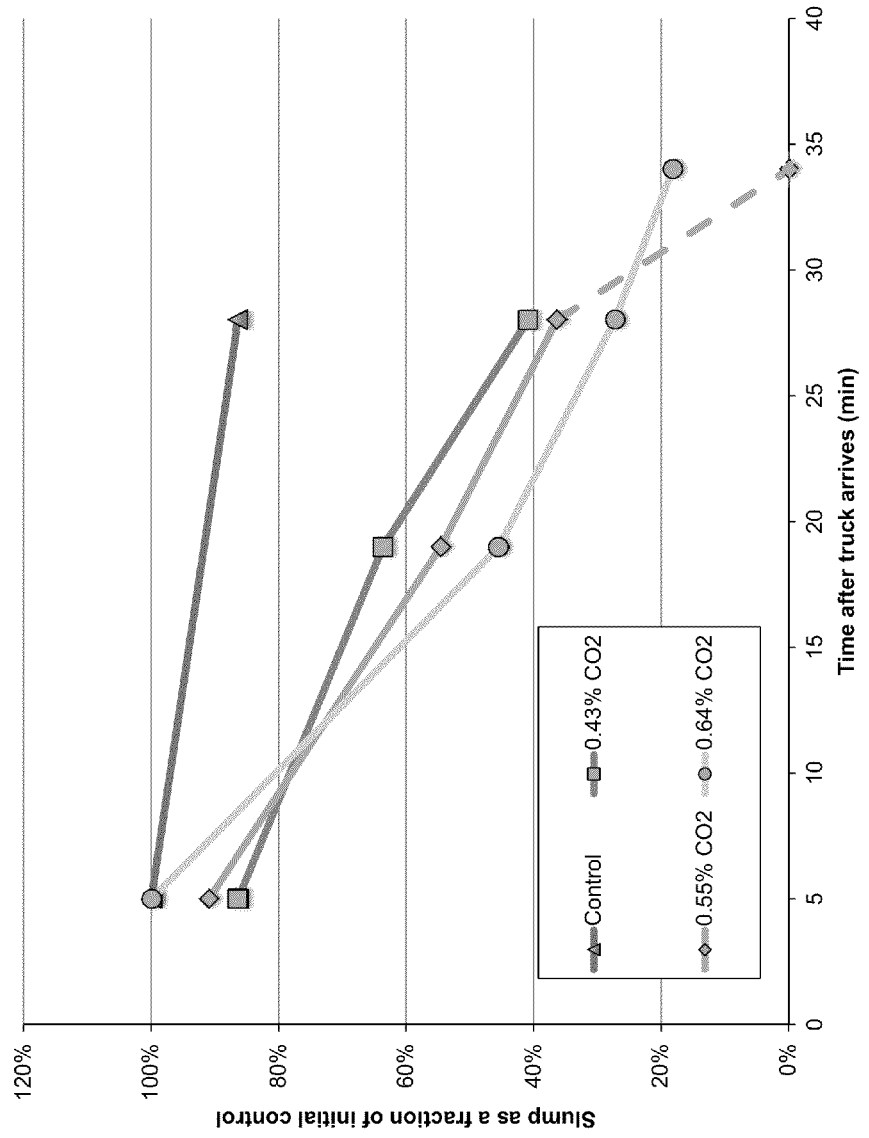
FIG. 15 provides a graphic illustration of slump at various times after truck arrival for carbonated concrete batches prepared in a ready mix operation.
Figure 16:
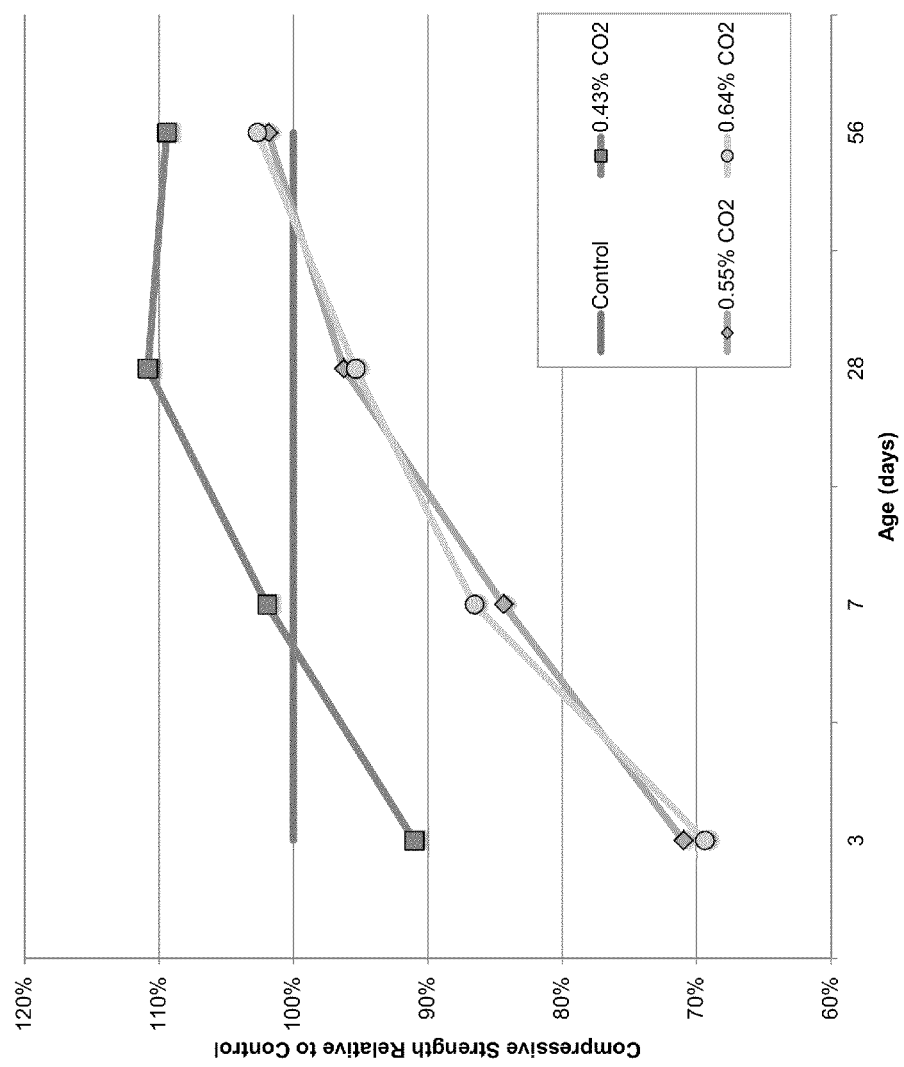
FIG. 16 provides a graphic illustration of compressive strength development in carbonated concrete prepared in a ready mix operation, compared to control, uncarbonated concrete, at 3, 7, 28, and 56 days.

The addition of $CO_2$ greatly reduced slump as time from arrival at site progressed, see FIG. 15. Carbonated concreted showed reduced strength at 7 days compared to control, increasing in strength over time so that by day 56 the carbonated concrete was stronger than uncarbonated at all doses tested. See FIG. 16. The addition of $CO_2$ caused an increase in temperature of the wet cement that was dose dependent, as shown in TABLE 2.

TABLE 2

Effect of $CO_2$ dose on temperature, ready mix

| Mix | Temperature (° C.) |
|---|---|
| Control | 15.2 |
| 0.43% $CO_2$ | 17.0 |
| 0.55% $CO_2$ | 18.4 |
| 0.64% $CO_2$ | 19.4 |

Figure 17:
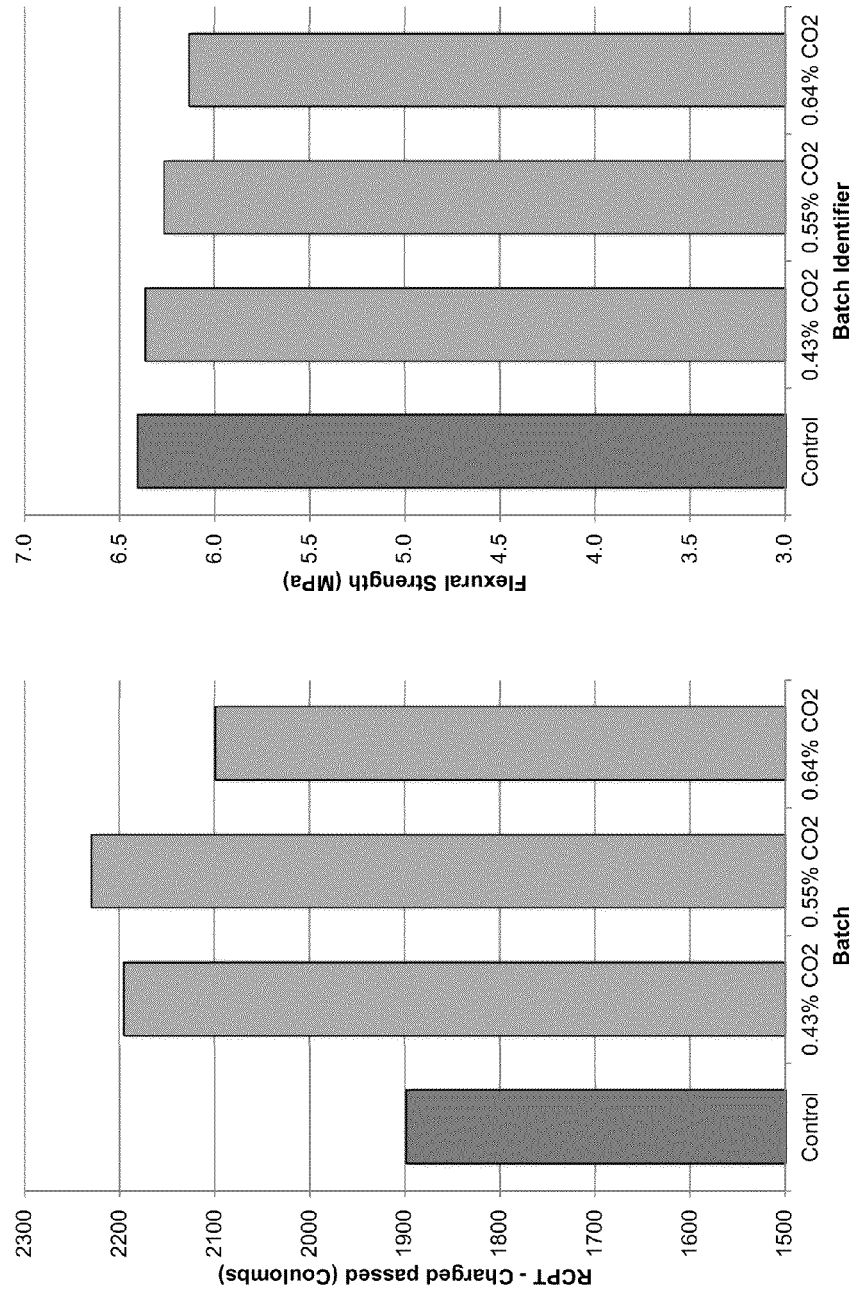
FIG. 17 provides a graphic illustration of A) Rapid chloride penetration tests and B) Flexural strength tests on carbonated concrete prepared in a ready mix operation compared to control, uncarbonated concrete.

Rapid chloride penetration tests (RCPT, using ASTM C1202 Standard Test Method for Electrical Indication of Concrete's Ability to Resist Chloride Ion Penetration) and flexural strength tests were also performed. See FIG. 17. Although RCPT increased with carbonation (FIG. 17A), since the control concrete was at the high end of low (generally considered 1000 to 2000 coulombs) and the carbonated concrete was at the low end of moderate (generally considered to be 2000 to 4000 coulombs) the difference was not considered to be significant. Flexural strength decreased slightly with carbonation (FIG. 17B).

In a second operation, mixes were prepared to meet a pre-determined slump target of 5 inches, with additional water added to carbonated batches as necessary to achieve target slump. The following mix was used:
Sand—770 kg/m3
20 mm Stone—1030 kg/m3
Cement GU—281 kg/m3
Fly Ash (F)—55 kg/m3

Water—165 L/m3
Daracem 50—1400 ml/m3
Darex II—200 ml/m3
Total—2301 kg
Water on CO2 batches increased (unknown amount added after CO2 injection ends) to achieve target slump.

$CO_2$ was introduced into the mixing drum of the ready mix truck via a hose connected at a T-junction to an existing water line that discharged into the mixing drum. As in the previous operation, because the aggregate was wet, $CO_2$ was added to the mix before the final addition of water; the w/c of the mix when $CO_2$ was added was calculated to be 0.16. Final water was added immediately after the $CO_2$ addition. Two doses of $CO_2$ were used, 0.5% and 1.5% bwc, as well as an uncarbonated control. Additional water was added to the carbonated concrete to achieve target slump. The concrete was used in a precast operation on site and arrived 20-25 minutes after the mixing started.

The use of additional water brought the slump of the carbonated concrete to levels comparable to the uncarbonated control, as shown in TABLE 3:

TABLE 3

Slump, temperature, and air content of uncarbonated and carbonated ready mix concretes

| Mix | Air Content | Slump (in) | Temperature (° C.) |
| --- | --- | --- | --- |
| Control | 3.6% | 5.5 | 23.9 |
| 0.5% $CO_2$ | 4.2% | 4.5 | 26.2 |
| 1.0% $CO_2$ | 4.1% | 5 | 28.6 |

For the 0.5% carbonated concrete, two later slump measurements, at 20 min and 35 min after arrival at the job site, were both 5 inches. Further measurements were not obtained for the 1.0% sample.

Figure 18:
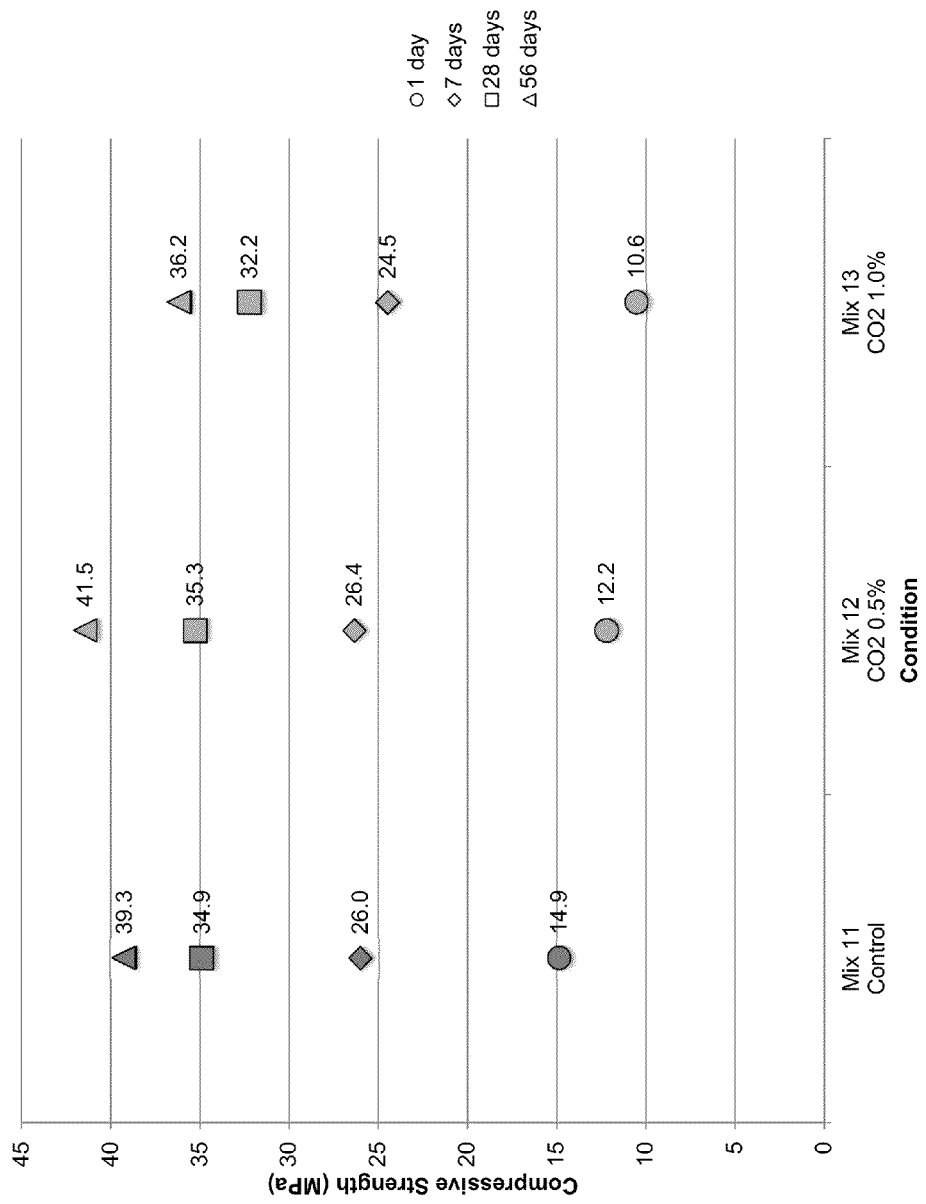
FIG. 18 provides a graphic illustration of compressive strengths at 1, 7, 28, and 56 days for concretes prepared in a ready mix operation with 0, 0.5, or 1.0% bwc carbon dioxide delivered to the concrete.

Compressive strengths of the batches are shown in FIG. 18. The 0.5% $CO_2$ mix showed 85% strength compared to control at 1 day, equivalent strength at 7 and 28 days, and 106% of control strength at 56 days. The 1.0% $CO_2$ mix showed 71% strength compared to control, and 94% at 28 and 56 days. The additional water added to achieve the target slump likely reduced compressive strength of the concrete.

In a third operation, an admixture, sodium gluconate, was used to restore flowability. The following mix was used:
Sand—770 kg/m3
20 mm Stone—1030 kg/m3
Cement GU—336 kg/m3
Water—163 L/m3
Daracem 55—1350 ml/m3

$CO_2$ was introduced into the mixing drum of the ready mix truck via a hose connected at a T-junction to an existing water line that discharged into the mixing drum. As in the previous operation, because the aggregate was wet, $CO_2$ was added to the mix without a first water addition, and before the final addition of water; the w/c of the mix when $CO_2$ was added was calculated to be 0.16. Final water was added immediately after the $CO_2$ addition. Two doses of $CO_2$ were used, 1.0% and 1.5% bwc, as well as an uncarbonated control. Sodium gluconate was added to the 1.5% $CO_2$ batch at dose of 0.05% bwc, after the addition of $CO_2$. The concrete was used in a precast operation on site and arrived 20-25 minutes after the mixing started.

The use of the sodium gluconate brought the slump of the 1.0% carbonated concrete toward levels comparable to the uncarbonated control, as shown in TABLE 4:

TABLE 4

Slump, temperature, and air content of uncarbonated and carbonated ready mix concretes

| Mix | Air Content | Slump (in) | Temperature (° C.) |
| --- | --- | --- | --- |
| Control | 5.9% | 7 | 25.8 |
| 1.0% $CO_2$ | 5.9% | 4 | 28.1 |
| 1.5% $CO_2$ | 4.5% | 3 | 28.6 |

For the 1.0% carbonated concrete (with sodium gluconate), a later slump measurements, at 20 min after arrival at the job site, was 5.5 inches. For the 1.5% carbonated concrete (no sodium gluconate), a later slump measurements, at 15 min after arrival at the job site, was 3.0 inches. Carbon dioxide uptake of the 1.0% dose was 0.44% bwc, for an efficiency of 44%. Carbon dioxide of the 1.5% dose was 1.69% bwc, or 113% efficiency.

Figure 19:
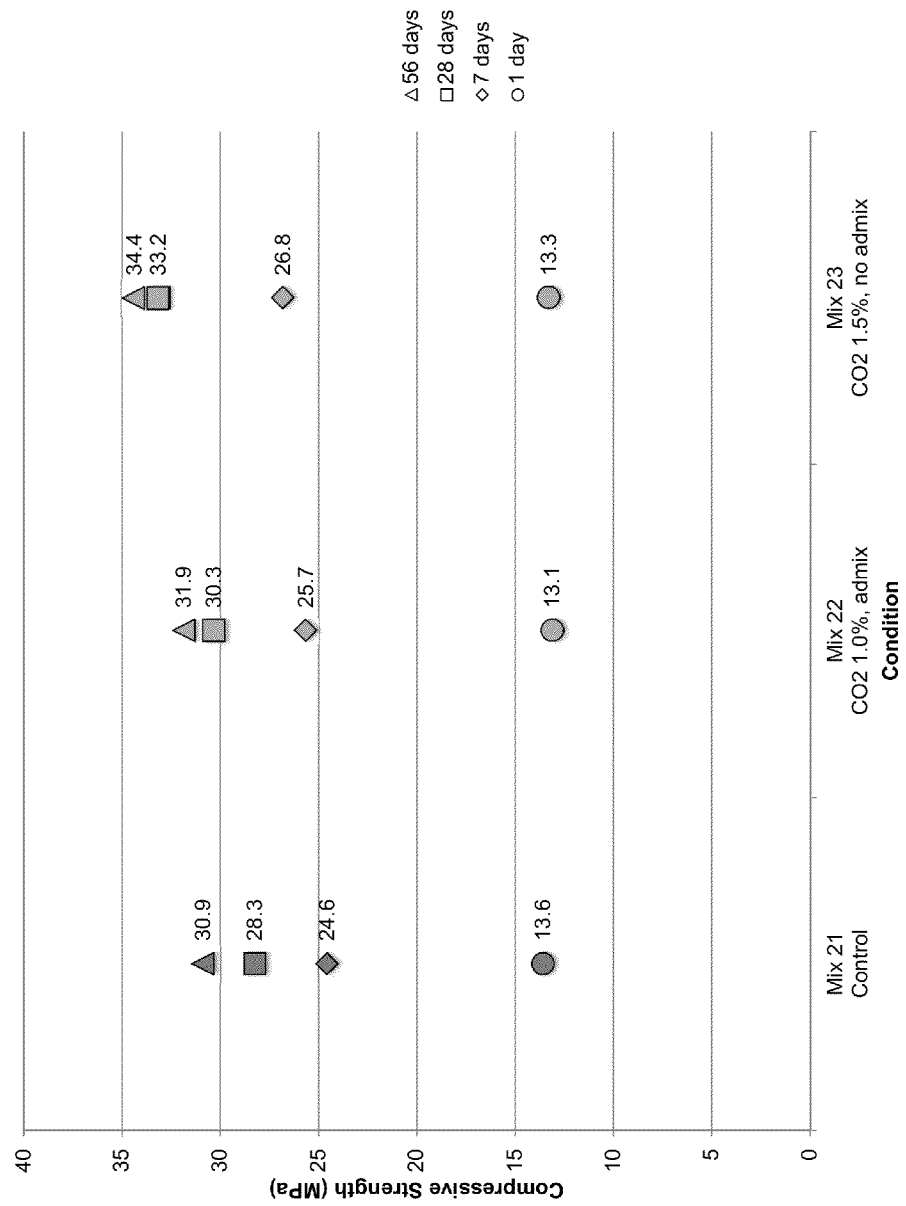
FIG. 19 provides a graphic illustration of compressive strengths at 1, 7, 28, and 56 days for concretes prepared in a ready mix operation with 0, 1.0, or 1.5% bwc carbon dioxide delivered to the concrete, and 0.05% sodium gluconate admixture added to the 1.5% batch.

Compressive strengths of the batches are shown in FIG. 19. The 1.0% concrete (with sodium gluconate) had a compressive strength of 96, 107, and 103% of control at 1, 28, and 56 days, respectively. The 1.5% concrete (no sodium gluconate) had a compressive strength of 98, 117, and 109% of control at 1, 28, and 56 days, respectively. The 1.5% CO2 concrete had a reduces slump but was still usable.

This example illustrates that carbonation can reduce slump in wet mix used in ready mix operations. Depending on the mix, the slump may be such that remedial measures, such as use of additional water, use of admixture, or both, are necessary; as illustrated by this example, these measures can restore slump to acceptable levels without major alteration in the strength of the concrete.

Example 7

This example describes the use of an admixture to modulate compactability/strength of a dry cast concrete mix. Several different tests were performed.

Work had identified that carbonation of fresh concrete prior to formation reduced the mass of an industrially produced carbonated dry mix product in certain mixes. Dry mix products are made to a constant dimension so lower mass resulted in lower density which can contribute to lower strength. A lab investigation pursued novel admixtures to address the density issue. Sodium gluconate was studied in a lab program. In conventional concrete sugars are known to be set retarders. The work investigated its use in conjunction with carbonated fresh concrete to see if the sodium gluconate would act in relation to the reaction products causing the density issue.

In a first test, the mix design was a dry mix concrete with the following proportions
1.75 kg cement
15.05 kg SSD (saturated surface dry) fine aggregate
7.00 kg SSD (saturated surface dry) coarse aggregate
1.19 kg mix water
Target water was 6.05% by mass of the concrete The admixtures used were: 1) Sodium gluconate to improve density—it was prepared as a solution of 36.8 g of sodium gluconate per 100 ml of water. It was dosed into the concrete as a mass of solid sodium gluconate by weight of cement; 2) Rainbloc 80—a water repellency admixture for Concrete Masonry Units; and 3) ProCast 150—an admixture for use in concrete masonry units. The two commercial admixtures were dosed based upon mL/100 kg cementitious materials as per manufacturer's specifications.

Samples were mixed according to the following procedure:
Aggregate is introduced first and mixed until homogenous.
Cement is introduced and mixed for 30 s until homogenous.
Mix water is added over 15 seconds.
The concrete is mixed for a total of 4 minutes starting from the water addition.
In the case of CO2 batches the following modified sequence was used:
1 minute mixing all materials
Initial temperature is recorded
CO2 gas is injected over the surface of the mixing concrete at 100 LPM for required time based on test plan. The gas is nominally retained in the bowl by use of a cover that accommodates the movement of the mixing mechanism. The mixing proceeds during the gas delivery.
Final temperature is recorded.
Admixtures are introduced to mix—always post carbonation
Mix for additional time to attain a total of 4 minutes mixing.

Concrete samples were formed according to the following procedure
Concrete was formed into standard 100 mm diameter cylinder molds
3.5 kg of dry mix materials were introduced into the molds and compacted using a specially designed pneumatic ram which applies 95-100 psi of pressure directly under vibration onto the cross section of the concrete mass
A steel trowel was used to remove any excess materials from the top of the mold and level the surface of the test specimen.
The mass of the cylinder was recorded.
Test specimens were set to cure in a lime water bath, in accordance with ASTM C192

The first trial produced four concretes: 1) Control; 2) Control with 0.05% sodium gluconate; 3) CO2; 4) CO2 with 0.05% sodium gluconate. The cylinder unit mass (mass of a constant volume of concrete) was understood as an estimate of product density. 6 samples were produced.

With the control density as the standard, the control with sodium gluconate had a relative density of 98.8%, the carbonated concrete was 94.0% and the carbonated concrete with sodium gluconate was 93.4%. Thus, addition of 0.05% sg to control reduces cylinder density 1.2%, application of $CO_2$ reduces cylinder density 6%, and addition of 0.05% sg to CO2 treated concrete did not improve cylinder density. The dose is too low.

Figure 20:
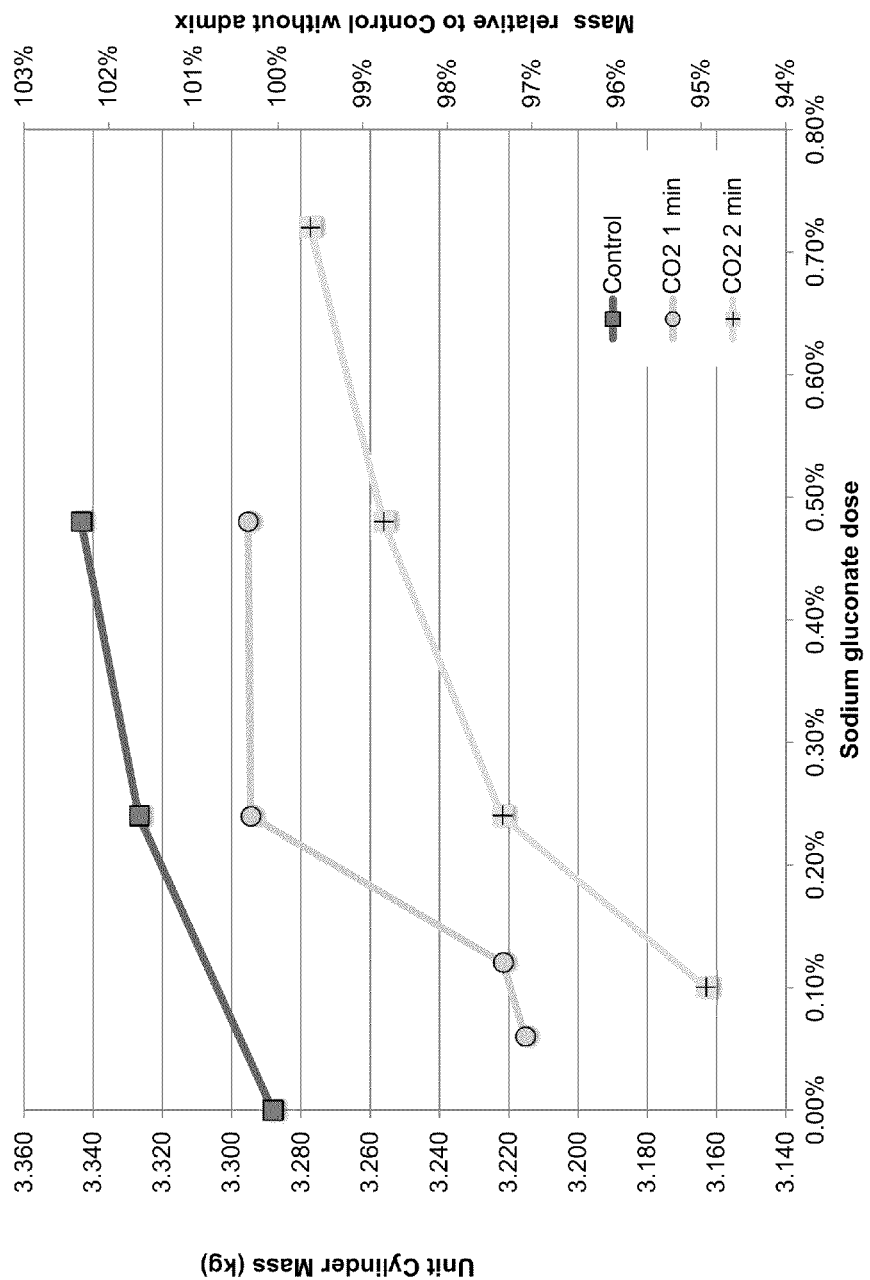
FIG. 20 provides a graphic illustration of cylinder mass for constant volume cylinders (density), a proxy for compressive strength, in dry cast concrete prepared as uncarbonated or carbonated for 1 or 2 minutes, with addition of sodium gluconate admixture at various concentrations.

In a second trial, the same conditions for sample preparation as for the first trial were used, with the following carbonation and sodium gluconate conditions:
Uncarbonated with 0, 0.24% and 0.48% sodium gluconate
CO2 for 1 minute with 0.06%, 0.12%, 0.24% and 0.48% sodium gluconate
CO2 for 2 minutes with 0.10%, 0.24%, 0.48% and 0.72% sodium gluconate The effects of various doses of sodium gluconate on density, which can be considered a proxy for strength, is shown in FIG. 20. Applying CO2 decreased the cylinder unit mass (proxy for density). Increasing the amount of CO2 absorbed by the concrete correspondingly increased the amounts of sodium gluconate to offset the density shortcoming. Increasing the sodium gluconate dose increased the density of all concretes over the range considered. The control concrete cylinder unit mass increased 1.7% at a dose of 0.48% sodium gluconate. For 1 min of CO2 the sodium gluconate dosages of 0.24% and 0.48% both resulted in a cylinder mass equivalent to the control. For 2 minutes of CO2 the cylinder mass was 99% of the control at a sodium gluconate dosage of 0.48% and matched the control cylinder mass when the dose reached 0.72%

Figure 21:
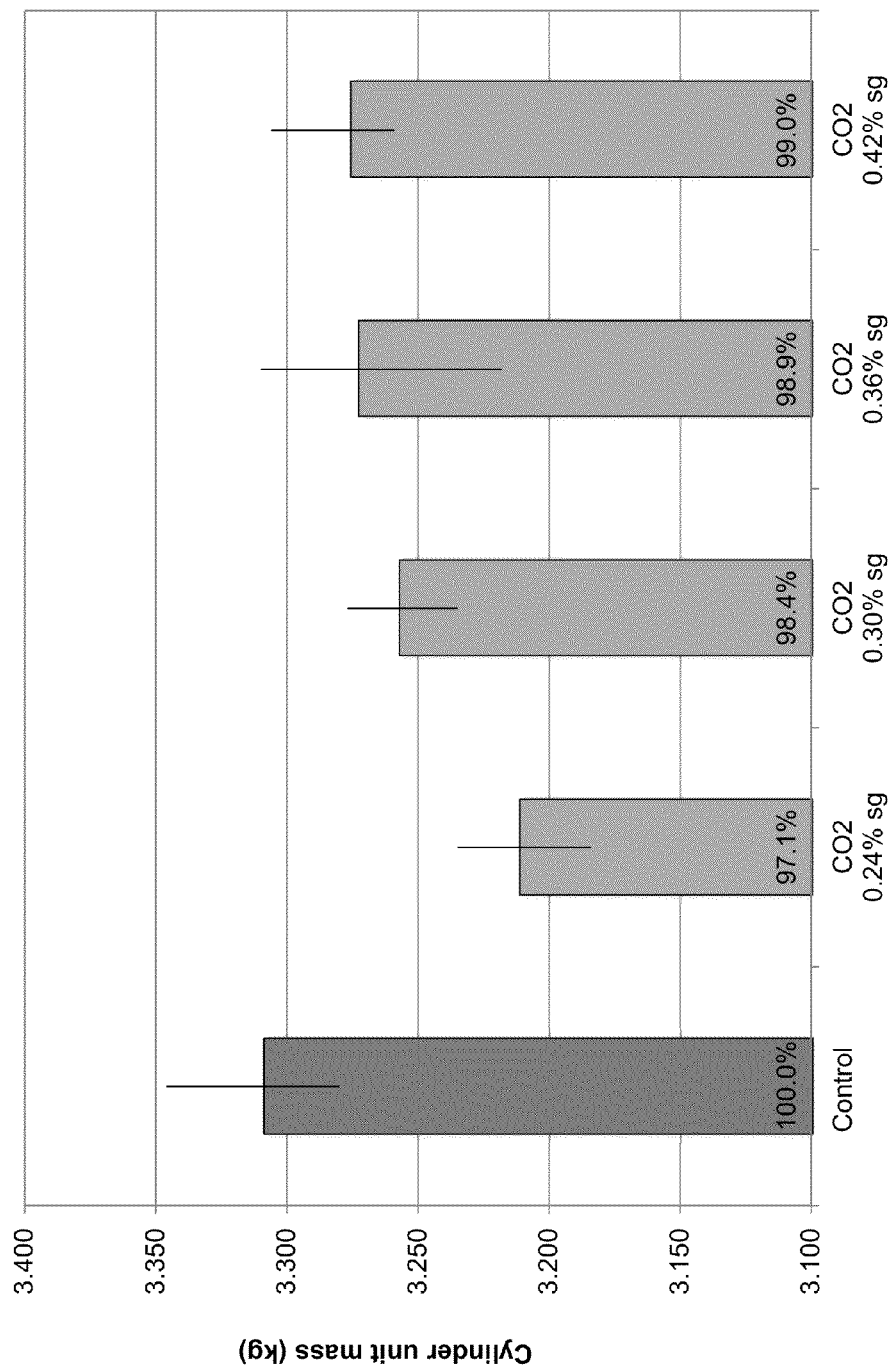
FIG. 21 provides a graphic illustration of cylinder mass for constant volume cylinders (density), a proxy for compressive strength, in dry cast concrete prepared as uncarbonated or carbonated for 90 s at 50 LPM with addition of sodium gluconate admixture at 0.24, 0.30, 0.36, or 0.42% bwc.

In a third trial, the same conditions for sample preparation as for the first trial were used, with carbonation at 50 LPM for 90 seconds and the following sodium gluconate conditions:
Control
CO2 with 0.24% sodium gluconate
CO2 with 0.30% sodium gluconate
CO2 with 0.36% sodium gluconate
CO2 with 0.42% sodium gluconate Cylinder mass (density, assuming all cylinders are of equal volume) was measured, and compressive strength measured at 1, 3, and 7 days. Cylinder densities are shown in FIG. 21. Applying CO2 decreased the cylinder unit mass (proxy for density). Increasing the sodium gluconate dose increased the density over the range considered. The effect plateaued somewhat at the higher doses suggested the preferred dose is potentially in the 0.30% to 0.42% range. Without gluconate the cylinder mass of a carbonated product is about 7% less than the control. A gluconate dose of 0.30% brought the mass to 3% under the control. A dose of 0.42% brought the mass to 4% less than the control. The compressive strengths of the sodium gluconate treated samples were comparable to those of the control sample at doses of 0.30% and above.

Figure 22:
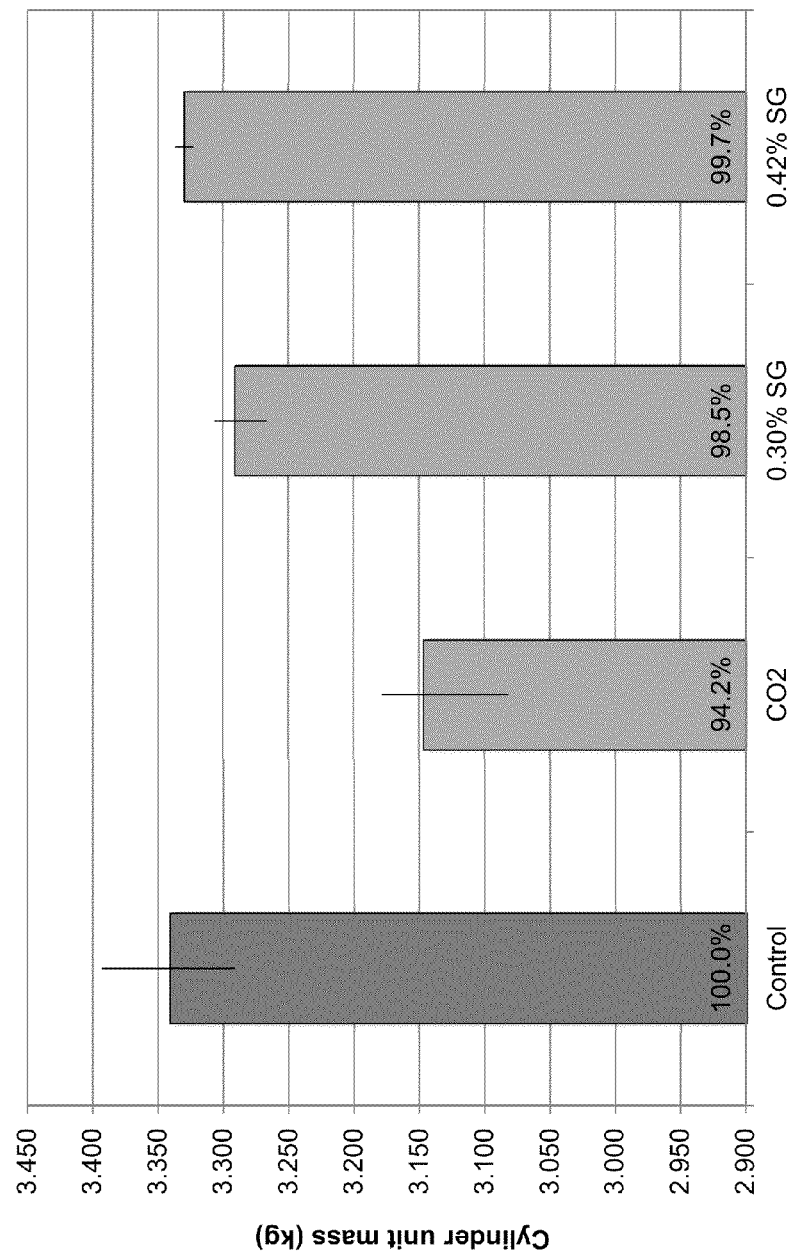
FIG. 22 provides a graphic illustration of cylinder mass for constant volume cylinders (density), a proxy for compressive strength, in dry cast concrete prepared as uncarbonated or carbonated for 90 s at 50 LPM with addition of sodium gluconate admixture at 0.30 or 0.42% bwc.

In a fourth trial, the same conditions for sample preparation as for the first trial were used. Carbonation was at 50 LPM for 90 seconds and the following sodium gluconate conditions:
Control
CO2
CO2 with 0.30% sodium gluconate
CO2 with 0.42% sodium gluconate All concretes contained Rainbloc (0.32%). It was added with the mix water. The cylinder unit mass (mass of a constant volume) was measured as a test of product density. 6 samples were produced. The strength was measured at 1, 3 and 7 days. Cylinder densities are shown in FIG. 22. The application of CO2 reduced the density (by 6%) and strength of the concrete product The use of sodium gluconate improved the density and strength. 0.3% sodium gluconate was sufficient to make carbonated concrete with 98.5% of the density of the control and equivalent strength. 0.42% sodium gluconate produced carbonated concrete with equivalent density and strength to the control. The optimum dose for this combination of cement and mix design proportions appears to be on the order of 0.42% sodium gluconate by weight of cement.

In a fourth trial, the same conditions for sample preparation as for the first trial were used. Carbonation was at 50 LPM for 90 seconds and the following sodium gluconate conditions:
Control
CO2
CO2 with 0.30% sodium gluconate
CO2 with 0.42% sodium gluconate
CO2 with 0.30% sodium gluconate with post-CO2 addition of Procast.

Figure 23:
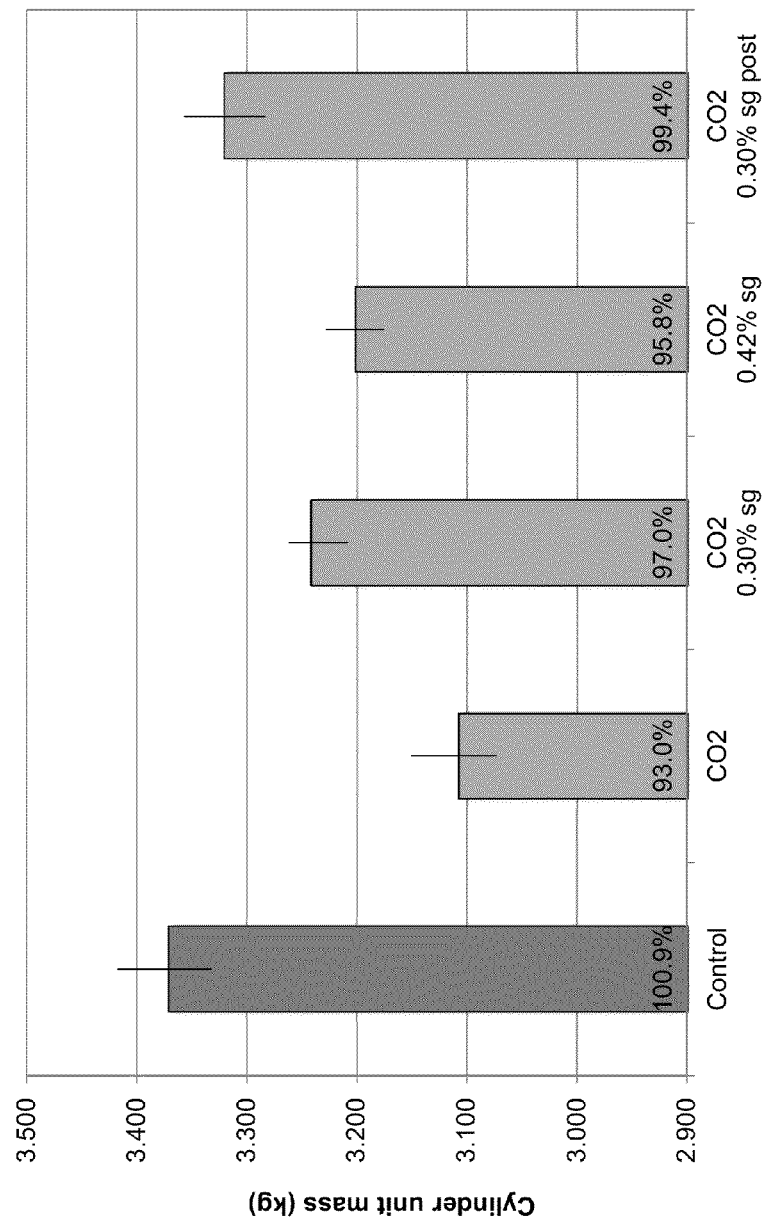
FIG. 23 provides a graphic illustration of cylinder mass for constant volume cylinders (density), a proxy for compressive strength, in dry cast concrete prepared as uncarbonated or carbonated for 90 s at 50 LPM with addition of sodium gluconate admixture at 0.30 or 0.42% bwc. All samples included Rainbloc and Procast admixtures, with one 0.30% sample having Procast added after carbon dioxide delivery.

In contrast to the previous days the cement was a 70/30 blend of white cement and OPC. All batches contained Rainbloc (0.32%) and Procast 150 (0.64%). The Rainbloc was added with the mix water while the Procast 150 was tried both as part of the mix water and as an addition after the carbon dioxide treatment. The strength was measured at 1 (2 samples), and 7 days (4 samples). Cylinder densities are shown in FIG. 23. The carbonation treatment produced a compacted concrete product that was 7% less dense than the control. The density was improved by adding sodium gluconate. A dose of 0.30% sodium gluconate improved the density to 97% of the control. A further increase to 0.42% produced a concrete product with a density of 96%. As compared to the earlier trial that did not include Procast, it is clear that the optimum dosage is sensitive to the presence of other admixtures. Adding the Procast after the carbon dioxide treatment provided improved product density. The timing of the addition of admixtures with respect to the carbon dioxide application is important.

This example illustrates that an admixture, sodium gluconate, can return density and compressive strength of carbonated dry mix samples to those of uncarbonated samples, that the effect is dose-dependent, and that the timing of delivery of additional admixtures added to the mix can affect strength development.

Example 8

This example illustrates the effects of various admixtures on the workability of carbonated mortar mix, prepared as for a wet cast operation.

A mortar mix was prepared containing 535 g Portland cement (Holcim GU), 1350 g sand, and 267.5 g water. $CO_2$ gas was introduced at 20 LPM while mixing. The time of $CO_2$ delivery depended on the target $CO_2$ uptake, for example, to achieve 1.1% bwc the delivery took 3 to 4.5 min.

Three admixtures were used: sodium gluconate, fructose, sodium glucoheptonate. The admixtures were added to carbonated mortar at dosages of 0.05, 0.10 and 0.20% by weight of cement. The dosages reflect solid mass of additive delivered in a solution. The mortars were carbonated while mixing to an uptake of about 1.9% by weight of cement. The admixture was added after the carbonation: after carbonation the temperature of the sample was measured, then the admixture was added and the sample was remixed to homogenize.

The slump of the produced mortar was measured as an assessment of workability. Slump was measure immediately after the end of mixing using a Cement & Mortar Testing Equipments Transparence Acrylic Mini Slump Cone Test Apparatus (NL SCIENTIFIC INSTRUMENTS SDN. BHD. Malaysia.). Samples were rodded in two lifts, TK.

Figure 24:
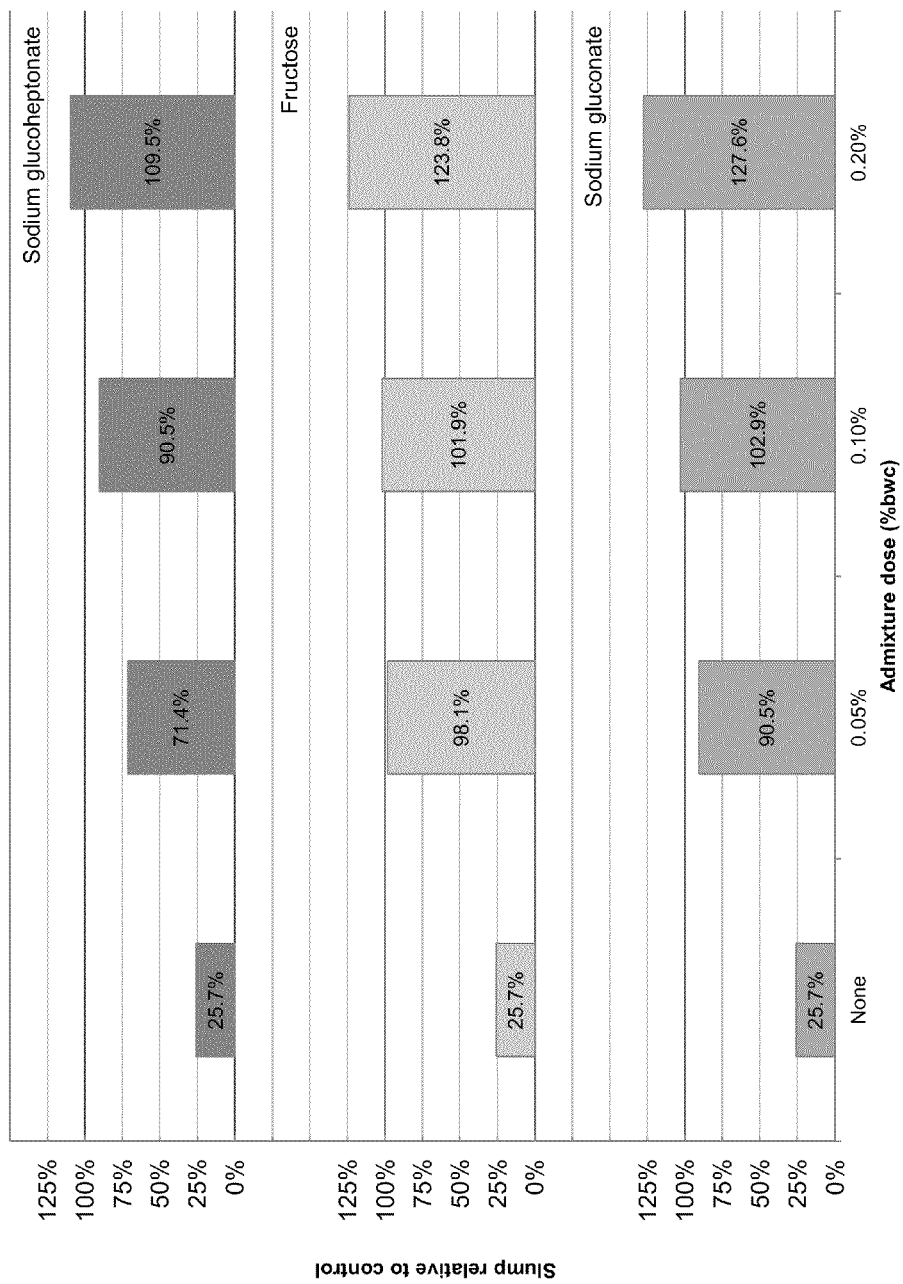
FIG. 24 provides a graphic illustration of slump, relative to untreated control, in carbonated mortar mixes treated with sodium glucoheptonate, fructose, or sodium gluconate at various concentrations.

Carbonation greatly decreased the mortar slump, while each of the admixtures, added after carbonation, improved slump. The carbonated slump matched the control upon addition of 0.05% fructose, 0.10% sodium gluconate or 0.2% sodium glucoheptonate. See FIG. 24.

Figure 25:
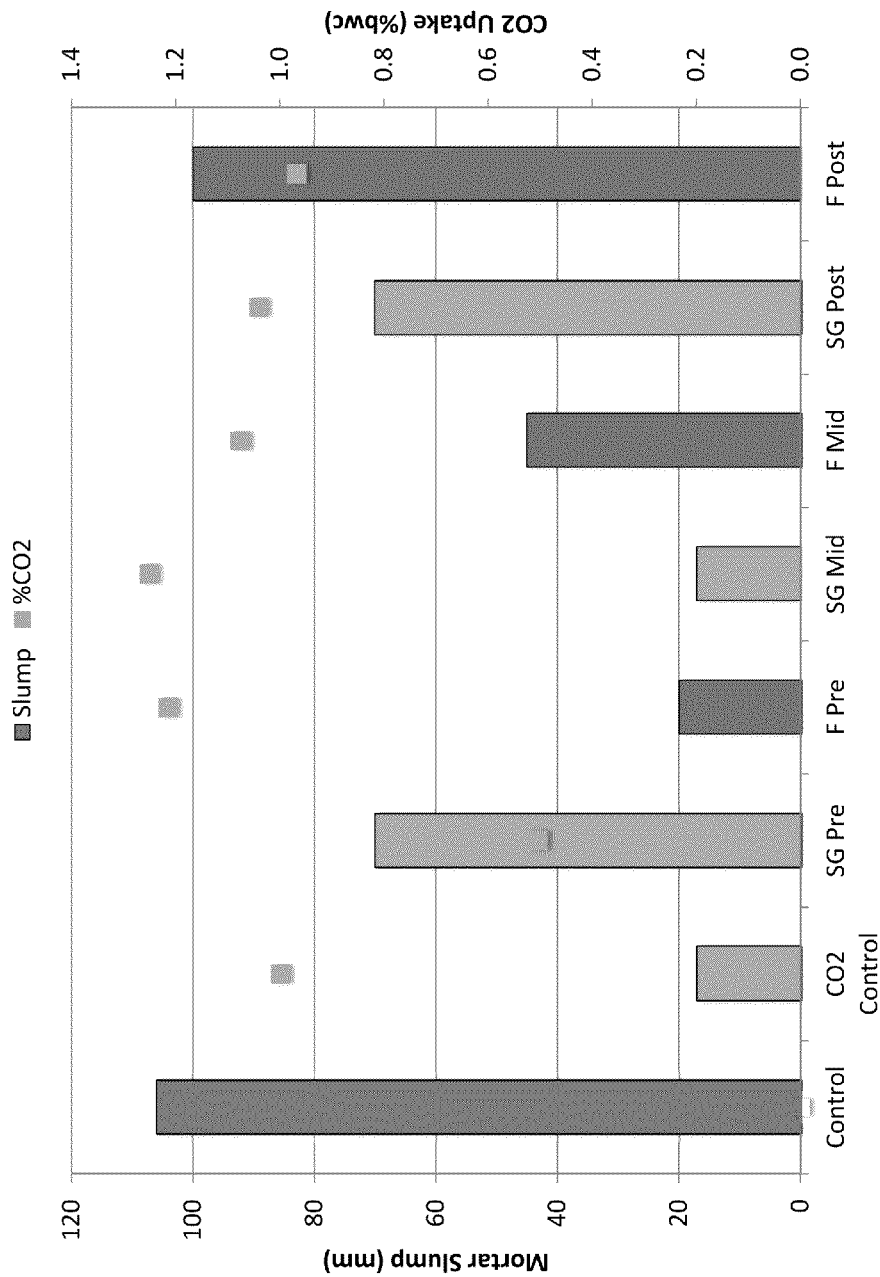
FIG. 25 provides a graphic illustration of effects on slump of fructose or sodium gluconate added to a mortar mix pre-, mid-, or post-carbonation.

In a second test, mortar mixes were prepared and carbonated as above, and either fructose or sodium gluconate was added before (Pre), during (Mid), or after (Post) carbonation, and the $CO_2$ uptake as well as slump was measured in the mortar mix. It was seen that the addition of admixture either Pre or Mid carbonation did not appreciably correct the decrease in slump caused by carbonation, whereas the addition of admixture Post carbonation greatly improved the slump (the apparent improvement in slump in the sodium gluconate Pre sample can be attributed to the anomalously low carbon dioxide uptake of this sample); this was true for both sodium gluconate and fructose. See FIG. 25.

Example 9

This example illustrates the effect of the time of addition of admix on workability and strength development in a carbonated mortar mix, as for a wet cast operation.

In a first test, mortar mix was prepared containing 535 g Portland cement (Holcim GU), 1350 g sand, and 267.5 g water. CO2 gas was introduced at 20 LPM while mixing. The time of CO2 delivery depended on the target CO2 uptake, for example, to achieve 1.1% bwc the delivery took 3 to 4.5 min. Mortar cubes were created with C109M-12 Standard Test Method for Compressive Strength of Hydraulic Cement Mortars. All samples contained 0.10% bwc PCE to assist casting of cubes.

Figure 26:
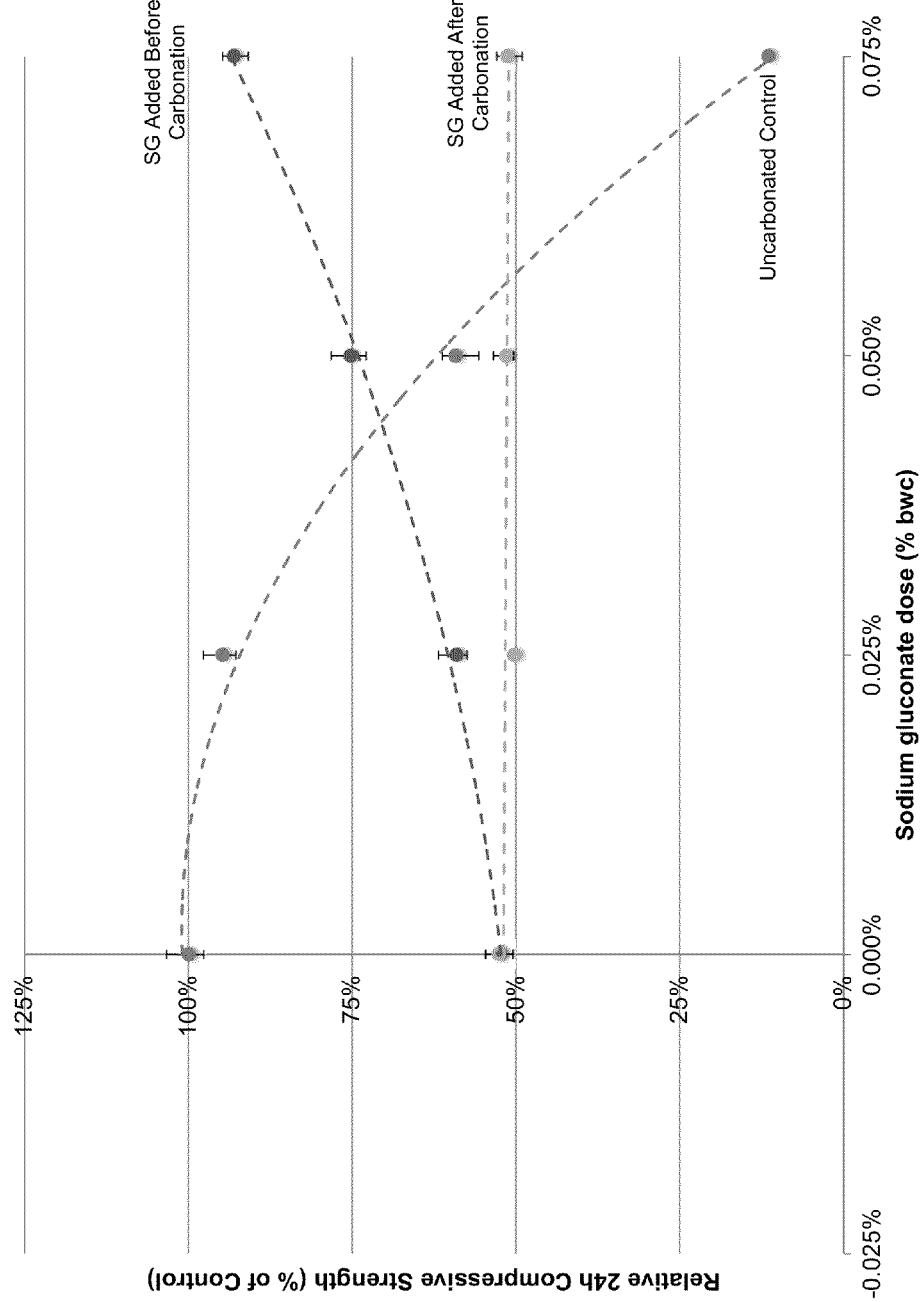
FIG. 26 provides a graphic illustration of effects on 24-hour compressive strength, compared to uncarbonated control, of a carbonated mortar preparation in which sodium gluconate was added either before or after carbonation at doses of 0, 0.025, 0.05, and 0.75%.

Sodium gluconate was added either before or after carbonation, at 0, 0.025, 0.05, and 0.075% bwc. Compressive strength at 24 hours was measured at 24 hours and compared to uncarbonated control. See FIG. 26. The sodium gluconate added after carbonation did not affect the 24-hour compressive strength, whereas sodium gluconate added before carbonation improved 24-hour compressive strength, but the mix was found to be stiff. The mix with sodium gluconate added after carbonation was workable, but strength development was adversely impacted.

In a second test, mortar was prepared and carbonated with or without sodium gluconate, added before or after carbonation, as in the first test, except the cement was Lehigh cement. The results were similar to those for mortar prepared with Holcim cement: When added after $CO_2$ the admix was a retarder and resulted in lower strengths at 24 hours. When added before the $CO_2$ the retarding effect was not evident and 24 h strength was ~90% of control with relatively small SG dosages.

Example 10

This Example illustrates the effects of system temperature on carbon dioxide uptake in a wet mix.

In a first test, an experiment was conducted to look at the effect of the initial temperature of the materials on the carbonation behavior of fresh cement paste. Three target starting temperatures were considered, 7° C., 15° C. and 25° C. (actual temperatures were ±2° C.). Measurements include the mortar temperature, mini-slump (vertical slump and lateral spread), carbon dioxide uptake, and cube strength.

A mortar mix was prepared containing 535 g Portland cement (Holcim GU), 1350 g sand, and 267.5 g water. The mix was brought to 7, 15, or 25° C., and CO2 gas was introduced at 20 LPM while mixing. The time of CO2 delivery depended on the target CO2 uptake, for example, to achieve 1.1% bwc the delivery took 3 to 4.5 min. CO2 uptake at various time points was measured. Slump measurements were also taken at various time points.

Figure 27:
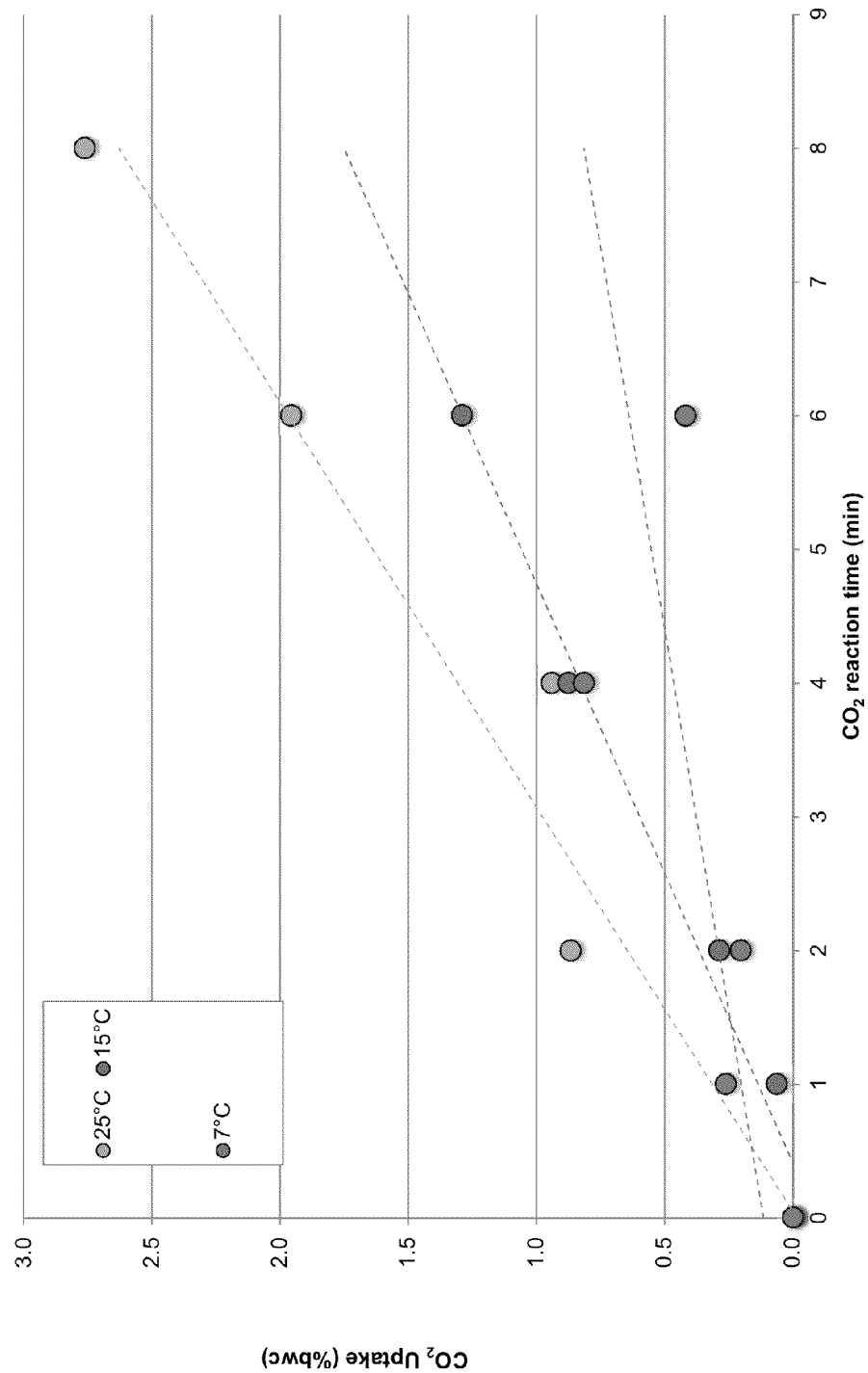
FIG. 27 provides a graphic illustration of the effects of temperature of materials on rate of carbon dioxide uptake in a mortar mix. Temperatures were 7° C., 15° C. and 25° C.

The effect of temperature on rate of carbon dioxide uptake is shown in FIG. 27, where the upper line and points are for 25° C., the middle line and points are for 15° C., and the lower line and points are for 7° C. Rate of uptake of carbon dioxide increased as temperature increased; the rate was 0.087% bwc/min at 7° C., 0.231 bwc/min at 15° C., and 0.331 bwc/min at 25° C. The rate of carbon dioxide uptake increased 278% as temperature increased from 7 to 25° C.

Figure 43:
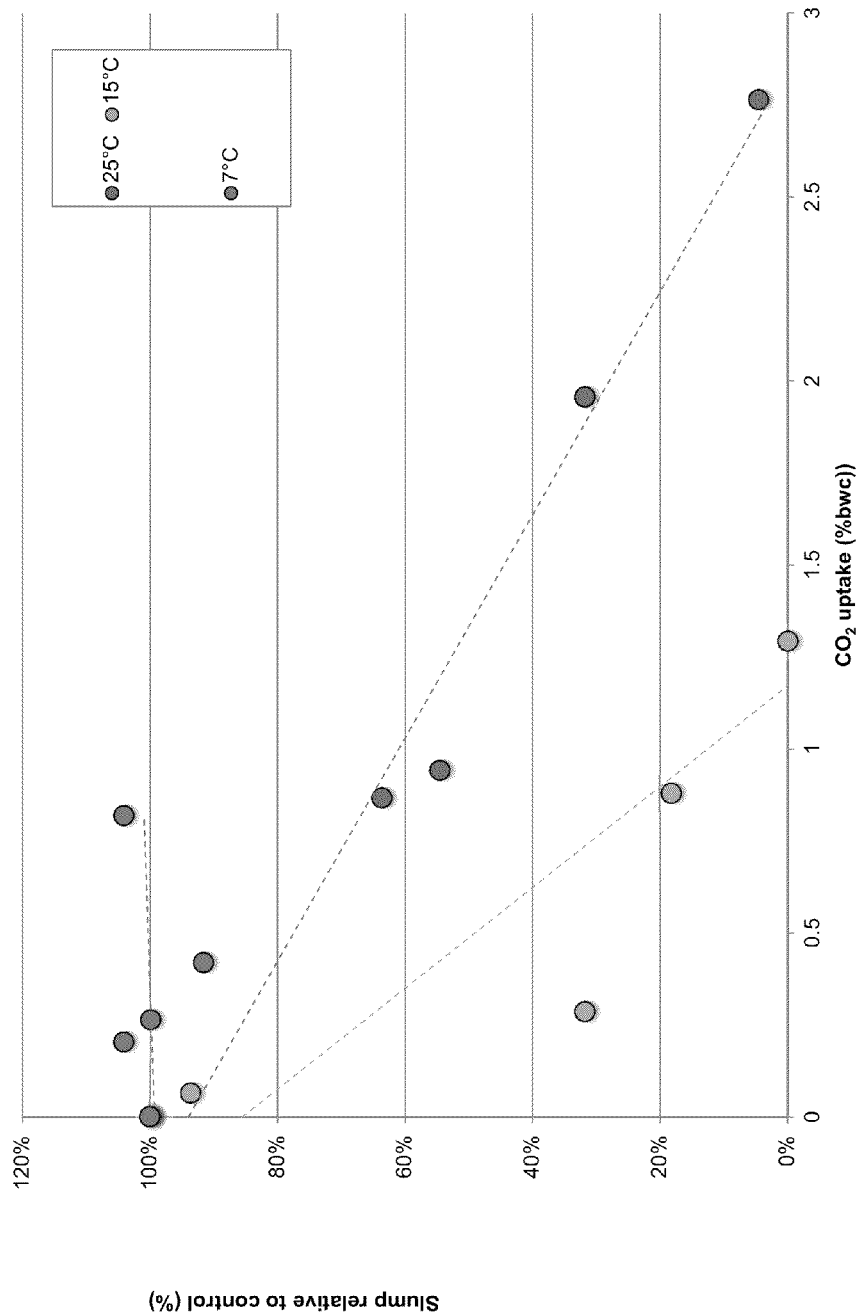
FIG. 43 provides a graphic illustration of the effects of temperature of materials on slump, relative to control, in carbonated mortar mixes. Temperatures were 7° C., 15° C. and 25° C.

The effect of temperature on slump is shown in FIG. 43. There was little effect on the workability with uptake of the mortar prepared at 7° C. (upper line and points). The workability of the mortar prepared at 15° C. declined rapidly with increasing uptake (lower line and points). The workability of the mortar prepared at 25° C. was between that of the two other mortars declining with uptake but taking higher uptakes than the 15° C. sample to reach zero workability (middle line and points).

Figure 28:
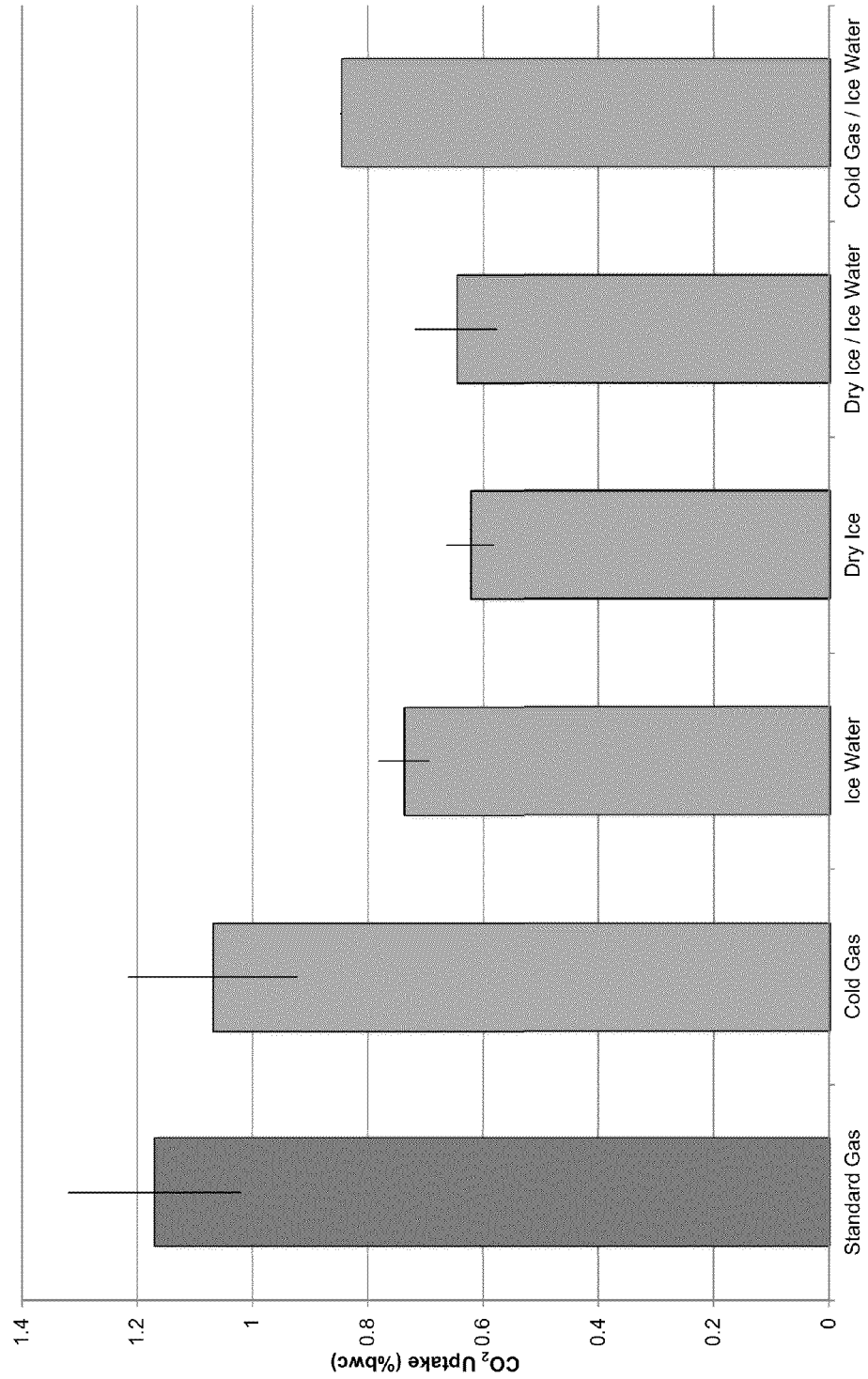
FIG. 28 provides a graphic illustration of the effects of heated or cold gases, or dry ice, on carbon dioxide uptake in a cement paste system.

In a second experiment, the effect of carbon dioxide temperature (heated or unheated (cold) or form (dry ice), in some cases combined with the use of ice water, on carbon dioxide uptake was measured in a cement paste system. Cement, mix water (untreated or ice water) and admix were mixed for 30 seconds in blender, and initial properties and temperature of the paste were evaluated. The paste was then carbonated while mixing in the blender. Carbonate while mixing in the blender, using heated gas, unheated gas (cold gas), or dry ice. Evaluate the final properties and temperature of the paste. FIG. 28 shows the results of the study. Heated or cold gases seemed to give approximately equivalent uptake. The mixes with cold temperature (cold mix water, dry ice) did not give improved carbon dioxide uptake.

Example 11

This example illustrates the beneficial effect of calcium containing compounds added before carbonation on 24 hour strength development in a carbonated mortar mix.

Figure 29:
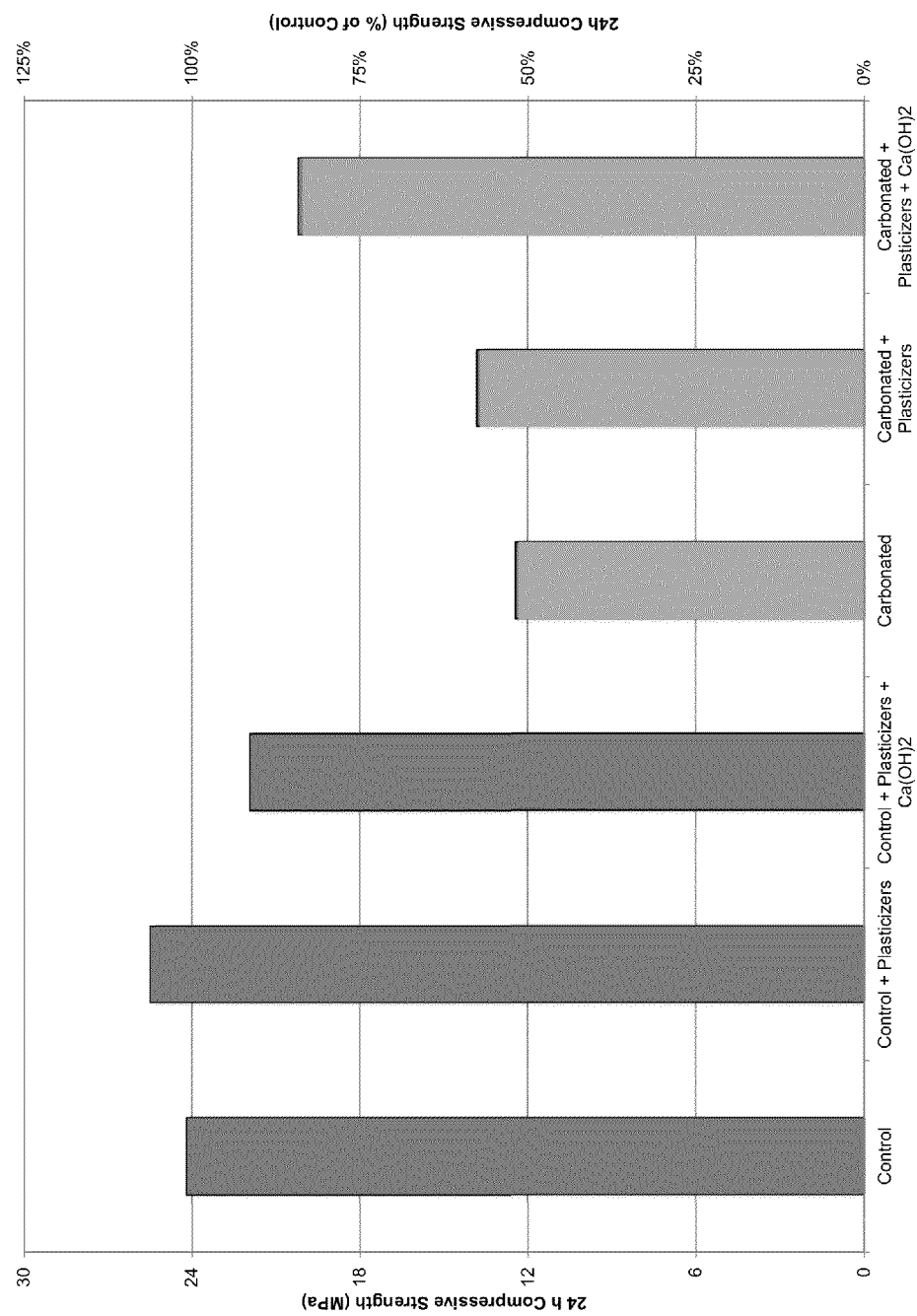
FIG. 29 provides a graphic illustration of the effects of plasticizers and calcium hydroxide on 24 hour compressive strength in carbonated and uncarbonated mortar mixes.

A mortar mix was prepared containing 535 g Portland cement (Holcim GU), 1350 g sand, and 267.5 g water. CO2 gas was introduced at 20 LPM while mixing. The time of CO2 delivery depended on the target CO2 uptake, for example, to achieve 1.1% bwc the delivery took 3 to 4.5 min. Mortar cubes were created with C109M-12 Standard Test Method for Compressive Strength of Hydraulic Cement Mortars. A plasticizer (0.10% Mighty ES+0.10% Sika VF) with or without $Ca(OH)_2$ (2.0% bwc) was added before carbonation, and effects on 24-hour compressive strength were measured. The results are shown in FIG. 29. Carbonation decreased the 24 hour strength of the mortar. The use of a plasticizer improved the strength of both carbonated and control mortars. The further addition of $Ca(OH)_2$ decreased the 24 hour strength of the control product but further increased the 24-hour strength of the carbonated product.

Figure 30:
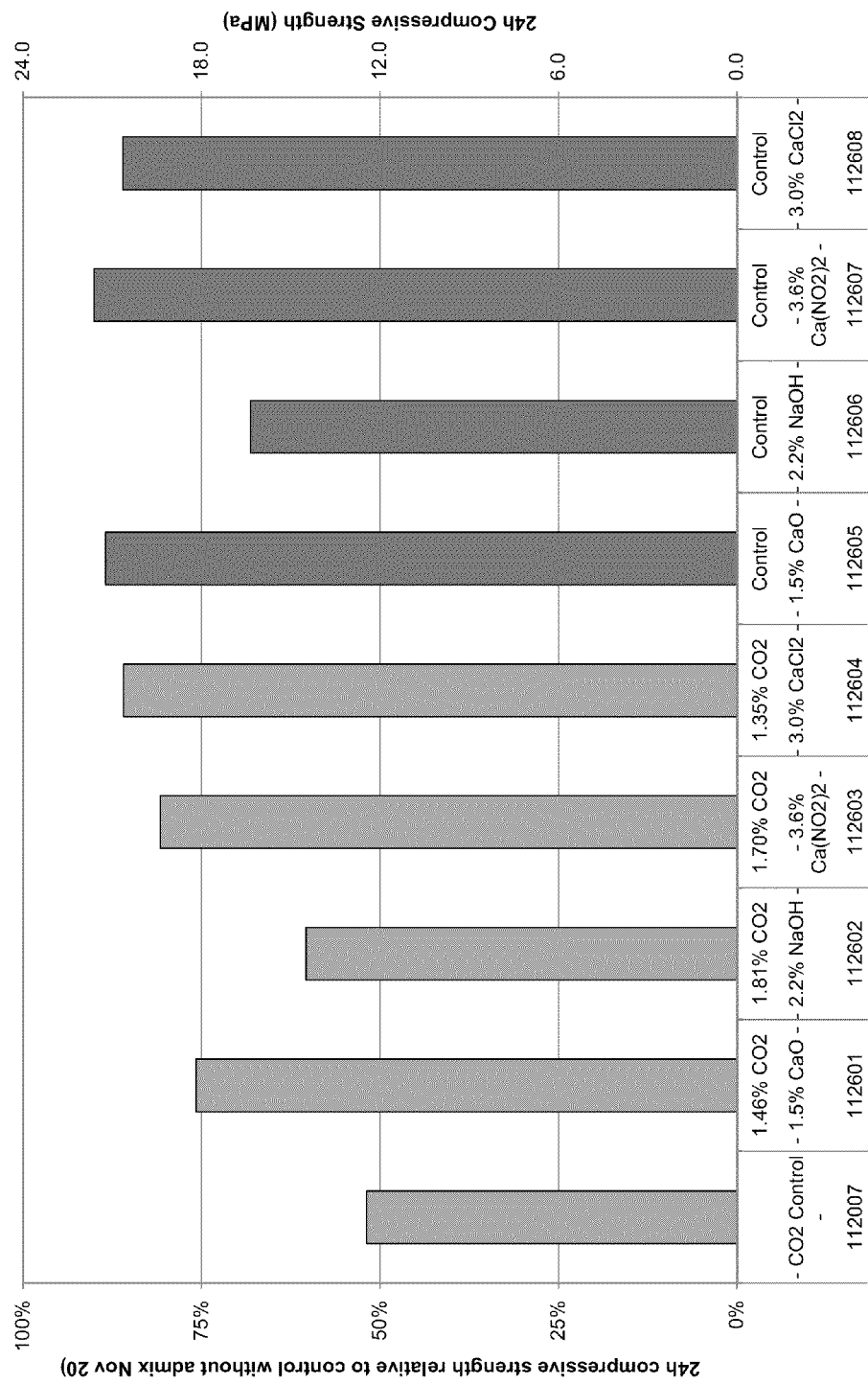
FIG. 30 provides a graphic illustration of the effects of CaO, NaOH, $Ca(NO_2)_2$, and $CaCl_2$ on 24 hour compressive strength in carbonated and uncarbonated mortar mix.

In a second experiment, CaO (1.5%), NaOH (2.2%), $Ca(NO_3)_2$, or $CaCl_2$ (3.0%) were added before carbonation to a mortar mix as above. Results are shown in FIG. 30. All calcium compounds showed benefits for strength development in the carbonated mortar mix, relative to carbonated mortar mix with no admixture added.

Example 12

This example illustrates that the timing of addition of an admixture used for conventional purposes, in this case an air entrainer, relative to carbonation, may be important to retain the effect of the admixture.

A calcium hydroxide slurry was used as a test system. 20 g of $Ca(OH)_2$ was mixed with 40 g water to form a slurry. $CO_2$ gas was injected into the slurry at 5 LPM. The temperature, an indicator of carbon dioxide uptake, was measured over a 9-minute period. The plain slurry contained no admixture, while the slurry with an air entrainer contained 2.5% (by mass of $Ca(OH)_2$ of a liquid solution of hydrocarbons used for air entrainment in concrete (AirEx-L, Euclid Chemical). The carbon content was quantified using a combustion infrared detection carbon analyzer (Eltra CS 800, Eltra GmbH, Germany). The net % $CO_2$ increase was calculated in comparison to a base uncarbonated system containing the components.

After 10 minutes of carbonation, the slurry without an additive showed a $CO_2$ uptake that was 25.5% of the original solid mass, while the slurry with the air entrainer additive had an uptake that was 36.2%; thus, the surfactant admixture increased the $CO_2$ uptake by 42.1%.

In a second test, various surfactants were tested for their effects on $CO_2$ uptake. Standard mortar mix, as in Example 8, was used, and the surfactants were dosed at 0.10% bwc. $CO_2$ as injected for 6 minutes during mixing. Initial and final temperatures were measured and net increase in $CO_2$ content was measured as above. The results are shown in TABLE 5.

TABLE 5

Effects of surfactants on CO2 uptake

| Additive | Source | Initial Temp, ° C. | Final Temp, ° C. | Temp Change | Net $CO_2$ % | $CO_2$ increase |
|---|---|---|---|---|---|---|
| None | | 23.8 | 33 | 9.2 | 1.65 | Baseline |
| Sunlight | Dish soap | 24.1 | 41.4 | 17.3 | 2.89 | 75% |
| Sunlight | Dish soap | 24.1 | 41.9 | 17.8 | 3.34 | 102% |
| MB AE-90 | BASF | 23.4 | 33 | 9.6 | 1.80 | 9% |
| Solar:w | Guelph Soap | 23.8 | 35.2 | 11.4 | 2.17 | 31% |
| AirEX-L | Euclid | 23.8 | 40.6 | 16.8 | 2.84 | 72% |

In a third test, mortar batches as above, containing 0.1% bwc of a surfactant air entrainer (Euclid AirEx-L), or no surfactant (control) were exposed to $CO_2$ during mixing for 0, 2, 4, or 6 minutes, and the $CO_2$ uptake measured. There was greater uptake in the mortar treated with air entrainer than in control, untreated mortar at all time points, but the relative improvement was greater at the low exposure times: there was a 117% increase in $CO_2$ uptake compared to control at 2 min, a 104% increase in $CO_2$ uptake at 4 minutes, and a 28% increase in $CO_2$ uptake at 6 min.

Figure 31:
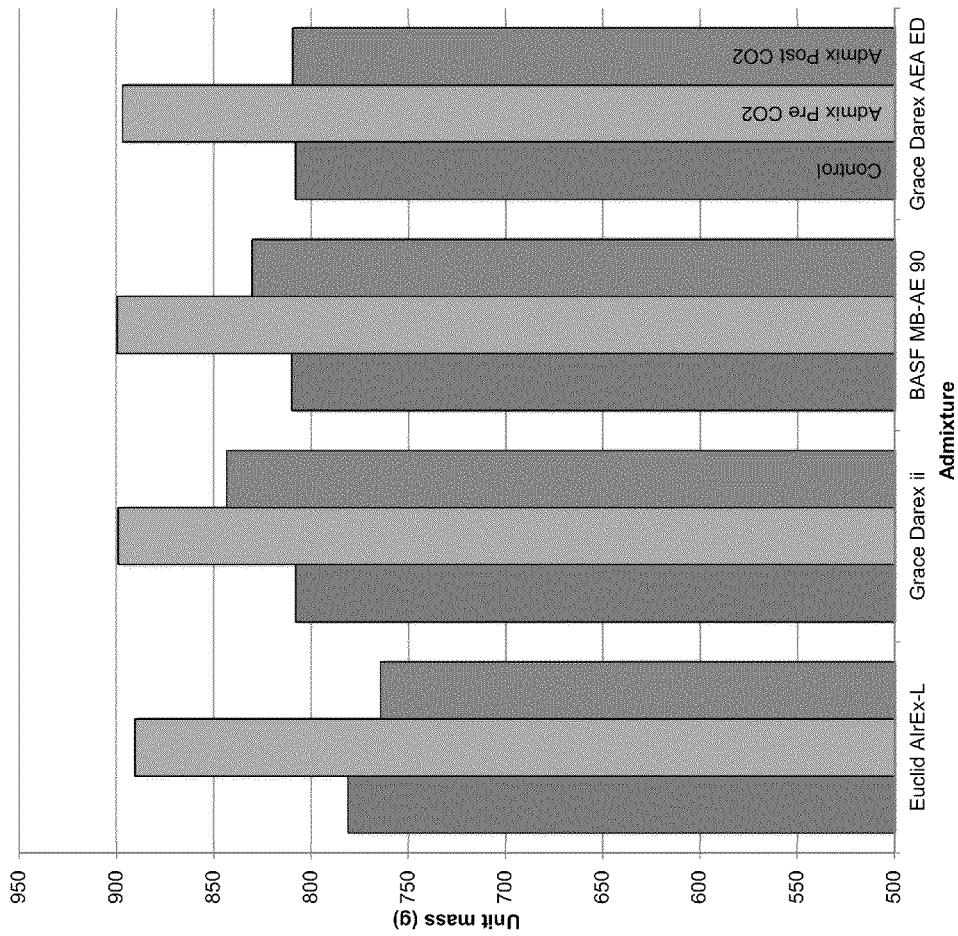
FIG. 31 provides a graphic illustration of the effect of carbon dioxide addition before or after the addition of an air entrainer on mortar density.

In a fourth test, the effect of $CO_2$ addition before or after addition of an air entrainer on mortar density was tested. A lower unit weight indicated a higher air content. Four air entrainers were used: Euclid Air-Ex-L, Grace Darex ii, BASF MB-AE 90, and Grace Darex AEA ED. The results are shown in FIG. 31. In all cases, addition of the air entrainer pre-$CO_2$ treatment led to an increase in density, whereas addition of the air entrainer post-$CO_2$ treatment resulted in a density the same as untreated mortar.

This Example illustrates that the timing of $CO_2$ treatment relative to addition an air entrainer affects rate of $CO_2$ uptake and density. If it is desired to maintain the density effect of the air entrainer, it should be added after $CO_2$ addition. In some cases, a two-dose approach could be used where an early dose of air entrainer is used to enhance $CO_2$ uptake, then a later dose to achieve desired effects on density.

Example 13

This Example describes tests of carbonation in a precast dry mix operation. Tests were conducted at a precast facility in which a concrete mix was carbonated at different stages of the casting process, in some cases using a sodium gluconate admixture at various concentrations. The effects of carbonation, with and without admixture, on strength and water absorption were measured.

The concrete mix shown in TABLE 6 was used.

TABLE 6

Standard Block Design

| Component | Name | Amount |
|---|---|---|
| Coarse aggregate | Birdseye Gravel | 685 lb |
| Fine aggregate | Meyers Mat Torp Sand | 4320 lb |
| Fine aggregate | Silica Sand/Wedron 430 | 1250 lb |
| Cement | Illinois Product | 1000 lb |
| Admixture | Rainbloc 80 | 50 oz |
| Target water content | | 6.5% |

The aggregates, cement and water were added to a planetary mixer. Carbon dioxide was flowed into the mixer via a ¾ inch diameter rubber pipe for 180 s at a flow rate to achieve the desired carbonation. In some runs, carbon dioxide was added both at the mixer and at the feedbox. In a preliminary run, all water was added initially, but in subsequent runs, additional water was added about halfway through the 180 s according to an assessment of the mix consistency prior to the completion of the mix and additional water was added as necessary to achieve a desired mix look. Batches with carbon dioxide delivered to the concrete required additional water nearly in proportion to the amount of carbon dioxide gas supplied. The concrete mix was placed in a mold to produce 8 inch blocks, which were tested for density, compressive strength at 7, 28, and 56 days, and water absorption (all according to ASTM C140, 5 blocks per test). The carbonation of the concrete was also determined: The samples for analyzing the carbon dioxide content of the concrete were created by taking a fresh sample from the production line, drying the concrete on a hot plate to remove the water, and subsequently sieving the material through a 160 μm sieve. Samples of the raw materials were examined to determine how much of each component passes a 160 μm sieve and the carbon content of the passing material. This information, along with the concrete mix design, allows for the calculation of a theoretical control carbon content against which analyzed samples can be compared. The carbon content was quantified using a combustion infrared detection carbon analyzer. The net % $CO_2$ increase was calculated in comparison to a base uncarbonated system containing the components.

In a first test, carbonation at both the feedbox and mixer or just the feedbox was tested. The variations examined are summarized in TABLE 7, below. Data for controls, which were prepared on other days (samples 500 and 700), are also presented.

TABLE 7

Standard Block Production Variables and Water Contents

| Code | Condition | Mode | Total Dose (% bwc) | w/c | Water fraction |
|---|---|---|---|---|---|
| 0600 | Control | Uncarbonated | — | 0.392 | 6.64% |
| 0601 | $CO_2$ | Feedbox 0.5% | 0.5% | 0.422 | 8.32% |
| 0602 | $CO_2$ | Mixer 0.5% | 0.5% | 0.430 | 8.25% |
| 0603 | $CO_2$ | Mixer 1.0% | 1.0% | 0.440 | 8.08% |
| 0604 | $CO_2$ | Mixer 1.0%, Feedbox 0.5% | 1.5% | 0.450 | 8.23% |
| 0605 | $CO_2$ | Mixer 1.5% | 1.5% | 0.455 | 8.39% |
| 0500 | Control | Uncarbonated | — | 0.406 | 8.88% |
| 0700 | Control | Uncarbonated | — | 0.426 | 7.45% |

FIG. 32 shows the results of tests for carbon dioxide uptake, compressive strength, water absorption, and density for the blocks produced in this test.

The efficiency of carbon dioxide uptake was greatest in the 1.5% bwc dose where carbon dioxide was delivered only to the mixer (batch 0605); delivery of 0.5% of the dose at the feedbox was consistently less efficient than delivery of all of the same dose at the mixer (batch 0601 compared to batch 0602; batch 0604 compared to batch 0605). A carbon dioxide uptake efficiency of 93% was achieved with a $CO_2$ dose of 1.5% delivered solely at the mixer (batch 0605). Consequently, in subsequent tests a dose of 1.5% $CO_2$, delivered solely at the mixer, was used.

The addition of $CO_2$ to the mix consistently improved compressive strength at 7, 28, and 56 days, at all doses tested, whether or not the $CO_2$ was added at the mixer, the feedbox, or both. The overall average compressive strengths of the two (uncarbonated) control sets (0500 and 0700) were 2843, 3199, and 3671 psi at 7, 28, and 56 days, respectively. At 7 days the first four batches made with $CO_2$ (0601, 0602, 0603, and 0604) showed a 30-36% strength benefit over the average control, and the final carbonated batch (0605) was 18% stronger. The strength benefit was maintained at 28 days with a benefit of the first four carbonated conditions ranging from 29037% and the final batch being 19% better than the average control. The 56 day results indicated the strength benefit had increased to 30-45% for the first four sets and 36% for the final set.

Water absorption was reduced through carbonation. Mixes 0601 to 0603 had a water absorption about 35% lower than that of uncarbonated control (0500 and 0700), and mixes 0604 and 0605, in which 1.5% $CO_2$ was added, had a water absorption of about 18% lower than control.

Density of the carbonated mixes varied with amount of carbon dioxide added. The density of the two lowest $CO_2$ (0.5%) batches (0601 and 0602) was about 2.5% higher than control, but the density of the batches carbonated at a dose of 1.0 or 1.5% (0603, 0604, and 0605) were equivalent to the density of the control.

Overall, this test indicated that carbonation of this mixture in a precast operation producing 8 inch blocks indicated that an efficiency of carbon dioxide uptake of over 90% could be achieved, producing blocks that were stronger than uncarbonated at all carbon dioxide doses and time points tested, culminating in a 56 day strength that averaged over 30% greater than control. Water absorption of the carbonated blocks was consistently lower than control, and the blocks carbonated at 1.0 and 1.5% $CO_2$ dose had a density the equivalent of uncarbonated blocks.

In a second test, the mix of TABLE 8 was used, with a dose of 1.5% $CO_2$, delivered at the mixer, and, in addition five different doses of a sodium gluconate admixture were delivered-0.1, 0.2, 0.3, 0.4, and 0.5% bwc. The sodium gluconate was delivered in water solution, dissolved one gallon of water (0.1, 0.2, and 0.3%) or in two gallons of water (0.4 and 0.5%). The sodium gluconate admixture was added about 75 s after carbon dioxide delivery to the mixer started, and took about 90 s to add. Admixture was added manually during the mixing cycle. The addition of admixture was begun during the carbon dioxide addition so as not to extend the mixing cycle. Carbonation, compressive strength, density, and water absorption were measured.

The investigated variables and water contents are summarized in TABLE 8. The overall results are summarized in FIG. 32.

TABLE 8

Standard Block, with sodium gluconate

| Code | Condition | Mode | $CO_2$ Dose (% bwc) | Sodium gluconate | w/c | Water fraction |
|---|---|---|---|---|---|---|
| 0700 | Control | — | — | — | 0.425 | 7.35% |
| 0701 | $CO_2$ | Mixer | 1.5 | 0.5% | 0.413 | 8.12% |
| 0702 | $CO_2$ | Mixer | 1.5 | 0.4% | 0.413 | 7.85% |
| 0703 | $CO_2$ | Mixer | 1.5 | 0.3% | 0.424 | 7.99% |
| 0704 | $CO_2$ | Mixer | 1.5 | 0.2% | 0.426 | 7.87% |
| 0705 | $CO_2$ | Mixer | 1.5 | 0.1% | 0.433 | 7.81% |
| 0706 | Control | — | — | — | 0.426 | 7.45% |

The efficiency of $CO_2$ delivery for batches produced in this test was found to range from 78% to 94%, across all batches. The gas injection parameters were held constant and the average efficiency was found to be about 85%.

Figure 33:
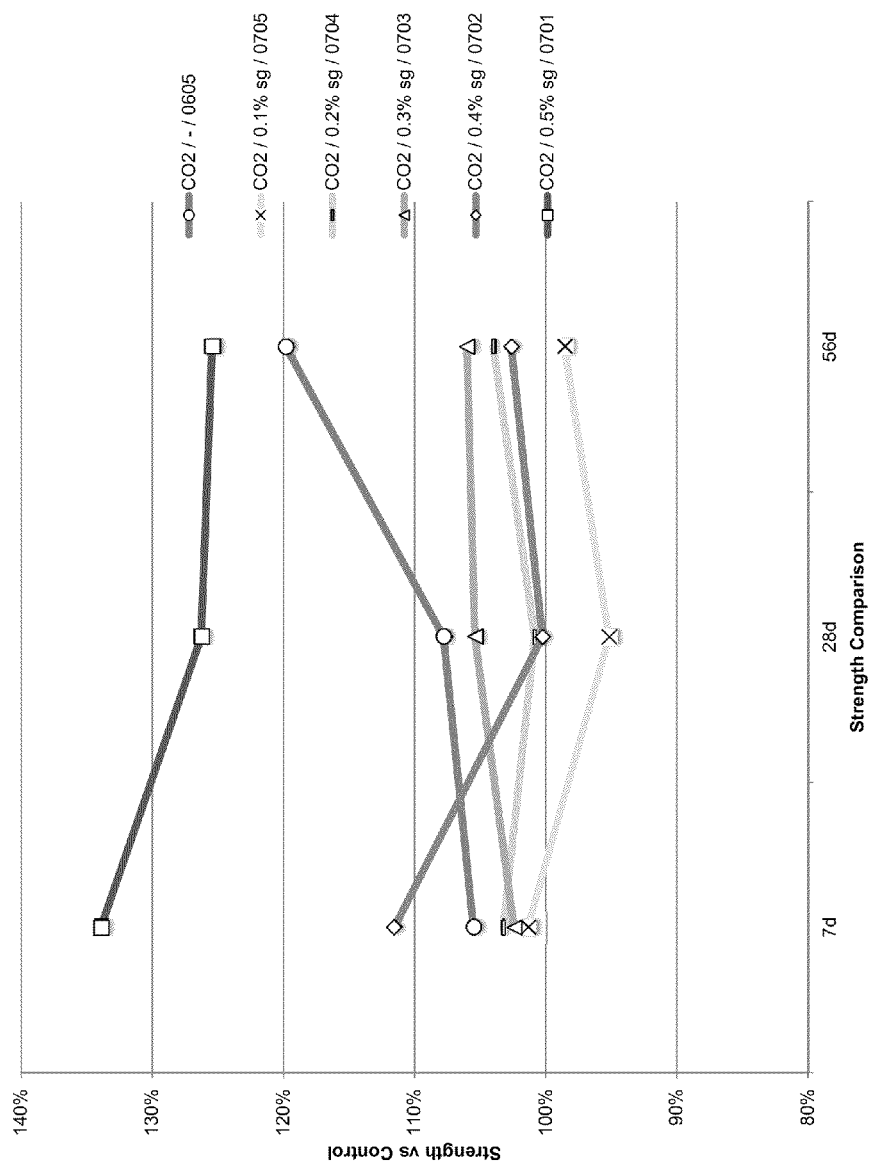
FIG. 33 is a graphic illustration of the effects of sodium gluconate dose on 7-, 28- and 56-day compressive strengths of carbonated blocks produced in a dry cast operation, with various doses of sodium gluconate, compared to uncarbonated control.

It was shown that the strength was sensitive to the admix dose. See FIG. 33. The control strength can be taken at 100% at all ages and the carbonated strengths are shown in relative comparison. For the lower doses the carbonated concrete strength was equivalent to the control strength at both 7 and 28 days. For a dose of 0.4% there was a 12% strength benefit at 7 days and equivalent performance at 28 and 56 days. For a dose of 0.5% there was a 34% strength benefit at 7 days, 28% at 28 days, and 25% at 56 days. These results indicate that there is a certain amount of admixture required in the concrete beyond which a strength benefit can be realized.

It is shown that the water absorption was again reduced for the carbonated products. All carbonated mixes were dosed with 1.5% CO2 bwc and had similar uptakes. The water absorption was reduced 12% for the lowest and 31% for the highest admixture dose. The density showed some dependence on admixture dosage. The carbonation treatment with the small dose of admixture decreased the density from 131 to 128.5 lb/ft$^3$ (though it can be noted that the strength remained equivalent to the control). The density increased with admixture dose and equivalent density was found with a dose of 0.3% and density was 1.3% higher for the highest admix dose.

This Example illustrates that carbon dioxide can be added to a precast concrete mix in a dry cast operation at the mixer stage and the products formed are generally stronger, show lower water absorption, and equivalent density when compared to non-carbonated products. The addition of a sodium gluconate admixture resulted in a dose-dependent effect on strength, water absorption and density, and indicated that an optimum dose for admixture can be achieved to optimize these parameters.

Example 14

In this example the same precast equipment was used in the same facility as in Example 13, but using three different concrete mixes: a limestone mix, a lightweight mix, and a sandstone mix. This example illustrates the importance of adjusting carbonation mix parameters to mixes with different characteristics.

Three different mix designs were used, shown in TABLES 9, 10, and 11.

TABLE 9

Limestone Block Mix Design

| Component | Name | Amount |
|---|---|---|
| Coarse aggregate | Sycamore FA-5 | 3152 lb |
| Coarse aggregate | Sycamore FM-20 | 5145 lb |
| Fine aggregate | Silica Sand/Wedron 430 | 745 lb |
| Cement | Illinois Product | 351 lb |
| Cement | White Cement | 819 lb |
| Admixture | Rainbloc 80 | 59 oz |
| Admixture | Frocast 150 | 117 oz |
| Target water content | | 8.6% |

TABLE 10

Lightweight Block Mix Design

| Component | Name | Amount |
|---|---|---|
| Coarse aggregate | Birdseye Gravel | 1030 lb |
| Coarse aggregate | Gravelite | 1500 lb |
| Fine aggregate | Screening Sand | 2200 lb |
| Fine aggregate | Meyers Mat Torp Sand | 1500 lb |
| Cement | Illinois Product | 725 lb |
| Admixture | Rainbloc 80 | 34 oz |
| Target water content | | 7.9% |

TABLE 11

Sandstone Block Mix Design

| Component | Name | Amount |
|---|---|---|
| Coarse aggregate | Sycamore FA-20 | 3750 lb |
| Fine aggregate | Meyers Mat Torp Sand | 1800 lb |
| Cement | Illinois Product | 730 lb |
| Admixture | Rainbloc 80 | 37 oz |
| Target water content | | 7.0% |

Limestone Mix Test.

In a first test, the limestone mix of TABLE 9 was used. Conditions were as for the second test of Example 13, with $CO_2$ added at a dose of 1.5% in the mixer. Addition of 0.4% sodium gluconate was tested. The addition of the Procast admixture that is normally part of the mixing sequence for the limestone mix design was delayed to be added after the carbon dioxide injection was complete. The investigated variables and water contents are summarized in TABLE 12. The overall results are summarized in FIG. 34.

TABLE 12

Limestone Mix Production Variables and Water Contents

| Mix Code | Design | Condition | Mode | $CO_2$ Dose (% bwc) | Admix | w/c | Water fraction |
|---|---|---|---|---|---|---|---|
| 0805 | Limestone | Control | — | — | — | 0.225 | 7.75% |
| 0806 | Limestone | $CO_2$ | Mixer | 1.5 | 0.4% | 0.514 | 8.53% |

The limestone mix design was examined in only a limited production run partly due to the perceived difficulty of accurately assessing the net amount of absorbed carbon dioxide against the high carbon content of the limestone background, at least when using the current analytical methods and procedures.

The compressive strength data showed that the carbonated limestone blocks averaged 2349 psi at 7 days and were slightly weaker (7%) than the control blocks. The 28 day strength was 2518 psi and 14% lower than the control. The 56 day strength averaged 2762 psi and 9% weaker than the control though this gap could be narrowed to 6% if an outlier point was removed. The dose of admixture in this test was determined using the Illinois Product cement and no advance tests on the Federal White cement used in the limestone mix design were performed. Subsequent lab development has made it clear that the effect and dosage of the admixture is sensitive to cement type. The integration of the carbonation technology may require a small investigative series of trial runs to determine both if the admixture is desired and what the proper dose should be. The success at demonstrating the admixture usage, for the Illinois Product cement, in the lab prior to the pilot suggests that preliminary optimization screening could be accomplished for any mix for which the materials were available.

In terms of water absorption, it was found that the carbonated limestone block had a higher absorption and lower density than the control blocks. The absorption was increased 18% and the density was decreased 2%. The results agree with the lower strength of the carbonated limestone blocks and support the need to fine tune the inputs used when carbonating this mix.

Lightweight Mix Test.

In a second test, the lightweight mix of TABLE 10 was used. Conditions were as for the second test of Example 13, with $CO_2$ added at a dose of 1.5% in the mixer. Addition of sodium gluconate at three different levels, 0.35, 0.4, and 0.45% was tested. The investigated variables and water contents are summarized in TABLE 13. The overall results are summarized in FIG. 35.

TABLE 13

Lightweight Mix Design Production Variables and Water Contents

| Code | Mix Design | Condition | Mode | $CO_2$ Dose (% bwc) | Admix | w/c | Water fraction |
|---|---|---|---|---|---|---|---|
| 0801 | Lightweight | Control | — | — | — | 0.745 | 6.96% |
| 0901 | Lightweight | $CO_2$ | Mixer | 1.5 | — | 0.691 | 12.25% |
| 0902 | Lightweight | $CO_2$ | Mixer | 1.5 | 0.35% | 0.703 | 13.79% |
| 0802 | Lightweight | $CO_2$ | Mixer | 1.5 | 0.40% | 0.758 | 8.80% |
| 0903 | Lightweight | $CO_2$ | Mixer | 1.5 | 0.45% | 0.707 | 13.99% |

Preliminary results suggest that an increase in $CO_2$ content similar to what has been observed for the Standard Block occurred for carbonated Lightweight mixes in all cases. However, due to inherent difficulties performing carbon quantification for these mix designs a definitive analysis was not performed, and actual numbers obtained, in some cases over 100%, are not reliable.

Figure 36:
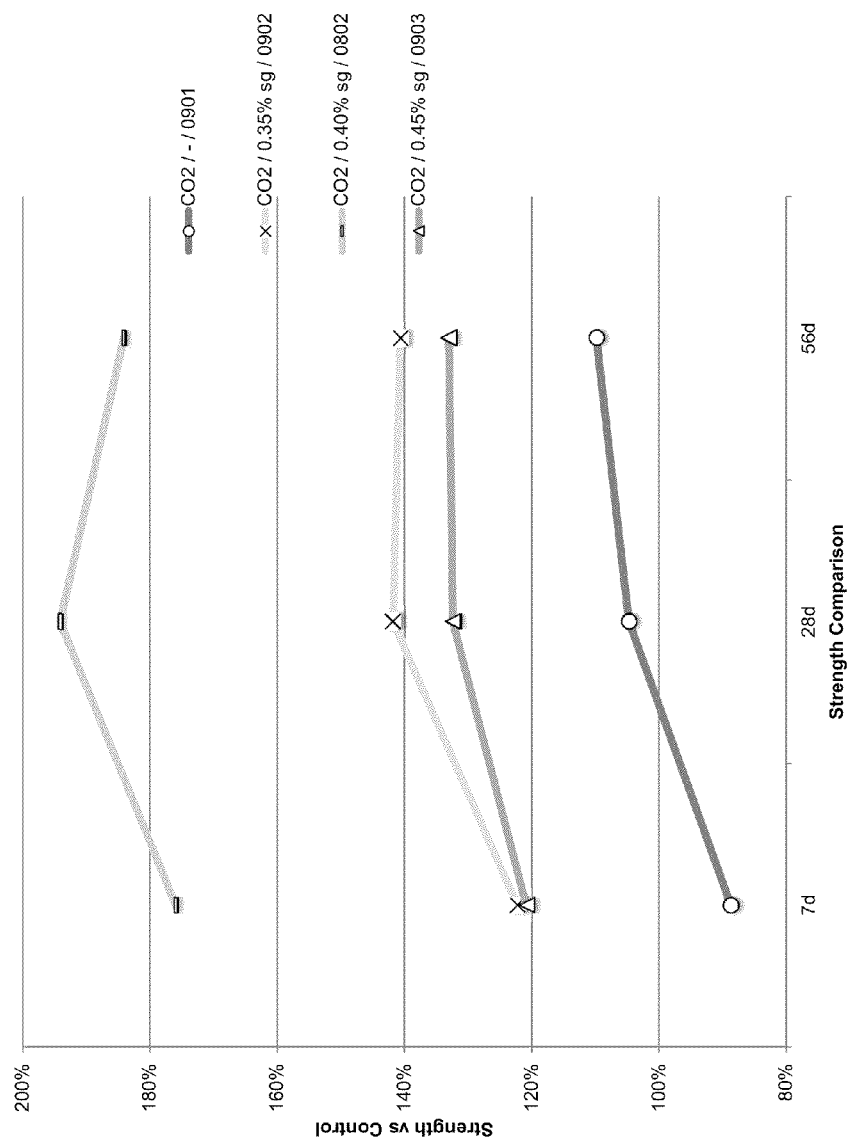
FIG. 36 provides a graphic illustration of 7-, 28-, and 56-day compressive strengths of lightweight blocks produced in a dry cast operation with carbonation and various doses of sodium gluconate.

The compressive strength data for the lightweight mix is summarized in FIG. 36. The testing broke three blocks from the control set and five blocks from each of the carbonated sets. The control (uncarbonated, no sodium gluconate) strength can be taken at 100% at all ages and the carbonated (with and without sodium gluconate) strengths are shown in relative comparison. The carbonated batch with no sodium gluconate was slightly behind the control at 7 days but developed strength at a faster rate thereafter. The admixture batches were found to be stronger at the first measurement and maintained at least this level or benefit through the remainder of the test program.

The lightweight block production found an optimal or near-optimal amount of admixture. With no admixture used the strength was 11% behind the control strength at 7 days, 5% ahead at 28 days and 10% ahead at 56 days. The carbonated concrete with low admixture dose was 22%, 42% and 41% stronger than the uncarbonated control at 7, 28 and 56 days respectively. The 0.40% dose produced concrete that was 76%, 94% and 84% stronger at the three ages while the 0.45% dose of admixture resulted in 21%, 32% and 33% improvements. These results are different than those for Standard Block in Example 13, where an optimal dose of sodium gluconate was not necessarily reached even at 0.5%, and illustrates the usefulness of pre-testing, or otherwise optimizing, admixture dose and other conditions specific to a specific mix design. See Example 15 for a further testing of this.

$CO_2$ injection had little effect on the lightweight block density or water absorption when no sodium gluconate was used. Across the dosages of admixture the water absorptions were decreased about 10% for the 0.35% and 0.45% doses and 34% for the middle dose of 0.4%, compared to uncarbonated control without sodium gluconate. Conversely, the density increased when sodium gluconate was used. It was up 1-2% for high and low doses and 7% higher for the middle dose, compared to uncarbonated control without sodium gluconate. While the middle dose carbonated blocks were the strongest and had the lowest water absorption they were also the highest density. Promising strength and absorption results were found with the other two admixture dosages and accompanied by a small density increase. Admixture usage will generally benefit from pre-testing or other predictive work to optimize conditions to obtain the desired result, e.g., in the case of lightweight blocks, a combination of strength, density, water absorption, and other properties as desired.

Sandstone Mix Test.

In a third test, the sandstone mix of TABLE 11 was used. Conditions were as for the second test of Example 13, with $CO_2$ added at a dose of 1.5% in the mixture Addition of 0.35, 0.4, and 0.45% sodium gluconate was tested. The investigated variables and water contents are summarized in TABLE 14. The overall results are summarized in FIG. 37.

TABLE 14

Sandstone Mix Design Production Variables and Water Contents

| Code | Mix Design | Condition | Mode | $CO_2$ Dose (% bwc) | Admix | w/c | Water fraction |
|---|---|---|---|---|---|---|---|
| 0803 | Sandstone | Control | — | — | — | 0.672 | 6.55% |
| 0904 | Sandstone | $CO_2$ | Mixer | 1.5 | — | 0.697 | 6.93% |
| 0905 | Sandstone | $CO_2$ | Mixer | 1.5 | 0.35% | 0.736 | 7.00% |
| 0804 | Sandstone | $CO_2$ | Mixer | 1.5 | 0.40% | 0.710 | 7.29% |
| 0906 | Sandstone | $CO_2$ | Mixer | 1.5 | 0.45% | 0.718 | 7.02% |

Preliminary analysis of the Sandstone samples found $CO_2$ contents to be higher in all carbonated mixes relative to the control. The average efficiency of $CO_2$ delivery for batches produced was found to range from 20% to 90% at a 1.5% by weight of cement $CO_2$ dose. From the preliminary analysis batch 0905 appears to contain a smaller amount of captured $CO_2$ compared to other batches produced under similar conditions. Further analysis is currently underway to confirm this result. The average efficiency of $CO_2$ delivery considering all Sandstone batches is approximately 66%, however rises to approximately 81% if batch 0905 is omitted from the calculation.

Figure 38:
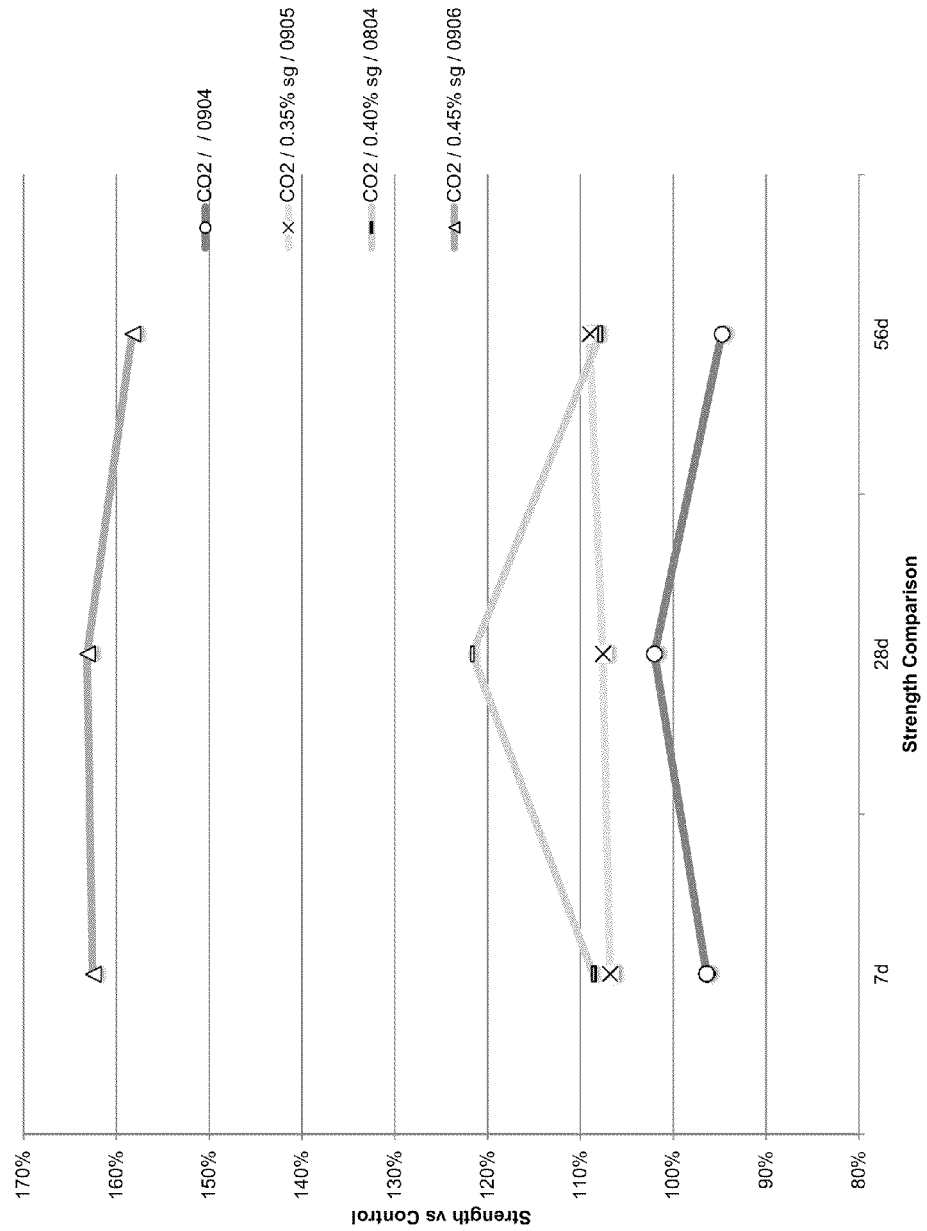
FIG. 38 provides a graphic illustration of 7-, 28-, and 56-day compressive strengths of sandstone blocks produced in a dry cast operation with carbonation and various doses of sodium gluconate.

The compressive strength data for the sandstone mix is summarized in FIG. 38. The testing broke three control blocks and five carbonated blocks. The data is plotted to show every individual break with the average compressive strength highlighted. The sandstone carbonated blocks with no admixture had a strength that was functionally equivalent to the control (carbonated, no admixture) strength (4% behind at 7 days, 2% ahead at 28 days and 5% behind at 56 days). Of three doses of admixture, strength increased with admixture dosage suggesting that the dosage was reaching an optimum across the range considered. The 7 day strength benefit was 7%, 9% and 63% on the three admixture dosages considered. The benefit at 28 days was 8%, 22% and 63% respectively. At 56 days was 9%, 8% and 58% respectively The strength increase with admixture dose across the range of dosages mirrors the data with the Standard Block of Example 13 wherein some "threshold" amount of admix seems to be crossed in relation to the amount of carbon dioxide present in the concrete.

The carbonation treatment without using the admixture increased the water absorption 12% and decreased the density 3%. The use of admixture brought the metrics back in line with the control at the lowest dose and offered significant improvement at the highest dose. The water absorption was reduced 19% and the density was increased 3% for the carbonated blocks with 0.45% dose of the admixture. As with other mixes, the final desired properties of the blocks will determine whether admixture, such as sodium gluconate, is used, and under what conditions, e.g., at what concentration, which can be pre-determined by preliminary testing or by other means.

This Example illustrates the importance of tailoring carbonation conditions, e.g., admixture usage, to the exact mix design being considered, in that the three mixes used showed differing responses to sodium gluconate as an admixture, and also had different requirements. For example, in the lightweight mix, density is an important consideration and may dictate that a lower dose of admixture be used than that that produces maximum strength development and/or minimum water absorption. For other mixes, other considerations may play a dominant role in determining carbonation conditions, such as use of admixture.

Example 15

This Example illustrates the use of a sodium gluconate admixture with a medium weight mix design, where the admixture dose was pre-determined based on results from the batches tested in Examples 13 and 14.

A Medium Weight mix design was used at the same facility and with the same equipment as in Examples 13 and 14. The mix design is given in TABLE 15.

TABLE 15

| Medium Weight Mix Design (target w/c = 0.78) | | |
| --- | --- | --- |
| Ingredient | Amount | Fraction |
| Birdseye Gravel | 1030 lbs | 12.8% |
| Illinois Product Cement | 675 lbs | 8.4% |
| McCook Block Sand | 1800 lbs | 22.3% |
| Meyers Torp Sand | 2270 lbs | 28.1% |
| Screening | 2300 lbs | 28.5% |
| RainBloc 80 | 34 oz | — |

Figure 39:
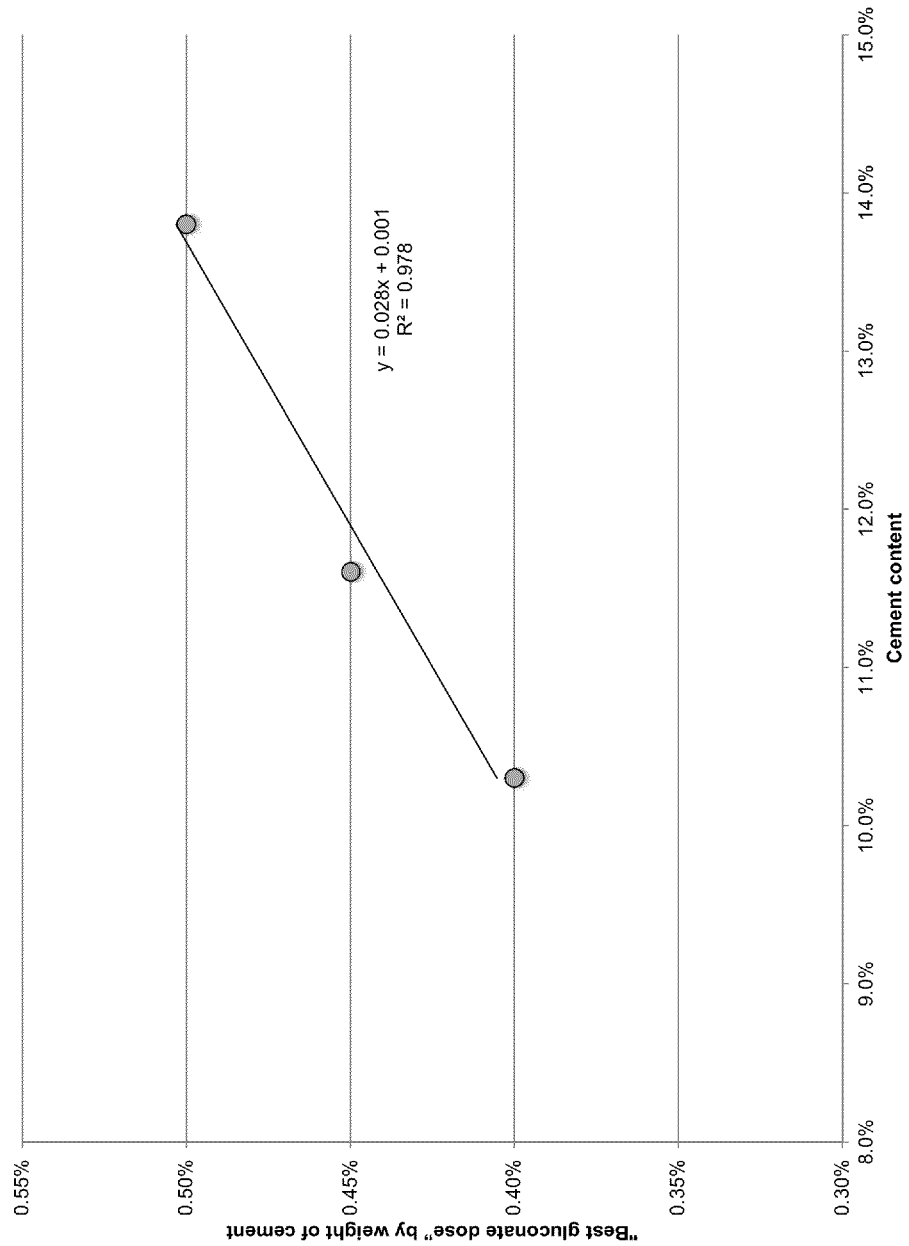
FIG. 39 provides a graphic illustration of the relationship between optimum dose of sodium gluconate and cement content in carbonated dry cast blocks.

It was found that the best dose of sodium gluconate in the Standard, Lightweight, and Sandstone mixes used in Examples 13 and 14 was linearly related to cement content. See FIG. 39. Based on this relationship, and adjusted for the fact that the $CO_2$ dose was to be 1.0% rather than 1.5% used in the Standard, Lightweight, and Sandstone, a sodium gluconate dose of 0.25% bwc was used. Blocks were produced as described in Example 13, with uncarbonated–sodium gluconate (control), uncarbonated+sodium gluconate, carbonated–sodium gluconate, and carbonated+sodium gluconate, and tested for compressive strength and density. The blocks were also submitted for third party testing which also included water absorption (Nelson Testing Laboratories, Schaumberg, Ill.).

Figure 40:
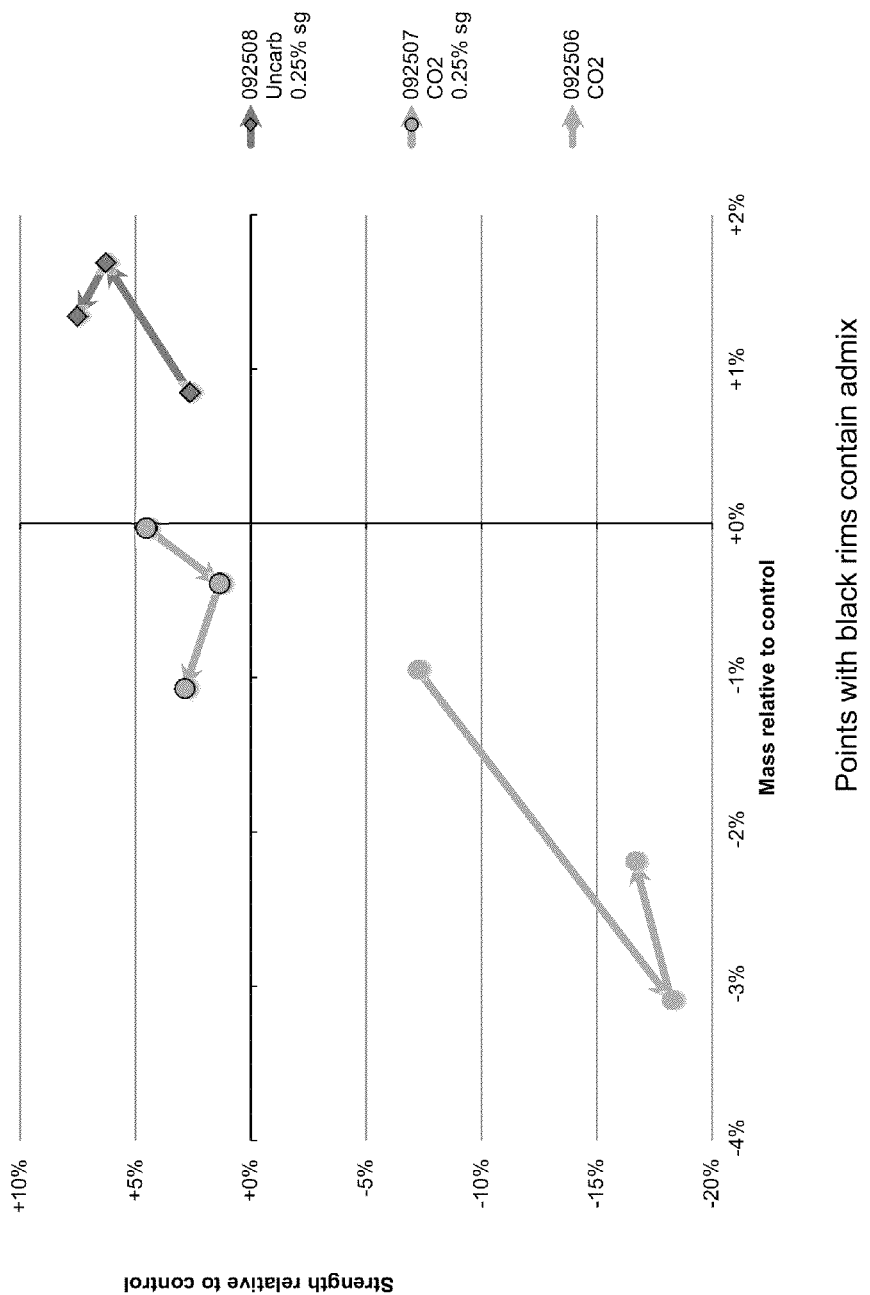
FIG. 40 provides a graphic illustration of compressive strength and density of carbonated and uncarbonated precast medium weight blocks, with or without treatment with 0.25% sodium gluconate.

Compressive strength and mass results for 7, 28, and 56 days are summarized in FIG. 40. The direction of the arrows represents time of measurement, from 7 to 56 days. The uncarbonated blocks with sodium gluconate were slightly denser and stronger than uncarbonated blocks without sodium gluconate at all time points tested, while the carbonated blocks without sodium gluconate were lower in strength and mass than uncarbonated without sodium gluconate, and the carbonated with sodium gluconate were both stronger and lighter than the uncarbonated without sodium gluconate.

The results of third party testing are shown in FIG. 41. Three block data sets were used, with all batches meeting ASTM C90 specification. $CO_2$ alone made the blocks 6% weaker than control, but using $CO_2$ plus sodium gluconate made it 8% stronger than control. $CO_2$ alone increased water absorption by 7% compared to control, but $CO_2$ plus sodium gluconate resulted in blocks with 4% lower water absorption compared to control. Shrinkage was increased for both $CO_2$ and $CO_2$ plus gluconate sets, but for the sodium gluconate batch it was effectively equivalent to the control.

This Example demonstrates that a pre-determined sodium gluconate dose for a new mix, based on previous results, was sufficient to produce carbonated blocks comparable in mass and shrinkage, greater in compressive strength, and lower in water absorption than uncarbonated blocks without sodium gluconate.

Example 16

The following protocols were used in EXAMPLES 17 TO 21, with modifications as indicated in particular examples.
Mortar Mix
1. Prepare the mixing bowl by dampening the sides with a wet cloth, be sure to remove any pooling water from the bowl before introducing raw materials.
2. Weigh the necessary amount of water for your test and add the water to the damp, empty mixing bowl.
3. Add sand to mixer
4. Blend sand and water for 30 seconds on Speed #2
5. Scrape the sides of the bowl with pre wet rubber spatula to remove any materials sticking to the sides of the mixing bowl
6. Add the required cementitious materials to the mixing bowl
7. Blend Sand, water and cementitious materials for 30 seconds at Speed #2
8. Record the time that cementitious materials are added to the mix
9. Scrape the sides of the mixing bowl with a pre wet rubber spatula
10. Record the temperature
11. If you are not carbonating, skip to step 14
12. Carbonate at a flow rate of 20 liters per min for desired duration.
13. Record final temperature
14. Scrape the sides of the bowl with pre wet rubber spatula
15. Introduce necessary admixtures—the mixing sequence and dosing details of the admixtures and additives may vary according to test. Record time and dosage.
16. After each admixture or sugar is added, blend for 30 seconds
17. Measure slump using the Japanese slump cone. Record slump and spread (two measurements).
18. For slump retention, return to bowl, wait, remix 30 sec before next slump.
19. Produce a sample for calorimetry 20. Fill three mortar cubes molds with mortar (Procedure ASTM C109/C109M—12 Standard Test Method for Compressive Strength of Hydraulic Cement Mortars)
21. Cover mortar cubes with a plastic garbage bag or damp cloth and demold only after 18+/−8 hours have passed
22. Break cubes at 24 hours+/−30 minutes (use time that cement was introduced into the mix as an indicator of when samples should be broken)

Concrete Mix

Wet inside mixer, add all stone and sand, mix 30 seconds to homogenize

Add all cementitious materials, mix one minute to homogenize

Add all batch water over a period of 30 seconds, mix all materials for one minute Take initial temperature Control batch—mix for 4 minutes and take final temperature. Add admixtures as required, mix one minute Carbonated mix—inject CO2 gas at 80 LPM, enclose mixer, mix while carbonating for required time Remove cover and record final temperature, Add admixtures as required, mix one minute Record slump (ASTM C143) and cast 6 compressive strength cylinders (ASTM C192)

Take two samples for moisture/carbon quantification bake off, one sample for calorimetry Demould cylinders after 28+/−8 hours and place them in a lime water bath curing tank at a temperature of 23° C.+/−3° C.

Test compressive strength 24 hours (3 samples) and 2 at 7 days (2 samples)

Example 17

In this Example the carbon dioxide uptake of cements from two different sources, Lehigh and Holcim, were compared.

Mortar mix made under a 20 LPM flow of $CO_2$ gas. Samples were removed from the batch of mortar every 60 s until the 8 minute point. The carbon dioxide content was measured and a curve constructed relating the length of exposure to $CO_2$ gas to the approximate amount of $CO_2$ uptake. Two cements were compared. Mix design was 1350 g EN sand, 535 g of cement, 267.5 g of water. w/c=0.5.

Figure 42:
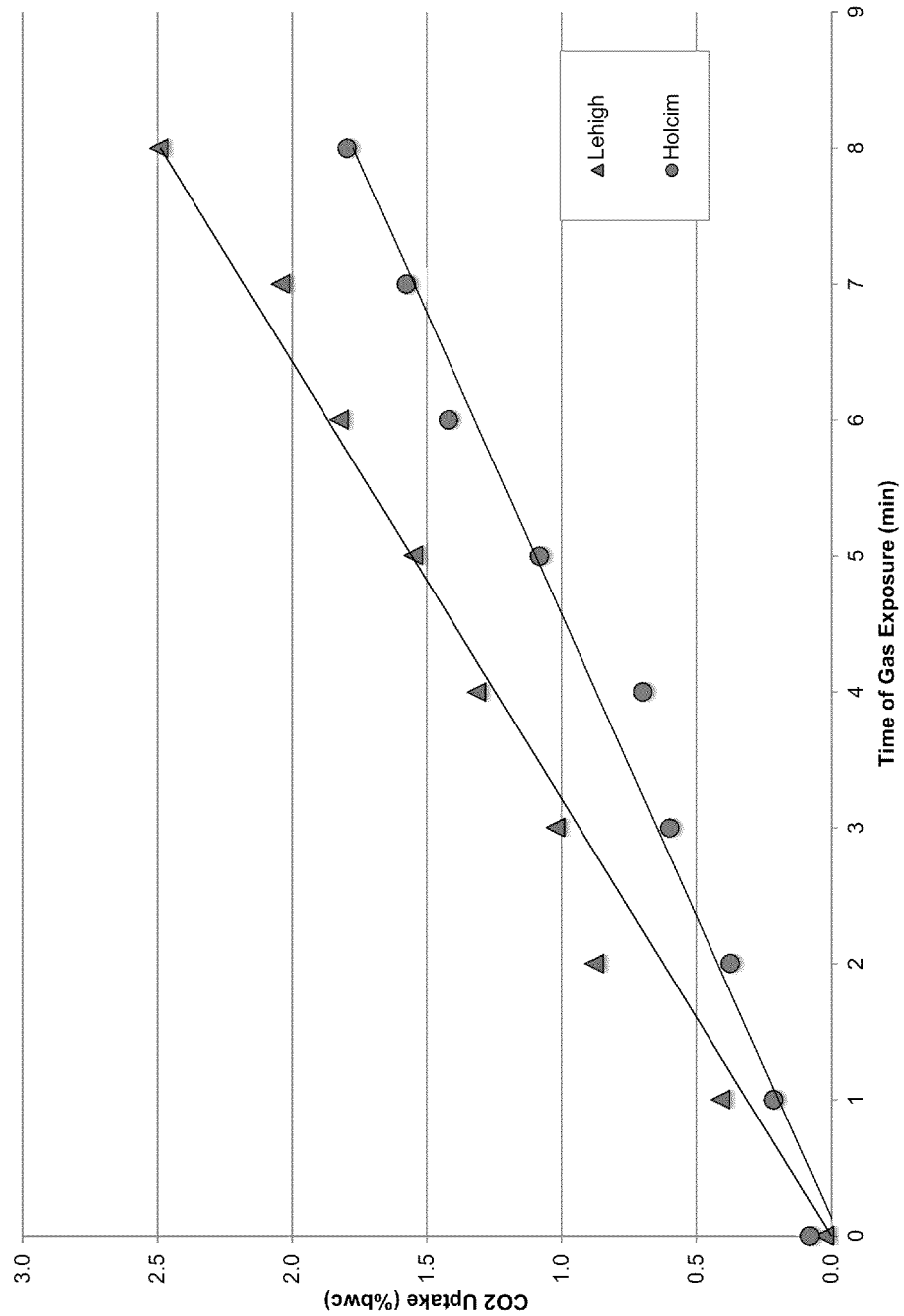
FIG. 42 provides a graphic illustration of the effect of cement type on carbon dioxide uptake in a mortar mix.

The results are shown in FIG. 42. Carbon dioxide uptake increased with time, as expected, but the rate of increase was different for the two different cements. At a w/c of 0.5, the mortar paste can absorb carbon dioxide but to exceed 1% uptake would take 3 to 5 minutes, depending on the cement type used.

This Example illustrates that a w/c of 0.5 allows carbon dioxide uptake, but at a rate that may not be compatible with mix times in some settings, and that the source of the cement can affect the properties of a hydraulic cement mix made with the cement regarding carbon dioxide uptake.

Example 18

In this Example, the effect of w/c ratio on carbon dioxide uptake was studied.

Figure 44:
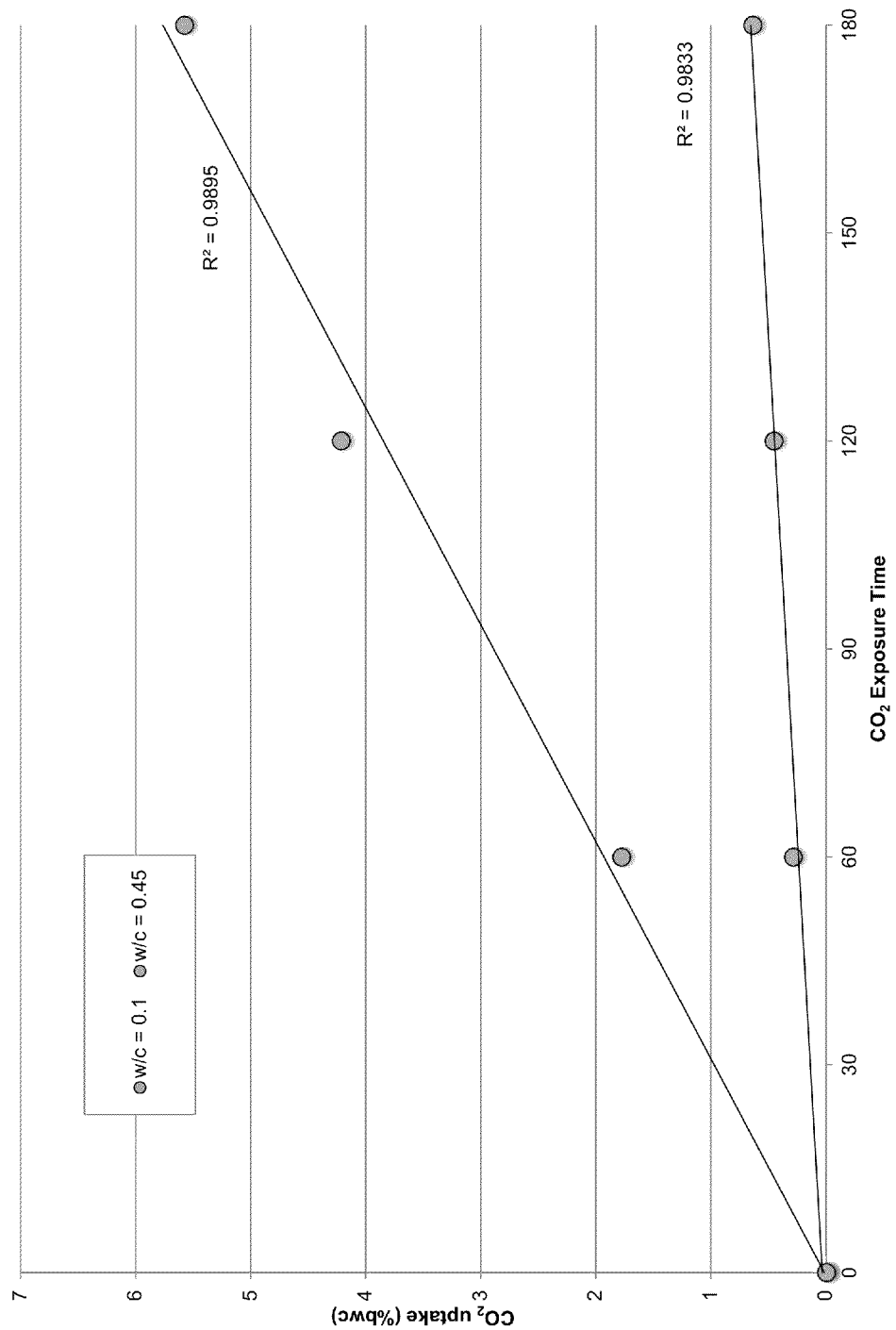
FIG. 44 provides a graphic illustration of the effect of w/c ratio on carbon dioxide uptake in a mortar mix.

In a first study, a test performed with mortar. The total mix was 990 g of Ottawa sand, 440 g cement, with 206 g of total water. Water, sand and cement were mixed, with the water added in two stages. $CO_2$ was supplied for various times at 10 LPM after the first water addition, which brought the mix to either 0.1 or 0.45 w/c, and the remaining water was then added and mixing completed. Carbon uptake at various time points was measured, as shown in FIG. 44. The rate of carbon dioxide uptake was higher for the paste with w/c 0.1 at time of reaction than for w/c of 0.45.

Figure 45:
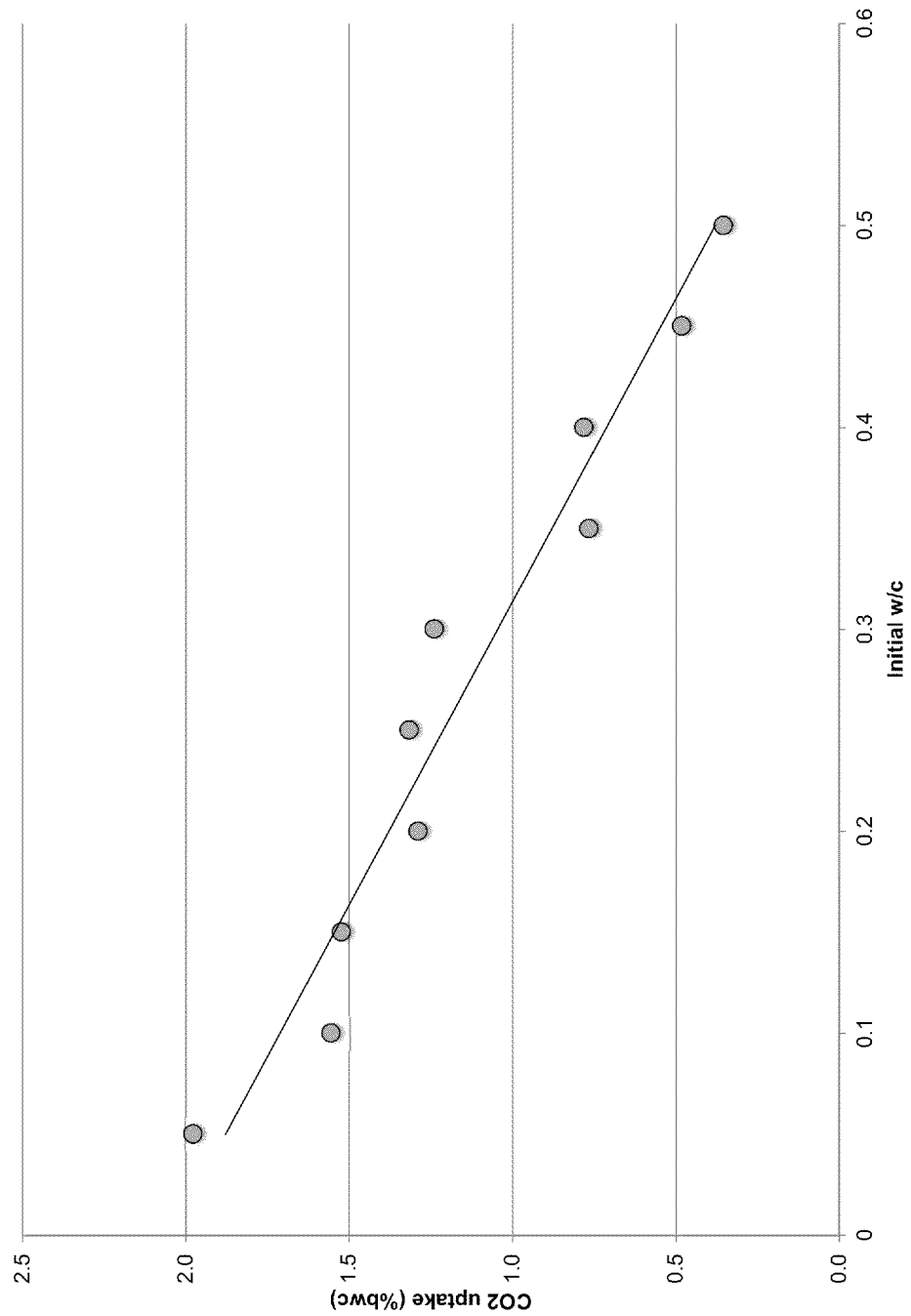
FIG. 45 provides a graphic illustration of the effect of w/c ratio on carbon dioxide uptake in a mortar mix.

In a second study, a series of tests were performed on mortar. Mortar mix made under a 20 LPM flow of $CO_2$ gas. The carbon dioxide content was measured and a curve constructed relating the w/c of the mortar mix at the time of carbon dioxide addition to the approximate amount of $CO_2$ uptake. Mix design was 1350 g EN sand, 535 g of cement (Holcim GU), 267.5 g of water. Total w/c=0.5 Water was added in two stages. One portion before carbonation, the remaining portion after 1 min of carbonation. The amount before carbonation ranged from 10% to 100% of total (w/c=0.05 to 0.50). The effect of w/c on carbonation at 1 minute is shown in FIG. 45 and TABLE 16.

TABLE 16

Effect of w/c in mortar on carbon dioxide uptake

| initial w/c | Uptake | Relative to 0.05 level |
|---|---|---|
| 0.50 | 0.00 | |
| 0.05 | 1.98 | 100% |
| 0.10 | 1.56 | 79% |
| 0.15 | 1.52 | 77% |
| 0.20 | 1.29 | 65% |
| 0.25 | 1.32 | 67% |
| 0.30 | 1.24 | 63% |
| 0.35 | 0.77 | 39% |
| 0.40 | 0.78 | 40% |
| 0.45 | 0.48 | 24% |
| 0.50 | 0.35 | 18% |

Drier mortar systems showed higher rates of uptake than did wet systems. 1.98% uptake at 0.05 w/c declined to 0.35% at 0.50 w/c.

Figure 46:
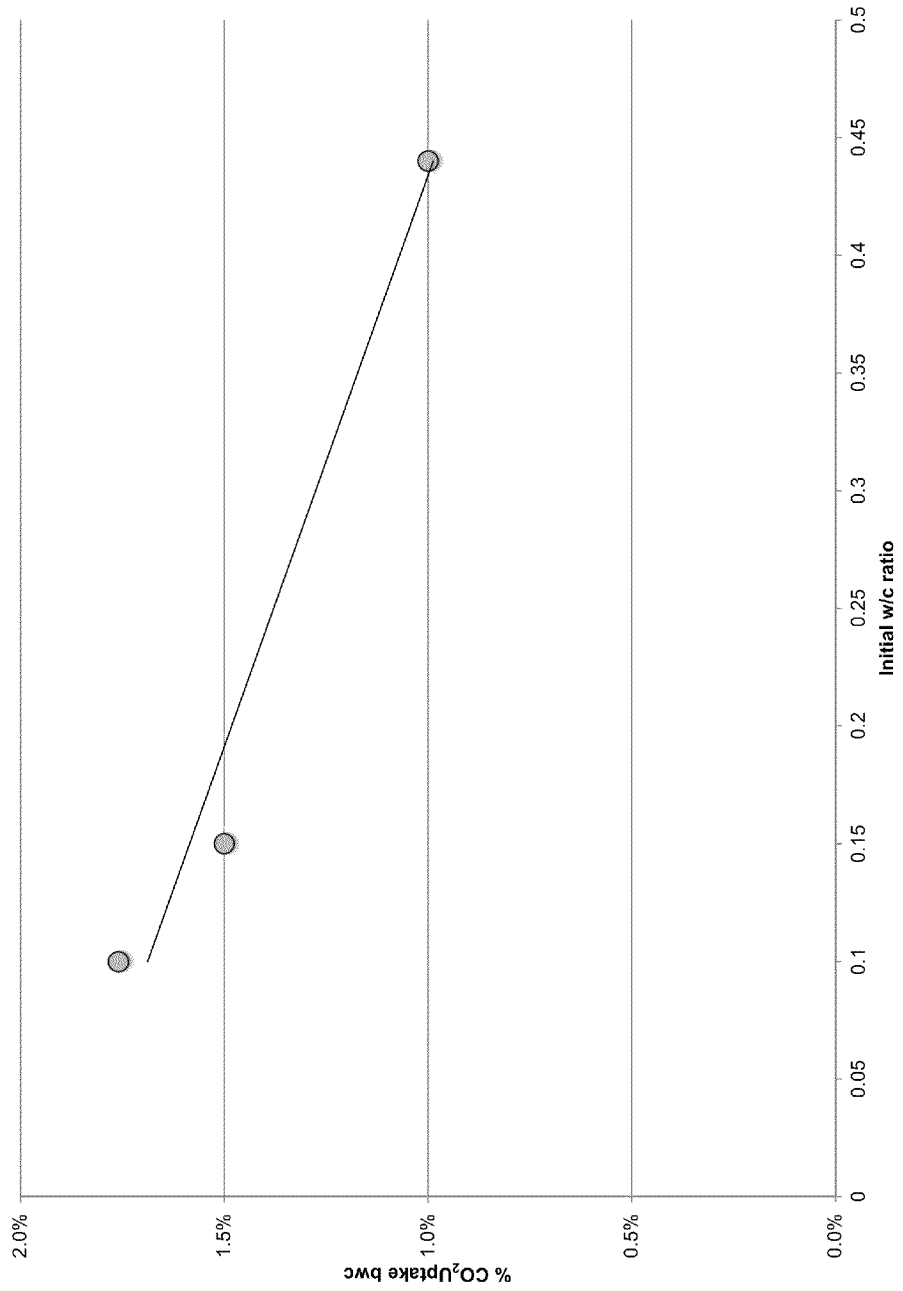
FIG. 46 provides a graphic illustration of the effect of w/c ratio on carbon dioxide uptake in a concrete mix.

In a third test, a trial concrete mix was prepared with split water additions. The total mix was 300 $kg/m^3$ cement, 60 fly ash, 160 water, 1030 stone, 832 sand. The water was added in two stages. $CO_2$ supplied for 180 seconds at 80 LPM after the first water addition. Remaining water then added and mixing completed. The w/c at carbon dioxide addition was 0.1, 0.15, or 0.45. The results are shown in FIG. 46. As with mortars, the carbon uptake increased with lower w/c when the carbon dioxide is delivered.

Example 19

This Example illustrates that temperature rise during carbonation of a hydraulic cement mix is highly correlated with degree of carbonation and can be used as an indicator of degree of carbonation in a specific system.

Figure 47:
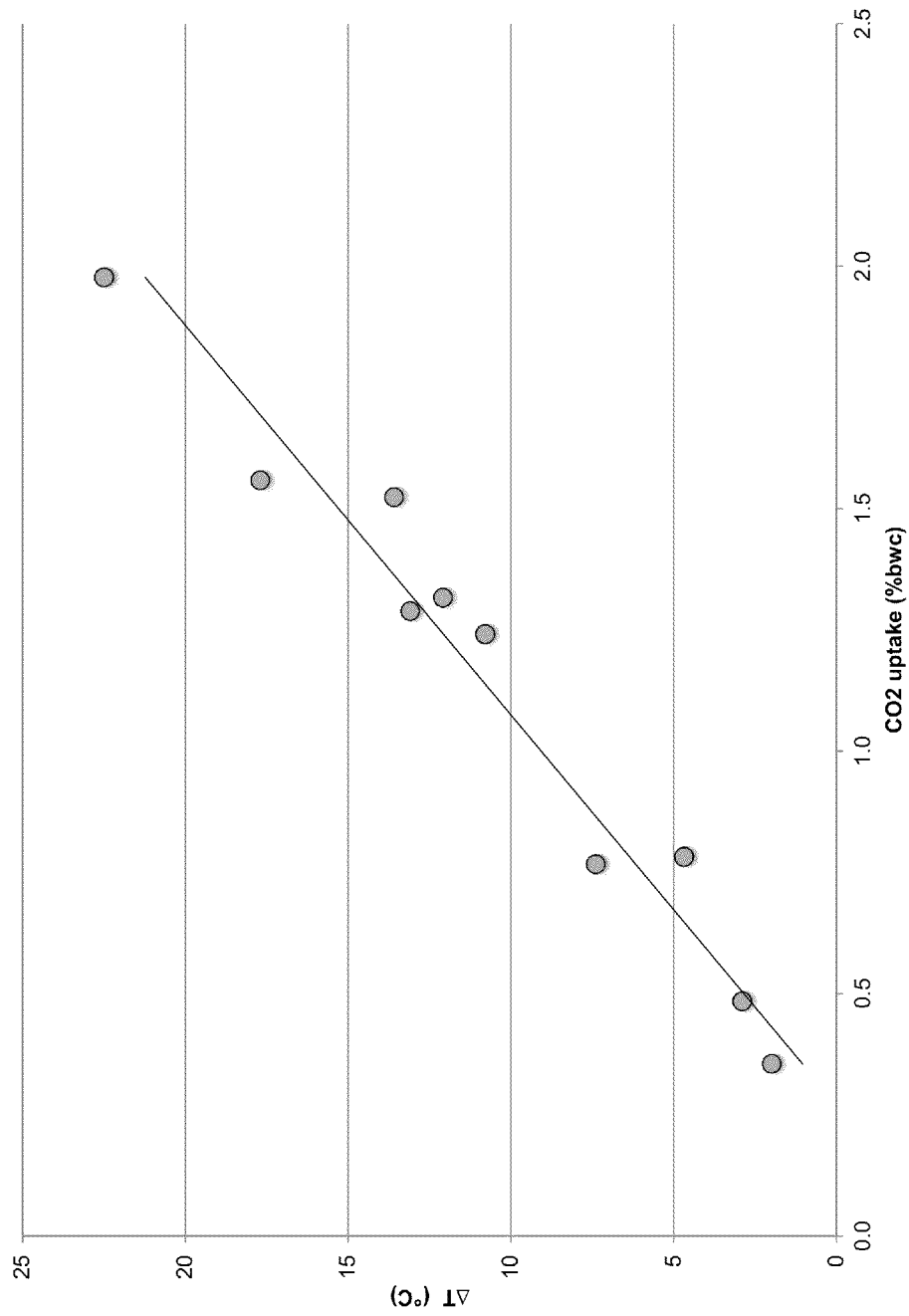
FIG. 47 provides a graphic illustration of the relationship between carbon dioxide uptake and temperature rise in a mortar mix at various w/c.

In a first test, the mortar used in the second test of EXAMPLE 17 also had temperature measurements taken at the various time points. The results are shown in FIG. 47. There was a linear relationship between degree of carbonation and temperature increase in this system, in which w/c was varied and carbon dioxide exposure was kept constant.

Figure 48:
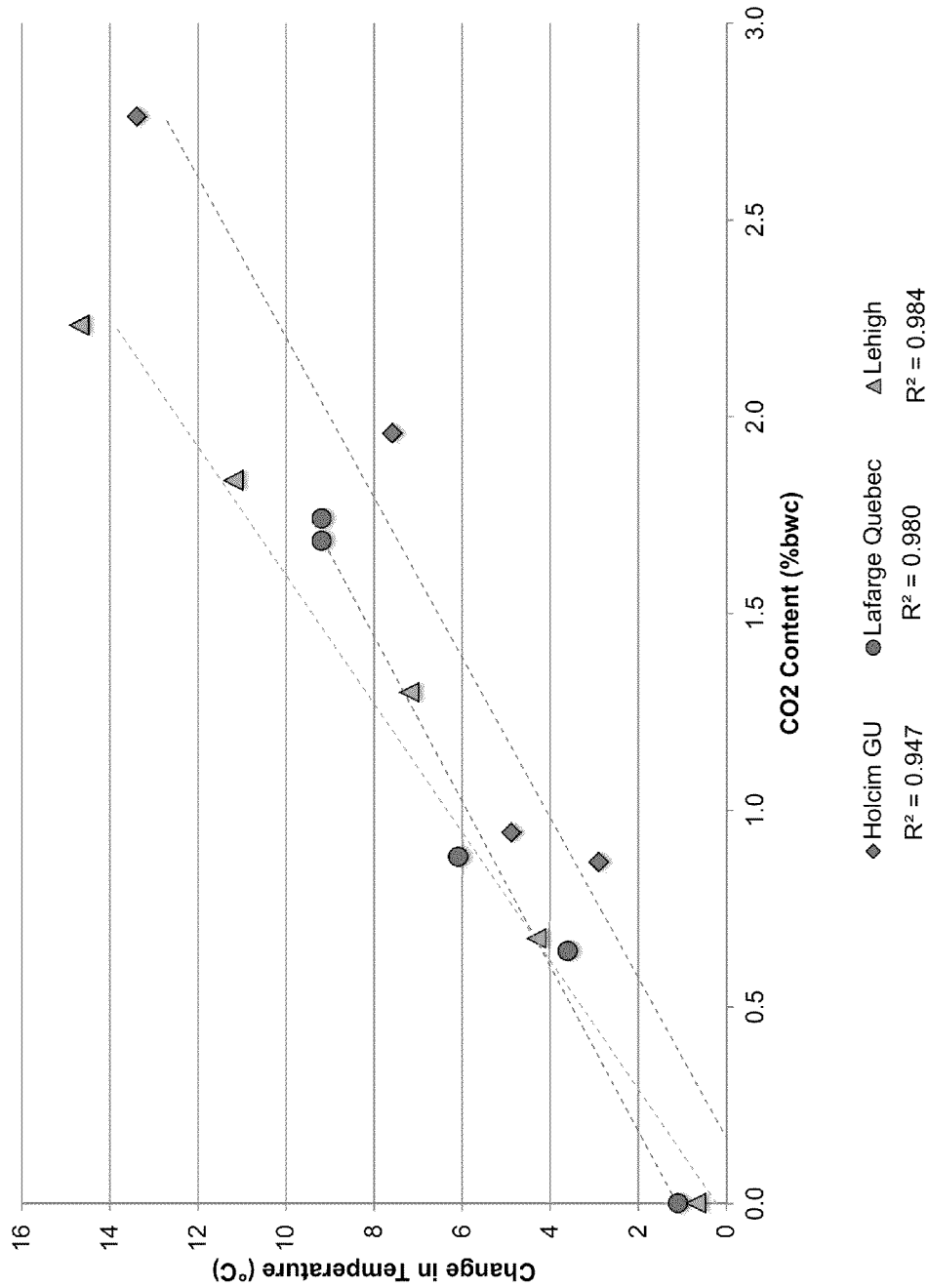
FIG. 48 provides a graphic illustration of the relationship between carbon dioxide uptake and temperature rise in mortar mixes prepared from cements from Holcim GU, Lafarge Quebec, and Lehigh, at w/c of 0.5.

In a second test, temperature vs. carbon dioxide uptake was studied in mortars prepared with three different cements, Holcim GU, Lafarge Quebec, and Lehigh. Mortar was prepared at a w/c=0.5 and carbonated for various times at 20 LPM CO2. The results are shown in FIG. 48. There was also a linear relationship between degree of carbonation and temperature rise in this system, in which w/c was kept constant at 0.5 and time of carbon dioxide exposure was varied. The relationship was relatively constant over different cement types. The slopes of the line differ in the two tests, which were conducted in two different systems, reflecting the specificity of temperature rise with carbonation to a particular system.

These results indicate that in a well-characterized system, temperature increase may be used as a proxy indicator for carbon dioxide uptake.

Example 20

This Example illustrates the effects of different admixtures on slump and compressive strength in concrete.

Figure 49:
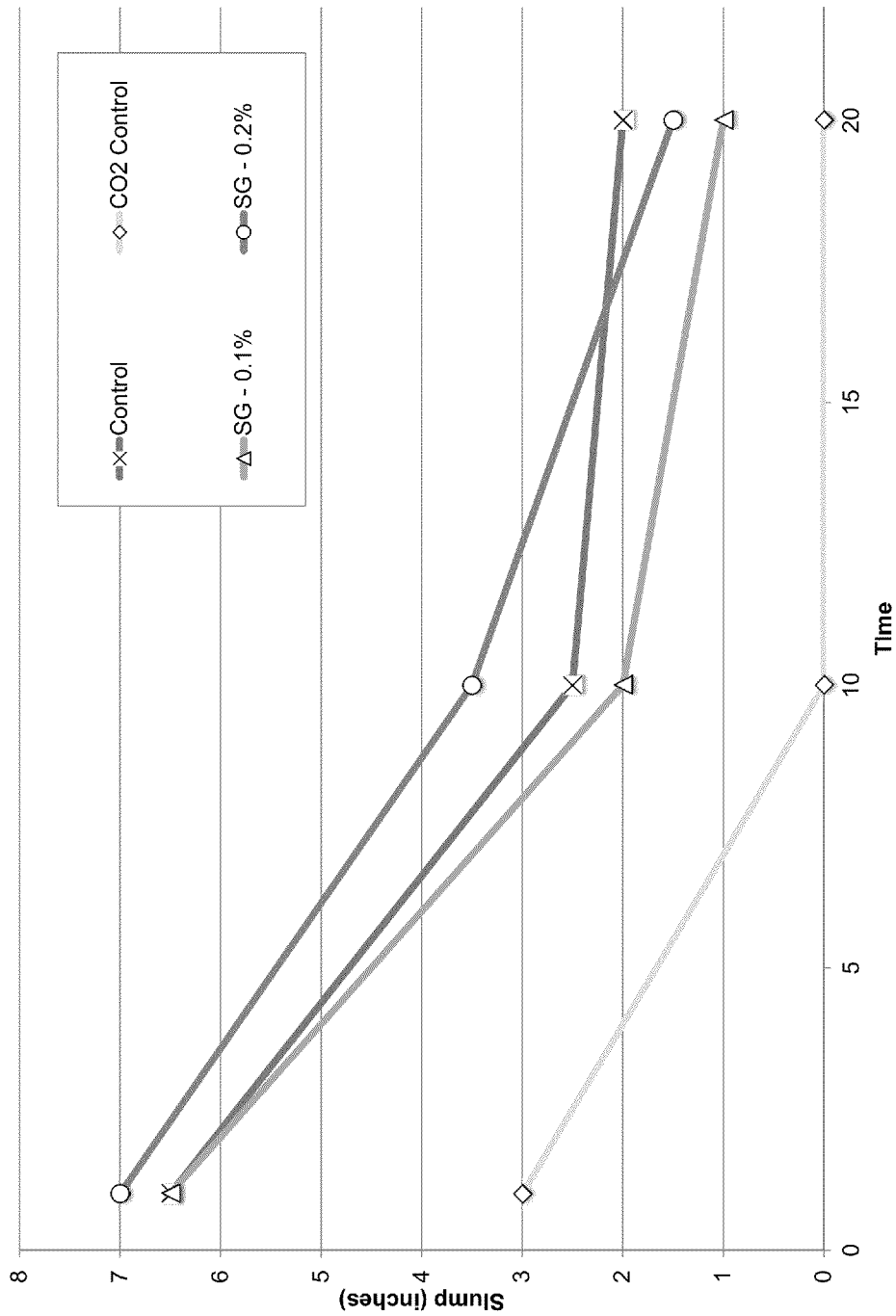
FIG. 49 provides a graphic illustration of the effects of sodium gluconate at 0, 0.1%, or 0.2%, added after carbonation to a concrete mix on slump at 1, 10, and 20 minutes.

In a first test, sodium gluconate at 0, 0.1% or 0.2% was added to a concrete mix after carbonation and the effects slump at 1, 10 and 20 minutes after mixing were measured, and compared to control, uncarbonated concrete. The results are shown in FIG. 49 and TABLE 17. The slump of the carbonated concrete is less than half of the control at 1 min and declines to no slump at 10 min. Adding 0.1% sodium gluconate after carbonation gave a slump equal to the control at 1 min, 80% at 10 min and 50% at 20 min. Adding 0.2% also provided high slump than the lower dose at all intervals, before being 75% of the control at 20 min.

TABLE 17

Effects of sodium gluconate on concrete slump

|  | Control | $CO_2$ Control | SG-0.1% | SG-0.2% |
|---|---|---|---|---|
| 1 min | 100% | 46% | 100% | 108% |
| 10 min | 100% | 0% | 80% | 140% |
| 20 min | 100% | 0% | 50% | 75% |

Figure 50:
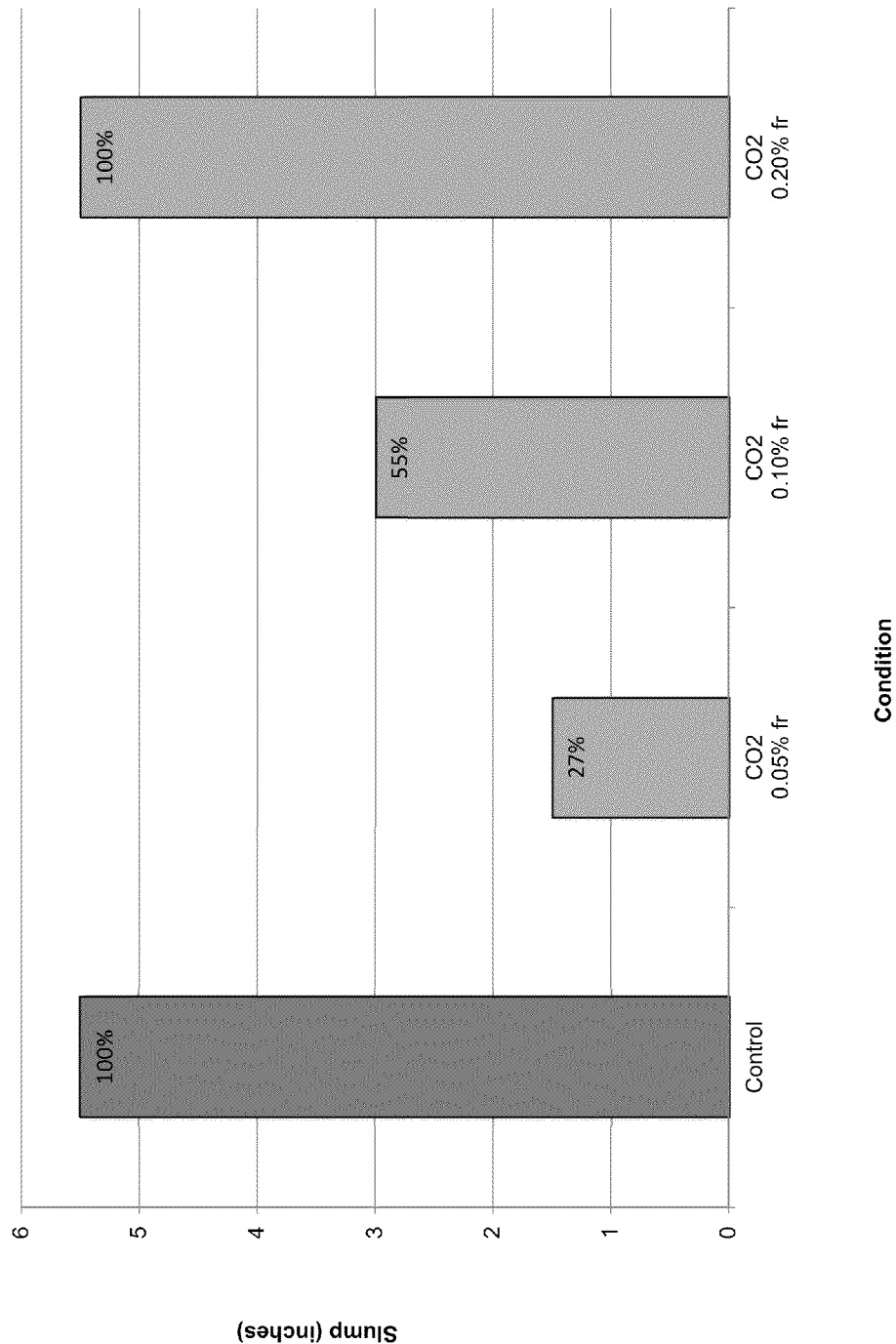
FIG. 50 provides a graphic illustration of the effects of fructose on initial slump of carbonated concrete mix.
Figure 51:
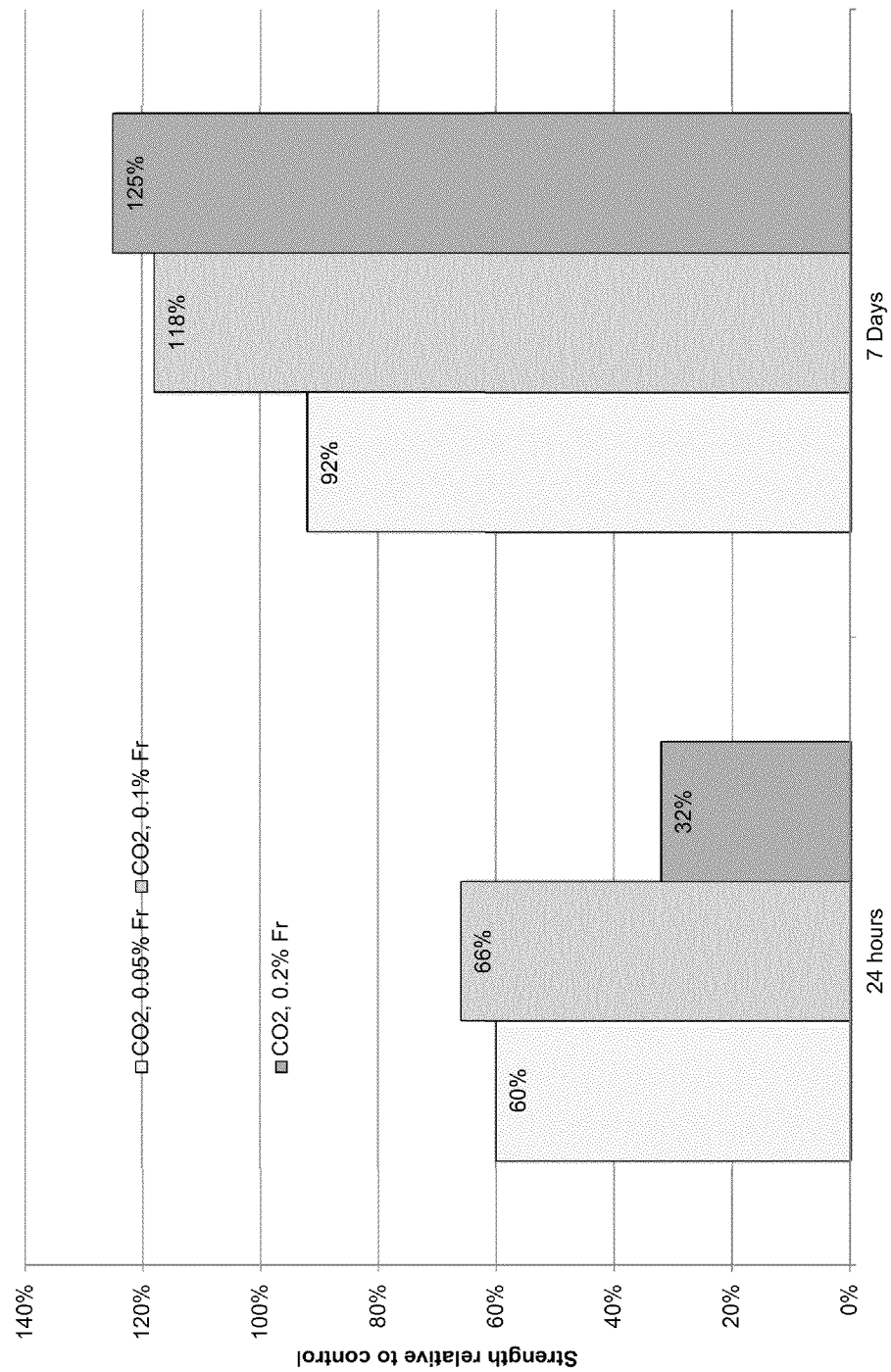
FIG. 51 provides a graphic illustration of the effects of fructose on 24-hour and 7-day compressive strength in a carbonated concrete mix.

In a second test, the effects of fructose at various concentrations on initial slump of a concrete mix were tested. Fructose was added after carbonation. Total mix was 4.22 kg cement, 1 kg fly ash, 3.11 kg water, 16.96 kg stone, 14.21 kg sand. The results are shown in FIG. 50. Carbonation reduced the slump of the concrete. In response, fructose was added after carbonation is proportions of 0.05, 0.10 and 0.20% by weight of cement. The dosages reflect solid mass of additive delivered in a solution. The $CO_2$ content was quantified as 1.3%, 1.4% and 1.5% by weight of cement for the three carbonated batches respectively. 0.20% fructose was sufficient to restore the slump to be equivalent to the control. However, fructose had a strength retarding effect, as shown in FIG. 51. Strength at 24 hours was significantly less than uncarbonated control, but strengths at 7 days was acceptable, with higher strengths associated with higher fructose contents.

Example 21

In this Example, a variety of different cements were tested in a mortar mix to determine variations in response to carbonation.

Six cements were tested: Holcim GU (Hol), Lafarge Quebec (LQc), Lafarge Brookfield (LBr), Lehigh (Leh), Illinois Product (Ipr), and Northfield Fed White (NWh). The properties and chemistries of the different cements are given in TABLE 18.

TABLE 18

Properties and chemistries of different cements

| Metric | Hol | LQc | LBr | Leh | IPr | NWh |
|---|---|---|---|---|---|---|
| Surface Area - Blaine (m²/kg) | 423 | 417 | 392 | 425 | 501 | 408 |
| Free CaO (%) | 0.31 | 0.94 | 0.16 | 1.45 | 1.45 | 1.47 |
| CaO (%) | 62.22 | 60.56 | 62.68 | 61.55 | 62.61 | 65.36 |
| Na2Oe (%) | 0.28 | 0.38 | 0.18 | 0.11 | 0.41 | 0.08 |
| SiO2 (%) | 20.30 | 19.18 | 20.10 | 19.53 | 19.12 | 21.41 |
| Al2O3 (%) | 4.62 | 4.72 | 5.24 | 4.45 | 5.47 | 4.38 |
| TiO2 (%) | 0.22 | 0.21 | 0.26 | 0.32 | 0.29 | 0.08 |
| P2O5 (%) | 0.14 | 0.26 | 0.05 | 0.25 | 0.13 | 0.01 |
| Fe2O3 (%) | 2.50 | 2.74 | 2.27 | 3.00 | 2.23 | 0.20 |
| MgO (%) | 2.21 | 2.80 | 1.48 | 3.21 | 2.70 | 0.90 |
| Na2O (%) | 0.22 | 0.32 | 0.11 | 0.06 | 0.34 | 0.06 |
| K2O (%) | 0.92 | 0.84 | 1.09 | 0.70 | 1.01 | 0.28 |
| Mn2O3 (%) | 0.05 | 0.09 | 0.07 | 0.18 | 0.19 | 0.01 |
| SrO (%) | 0.08 | 0.24 | 0.06 | 0.04 | 0.07 | 0.03 |
| SO3 (%) | 3.63 | 3.79 | 4.10 | 2.96 | 3.88 | 3.94 |
| BaO (%) | 0.06 | 0.05 | 0.13 | 0.05 | 0.05 | 0.08 |
| ZnO (%) | 0.04 | 0.07 | 0.00 | 0.02 | 0.01 | 0.00 |
| Cr2O3 (%) | 0.01 | 0.03 | 0.01 | 0.01 | 0.01 | 0.00 |
| Loss on ignition to 975° C. (%) | 2.52 | 4.08 | 2.38 | 3.54 | 1.98 | 3.00 |

The mortar mix was EN 196 Sand 1350 g, Cement 535 g, Water 267.5 g, w/c Ratio 0.5. $CO_2$ was added to the mixing bowl at 20 LPM for durations of 0, 2, 4, 6, and 8 minutes. Temperature change, slump, flow-spread, $CO_2$ uptake, and 24 hr cube strength were measured. The results are given in TABLE 19.

TABLE 19

Properties of carbonated mortars made with different cements

|  |  | Hol | LQc | LBr | Leh | IPr | NWh |
|---|---|---|---|---|---|---|---|
| 0 min CO2 | CO2 Uptake (% bwc) | 0.00 | 0.00 | 0.00 | 0.00 | 0.00 | 0.00 |
|  | Delta T (° C.) | 0.0 | 1.1 | 1.2 | 0.7 | 1.3 | 1.0 |
|  | Slump (mm) | 110 | 115 | 100 | 110 | 95 | 105 |
|  | Slump (% of Control) | 100% | 100% | 100% | 100% | 100% | 100% |
|  | Work (mm) | 157 | 185 | 144 | 165 | 130 | 180 |
|  | Strength (Mpa) | 20.2 | 15.0 | 25.1 | 16.0 | 33.4 | 20.4 |
|  | Strength (% of Control) | 100% | 100% | 100% | 100% | 100% | 100% |
| 2 min CO2 | CO2 Uptake (% bwc) | 0.87 | 0.64 | 0.47 | 0.67 | 0.55 | 0.69 |
|  | Delta T (° C.) | 2.9 | 3.6 | 2.8 | 4.3 | 3.7 | 6.5 |
|  | Slump (mm) | 70 | 105 | 40 | 50 | 10 | 30 |
|  | Slump (% of Control) | 64% | 91% | 40% | 45% | 11% | 29% |
|  | Work (mm) | 83 | 140 | 58 | 60 | 10 | 35 |
|  | Strength (Mpa) | 9.9 | 7.6 | 12.0 | 13.1 | 31.3 | 17.3 |
|  | Strength (% of Control) | 49% | 38% | 48% | 65% | 94% | 85% |

TABLE 19-continued

Properties of carbonated mortars made with different cements

| | | Hol | LQc | LBr | Leh | IPr | NWh |
|---|---|---|---|---|---|---|---|
| 4 min CO2 | CO2 Uptake (% bwc) | 0.94 | 0.88 | 1.10 | 1.30 | 1.79 | 0.88 |
| | Delta T (° C.) | 4.9 | 6.1 | 7.6 | 7.2 | 9.3 | 9.3 |
| | Slump (mm) | 60 | 70 | 20 | 45 | 0 | 8 |
| | Slump (% of Control) | 55% | 61% | 20% | 41% | 0% | 8% |
| | Work (mm) | 75 | 78 | 21 | 45 | 0 | 10 |
| | Strength (Mpa) | 9.9 | 8.1 | 11.2 | 10.9 | 27.5 | 16.4 |
| | Strength (% of Control) | 49% | 40% | 45% | 54% | 82% | 80% |
| 6 min CO2 | CO2 Uptake (% bwc) | 1.96 | 1.74 | 4.06 | 1.84 | 2.71 | 1.57 |
| | Delta T (° C.) | 7.6 | 9.2 | 9.7 | 11.2 | 13.2 | 12.7 |
| | Slump (mm) | 35 | 70 | 0 | 35 | 0 | 0 |
| | Slump (% of Control) | 32% | 61% | 0% | 32% | 0% | 0% |
| | Work (mm) | 35 | 89 | −6 | 37 | 0 | 0 |
| | Strength (Mpa) | 8.8 | 6.4 | 11.2 | 13.4 | 29.5 | — |
| | Strength (% of Control) | 43% | 32% | 45% | 66% | 88% | — |
| 8 min CO2 | CO2 Uptake (% bwc) | 2.76 | 1.68 | 1.27 | 2.23 | 3.75 | 2.07 |
| | Delta T (° C.) | 13.4 | 9.2 | 14.8 | 14.7 | 22.2 | 17.3 |
| | Slump (mm) | 5 | 40 | 0 | 15 | 0 | 0 |
| | Slump (% of Control) | 5% | 35% | 0% | 14% | 0% | 0% |
| | Work (mm) | 5 | 44 | −8 | 13 | 0 | 0 |
| | Strength (Mpa) | 8.2 | 6.8 | 13.9 | 14.5 | — | — |
| | Strength (% of Control) | 41% | 34% | 56% | 72% | — | — |

Figure 52:
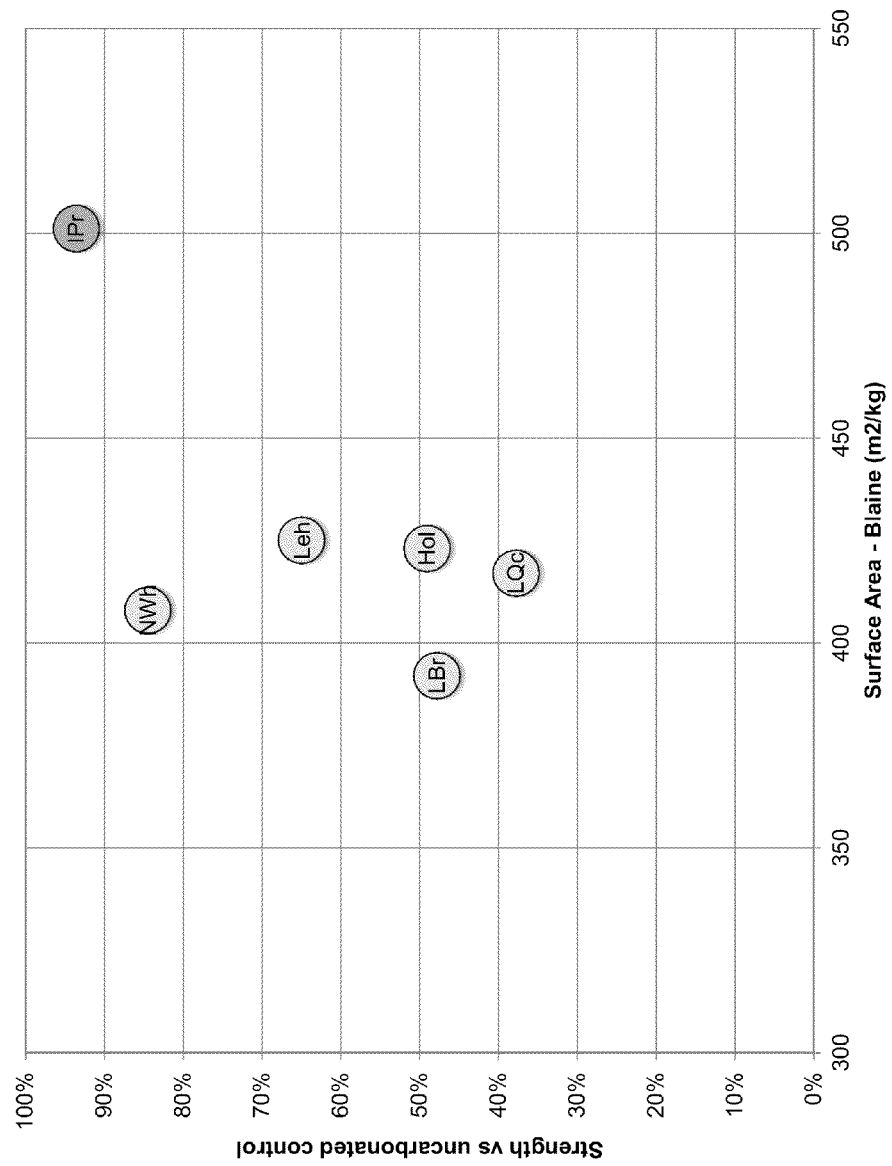
FIG. 52 provides a graphic illustration of the relationship between surface area compressive strength at 24 hours of carbonated mortars produced with different cements.

There was considerable variation among the mortars made from the different cements in slump and strength. The Illinois Product was notable for its higher compressive strength at all time points tested. Without being bound by theory, this may be due to its greater surface area (see TABLE 18), which allows it to absorb carbon dioxide with relatively less proportional impact on strength development. Strength vs. surface area of carbonated mortar mixes with various surface areas is shown in FIG. 52.

Example 22

In this Example, various admixtures were added to cement paste mixes exposed to carbon dioxide and their effects on slump after mixing were determined. The paste mix was 500 g cement, 250 g water. Holcim GU cement. 1% bwc $CO_2$ was dosed, with mixing for one minute. The results are shown in TABLE 20.

TABLE 20

Effects of admixtures on slump of carbonated mortar

| Condition (all doses expressed as % by weight of cement) | Paste Spread (cm) 1 Min after mixing | Paste Spread (cm) 10 Min after mixing |
|---|---|---|
| Control | 11.5 | 13.75 |
| 1% CO2 | 8.75 | 5 |
| 1% CO2 + 1% Na2SO4 | 9.75 | 4.25 |
| 1% CO2 + 3% Na2SO4 | 7.25 | 4 |
| 1% CO2 + 5% Na2SO4 | 4.75 | 4 |
| 1% CO2 + 0.04% Citric Acid | 6.75 | 4 |
| 1% CO2 + 0.10% Gluconate | 6.5 | 4.25 |
| 1% CO2 + 0.15% Gluconate | 9.25 | 9.75 |
| 1% CO2 + 0.20% Gluconate | 9.25 | 10.25 |
| 1% CO2 + 0.05% Gluconate—After Carbonation | 9.75 | 4.75 |
| 1% CO2 + 0.10% Gluconate—After Carbonation | 10.75 | 11.775 |
| 1% CO2 + 0.15% Gluconate—After Carbonation | 13.5 | 14 |

Example 23

In this Example, sensors for carbon dioxide and moisture were used in a mixing operation.

A precast operation was performed using the following mix compone

| Aggregate | Fine | Shaw Resources Sand | 602 kg |
|---|---|---|---|
| Aggregate | Coarse | 3/8" Coldstream | 200 kg |
| Aggregate | Coarse | Granodiorite | 839 kg |
| Cement | Cement | Maxcem | 286 kg |
| Admix | | Rheopel Plus | 400 ml |
| Admis | | Rheofit 900 | 350 ml |

Two carbon dioxide sensors were used, Sensor 1 positioned adjacent to an access hatch to the mixer and Sensor 2 positioned at the ejection location of the mixer, at a door that discharges onto a belt. $CO_2$ dose was increased or decreased depending on the overspill, as detected by the two sensors.

They are involved in a two stage injection approach.
1. Fill—high flowrate to fill the mixer with $CO_2$
2. Supply—lower flowrate to maintain a supply as $CO_2$ is absorbed by the concrete.

The PLC was programmed as follows to make changes based on the readings of the $CO_2$ sensors:

Sensor 1 to be placed by door, sensor 2 placed by mixer exit (measure each sensor separately)

If sensor 1 exceeds X ppm during flow 1, go to flow 2

If sensor 1 exceeds X ppm during flow 2, reduce flow by reduce percentage

If sensor 2 exceeds Y ppm ever, reduce max mix time by reduce time

If either sensor exceeds 5000 ppm for more than 5 mins, pop-up alarm on screen

If either sensor exceeds 5000 ppm for more than 10 mins, shut off system

If either sensor exceeds 9000 ppm, shut system off

X and Y were programmable under each recipe (this allows change if a plant has a high $CO_2$ baseline due to dust etc.). Flow 1 was programmable and was the flow that was used to fill the headspace quickly (usually 1500 LPM). Flow 2 was calculated by the PLC and was based on max mix time, $CO_2$ dose and the total already in the headspace. Max mix time was programmable and was the total desired injection time. Reduce percentage and reduce time were programmable and were determine by what percentage to reduce either the flowrate (thus reducing total CO2 dosage) or the max mix time (thus increasing flowrate to inject in shorter time).

Figure 53:
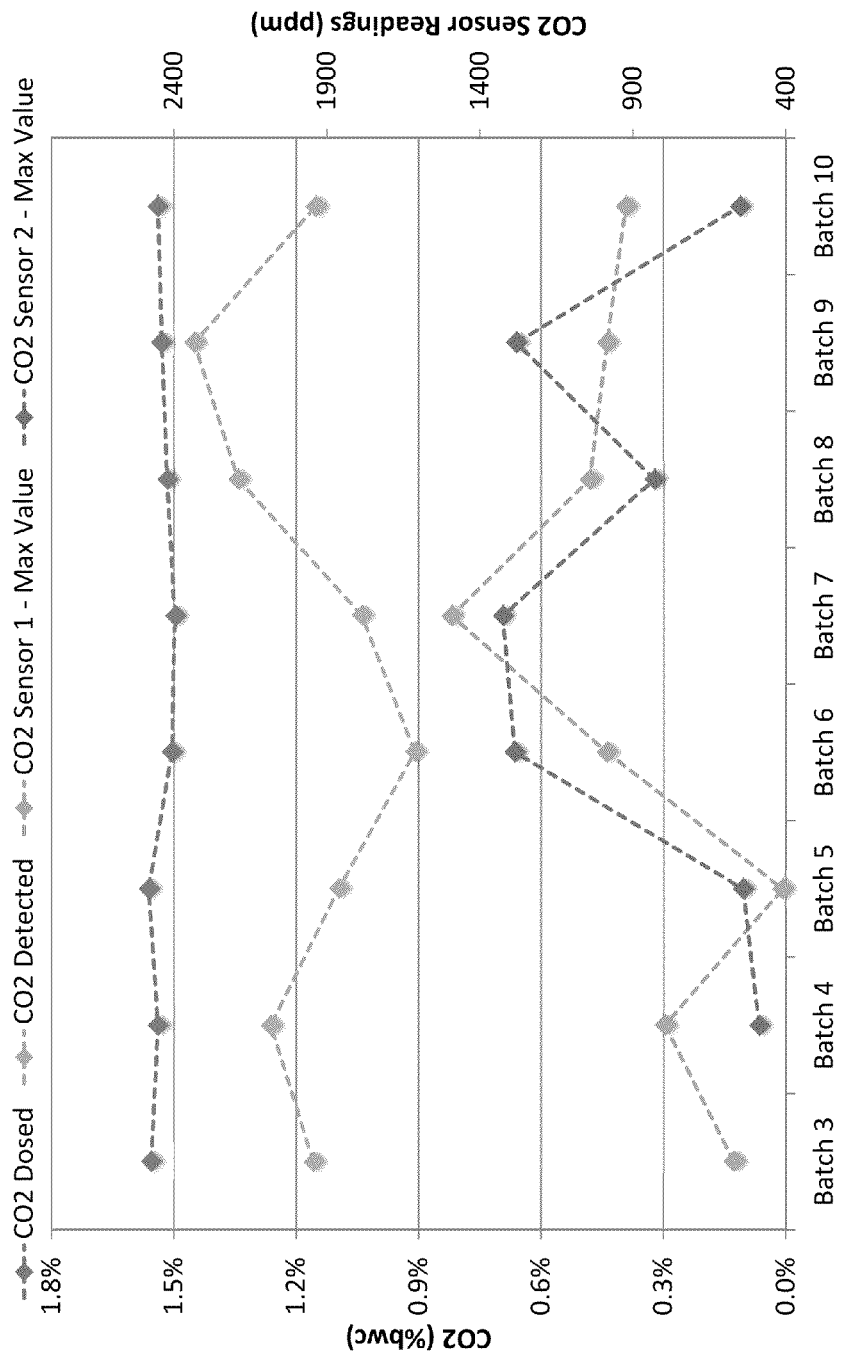
FIG. 53 provides a graphic illustration of carbon dioxide dosing (top line), carbon dioxide uptake (second line from top), and carbon dioxide detected at two sensors (bottom two lines) in a precast mixing operation where carbon dioxide flow was adjusted according to the carbon dioxide detected by the sensors.

The system was used over several batches and the results are shown in FIG. 53. The top line of FIG. 53 indicates the actual $CO_2$ dosed, and the second line indicates $CO_2$ detected in the mix. The efficiency of uptake varied from 60 to 95%. The bottom two lines indicate maximum values detected at Sensor 1 (all batches including Batch 3) and Sensor 2 (Batches 4-10). Average values may produce a better result.

This Example demonstrates that carbon dioxide sensors may be used to adjust the flow of carbon dioxide in a cement mixing operation, producing uptake efficiencies up to 95%.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. An apparatus for carbonating a cement mix comprising a cement binder and aggregate in a cement mix apparatus during a mix operation, comprising
   (i) a mixer for mixing the cement mix, wherein the mixer is an open mixer;
   (ii) a system for contacting the cement mix in the mixer with carbon dioxide operably connected to the mixer and comprising a first actuator for modulating a flow of carbon dioxide to the mixer through a conduit comprising an opening directed to the mixer;
   (iii) a first sensor positioned at a first location and configured to monitor a characteristic of the mix operation, wherein the characteristic comprises a carbon dioxide content of a gas mixture exiting from the mixer; and to transmit information regarding the characteristic to a controller;
   (iv) the controller, wherein the controller is operably connected to the sensor and the actuator and configured to process the information and determine whether or not and/or to what degree to modulate the flow of carbon dioxide to the mixer, based at least in part on receiving information from the sensor regarding the carbon dioxide content of the gas mixture exiting from the mixer at the first location and comparing the carbon dioxide content of the gas mixture exiting from the mixer at the first location with a predetermined threshold level, and to transmit a signal to the actuator to modulate the flow of carbon dioxide to the mixer if the carbon dioxide content of the gas mixture exiting the mixer exceeds the threshold.

2. The apparatus of claim 1 comprising a second sensor configured to monitor
   (i) mass of cement binder added to the cement mix,
   (ii) location of the cement binder in the mixer,
   (iii) carbon dioxide content of a gas mixture within the mixer in contact with the cement mix,
   (iv) carbon dioxide content of gas mixture exiting from the mixer at a second location,
   (v) carbon dioxide content of gas mixture in the vicinity of the mixer,
   (vi) temperature of the cement mix or a component in contact with the cement mix,
   (vii) rheology of the cement mix, or
   (viii) moisture content of the cement mix,
wherein the controller is operably connected to the second sensor and configured to process information from the second sensor and
   (a) determine whether or not and/or to what degree to modulate the flow of carbon dioxide to the mixer, based at least in part on the information from the second sensor, or
   (b) store and process the information from the second sensor for a first batch of cement mix and to adjust conditions for a subsequent second cement mix batch based at least in part on the processing to optimize one or more aspects of the mix operation, or
   (c) both (a) and (b).

3. The apparatus of claim 2 wherein the controller is configured to store and process the information obtained regarding the characteristic monitored by the second sensor for a first batch of cement mix and to adjust conditions for a subsequent second cement mix batch based at least in part on the processing to optimize one or more aspects of the mix operation.

4. The apparatus of claim 3 wherein the condition adjusted comprises total amount of carbon dioxide added to the cement mix, rate of addition of carbon dioxide, time of addition of carbon dioxide, whether or not an admixture is added to the cement mix, type of admixture added, timing of addition of admixture, amount of admixture, amount of water added to the cement mix, timing of addition of water, cooling the cement mix during or after carbon dioxide addition, or a combination thereof.

5. The apparatus of claim 4 wherein the condition adjusted comprises total amount of carbon dioxide added to the cement mix, rate of addition of carbon dioxide, time of addition of carbon dioxide, or a combination thereof.

6. The apparatus of claim 2 further comprising a third sensor that is different from the first and second sensors and is configured to monitor
   (i) mass of cement binder added to the cement mix,
   (ii) location of the cement binder in the mixer,
   (iii) carbon dioxide content of a gas mixture within the mixer in contact with the cement mix,
   (iv) carbon dioxide content of gas mixture exiting from the mixer at a third location,
   (v) carbon dioxide content of gas mixture in the vicinity of the mixer,
   (vi) temperature of the cement mix or a component in contact with the cement mix,
   (vii) rheology of the cement mix, or
   (viii) moisture content of the cement mix,
wherein the controller is operably connected to the third sensor and configured to process information from the third sensor and
   (a) determine whether or not and/or to what degree to modulate the flow of carbon dioxide to the mixer, based at least in part on the information from the third sensor, or
   (b) store and process the information from the third sensor for a first batch of cement mix and to adjust conditions for a subsequent second cement mix batch based at least in part on the processing to optimize one or more aspects of the mix operation, or
   (c) both (a) and (b).

7. The apparatus of claim 1 further comprising a second actuator configured to modulate an additional characteristic of the mix operation, wherein the actuator is operably connected to the controller and wherein the controller is configured to send a signal to the actuator to modulate the additional characteristic based on the processing of information from one or more sensors.

8. The apparatus of claim 7 wherein the second actuator is configured to modulate addition of admixture to the cement mix, type of admixture added to the cement mix, timing of addition of admixture to the cement mix, amount of admixture added to the cement mix, amount of water added to the cement mix, timing of addition of water to the cement mix, or cooling the cement mix during or after carbon dioxide addition.

9. The apparatus of claim 1 wherein the controller is configured to store and process the information obtained regarding the characteristic monitored by the first sensor for a first batch of cement mix and to adjust conditions for a subsequent second cement mix batch based on the processing to optimize one or more aspects of the mix operation.

10. The apparatus of claim 9 wherein the controller is further configured to receive and process information regarding one or more characteristics of the cement mix measured after the cement mix leaves the mixer, and to transmit signals to one or more actuators configured to adjust conditions for the second cement mix batch based on the processing to modulate contact with the carbon dioxide or another characteristic of the mix operation.

11. The apparatus of claim 9 wherein the condition adjusted comprises total amount of carbon dioxide added to the cement mix, rate of addition of carbon dioxide, time of addition of carbon dioxide, whether or not an admixture is added to the cement mix, type of admixture added, timing of addition of admixture, amount of admixture, amount of water added to the cement mix, timing of addition of water, cooling the cement mix during or after carbon dioxide addition, or a combination thereof.

12. The apparatus of claim 9 wherein the condition adjusted comprises total amount of carbon dioxide added to the cement mix, rate of addition of carbon dioxide, time of addition of carbon dioxide, or a combination thereof.

13. The apparatus of claim 1 wherein the controller, sensor, actuator, or combination thereof, is configured to transmit information regarding the characteristics monitored and conditions modulated to a central controller that is configured to receive information from a plurality of controllers, sensors, actuators, or combination thereof, each of which transmits information from a separate mix operation to the central controller.

14. The apparatus of claim 13 wherein the central controller is configured to process the information received from the plurality of controllers, sensors, actuators, or combination thereof and processes the information to modulate one or more of the plurality of mix operations.

15. The apparatus of claim 1 wherein the processor is configured to control the first actuator such that exposure of the cement mix to the carbon dioxide is modulated in such a way as to achieve an efficiency of carbonation of at least 60%, wherein efficiency of carbonation is the amount of carbon dioxide retained in the cement mix per the total amount of carbon dioxide to which the cement mix is exposed during mixing.

16. The apparatus of claim 1 wherein the conduit is configured to deliver carbon dioxide comprising liquid and/or gaseous carbon dioxide to the opening, wherein the opening is an orifice is adapted to allow for the flow of both liquid and gaseous carbon dioxide therethrough, and wherein the orifice is configured to cause the liquid carbon dioxide to convert to gaseous and solid carbon dioxide as it is delivered to the mixer.

17. The apparatus of claim 16 wherein the controller is further configured to adjust the flow rate of carbon dioxide, or to adjust the orifice, or both, based on the ratio of gaseous to solid carbon dioxide delivered to the mixer.

18. The apparatus of claim 17 wherein the ratio is in the range of 1:10 to 10:1 gaseous carbon dioxide:solid carbon dioxide.

19. The apparatus of claim 1 wherein the mixer is a stationary mixer.

20. The apparatus of claim 19 wherein the mixer comprises a mixer for a precast operation with leak points.

21. The apparatus of claim 20 wherein the first sensor is located at or near a leak point of the mixer.

22. The apparatus of claim 1 wherein the mixer is a transportable mixer.

23. The apparatus of claim 22 wherein the mixer is a drum of a ready mix truck.

24. The apparatus of claim 1 wherein the opening is positioned to supply carbon dioxide to the surface of the mixing cement mix.

25. The apparatus of claim 24 wherein the opening is positioned to be at least 10 cm from the surface of the mixing cement mix, on average.

26. The apparatus of claim 1 wherein the orifice is positioned to be at least 50 cm from the surface of the mixing cement mix, on average.

27. The apparatus of claim 1 further comprising a temperature sensor operably connected to the controller, wherein the determination of the controller of whether or not and/or to what degree to modulate the flow of carbon dioxide to the mixer is determined at least in part based on the temperature sensed by the temperature sensor.

28. The apparatus of claim 27 further comprising a pressure sensor operably connected to the controller, wherein the determination of the controller of whether or not and/or to what degree to modulate the flow of carbon dioxide to the mixer is determined at least in part based on the pressure sensed by the pressure sensor.

29. The apparatus of claim 1 wherein the signal to the modulate the flow of carbon dioxide to the mixer is a signal to decrease the flow of carbon dioxide to the mixer or a signal to decrease the time that flow continues, or a combination thereof.

30. The apparatus of claim 1 wherein the threshold is a threshold that indicates overspill of carbon dioxide from the mixer.

31. The apparatus of claim 1 wherein the threshold is a threshold that indicates worker safety is threatened.

32. The apparatus of claim 31 wherein the modulation is a complete cessation of the flow of carbon dioxide.

33. The apparatus of claim 1 wherein the controller is further operably connected to a component that alerts the controller when cement is released into the mixer.

34. The apparatus of claim 33 wherein the component comprises a proximity sensor at a cement silo release point or a mix controller for the overall mix operation.

35. The apparatus of claim 33 wherein the controller is further configured to delay carbon dioxide delivery to the mixer for a predetermined time after release of the cement.

36. The apparatus of claim 1 wherein the cement binder comprises a hydraulic cement.

37. The apparatus of claim 1 wherein the controller is configured to receive information regarding the weight of cement used in the mix.

38. The apparatus of claim 37 wherein the controller is configured to calculate a total amount of carbon dioxide to be delivered to the mix.

39. The apparatus of claim 37 further comprising a sensor to monitor flow rate of carbon dioxide, a sensor to monitor the time of exposure of the cement mix to the carbon dioxide, or both.

40. The apparatus of claim 39 wherein the controller is configured to send a signal to the actuator to halt carbon dioxide flow when the total amount of carbon dioxide to be delivered to the mix has been reached.

41. The apparatus of claim 40 wherein the duration of carbon dioxide flow is less than or equal to 5 minutes.

42. The apparatus of claim 1 further comprising a cement mass sensor or from a mix controller, or both, which transmits the information regarding the weight of cement used in the mix to the controller.

43. The apparatus of claim 1 further comprising a source of carbon dioxide operably connected to the conduit, wherein the carbon dioxide provided by the source comprises at least 80% carbon dioxide.

* * * * *